United States Patent [19]

Amada

[11] Patent Number: 5,293,615
[45] Date of Patent: Mar. 8, 1994

[54] POINT AND SHOOT INTERFACE FOR LINKING DATABASE RECORDS TO SPREADSHEETS WHEREBY DATA OF A RECORD IS AUTOMATICALLY REFORMATTED AND LOADED UPON ISSUANCE OF A RECALCULATION COMMAND

[76] Inventor: Carlos A. Amada, 4 Ave. 20-38 Zona 14, Guatemala, Guatemala

[21] Appl. No.: 614,907

[22] Filed: Nov. 16, 1990

[51] Int. Cl.$^5$ ............................................. G06F 15/40
[52] U.S. Cl. .................... 395/600; 395/800; 395/700; 395/161; 395/157; 395/118; 364/401; 364/974; 364/943.1; 364/918; 364/DIG. 2; 364/282.1; 364/225
[58] Field of Search ............... 364/419, 222.81, 200, 364/900, 401, 419; 395/600, 800, 157, 161, 118, 700; 340/709

[56] References Cited

U.S. PATENT DOCUMENTS

| | | | |
|---|---|---|---|
| 4,674,040 | 6/1987 | Barker et al. | 364/300 |
| 4,713,754 | 12/1987 | Agarwal et al. | 364/200 |
| 4,868,745 | 9/1989 | Patton et al. | 364/200 |
| 5,079,695 | 1/1992 | Dysart et al. | 395/700 |
| 5,097,408 | 3/1992 | Huber | 395/600 |
| 5,121,499 | 6/1992 | McCaskill et al. | 395/700 |
| 5,157,763 | 10/1992 | Peters et al. | 395/157 |
| 5,204,947 | 4/1993 | Bernstein et al. | 395/157 |

OTHER PUBLICATIONS

Timeworks, "SwiftCalc St", 1982, pp. 9-10, 25-37, 74-80, 159.

*Primary Examiner*—Thomas C. Lee
*Assistant Examiner*—Paul Harrity
*Attorney, Agent, or Firm*—Falk, Vestal & Fish

[57] ABSTRACT

A spreadsheet program providing the combination of spreadsheet and database tools, and enabling users to develop an application environment that can use all resources in the spreadsheet storage area. The spreadsheet program comprises three storage areas: a spreadsheet data structure; a set of database files in a storage area, and a video display system. The spreadsheet data structure is divided into two sets of cells that can be operated through three different environments. The first environment contains the tools of a spreadsheet environment, and the first set of cells can be operated through the first environment. This is most appropriate for scratchpad uses. The second environment contains the tools of a spreadsheet environment and contains a special command that can define commands for the third environment. This is appropriate to develop formulas for an application, and the application's environment of operation. The second environment also contains the tools necessary to define special environments for the integrated operation of spreadsheet and database tools. Said integrated operation coordinates dynamic screen video operations of the information in the spreadsheet and database storage areas. The second set of cells (for the development and use of an application) can be operated through the second or third environments. Several environments for the integrated operation of spreadsheet and database tools can exist in this invention. The software enables users to develop and use full database applications such as integrated accounting packages, within spreadsheet environments.

21 Claims, 24 Drawing Sheets

41 RAM storage area
42 Disk storage area
43 Environment

45 Scratch section (scratchpad section)
46 Gen_prog section (general programmable section)
44 Spreadsheet storage area (spread_sa)
47 Database files storage area (db_sa)
48 Video system storage area (video_sa)

Video system storage area (video_sa)

44 Spreadsheet storage area (spread_sa)

46 General programmable section (gen_prog section)

50 Columnar programmable range (col_prog range)

44 Spreadsheet storage area (spread_sa)

45 Scratch section

50 Columnar programmable range (col_prog range)

46 General programmable section (gen_prog section)

POINT AND SHOOT INTERFACE FOR LINKING DATABASE RECORDS TO SPREADSHEETS WHEREBY DATA OF A RECORD IS AUTOMATICALLY REFORMATTED AND LOADED UPON ISSUANCE OF A RECALCULATION COMMAND

BACKGROUND OF THE INVENTION

The invention relates to the field of enhancements for spreadsheet software instruments. More specifically the invention relates to an improved environment and data interface for spreadsheet and database instruments.

Heretofore three kinds of instruments had been involved with a similar idea as that dealt with in the invention: multitasking environments (A), database systems (B) and database tools for spreadsheet instruments (C).

A. Referring to MULTITASKING ENVIRONMENTS, the DESKVIEW TM multitasking environment, by Quarterdeck Office Systems, and the MICROSOFT WINDOWS TM graphical user interface and multitasking environment, by Microsoft Corporation, allow applications such as spreadsheets and database programs to transfer information from one to another by data exchange services. But this communication between processes is slow and limited to information displayed in the video screen.

B. Referring to relational DATABASE SYSTEMS, some of these let the user build entry tables that are similar in appearance to spreadsheet tables. The FOXBASE+ TM and the FOXPRO TM programmable database file managers, by Fox Software Inc., call them browse tables. There are also other systems, such as the ADVANCED REVELATION TM programmable database file manager, by Revelation Technologies Inc., that let the user write small programs to perform field calculations that involve formulas and numerical operations. The LOTUS/DBMS TM spreadsheet/database integrative program, by Lotus Development Corporation, is one such relational database systems. A publication in the LOTUS TM industry-specific magazine, by Lotus Development Corporation, April 1988, page 5, says that the LOTUS/DBMS TM spreadsheet/database integrative program, by Lotus Development Corporation, "will share a common menu structure and programming capability with Lotus Development's forthcoming graphical spreadsheet" (referring to the LOTUS 1-2-3/G TM spreadsheet program, by Lotus Development Corporation). "This means, for example, that (the user) will be able to move data between the database and the spreadsheet without reformatting or converting." "[Besides] An add-in product will allow you to use LOTUS 1-2-3 TM Releases 2 and 3 with the LOTUS/DBMS TM server. This will enable users of Microsoft's DOS 3.0 TM operating system and OS/2 TM operating system to share information, using the familiar LOTUS 1-2-3 TM interface."

However, browse tables of relational database systems are not spreadsheet tables. In a browse table the user may define a formula and place its computed results in a field that is added to all the records. Thus, the same formula is repeatedly applied to all records. Except for the ADVANCED REVELATION TM programmable database file manager, by Revelation Technologies Inc., the formula's arguments may only be fields of the same record that holds the result of the calculation.

Most relational database instruments provide procedural languages for the development of applications. These languages allow the user to perform calculations with diverse structures, and write the results back to fields located anywhere in the records. But the combination of the procedural language and the data interface for indexed files causes the programming and interpretation of calculations to be cumbersome.

The LOTUS/DBMS TM spreadsheet/database integrative program, by Lotus Development Corporation, is an example of a standalone relational database instrument that operates as described above. Compatibility with the LOTUS 1-2-3 TM spreadsheet program, by Lotus Development Corporation, is limited to menu structure and programming language. The LOTUS/DBMS TM spreadsheet/database integrative program, by Lotus Development Corporation, has offered an add-in product that allows the use of LOTUS 1-2-3 RELEASE 2.0 TM and LOTUS 1-2-3 RELEASE 3.0 TM with the LOTUS/DBMS TM spreadsheet/database integrative program, by Lotus Development Corporation. But it is very probable that this new product operates like all database add-ins for the LOTUS 1-2-3 TM spreadsheet program, by Lotus Development Corporation. Database add-ins are very similar to the @BASE TM spreadsheet add-in for database management, by Personics Corporation, a database tool for a spreadsheet program described in the following section.

C. The ideas used by DATABASE TOOLS FOR SPREADSHEET PROGRAMS are the most similar prior-art references to the invention.

The @BASE TM spreadsheet add-in for database management, by Personics Corporation, may be considered the pioneer among the LOTUS 1-2-3 TM add-in product family. It has kept a leadership position in the market and a series of enhanced versions have updated its capabilities.

The @BASE TM spreadsheet add-in for database management is a database add-in for the LOTUS 1-2-3 TM spreadsheet program that mimics most commands in the DBASE III TM database file manager, by Ashton Tate Corporation. The manufacturer refers to it as "a full-feature relational database add-in for LOTUS 1-2-3 TM." Personics advertises the product with the slogan: "@BASE TM turns LOTUS 1-2-3 TM into a powerful front-end for database applications."

In the @BASE TM spreadsheet add-in for database management it is possible to set up dynamic links that import updated information from the DBASE III TM database file manager records every time a worksheet is recalculated. Records can be entered or examined either in a form view, where each record occupies a separate screen, or in the usual one-record-to-a-line format.

Besides the indexing feature, the @BASE TM spreadsheet add-in for database management's OPTION PAC TM, by Personics Corporation, can perform file join operations to create relational databases and operating computed fields. Also it may sort a database without rearranging the records on the disk, and automatically keeps files in the correct sorting order during record entry or updating.

The @BASE TM spreadsheet add-in for database management comprises two sets of elements in its operational structure: a functional replicate of the DBASE III TM database file manager's set of commands, and a set of @functions for read and write operations.

Any DBASE III ™-compatible command may be issued from within the LOTUS 1-2-3 ™ spreadsheet program, by Lotus Development Corporation. But the @BASE ™ spreadsheet add-in for database management and the LOTUS 1-2-3 ™ spreadsheet program have completely independent video screens and communication links between files and data. Thus, operating the @BASE ™ spreadsheet add-in for database management's independent compatible format files is functionally equivalent to suspending execution of the LOTUS 1-2-3 ™ spreadsheet program, and activating the DBASE III ™ database file manager. The user may go back to the LOTUS 1-2-3 ™ spreadsheet program when finished using the DBASE III ™ tools. This clears the video overlay of the add-in application, and allows the user to return to the LOTUS 1-2-3 ™'s previous condition.

A set of @functions allow the user to read and write the contents of single fields in database files and single cells in the LOTUS 1-2-3 ™ spreadsheet environment. These functions perform like standard screen input and output operations in the DBASE III ™ database file manager. Yet database and spreadsheet instruments operate independently from one another.

With the invention, the user can generate coordinated video operations, to look and operate simultaneously at a combination of the spreadsheet and the database files contents. This is not possible in the @BASE ™ spreadsheet add-in for database management.

By means of the invention, the user needs only design the structure and contents of database files and spreadsheet formulas. The screen simultaneously displays actual spreadsheet information and a dynamic database browse view. Yet, the program performs all read and write functions automatically, so the user is unaware of them. Thus, it is necessary for the user to distinguish between the database and the spreadsheet data.

In the @BASE ™ spreadsheet add-in for database management, the user has to program each individual read and write operation to and from the database files. These operations and functions may be directly written in data cells or as the LOTUS 1-2-3 ™ spreadsheet program's macro commands. Yet an average programmer would consider this an extensive and complicated programming task. The execution of these operations would be significantly slow, due to the large number of commands and to a sub-optimal execution schedule for read and write operations.

The ORACLE DATABASE ADD-IN FOR 1-2-3 ™ spreadsheet add-in for database management, by Oracle Systems Corp., is a product whose basic concept is similar to the @BASE ™ spreadsheet add-in for database management. However, this product also allows the user to type SQL statements directly into the worksheet. These statements can be stored in LOTUS 1-2-3 ™ worksheet cells as LOTUS 1-2-3 ™ @functions. Function @SQL(range) executes the SQL statement in "range." These SQL statements may operate directly with database tables.

However, video operations in the environments of LOTUS 1-2-3 ™ and the ORACLE DATABASE ADD-IN FOR 1-2-3 ™ spreadsheet add-in are totally isolated, as in the @BASE ™ spreadsheet add-in for database management. With the invention, the user can generate coordinated video operations, to look and operate simultaneously at a combination of the spreadsheet and the database files contents, as was described before.

SQL statements accelerate programming for the operation of database files, but they cannot control those read and write operations that effect information transfer between spreadsheet and database instruments. Users of the ORACLE DATABASE ADD-IN FOR 1-2-3 ™ spreadsheet add-in would have to do extensive programming automatic read/write operations in the invention. Therefore, the same limitations described for the @BASE ™ spreadsheet add-in for database management, by Personics Corporation, apply to this product.

The INFORMIX DATASHEET ADD-IN ™ spreadsheet add-in for database management, by Informix Software Inc., develops essentially the same idea and data procedures as the @BASE ™ spreadsheet add-in for database management, by Personics Corporation, but is based in a different database file format. It uses "query by example" techniques. There are other important implementations of database add-in spreadsheet tools, such as @DB123 ™, which are not described here. These present similar characteristics and limitations as those products described here.

As mentioned in preceding paragraphs, the invention presents a spreadsheet environment optimally suited for the integrated operation of database files. Such an environment cannot be developed using an add-in product such as any of those described here. This type of product is designed with a different orientation. It provides the user expanded spreadsheet operations, by adding @functions and superimposing alternative menus and video structures in particular modes of the spreadsheet environment. These capabilities in an existent spreadsheet product do not suffice for the implementation of the invention.

Recent spreadsheet programs, like the MICROSOFT EXCEL ™ spreadsheet program, by Microsoft Corporation, the SUPERCALC ™ spreadsheet program, by Computer Associates International Inc., and the LOTUS 1-2-3 release 2.2 ™ and the LOTUS 1-2-3 release 3.1 ™ spreadsheet programs, by Lotus Development Corporation, also contain database features. As an example of their characteristics, four products will be discussed here: the QUATTRO PRO ™ spreadsheet program, by Borland International, the VP-PLANNER PLUS ™ spreadsheet program, by Paperback Software International, the LOTUS SYMPHONY ™ integrated spreadsheet/database manager/word processing program, by Lotus Development Corporation, and the UNIPLEX SPREADSHEET ™ program by Uniplex Information Systems.

The QUATTRO PRO ™ spreadsheet program, by Borland International, is a spreadsheet program that implements database instruments similar to those described in the previous add-in database instruments. The same limitations described for the @BASE ™ spreadsheet add-in for database management, by Personics Corporation, apply to this product. Also, this product does not allow the user to write information directly to a database file. Besides, the user may read data from a database file, but needs to convert it to a spreadsheet format to operate on it.

The VP-PLANNER PLUS ™ spreadsheet program, by Paperback Software International, is a spreadsheet program that implements the read, write, query and sort operations of the previous database instruments. This product also implements a multidimensional database option, which lets the user create a database with up to five fields. By choosing two of these fields to act as vertical and horizontal coordinates, the user can view a crosstab table automatically. However, this multidimensional database file is really a spreadsheet data storage file of a fixed format. Thus, the same limitations described for the @BASE ™ spreadsheet add-in for database management, by Personics Corporation, apply to this product.

The LOTUS SYMPHONY ™ integrated spreadsheet/database manager/word processing program, by Lotus Development Corporation, integrates spreadsheet, database and word processing environments. Yet this product stores database information in spreadsheet cells. So, the nature of its query, sort and other database operations is very similar to operations in LOTUS 1-2-3 ™ and other spreadsheet programs. The same limitations described for the @BASE ™ spreadsheet add-in for database management, by Personics Corporation, apply to this product.

The UNIPLEX SPREADSHEET ™ program by Uniplex Information Systems, is a spreadsheet program based in the UNIX ™ operating system, by AT&T. It supports "embedded calls to the database using SQL," according to the commercial documentation. The UNIPLEX SPREADSHEET ™ program by Uniplex Information Systems, is part of the UNIPLEX ADVANCED OFFICE SYSTEM ™ also by Uniplex Information Systems, integrating several application programs. However, all these products can only exchange information through a compatible format for file storage. Like most integrated software systems, the UNIPLEX SPREADSHEET ™ program only allows video integration of independent modules through the window capability of the base operating systems. The same limitations described for the @BASE ™ spreadsheet add-in for database management, by Personics Corporation, and for multitasking environments such as the DESKVIEW ™ multitasking environment, by Quarterdeck Office Systems, and the MICROSOFT WINDOWS ™ graphical user interface and multitasking environment, by Microsoft Corporation, apply to this product.

Two particular products also merit mention as relevant prior-art references to the invention: (D) the REFLEX PLUS ™ spreadsheet analysis tool, by Borland International, and (D) the RONSTADT'S FINANCIALS ™ financial forecasting system, by Lord Publishing Inc.

D. The REFLEX PLUS ™ spreadsheet analysis tool, by Borland International, is a database program that adds special features for the analysis of information. The user may define several ways of displaying the data, or database "views."

For example, one possible "view," called table-mode, can mimic some operations in a spreadsheet program. This corresponds to the "browse" mode in other database programs. It allows the user to examine all the database information as in a spreadsheet table.

Table-mode operations act only on the structure and contents of a single flat database file. In table-mode, any formula is evaluated on all records of the underlying database. This is functionally equivalent to the operation of computed fields in other database programs. The user interface for the development, modification and recalculation of formulas in table-mode imitates some characteristics of spreadsheet programs.

The REFLEX PLUS ™ spreadsheet analysis tool is a flat database program with a powerful customized interface for data analysis. Yet its functionality is still limited to that of a database program, which naturally lacks the flexibility of spreadsheet operations. Thus the restrictions mentioned for relational databases apply to this program as well.

E. The RONSTADT'S FINANCIALS ™ financial forecasting system, by Lord Publishing Inc., is a software tool for developing financial models (by Lord Publishing, Inc.; One Apple Hill, Natick, Mass. 01760; 508-651-9955).

The visual operation and the user interface of the RONSTADT'S FINANCIALS ™ financial forecasting system are similar to the operation of the invention's database interface. Also, the RONSTADT'S FINANCIALS ™ financial forecasting system allows the definition of formulas as in a spreadsheet, but the user is restricted to write them in a single column. This instrument is not a spreadsheet program.

Formula evaluation in the RONSTADT'S FINANCIALS ™ financial forecasting system parallels a Copy command in a spreadsheet, executed over the entire worksheet. The user of the RONSTADT'S FINANCIALS ™ financial forecasting system loads a column of formulas and an entire set of database records into memory. The screen displays records as a columns of data. Then the column of formulas operates repeatedly on successive data columns.

As indicated before the RONSTADT'S FINANCIALS ™ financial forecasting system is not a spreadsheet program. Therefore, it lacks the flexibility and efficiency of the spreadsheet operations that the invention allows. It is restricted by the columnar evaluation of formulas.

The RONSTADT'S FINANCIALS ™ financial forecasting system does not allow the operation of external database files, because it operates exclusively on the database file that is loaded completely into memory. The invention, on the other hand, operates directly with database files' contents.

The RONSTADT'S FINANCIALS ™ financial forecasting system was designed exclusively for the calculation of financial projections. Therefore, it is limited to working with data columns that represent single periods in time. The invention, being an enhancement to a spreadsheet instrument, does not have this restriction, since it can be used to develop all kinds of applications.

F. SPREADSHEET COMPILERS also merit mention as relevant prior-art references. Two examples of these are the BALER ™ spreadsheet compiler, by Baler Software Corporation, and the KING JAGUAR ™ spreadsheet compiler, by Sheng Laboratories Inc.

These instruments allow the user to compile or convert a worksheet into a closed (unmodifiable) application. The worksheet may be developed with any spreadsheet program, such as the LOTUS 1-2-3 ™ spreadsheet program. The result is a standalone program that uses context-sensitive help screens, data validation, special macros, and pull-down menus. These instruments do not allow the modification of formulas after compilation, nor the creation of new formulas. Therefore, the finished application loses the flexibility of the spreadsheet.

The invention allows the user all the features mentioned above WITHIN an active modifiable spreadsheet. The invention enables the user to continue to work with the spreadsheet, modify formulas and screens, and do additional transformations on the data.

Also, all existing spreadsheet compilers do not contain the capability to access external database files.

The cited PRIOR-ART references are important because the invention provides the benefits of integrating their main characteristics. Like database add-ins, the invention is a spreadsheet enhancement. Yet, it is the only spreadsheet enhancement that implements options for full environment definition and automatic read and write operations between database and spreadsheet structures. The RONSTADT'S FINANCIALS TM financial forecasting system, by Lord Publishing Inc., and the REFLEX PLUS TM spreadsheet analysis tool, by Borland International, store their information in database structures similarly to the invention. Also, the RONSTADT'S FINANCIALS TM financial forecasting system allows formula operation on database structures. Yet, the invention integrates these concepts in spreadsheet instruments. Spreadsheet compilers implement options for full environment definition, but the invention does so while keeping the interactive nature of a full spreadsheet environment.

Thus, as stated before, the invention allows users to interactively develop new environments to program and use finished applications, and to use database files for the storage of information operated in the spreadsheet program. Prior art references do not implement interactive creation of spreadsheet environments.

Accordingly, the following paragraphs describe several objects and advantages of the invention.

The invention expands the power of spreadsheet programs without placing any limitations on their basic operations. All applications developed for spreadsheet environments are a primary subject of the invention. Of particular interest are applications whose data structures benefit from the added support of database files.

The invention integrates the operation of spreadsheet and database instruments in an environment that provides an "automatic" collaborative scheme. It allows the coordination of video screens, data storage, spreadsheet operations and database features. The combination does not confuse the user by presenting a multitude of options. This gives more flexibility and power to the spreadsheet than all 3-D and "@BASE-like" schemes used in other products.

The invention enables the user to develop spreadsheet application environments. This will enable users to develop small, practical and modifiable applications for tasks such as the analysis of financial and accounting statements and market reports. Finished applications may provide specific database features. Also, they may have data validation capabilities, context-sensitive help texts and distinctive screen displays.

The invention's synergistic approach allows users to develop spreadsheet applications traditionally executed with database instruments, such as integrated accounting packages and inventory analysis.

By using the invention, users can develop small, practical and modifiable applications for the analysis of financial and accounting statements, market demand, and other business problems. These types of applications will benefit from the invention, because they require relational database storage and access techniques, and complex analytical computations.

For example, a simple financial model can be developed by using only one col_prog window and one flat database file. In this application, each record in the database file corresponds to one period. Also, all formulas are developed in the col_prog window. The implementation of a large-scale financial model may use separate database files to store credit information, accounting data, market demand analysis, etc. It would take approximately three man-years to implement this model with prior-art tools. In the invention's environment, the development of the model takes between three and six months.

Therefore, the invention represents cost reductions in the development of many types of large and complicated data-analysis applications. The resulting applications are as flexible as spreadsheet programs, and modifiable by the user.

Another example is inventory planning. The invention enables the user to design an application containing past history of sales, inventory levels, prices and other criteria for each product and/or product group. The user may easily classify products according to their sales/inventory level indexes. The application allows the user to prepare sales forecasts and recommend new orders for each product and/or product group. This is accomplished by one or more associated database files. Each file may contain, among other data, information regarding individual products, product groups, demand forecasts, and future orders for manufacturing and/or raw materials.

Another example is a fully integrated accounting system. The invention allows the creation of such a system in a spreadsheet-database environment. The scratchpad section allows the user the additional opportunity of performing spreadsheet operations on data generated by reports. This information is stored in a relational structure of database files associated to several col_prog windows.

Database files being used by the invention may contain special operational codes. These codes can control the operation of specific database fields or spreadsheet cells. In a particular example, operational codes allow the results of a financial application to be calculated and expressed in different currencies. This may be done without changing the formulas in the spreadsheet environment. Thus, operational codes expand the power and flexibility of the invention's programmability.

The invention has the functionality of the combination of a spreadsheet compiler and a spreadsheet program. A user can develop applications in a spreadsheet format. Then the user may define tools for the application (menu options, help screens, data validation routines, etc.) that enable other users to operate the application.

The invention overcomes weaknesses that proved the downfall of spreadsheet prepackaged applications. These applications for spreadsheet programs, or "templates," reached their sales peak before the arrival of the LOTUS 1-2-3 TM spreadsheet program. According to some experts, their popularity wanned gradually due to their failure to make the spreadsheet program easier to use. (See chapter 3 of: Entrepreneurial Finance—Taking Control of Your Financial Decision Making, by Dr. Robert Ronstadt; Lord Publishing, Natick, Mass., 1988. Also see: Mark Chussil, "Computer-Based Planning: A PC Survival Guide," The Journal of Business Strategy, January/February, 1988, pp. 38-42.)

Users of the invention are able to interactively modify an application developed using the invention. The user who developed it can limit the number and quality of the modifications available to other users. Thus, any other user can build new routines for any application, that conform to specific needs. These routines involve adding formulas that cannot damage the primitive application.

The invention can operate as the software equivalent of a hardware parallel processor for several Turing machines. Additionally, some tools of the invention can make it operate more efficiently than a the parallel Turing machines. Any computation or recognition problem for which there is a known informal algorithm can be handled by a Turing machine. Therefore, the invention can handle and solve all sorts of programming problems.

Templates developed for spreadsheet programs do not execute as efficiently as other programming means currently available. However, spreadsheet programming is now popular due to the interactive nature of its operation. Also, at a medium range of time, faster mass-memory devices will be available. Then, multidimensional database structures coupled with spreadsheet program tools will make the invention more attractive. Execution of applications programmed with the invention will be more efficient.

This combination of concepts is an important ramification of the long-term application of the invention. During the next ten years, a large portion of software development and research will focus on the creation of tools for power-easy programming and the easy use of applications. Hardware storage devices will change. Database files will probably be stored in dynamic memory, bubble memory and other hardware structures. This will result in faster data operations.

The storage and processing of the three elements of the invention (database structures, spreadsheet structures and video system structures) will be important in terms of their relative structures or topologies. The invention may represent a future direction for research. The user will have more power to develop and operate data structures. Also, the user will be able to control the corresponding three levels of the development process for products, tools and applications.

Further objects and advantages of the invention will become apparent in the consideration of the drawings and ensuing description.

SUMMARY OF THE INVENTION

An enhanced spreadsheet program (a) providing a novel synergistic approach to the combination of spreadsheet and database tools, and (b) enabling users to develop an application environment that can use all resources in the spreadsheet storage area.

The following paragraphs refer to the structure of the invention.

The enhanced spreadsheet program comprises three storage areas:
a spreadsheet data structure,
a set of database files in a storage area, and
a video display system.

The spreadsheet data structure is divided into two sets of cells that can be operated through three different environments.

The first environment contains the tools of a spreadsheet environment, and the first set of cells can be operated through the first environment. This is most appropriate for scratchpad uses.

The second environment contains the tools of a spreadsheet environment and contains a special command that can define commands for the third environment. This is appropriate to develop formulas for an application, and the application's environment of operation.

The second environment also contains the tools necessary to define special environments for the integrated operation of spreadsheet and database tools. Said integrated operation coordinates dynamic screen video operations of the information in the spreadsheet and database storage areas.

The second set of cells (for the development and use of an application) can be operated through the second or third environments.

The following paragraphs refer to the first enhancement, a novel synergistic approach to the combination of spreadsheet and database tools.

A novel aspect according to the teachings of the invention is the provision of a browse view in the spreadsheet which shows the contents of a number of different records in the active database file. The spreadsheet has a portion thereof which has previously been defined as a "col_prog" range. Cells in this range can receive numbers, text, formulas or any other type of data that may be stored in database record fields. These cells in the col_prog range can be defined as "temporary" or "permanent" by the user at any time. Temporary cells are cells that are designed to receive data updates from database records. Permanent cells are cells that are "write protected" in the sense that when a database record is written into the col_prog range, the contents of the col_prog range permanent cells are not changed. Whatever field from the database record that would have gone into a permanent cell is not used.

When contents of a database record are written into the col_prog range, this database record is then called "active record". The fields of a database record which are designated to be written into the col_prog range are defined in the "col_prog window". This is a set of instructions that defines which spreadsheet cells are part of the col_prog range, identifies the name of the database file whose information will be written into the col_prog range, and defines which fields of the database record exchange data with which fields of the col_prog range.

After the contents of a database record have been written into the col_prog range, the conventional recalculation function key may be pressed and all the formulas in the spreadsheet including the formulas in the col_prog range will be recalculated. The formulas in any cell may reference any other cell in the spreadsheet, i.e., read data or the results of formulas from any other cell. Data in the database may thus be brought into a spreadsheet one record at a time and may be operated upon mathematically by whatever formulas are programmed into the cells anywhere on the spreadsheet which reference the cells in the col_prog range.

The "browse view" aspect of the invention allows a screenful of database records to be displayed. The particular record which is "active", i.e., its contents are currently stored in the col_prog range, is designed in some visual fashion on the display such as by reverse video, a different color, a different color cursor underlining the column, etc. A cursor, which the user can move among all the displayed records, designates a "current" record. When the user desires to load the contents of the "current" database record into the col_prog range, he or she presses the recalculation function key. This writes the contents of the current database record into the col_prog range according to the instructions in the col_prog window. The current contents of the col_prog range are written back into the database record from which the original data entered into the col_prog range cells at the last recalculation event. In other words, upon each recalculation, the current contents of the col_prog range are used to update the database records from which they originated, and a new database record is loaded into the col_prog range and is mathematically operated upon by the formulas in the spreadsheet.

For time-based database records, the above process is one step in the overall process. Time-based processing works as follows. Assume that the report being developed is a collection report to be run monthly linked to a database on the spreadsheet where monthly database records exist, one field of which is the cash collections for that month. Assume also that one line of the report is total collections year-to-date. To process this report, the cash collections for the current month need to be added to the running total. To do this a "col_prev range" is defined in addition to the col_prog range. In the preferred embodiment, the program assumes that the database records have been sorted or entered such that records for adjacent periods of time are stored sequentially. In this example, assume that the first database record is January collections, the second record was February collections and the third record was March collections. To process the February record, it would be loaded into the col_prog range and, the January record would be loaded into the col_prev range. A formula programmed in a cell of the col_prog range would then add February collections to the year-to-date collections cell contents in the col_prev range (January). When the March record was to be processed, the cursor would be placed on the March record and the recalculation function key would be pressed. This would cause the contents of the col_prog range to be written to the February database record and then the col_prog range and the col_prev range would be loaded. Col_prog is loaded with the contents of the March record and col_prev is loaded with the now updated contents of the February database record, and the spreadsheet is recalculated. This causes the contents of the March database record for March collections to be added to the year-to-date collections data stored in the col_prev range.

The "browse view" is a scrolling display and can be used to show all the database records by scrolling through them with the arrow or cursor control keys. When the cursor is moved to the extreme right side of the display, for example, more database records are brought in. Old records for which there is insufficient room scroll off the screen to the left. Database records shown in the browse view may be sorted in different ways, indexed or selected from all database records in a file.

To summarize this scheme of operation, it can be said that the screen simultaneously displays actual spreadsheet information and a dynamic database browse view. Read and write functions are performed automatically and are transparent to the user. The user does not need to differentiate when he is working with the database files or the spreadsheet data.

The foregoing description of the communication between database and spreadsheet data corresponds to one environment for the integrated operation of spreadsheet database tools. Several such environments can exist in this invention. The operation of these environments can be coordinated to operate database files in the manner of a relational database system. Thus, said software invention enables users to develop and use full database applications such as integrated accounting packages, within spreadsheet environments.

The following paragraphs refer to the second enhancement, the development of an application environment that can use all resources in the spreadsheet storage area.

There are at least three novel aspects to the teachings of the invention regarding provision of a facility whereby a user can develop new applications using the spreadsheet format. An "application" means a spreadsheet or collection of related spreadsheets or portions of the same spreadsheet which are programmed with formulas. These formulas are designed to perform calculations for a particular job such as calculating and displaying an income statement or balance sheet for a particular business enterprise.

The invention allows the creation of many different tools for the development of new applications using the spreadsheet format. Hence, the three novel aspects described here are only particular examples of the invention's capabilities.

The first novel aspect is the provision of layout tools by which the user can write his or her own help screens that explain various screens of an application that user has developed. This is called "context sensitive help". For example, assume that the user is developing an income statement report in the range of cells U-5 and Z-200, and assume that the user feels that the particular method by which the user is calculating profits needs to be explained. At any time while the user is entering text, formulas or numbers to the various cells in the report, the user may invoke the help option. The user is then presented with effectively a blank screen which has associated with it a set of basic word processing commands, e.g. a set of commands very similar to the word processing commands of Wordstar TM 3.3. The user may then enter whatever text is necessary to explain any methodology, approach, purpose, function, formula or whatever of the application screen from which the layout-help option was invoked. Alternatively, after a set of reports have been programmed in various ranges of a spreadsheet, the user may write help screens for these reports (or for each screen of the report if the report takes up more than one screen) after they are all done. This is done by invoking the layout-help option and specifying the particular range, i.e., report screen, to which the help screen pertains.

The second novel aspect is the provision to the user in a spreadsheet environment of a set of layout commands by which the user may program his or her own menus and the "look" of the screen. By these commands, the user can design a set of custom menus and make them appear as menu options anywhere on a screen of his or her design. For example, the user may specify the text of each menu option, whether it appears in the center of the screen in a window, along the top horizontally or down the side vertically etc., the color of the menu box and whether the screen has a border etc. For example, the user may wish to develop a series of portions of the spreadsheet which contain a series of related financial reports regarding the health of a business. Such a series of reports might include an income statement, a balance sheet, a statement of changes in financial position, a sales forecast, a sales by product line and territory, an inventory report and various manufacturing reports. Each of these reports can be contained in a specific range of the spreadsheet and can be assigned to a menu option on a main menu defined by the user using the layout commands. When the user selects a particular report menu option, the portion of the spreadsheet containing that report is brought to the screen for use. The user who designed the formulas contained in the various cells also has the option of "closing" some or all of the formulas so that subsequent users cannot modify them. The subsequent uses may go back and forth from the various reports and the main menu by pushing the escape key.

A third novel aspect of the invention pertains to "data validation" tools. Although it is known in data base programs to define certain fields as text, numeric, logical, date etc., this concept is unknown in spreadsheets as far as the applicants are aware. Data validation tools are invoked from the layout menu in the layout environment. The user then selects a range by entering the upper left and lower right corners of the range or by pointing to the range corners with a cursor. Then the user presses "enter" and the range is accepted. Upon acceptance, a default set of data validation options for the range appear. The user may then select one of the options such as "text" or "numeric" subsequent users may not enter types of data in the cells so "validated" other than the type of data originally defined for that cell or range by the procedure described above.

BRIEF DESCRIPTION OF DRAWINGS

FIGS. 1 to 15: RAM storage area (41), disk storage area or other massive storage area for databases (42), and environment (43). An environment defines a set of commands and options available to the user for the operation of information, and displays that information in a particular way.

FIG. 2 represents the invention's structure. This is divided into three storage areas: video system storage area or video_sa (48), which contains the information that is displayed in the computer's video screen; database file storage area or db_sa (47), which contains information in regular database files; and spreadsheet storage area or spread_sa (44), containing information with the same data structures as prior-art spreadsheet programs.

FIG. 3 represents a set of definitions called col_prog window (49). This set of definitions may be created by the user. These definitions comprise: the col_prog range (50) and col_prev range (51), which are cells' ranges in the gen_prog section; the associated case_db files (54) and active case_db file (52), which are regular database files, and other elements. The case_db files are contained in the db_sa (47). The col_prog range is related to a particular record in the case_db file; this is the active record (53). The video display shows the video_sa's (48) contents, that is, a browse view of the active case_db file, where the active record is substituted by the contents of the col_prog range. (The video_sa is the video displays's storage area.)

FIG. 4 shows the database files storage area (42). This contains the case_db files (54). One of these files may be the active case_db file (52) containing, among other case_db records, the active record (53).

FIG. 5 represents a cell range in the gen_prog section (46), called col_prog range (50). Information of the active record (not shown) can be loaded into the col_prog range.

FIG. 6 shows that formulas in one section of the spreadsheet (45 or 46) may reference formulas or data in any other section. Referenced formulas or data may or may not be displayed in a particular col_prog window. The entire contents of the scratch section (45) and the gen_prog section (46), including the information displayed in the col_prog windows, are sections of a single spreadsheet. Simple cell formulas connect the data, as in any ordinary spreadsheet.

FIG. 7 shows that all cells in the gen_prog section (46) can be linked by formulas. The contents of the col_prog range (50) may thus determine the contents of cells' ranges (56) located anywhere within the gen_prog section. The contents of these cells' ranges can be shown in screens defined for the application environment.

FIG. 8 shows that the col_prog range (50) transfers information to and from the active case_db file (52), by reading and writing the information contained in the active record (53).

FIG. 9 shows that the video storage area (48) contains the screen's information, shown by the video system. It shows a browse view of the active case_db file (52), where the active record (53) is substituted by the contents of the col_prog range (50). The current record (57) is the case_db record where the screen cursor (58) is positioned. The direction of the arrows indicates the flow of information: the col_prog range (50) reads information from the active record (53). The video_sa (48) receives information from the active case_db file (52) and the col_prog range (50).

FIG. 10 shows that, while operating in the scratch section (45), control of program execution is in the scratch environment (59).

FIG. 11 shows that, while operating in the gen_prog section (46), control of program execution may be in the layout (60) or the application environment (61). The application environment's commands are defined by a special command in the layout environment.

FIG. 12 shows that the active col_prog window allows the simultaneous access and operation of information of the active case_db file (47) and the col_prog range (50) in the gen_prog section (46). At this point, control of the program's execution is transferred to the col_prog environment (62). The col_prog environment inherits all characteristics from the environment in which it is activated. In the example of the figure, the col_prog environment was activated from the layout environment (60) and generates the video display (48) as defined.

FIG. 13 is similar to FIG. 12. But in the example of this Figure, the col_prog environment was activated from the application environment (61).

FIG. 14 shows that the invention can be extended to operate with relational databases. Several col_prog windows can be activated simultaneously in a single spreadsheet application. The col_prog range (50) in each col_prog window accesses its corresponding active case_db file (52) and associated case_db files (54). Through these operations, and through the coordination of a central program, the col_prog windows and the case_db files can compose a relational database system.

FIG. 15 shows that a col_prog range (50) can transfer information (63) to and from different records in the assigned case_db file (52).

The following steps are executed: When operating in the LAYOUT environment, the APPLICATION environment is defined when the LAYOUT key is pressed. For any other key pressed, the LAYOUT environment acts like the SCRATCH environment. Finally, when operating in the APPLICATION environment, Execute_Application_Environment must execute. This is not shown in more detail since it must be defined by the user through the LAYOUT command.

Figure 32:
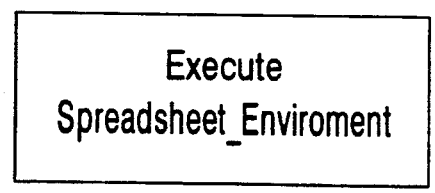

FIG. 32 shows a flowchart of procedure Execute_Scratch_Environment. This procedure executes user-activated commands in the scratch environment. The SCRATCH environment operates like a prior_art spreadsheet environment.

Figure 33:
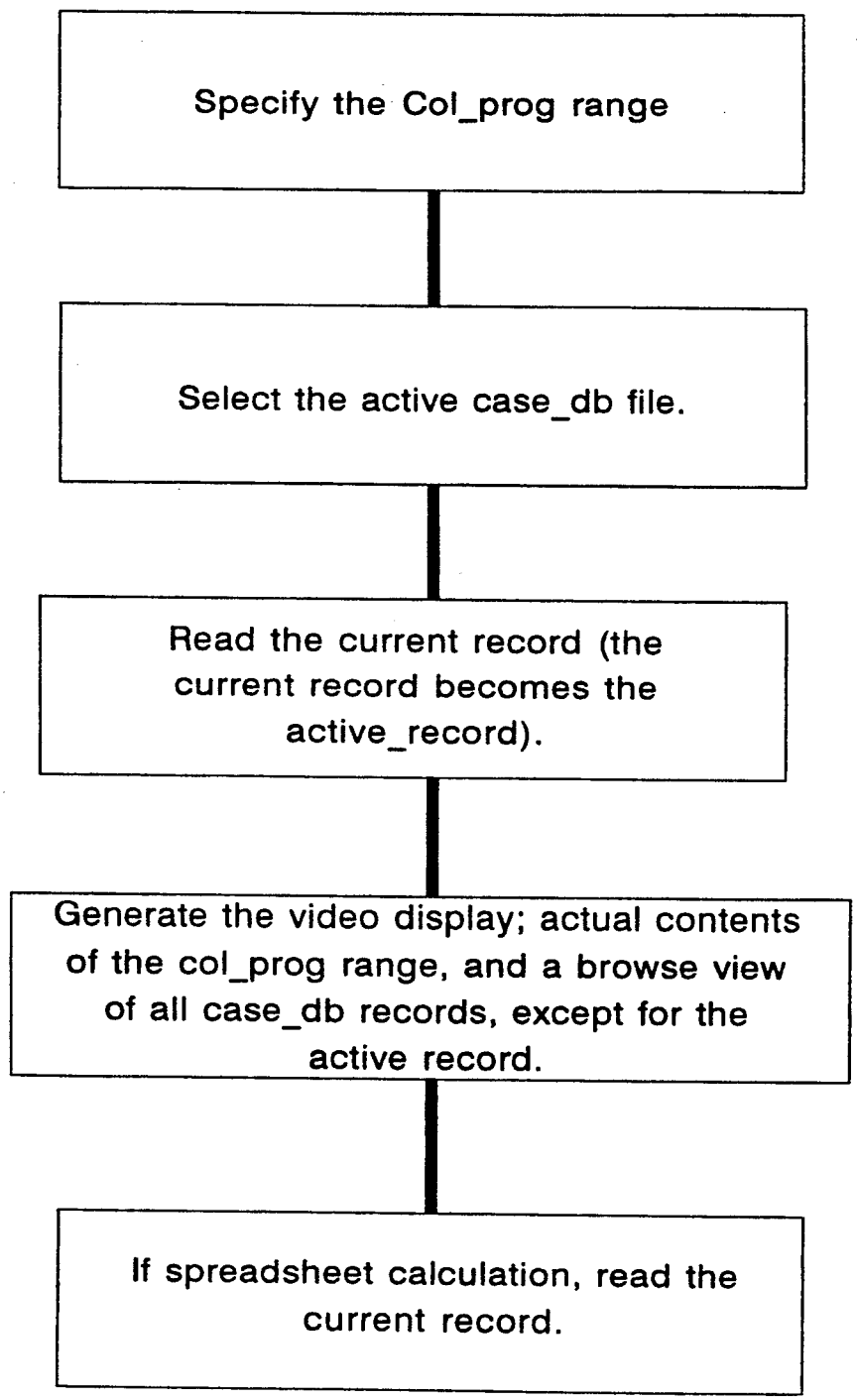

FIG. 33 shows a flowchart of the procedure through which the program reads the contents of the active case_db file and generates a browse view of its contents, through the following steps:
a) Specifying the col_prog range in the spread_sa.
b) Selecting the active case_db file.
c) Reading selected contents from the current record in the active case_db file.
d) Generating the video display showing the actual contents of the col_prog range, and a browse view of the contents of all other case_db records.
e) Whenever a spreadsheet calculation is issued during the operation of the col_prog environment, reading selected contents from the current record in the active case_db file.

DETAILED DESCRIPTION OF THE PREFERRED EMBODIMENT

A list of all parts identified by reference numerals in FIGS. 1 to 15 follows:
41. RAM storage area
42. Disk storage area (or other massive storage area)
43. Environment
44. Spread_sa (spreadsheet storage area)
45. Scratch section (scratchpad section)
46. Gen_prog section (general programmable section)
47. Database files storage area (db_sa)
48. Video system storage area (video_sa)
49. Col_prog window (columnar programmable window)
50. Col_prog range (columnar programmable range)
51. Col_prog range
52. Active case_db file
53. Active record
54. Assigned case_db file
55. Video window
56. Cell's range
57. Current record
58. Screen's cursor
59. Scratch environment
60. Layout environment
61. Application environment
62. Col_prog environment
63. Read and write operations Referring to FIG. 2, the invention's entire program storage area is divided into three storage areas:

The video system storage area (48) contains the information that is displayed in the computer's video screen. Prior-art references generally locate the video system storage area in reserved locations in the computer system's main memory; this set of reserved locations is usually called display memory.

The database file storage area (47) contains information in regular database files. Prior-art references generally locate the database file storage area in any large-scale memory component, usually, a computer hard disk.

The spreadsheet storage area (44) contains information with the same data structures as an ordinary spreadsheet program. Prior-art references generally locate the spreadsheet storage area in the computer system's main memory.

VIDEO SYSTEM STORAGE AREA

In this document, the video system storage area will be abbreviated video_sa.

The computer's video screen displays the information contained in the video_sa. In most computer systems, the screen displays the modified video_sa's contents only an instant after they are actually modified.

Figure 9:
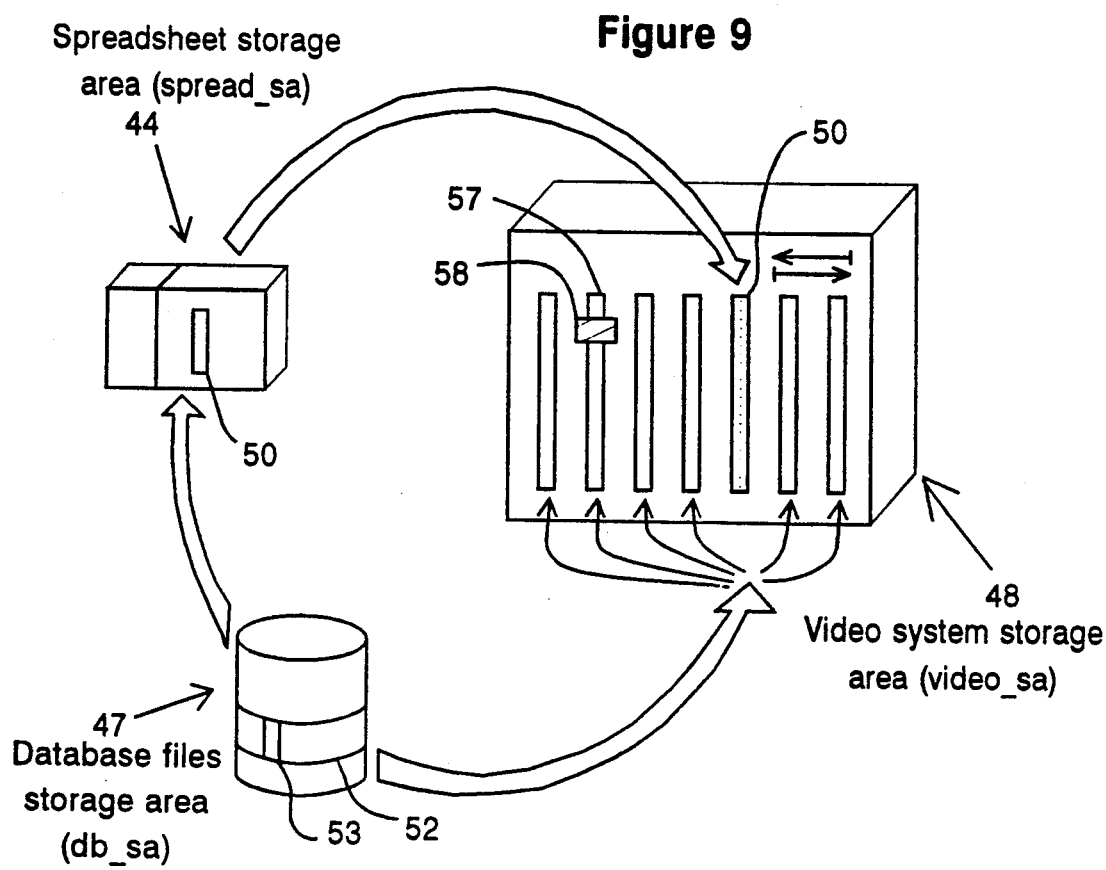

Referring to FIG. 9, the video_sa (48) contains selected information from the spread_sa (50) and the db_sa (47). The original way in which this information is selected and displayed distinguishes this invention from all prior-art references. This will be shown in the description and operation of the invention.

DATABASE FILES STORAGE AREA

In this document, the database files storage area will be abbreviated db_sa.

Figure 4:
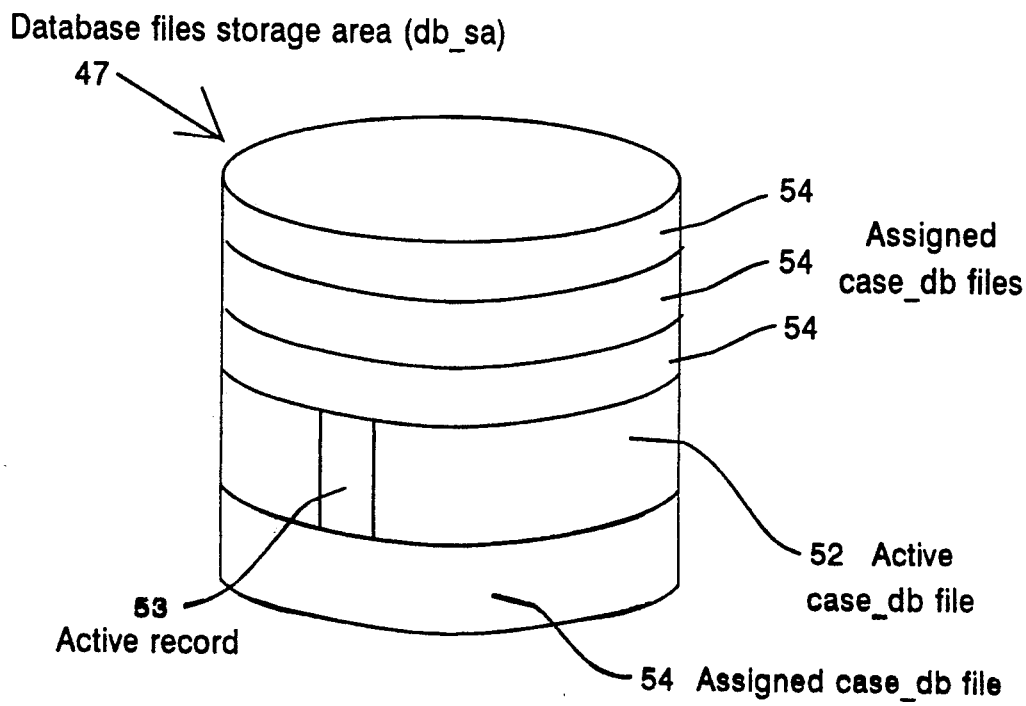
Figure 5:
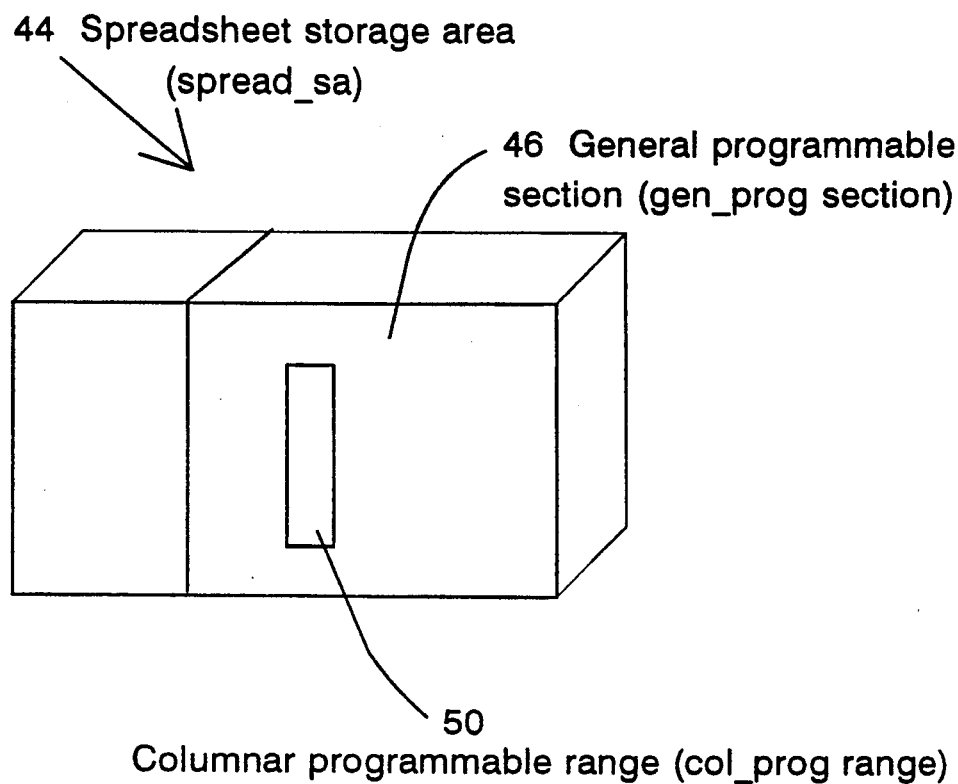

Referring to FIG. 4, the db_sa contains information in regular database records and files. These files are called case_db files (52 and 54). Their individual records are called case_db records.

Figure 3:
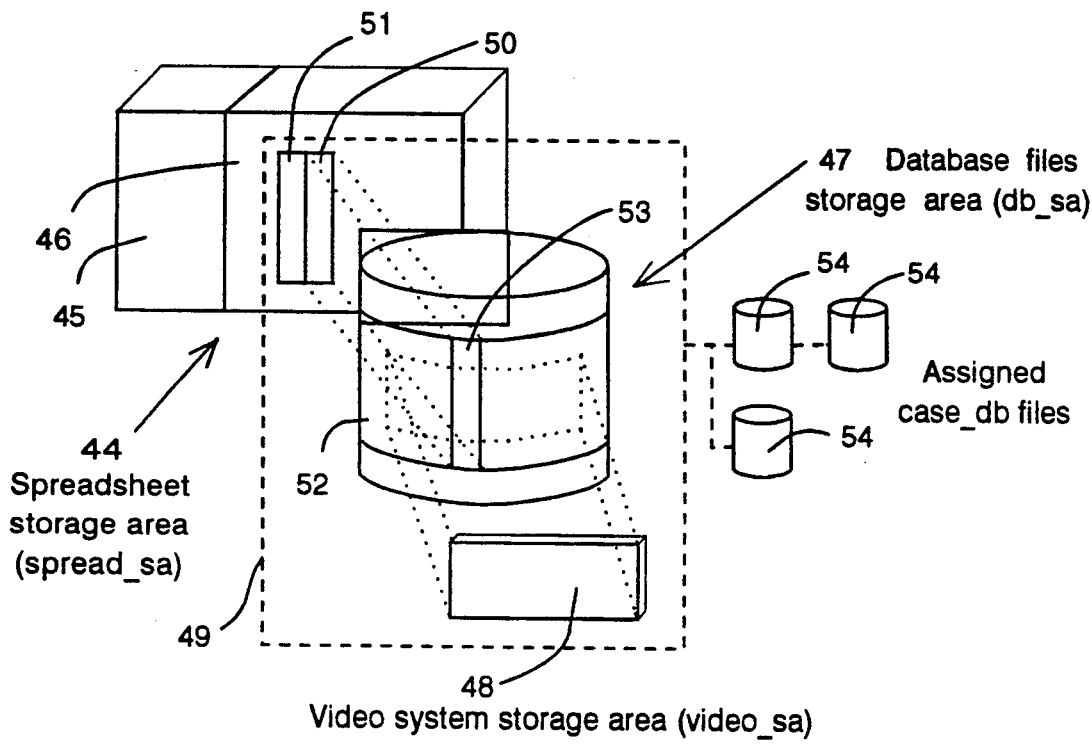

As shown in FIGS. 3 and 9, the invention refers to the integration of the video_sa (55), db_sa (47) and spread_sa (44). This is managed by operating the information in case_db files (52 and 54) one record at a time. For example, a single operation may involve reading only one case_db record (53) into a specified range in the spread_sa (50). Another operation may involve writing back information into one case_db record.

These operations take place between a specified spread_sa range (50) and a case_db record (53). A case_db record is a set of fields that store numeric or text-based information. Also, the record may contain date or time fields. Alternatively, a record field may store a formula that is interpreted as a spreadsheet formula, when the field is read into a spreadsheet cell.

In the preferred implementation, each case_db record comprises a set of fields of the same size (for example, 8 bytes long). Numeric information is stored in integer or floating point format, with the maximum available precision according to the field's size. Character-based information is stored in text format. Formulas are stored in a different special format.

Also, the preferred embodiment implementation allows the definition of database files that are not case_db files. These database files are called desc_db files. A desc_db file contains textual descriptions of the case_db records' contents for a particular case_db file. Each record of a desc_db file describes one field of a typical case_db record. So, the number of records in a desc_db file equals the number of fields in the case_db record. If the user wishes to view these descriptions, they are processed through the video_sa and shown in the video display.

SPREADSHEET STORAGE AREA

Throughout this document, the spreadsheet storage area will be abbreviated spread_sa. In the spread_sa, information is organized exactly as in an ordinary spreadsheet program.

Figure 1:
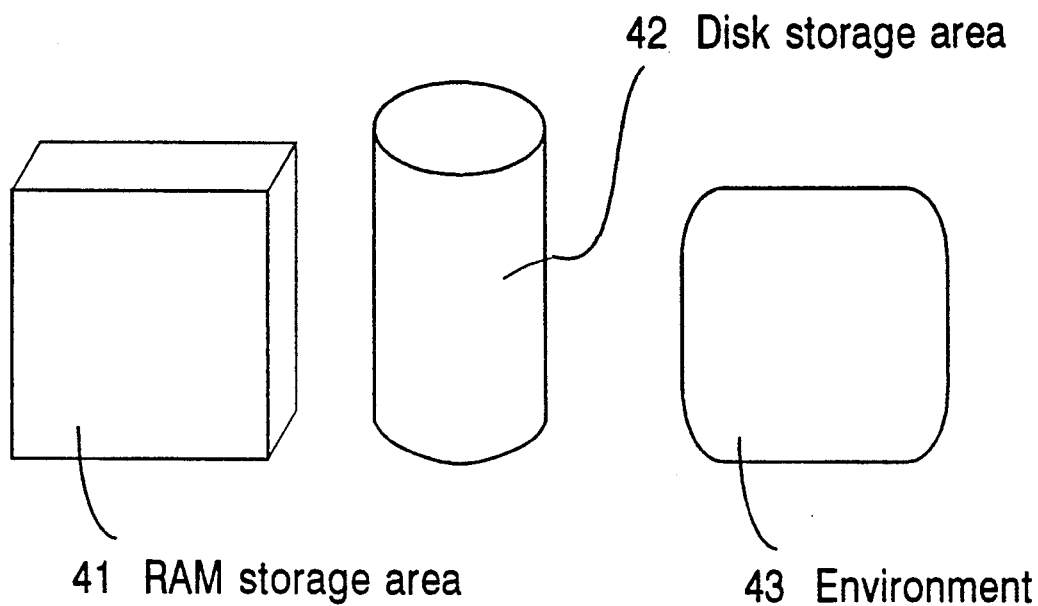
FIG. 1 represents the symbols to be used throughout
Figure 2:
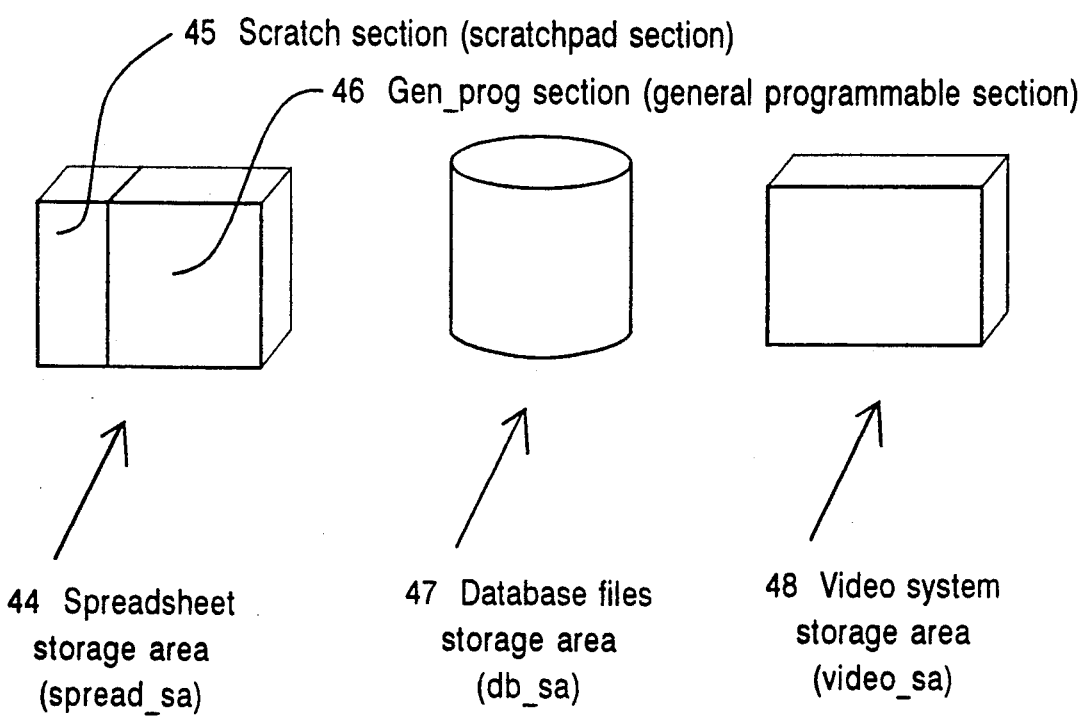

Referring to FIGS. 2 and 3, the spread_sa is divided into two integrated physical sections or sets of cells:

(a) the scratchpad -non-programmable- section (45), and (b) the general programmable section (46).

The names of these sections are abbreviated as scratch section and gen_prog section, respectively.

Figure 10:
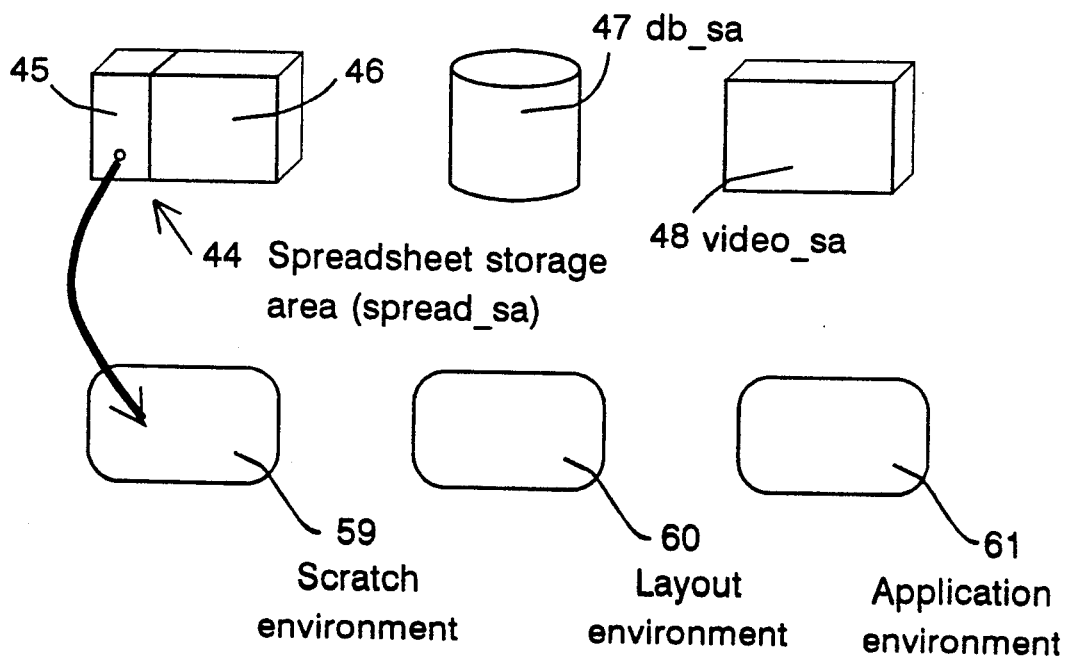

Referring to FIG. 10, the scratchpad section (45) is a range of cells in the spreadsheet structure. It has its own set of tools and commands to let the user do ordinary spreadsheet operations (59).

Figure 11:
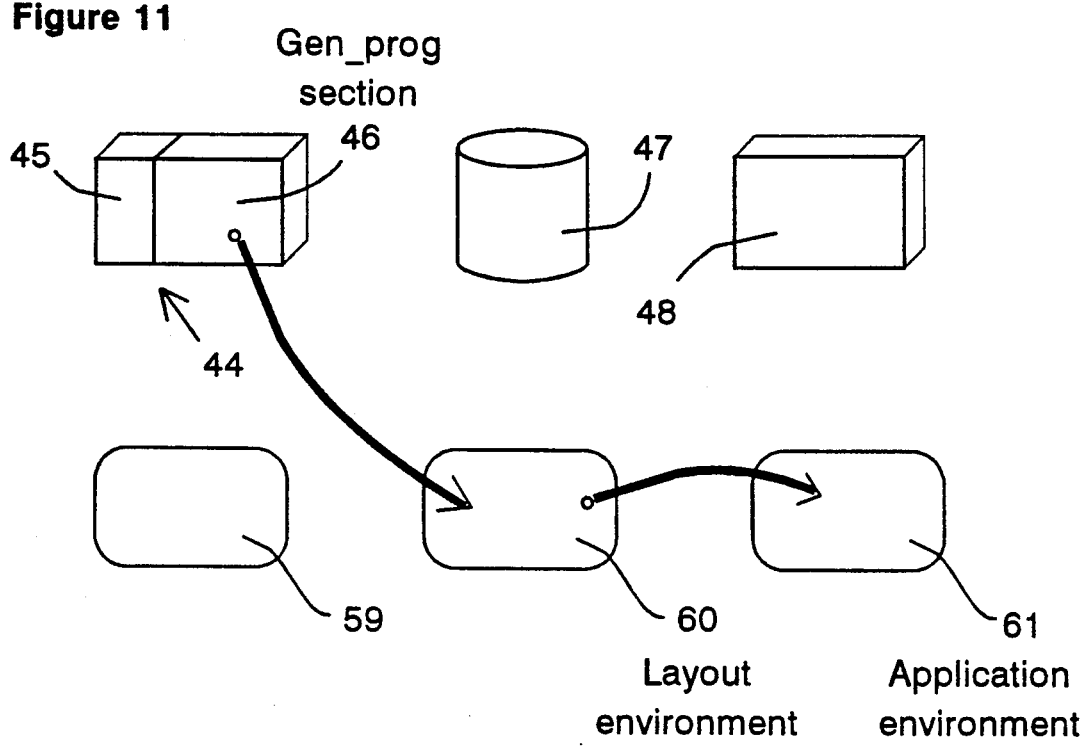

Referring to FIG. 11, the general programmable section (46) is also a range of cells in the spreadsheet structure with its own set of tools and commands (60). In addition to allowing ordinary spreadsheet operations, it lets the user communicate with database files (47), and develop and use new tools and commands (61).

While working in the spread_sa, the user may select the scratch section or the gen_prog section by pressing the section key. This key changes the section where the user is operating to the alternative section. The switching operation is similar to the operation of the WINDOW Function Key (F6 key) in the LOTUS 1-2-3 TM spreadsheet program and in other similar spreadsheet programs.

In reference to FIGS. 10 to 13, the user may interact with each section in the spread_sa (44) through any of three environments (59, 60 and 61). Each environment defines a set of commands and options available to the user for the operation of spread_sa information. Also, each environment displays the information in the spread_sa in a particular way.

As shown in FIG. 10, one of the environments, the scratch environment (59), handles the information stored in the scratch section (45). When the user is located in the scratch section, the program automatically makes available the scratch environment. It executes like an ordinary spreadsheet.

Referring to FIG. 11, the program operates on the information in the gen_prog section in two different ways, depending on one of two environments selected with the environment key: the layout environment (60) and the application environment (61). The layout environment may be used to develop the application environment.

Throughout the description of the invention, user is any person who uses the invention in any of the three available environments. This person becomes a programmer when using the layout environment to develop an application.

A more detailed definition of these two environments is necessary to describe the invention:

The Layout Environment

This is an enhanced spreadsheet environment that uses a special command set (called the layout command set). The programmer may use this command set to define the tools available to the user for the operation of the application environment. Also, this environment lets the programmer define the elements that allow the simultaneous access and operation of information in case_db files and the gen_prog section.

The Application Environment

This environment comprises the tools that have been defined in the layout environment with the layout command. In the preferred embodiment, these are the only tools and operations that the user will be able to use in the application environment.

Figure 12:
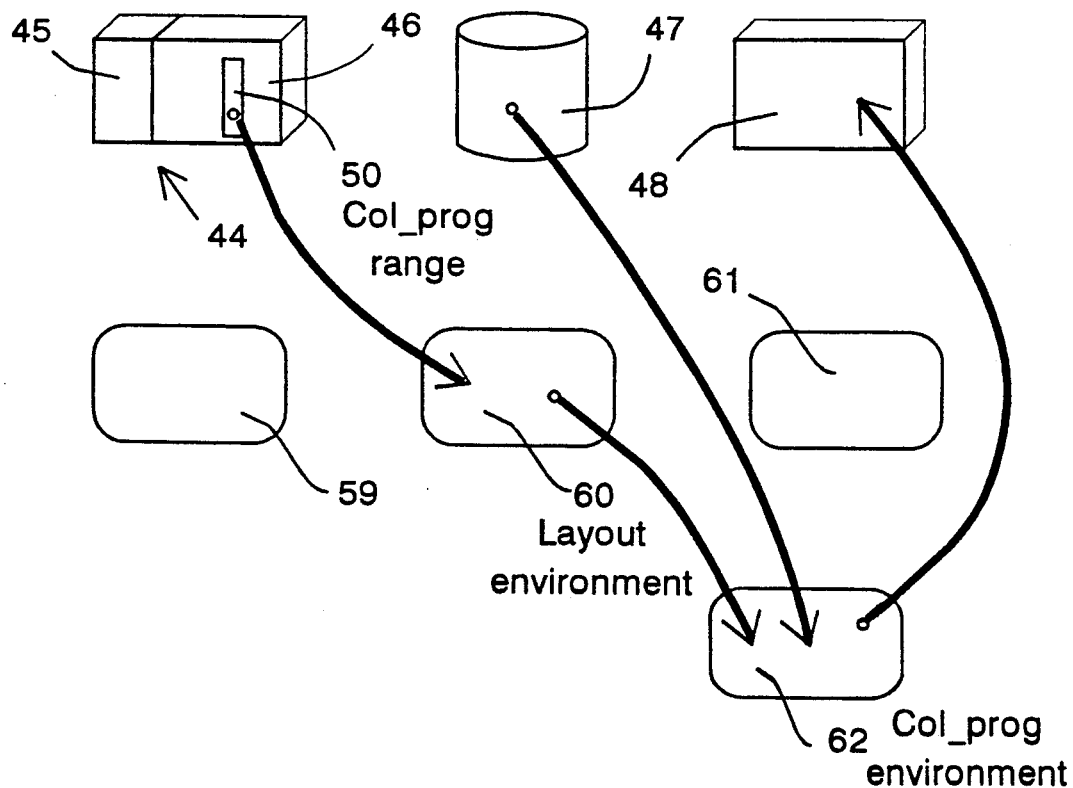
Figure 13:
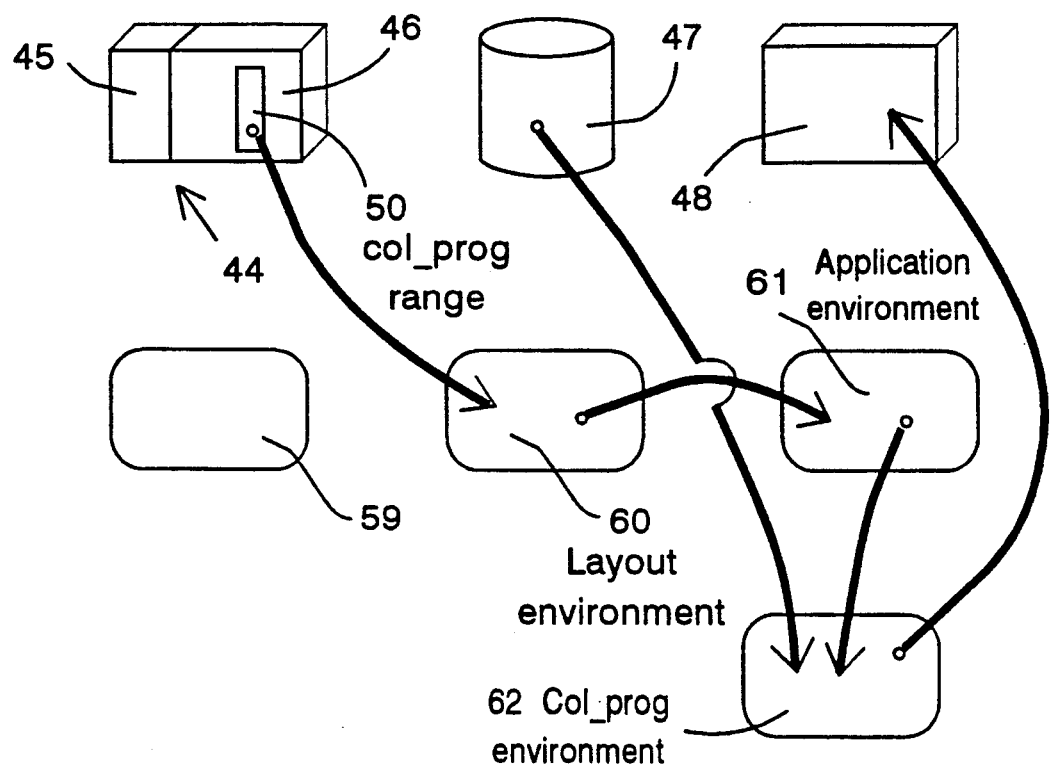

As shown in FIGS. 12 and 13, an additional environment (62) operates in the gen-prog section. It is defined in the following paragraphs.

Col_prog windows, ranges and environments

In the layout environment, the user may create sets of definitions related to the operation on the data in the gen_prog section and the case_db files. Referring to FIG. 3, each one of these sets of definitions will be called a columnar programmable window (49), abbreviated col_prog window. Each col_prog window is identified by a distinct name, and contains the following definitions:

a) The location of a specific range of cells within the gen_prog section; this range of cells is called col_prog range (50).

b) Whether the database records are chained-dependent (as in a time_based application).

c) If the database records are chained-dependent, the location of another specific range of cells within the gen_prog section; this range of cells is called col_prev range (51).

d) The names and directories for all database files whose data will be accessed; these files are called assigned case_db files (54).

e) The identifier of the assigned case_db file that will be linked to the gen_prog section; this file is called active case_db file (55).

f) The identifier of that record in the active case_db file that will be loaded into the col_prog range; this record is called active record (53).

Col_prog ranges, time_based applications, col_prev ranges, associate case_db files and active case_db files will be described later in this document.

The user presses a special key, called window key, to activate a col_prog window. Through this operation, the col_prog window becomes the active col_prog window. An active col_prog window allows the simultaneous access and operation on information from the active case_db file and the col_prog and col_prev ranges contained in its definition. To do this it activates the col_prog environment.

Referring to FIGS. 12 and 13, the col_prog environment inherits all characteristics from the environment in which it is activated (60 or 61). In this context, this environment acts as a parent environment, because it passes on its properties to the col_prog environment. Also, as a parent environment, it allows the col_prog environment to add its own significant characteristics.

The col_prog environment controls and coordinates the display of spreadsheet contents and data from the active case_db file.

Referring again to FIG. 3, a col_prog range (50) is a range of spreadsheet cells that will hold the information in one record of the active case_db file (52). This record is called the active record (53). In the best mode implementation, the col_prog range is a range of adjacent cells located in a single spreadsheet column. In alternative implementations, the col_prog range may be an ordered set of disjoint spreadsheet cells.

Figure 14:
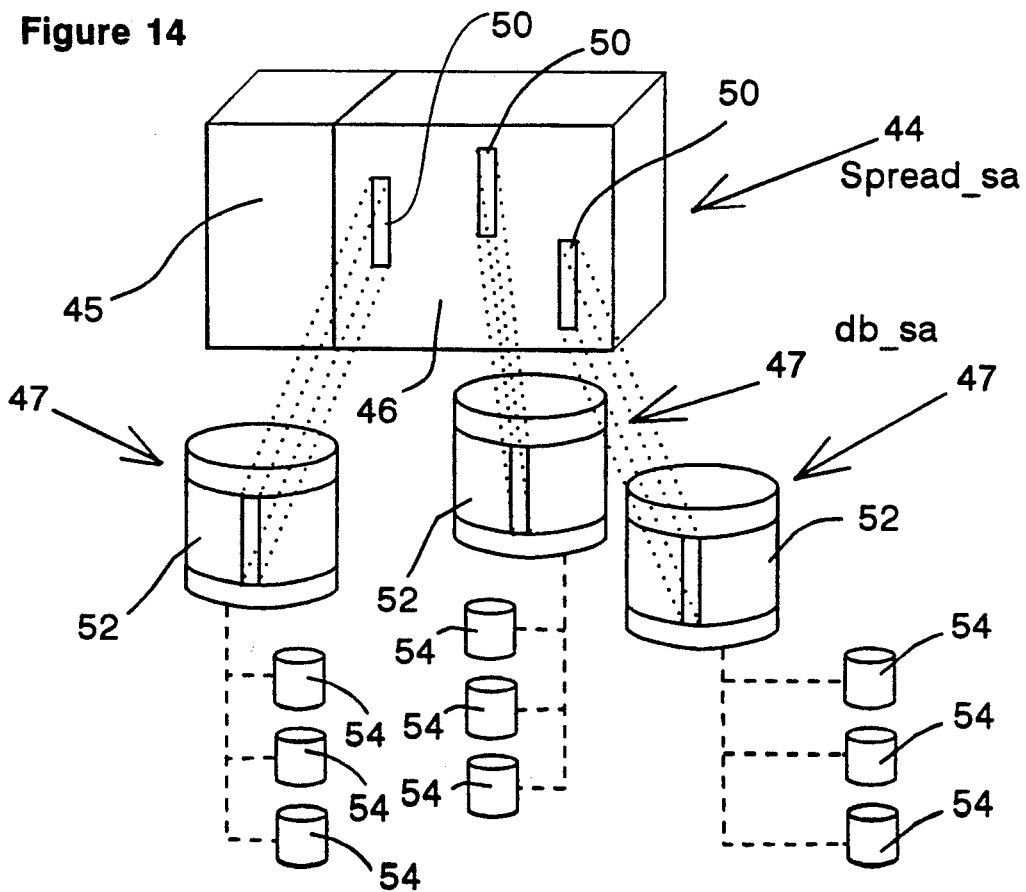
Figure 15:
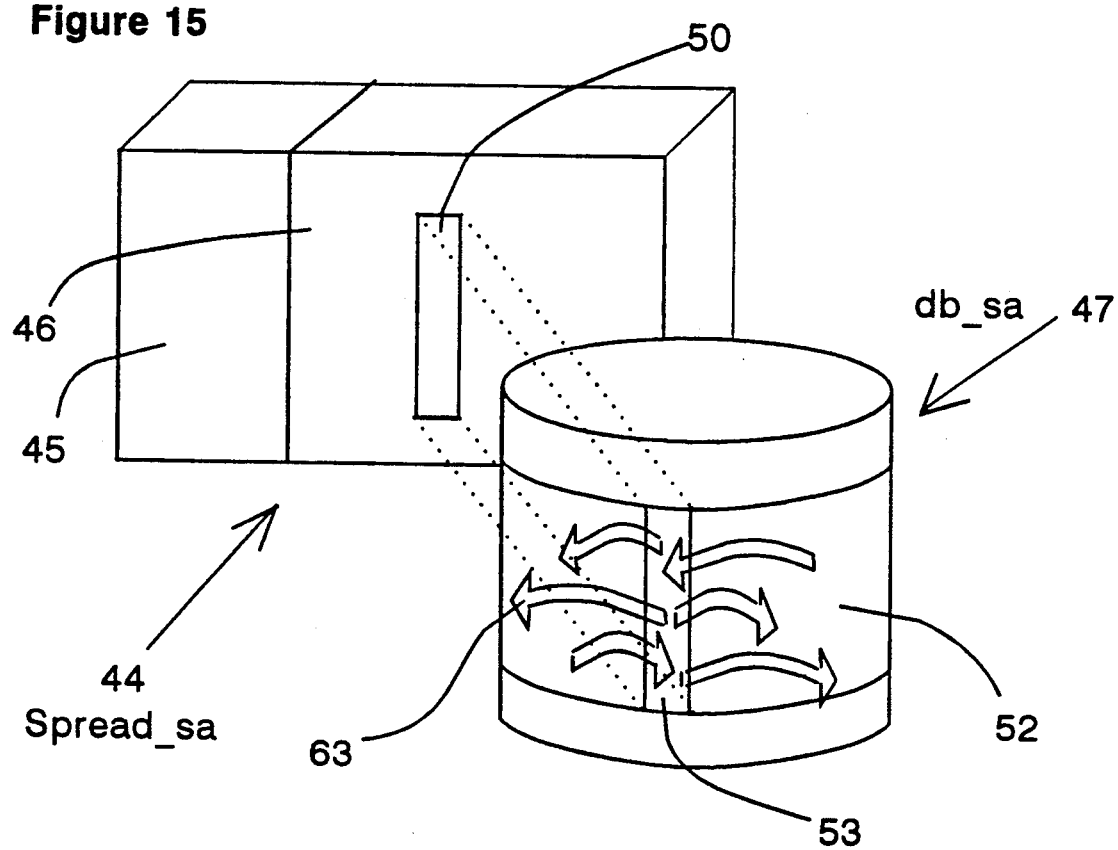

As shown in FIG. 14, more than one col_prog window may be defined in the invention. However, in the best mode implementation, col_prog windows and col_prog ranges are in a strict one-to-one relationship. That is, there is one col_prog range for each col_prog window, and there is one col_prog window for each col_prog range.

The col_prog environment has several important characteristics. It controls the operation of the elements defined in the col_prog windows. Also, it inherits all the characteristics and basic commands from the parent environment. It adds commands and operations for the access and operation on information in the case_db files and the gen_prog section. Finally, the col_prog environment adds commands for generating the video display of that information, i.e., modifying the contents of the video_sa.

This invention's originality and power are based in the particular operation of the col_prog environment.

All elements described in this summary suffice to be used as a dictionary of the terms involved in the claims of this patent application. However, the following elements and considerations are also important to the operation of this invention.

Figure 6:
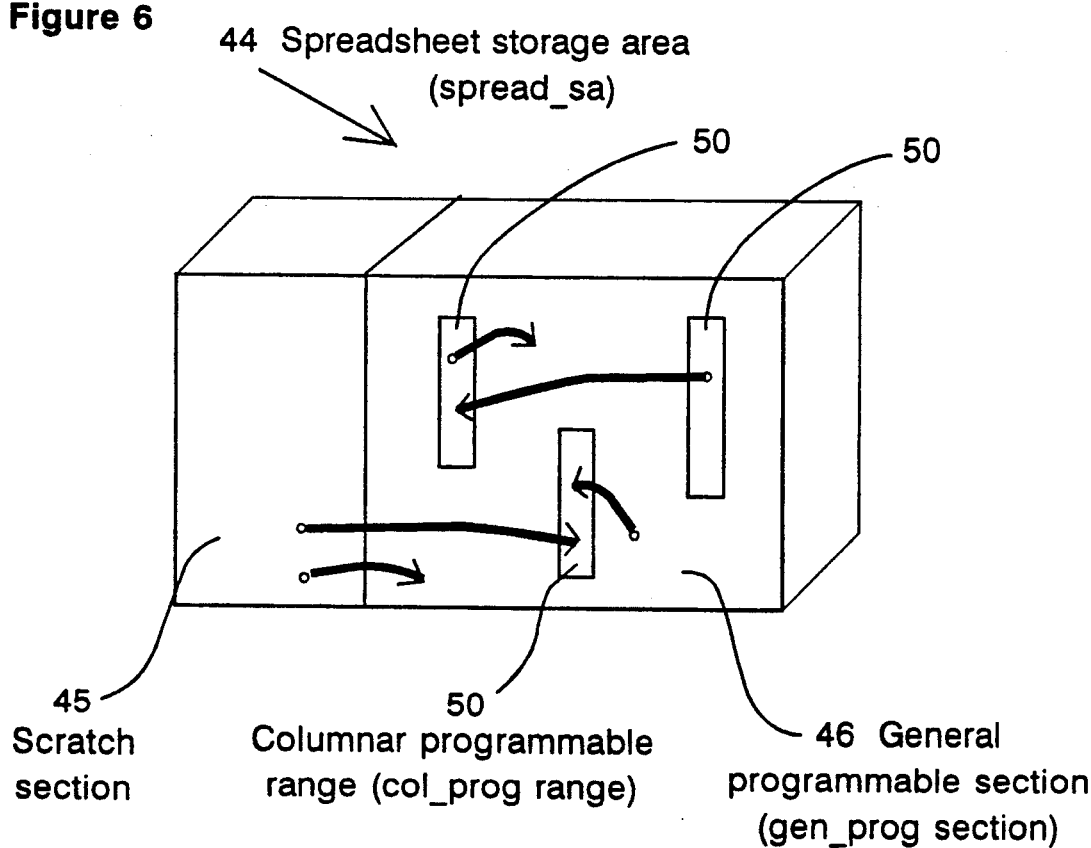
Figure 7:
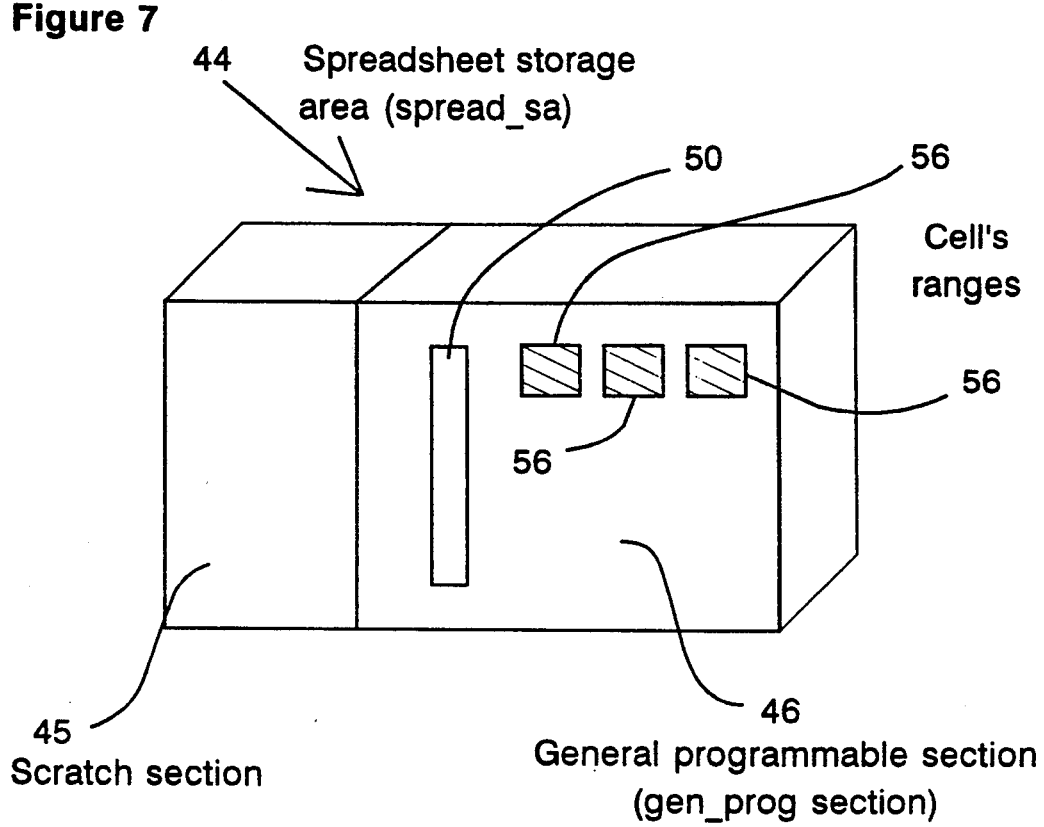
Figure 8:
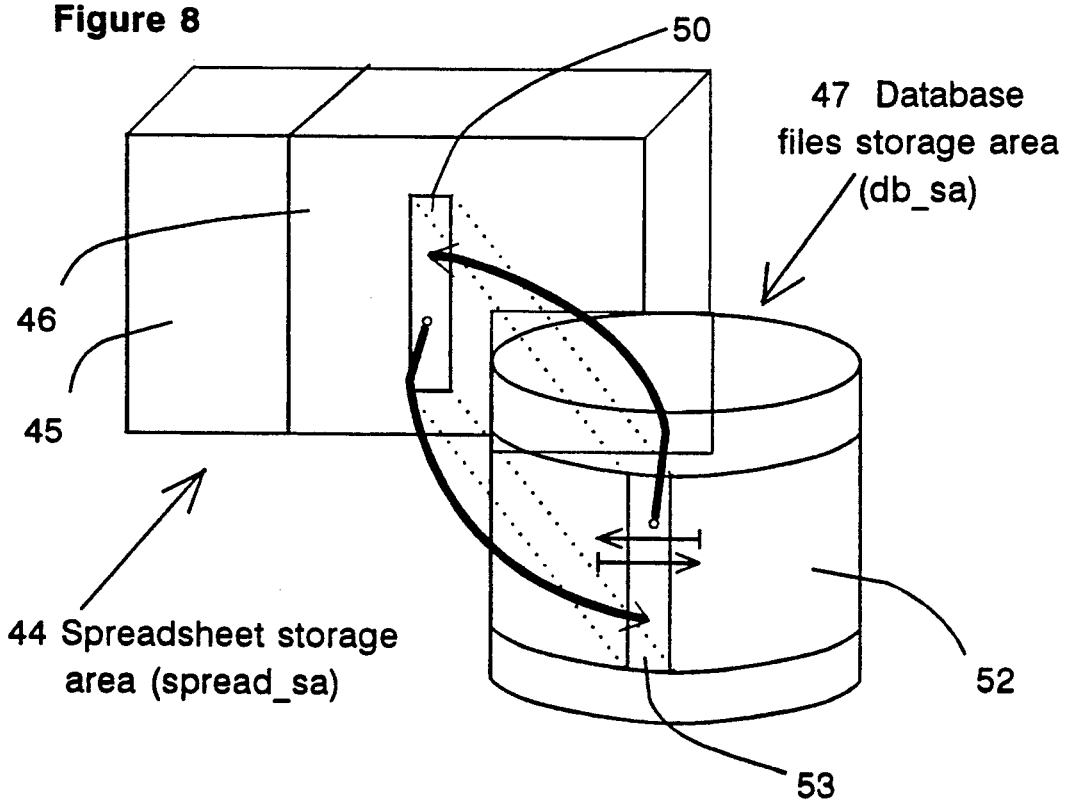

As shown in FIGS. 6 and 7, a formula in a spread_sa cell may reference any other cell in the spread_sa. Referenced cells may be located in the scratch section or the gen_prog section. They may or may not be displayed in a col_prog window. The possibility of formulas that cross-reference the scratch section (45) and the gen_prog section (46), is due to the fact that both sections effectively compose a single spreadsheet.

Gen_prog cells are part of the gen_prog section, regardless of whether they are in a col_prog range (50). They may be accessed and operated as ordinary spreadsheet cells, when working in the gen_prog section. This implies that the programmer may access a col_prog range cell in the layout environment, without activating the col_prog window. Also, col_prog range cells may store formulas that reference other cells or cell ranges in the gen_prog section and the scratch section.

The preferred embodiment allows the programmer to configure the invention otherwise: access to the col_prog range's cells may be effected only from within a col_prog window.

Although all gen_prog cells are outcome cells initially, the user may define some of gen_prog cells as data cells. This cell type definition is transferred to the application environment.

Outcome cells are mainly related to the design of the application in the gen_prog section. The programmer must define the formulas in these cells in the layout environment. The user in the application environment cannot modify these cells' contents.

Data cells accept data input from the user in the application environment. Data input can be texts, numbers or formulas.

The user may specify the contents of the col_prog range cells as "temporary" or "permanent." Permanent cells are not modified when the program loads a database record into the col_prog range, because it does not load record fields into col_prog range permanent cells. The program only loads those fields that will be placed in temporary cells.

All outcome cells in the col_prog range must be permanent cells. All data cells in the col_prog range are initially set up as temporary cells, but the user may specify them as permanent cells.

The main spreadsheet file stores all texts, numbers or formulas defined in outcome cells. This file is identified by the suffix ANS, for ans_file ("analysis-spreadsheet-file"). All texts, numbers or formulas defined in permanent data cells are stored in a separate file, identified by the suffix CAP, for cap_file ("hat file").

According to the cell identification described in the preceding paragraphs, the ans_file contains the formulas that define the application developed in the layout environment. It also enables the program to store, in a cap_file, information that a particular user wishes to protect from other users of the same application. This scheme to store each type of information in a different file provides maximum protection to the programmer and to each individual user.

As described previously, if a permanent data cell contains a formula, it is stored in a cap_file. In the preferred embodiment implementation, the file-save command also stores the current results of evaluating this formula in the ans_file, together with the outcome cells' contents. This ensures the integrity of the information contained in the ans_file.

In special applications described as "time-based," a col_prog range works closely with a related idea: the col_prev range. As seen in FIG. 3, in the best mode implementation, the col_prev range (51) is a single column of adjacent spreadsheet cells, located immediately to the left of the col_prog range (50).

A time-based or record-chained application is an application whose data is contained in ordered records. An ordered record depends on the record previous to it. In these applications, the records compose a chained structure with dependency relationships, so they are called chained-dependent records. Chained-dependent records are mostly used for time-based applications. Yet, the idea should be envisioned in a broader applicability context.

One example of a time-based application is a financial model. In this type of model, the sales level may change for a particular period. This causes a variation in the financial statements corresponding to that period and subsequent periods.

Dependency between records is not the case in all applications. For example, in an inventory analysis model, each database record contains the information corresponding to a single product. Thus, a database record in this kind of model represents a completely independent object.

In all time-based applications, each col_prog range has an associated col_prev range. When a database record is loaded into the col_prog range, it becomes the active record. Then, the database record (previous record) located immediately before the active record is loaded into the col_prev range.

Formulas access values in the previous record, which have already been loaded into the spreadsheet. Thus, this idea enables the program to calculate formulas in the col_prog range much faster.

Only time-based applications employ a col_prev range. Therefore, a programmer should decide beforehand whether to process the application as time-based, and configure program settings accordingly.

All elements described in this description suffice to be used as a dictionary of the terms involved in the claims.

Referring to FIG. 9, under the control of the col_prog environment, the video display (48) shows an interactive database browse view of the active case_db file (52). This browse view is similar to those generated by the BROWSE command in prior-art database programs.

Yet, the invention's browse view has some specific differences. The invention's browse view displays all the records' contents that fit in the view window, except for those of the active record (53). Instead of the information contents of the active record, the video displays those of the col_prog range (50). The screen displays the contents of the col_prog range cells. In the special case of formula-containing cells, by default the screen displays the results of formula operations, as is usual in ordinary spreadsheet programs The operations of the col_prog environment involve memory elements called dynamic links. Dynamic links are storage elements that contain the actual value of the identifiers of the active case_db records that are being accessed by the spread_sa. They coordinate the operation of the case_db files and the col_prog window. There are two distinct dynamic links, depending on the case_db record to which they point:
1) the identifier for the current record, and
2) the identifier for the active record.

Referring to FIG. 33, the program reads the contents of the active case_db file and generates a browse view of its contents, through the following steps:
a) Specifying the col_prog range in the spread_sa, where the contents of individual records from the active case_db file may be read.
b) Selecting the active case_db file.
c) Reading selected contents from the current record in the active case_db file. By this operation, the current record becomes the active_record.
d) Generating the video display showing the actual contents of the col_prog range, and simultaneously showing a browse view of the actual contents of all case_db records different than the active record. Notice, that the video display may show the col_prog range contents interpreting texts as texts, numbers as numbers, and formulas as the results of evaluating said formulas. This is the default mode of operation in prior-art spreadsheet programs.
e) Whenever a spreadsheet calculation is issued during the operation of the col_prog environment, reading selected contents from the current record in the active case_db file, where the current record is chosen by the screen cursor's position.

While this operation is performed, the condition of the current record's dynamic link is determined by the screen cursor's movements and position. The actual value of the current record's dynamic link determines which case_db record is the current record. Thus, the current record is selected according to the condition of the current record's dynamic link.

When the contents from the current record the case_db file are loaded to the col_prog range (step 'c' above), the active record's dynamic link is changed to the contents of the current record's dynamic link. Thus, the active record's dynamic link can identify again the record loaded from the active case_db file (that is, it remembers which record is the active record).

This invention's originality and power are based in the operation of the col_prog environment. The way it controls the operation of the video system storage area is particularly important.

Referring to FIGS. 3 and 12, the col_prog environment (62) has several important characteristics. It controls the operation of the elements defined in the col_prog windows (49). Also, it inherits all the characteristics and basic commands from the parent environment (60 and 61). It adds commands and operations for the access and operation of information in the case_db files (52 and 54) and the gen_prog section (46). Finally, the col_prog environment adds commands for generating the video display of that information, i.e., modifying the contents of the video_sa (47).

Referring to FIG. 9, under the control of the col_prog environment, the video display shows—i.e., the video_sa (47) stores—an interactive database browse view of the active case_db file (52)). This browse view is similar to any one generated by the BROWSE command, in prior-art references such as the FOXBASE+ TM and the FOXPRO TM programmable database file managers, by Fox Software Inc., the DBASE II TM and the DBASE III TM database file managers, by Ashton Tate Corporation, and others. The cursor key and data input operations involved are similar to those used by these programs.

Yet, the invention's browse view has some specific differences. The invention's browse view displays all the records' contents that fit in the view window, except for those of the active record (53). In the screen, the information contents of the active record are substituted by those of the corresponding col_prog range (50). The screen displays the contents of the col_prog range cells. In the special case of formula-containing cells, by default the screen displays the results of formula operations.

The col_prog environment also implements operations that require a dynamic connection between the active case_db file and the col_prog range. Examples of these are the simple_calc and full_recalc operations.

Figure 27:
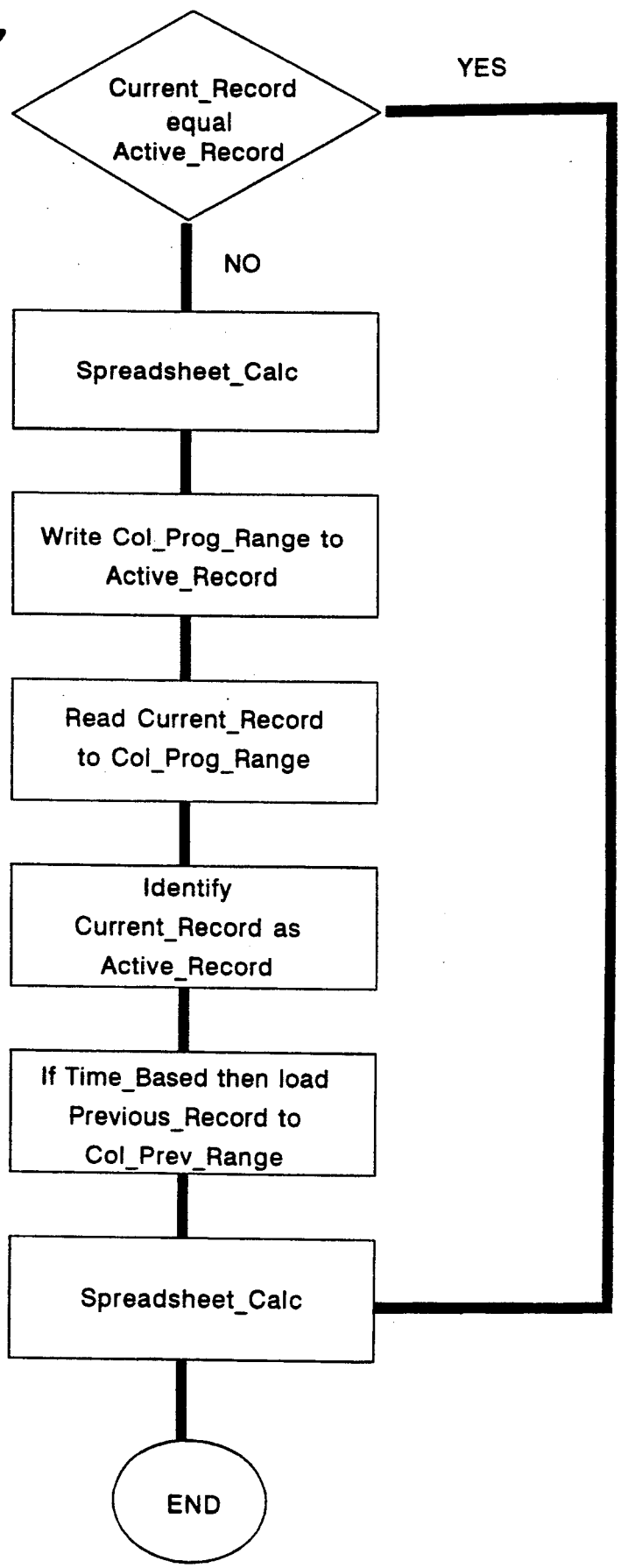
FIG. 27 shows a flowchart of procedure Calc, executing a simple recalc operation. This flowchart shows a simplified case, where Mark‒Record and Need‒Rec‒Calc flags are not considered. The following steps are executed: If the current record is also the active record, then a spreadsheet calc is executed and the process ends. Else, a spreadsheet calc is executed if needed, then the col‒prog range's contents are written to the active record, the current record's contents are read into the col‒prog range. The current record is then identified as the active record and, if application is time‒based, the previous‒record is also loaded into the col‒prev range. Finally, a spreadsheet calc is executed.

As shown in FIG. 27, when a simple_calc operation is issued, the record identified by the screen cursor (current record) is loaded into the col_prog range. Thus, according to the definition, it immediately becomes the active record. Also, if the operation is time_based, the record before the active record (previous record) is loaded into the col_prev range.

Figure 28:
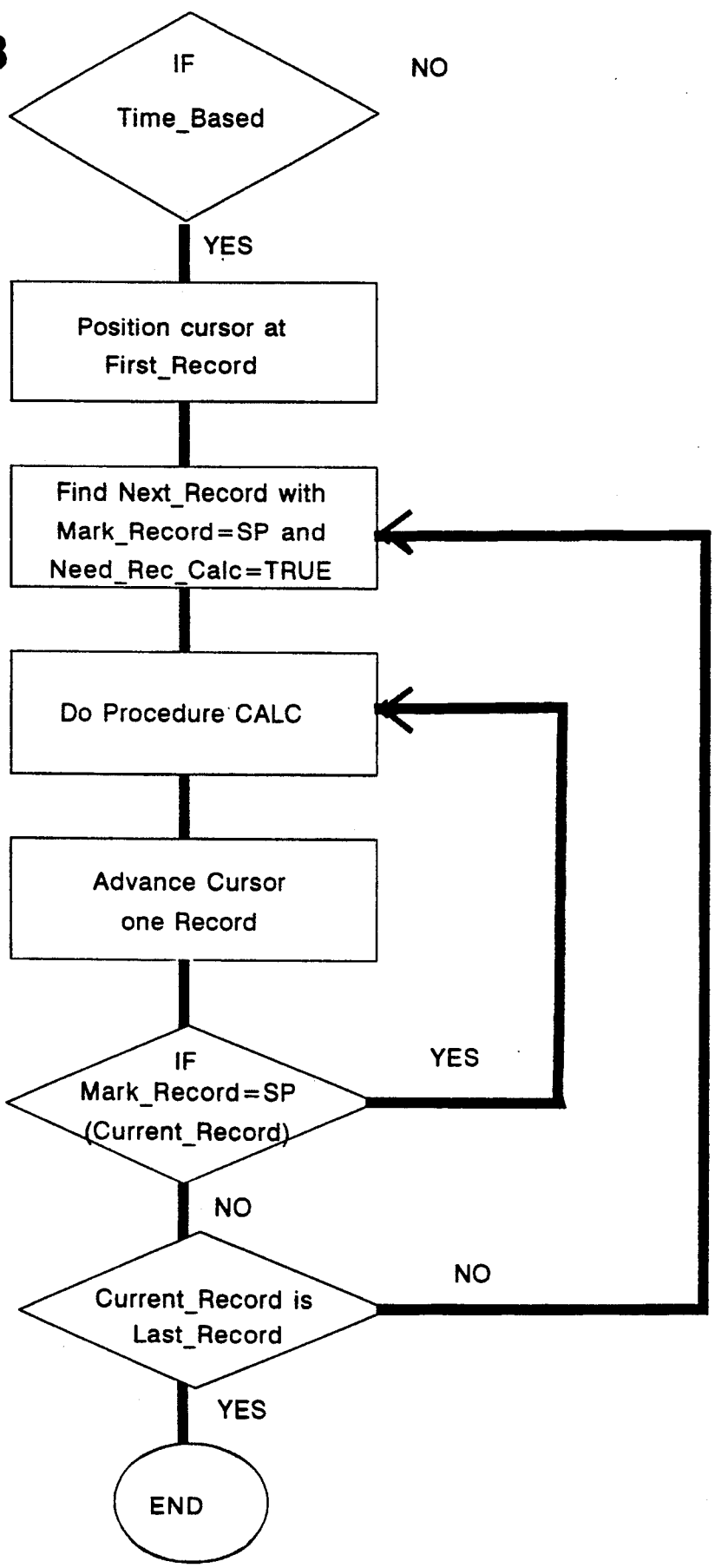
FIG. 28 shows a flowchart of procedure Full‒Recalc. This executes a full recalculation. The flowchart shows a simplified case. The following steps are executed: If application is not time‒based, then this process doesn't execute any operations. Else, cursor is positioned at first record (that is, the first record is made the current record). The next record with Mark‒Record=SP and Need‒Rec‒Calc=TRUE is found (if not found, Process Full‒Recalc terminates here). Procedure Calc is executed. Cursor is advanced one record and procedure Calc is executed again until Mark‒Record for Current‒Record <> SP. If current‒record is not last‒record, the next record with Mark‒Record=SP and Need‒Rec‒Calc=TRUE is found and the process starts again from that record.

FIG. 28 shows a simplified rendering of Procedure Full_Recalc. The full_recalc operation is more complicated. It is a structured sequence of simple_calc operations that involve memory elements called dynamic links. Dynamic links are storage elements that contain the actual value of the identifiers of the active case_db records that are being accessed by the spread_sa. They coordinate the operation of the case_db files and the col_prog window.

Two dynamic links have already been described in the operation of the invention's summary. Besides these, a third dynamic link is important to the operation of this invention. Hence, there are effectively three distinct dynamic links, depending on the record of the active case_db file to which they point:
1) the identifier for the current record,
2) the identifier for the active record, and
3) the identifier for the previous record.

Figure 16A:
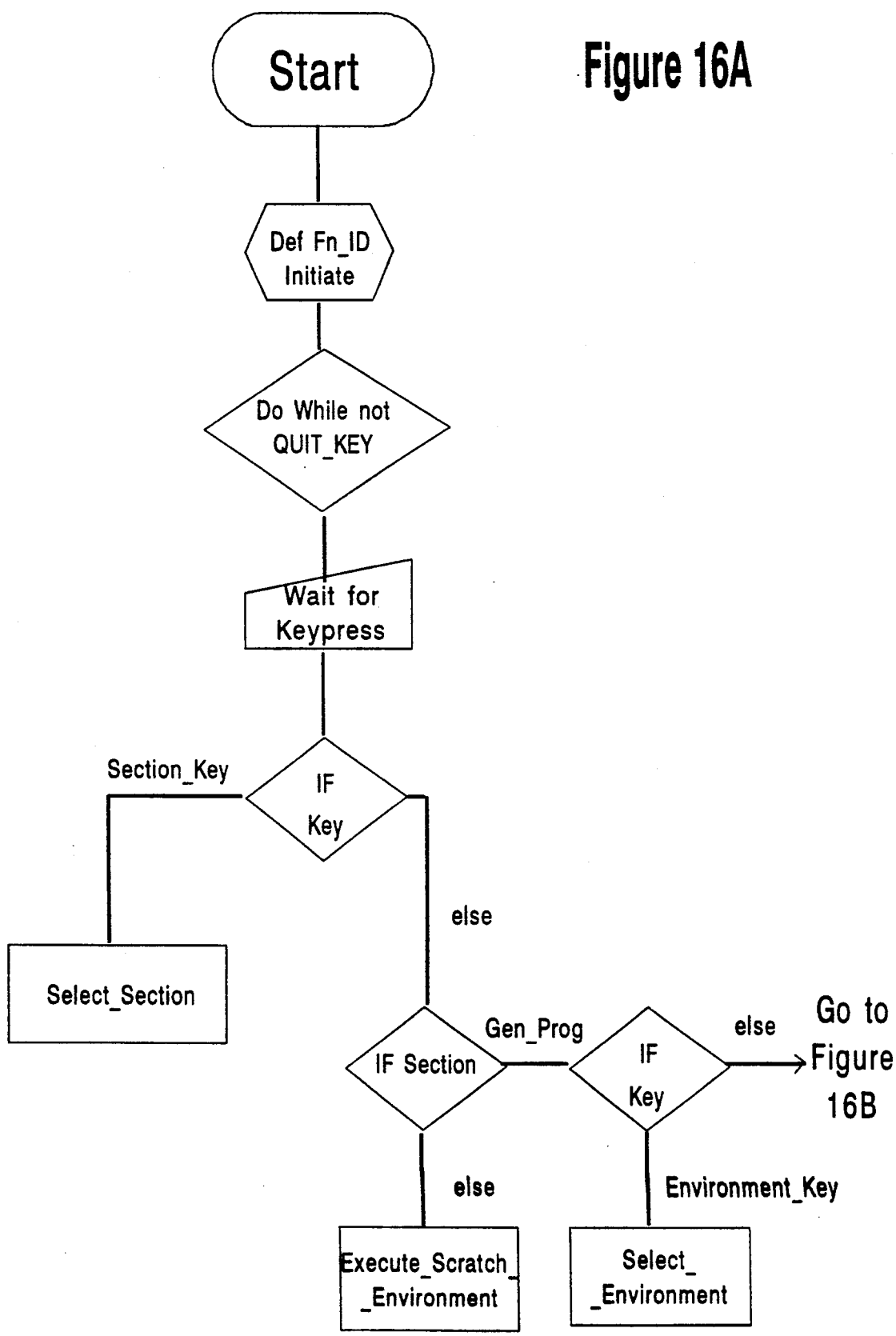
FIGS. 16A and 16B show the main procedure for the operation of the preferred embodiment. This considers the invention's operation in the scratch, layout and application environments and col‒prog environment. The following steps are executed: All elements necessary to the operation of the invention are defined (initiate). If the Quit‒key is pressed, the program terminates, else, it waits for a keypress. According to the key pressed, the program selects a section or does a different action. If section <> Gen‒Prog, Scratch‒Environment is executed. If the Environment‒Key is pressed, an environment is selected. If the Window‒Key is pressed, the col‒prog environment and the col‒prog window are activated or deactivated. If the col‒prog window is deactivated, the Parent‒Environment is executed. Finally, if the col‒prog window is activated, according to the key pressed, the invention may execute any of the following processes: process‒video, process‒formula‒edit, process‒mark‒record, process calc, full‒recalc, change‒case, field‒input, or execute‒parent‒environment.
Figure 16B:
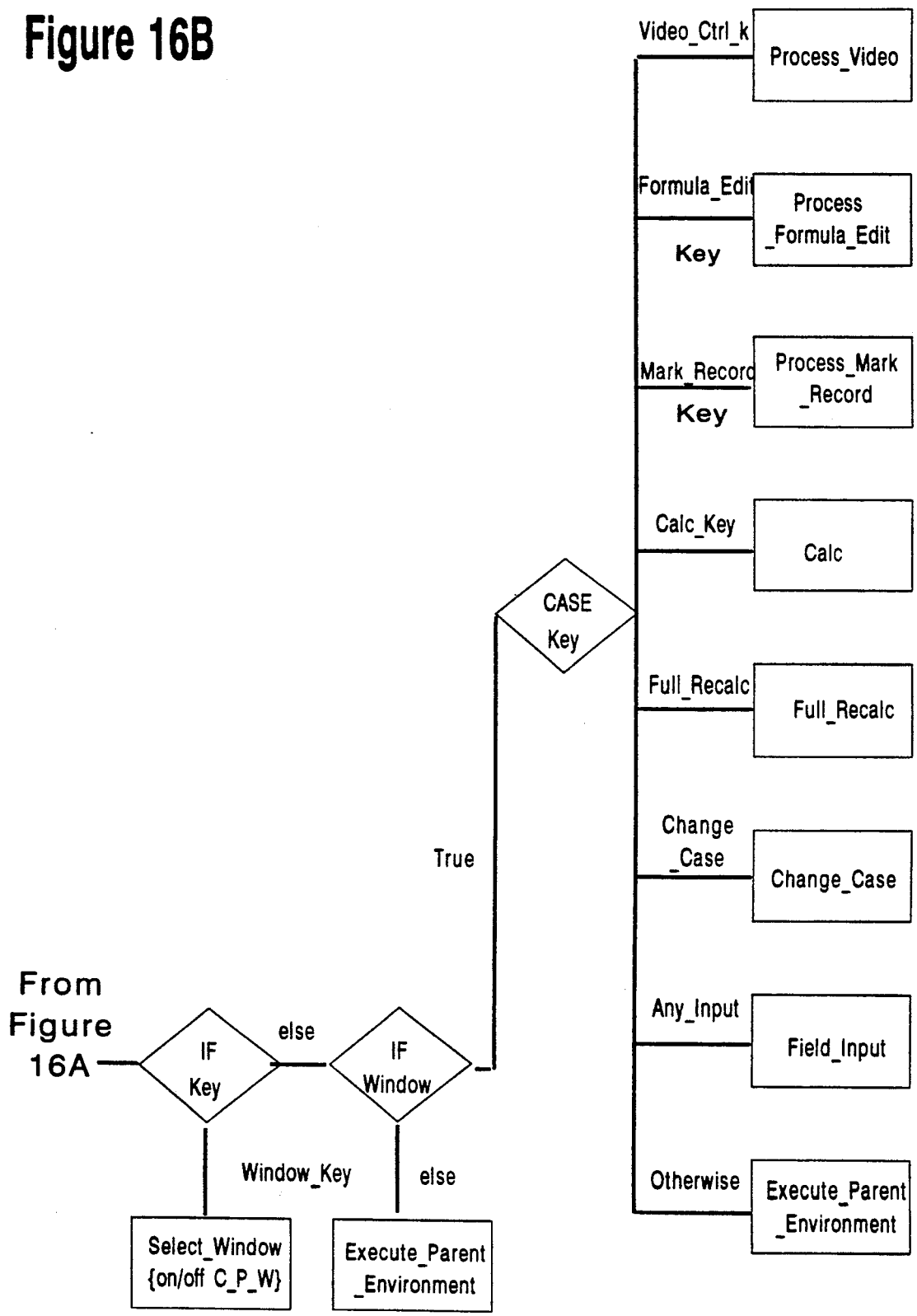
Figure 17:
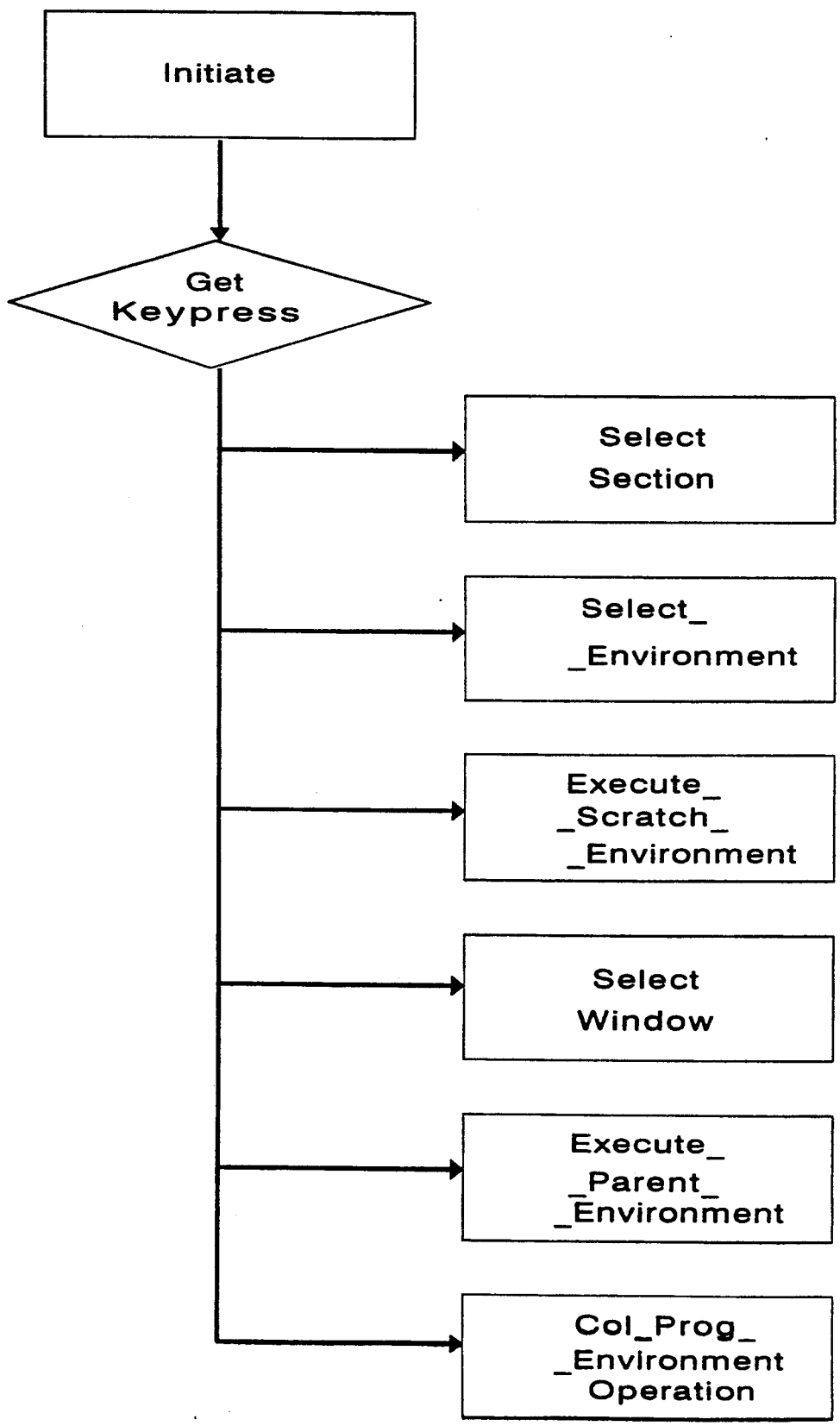
FIG. 17 shows an abbreviated rendering of procedure Main. Same description as in FIG. 16, but the whole operation of the col‒prog‒environment is abbreviated in the last process box (col‒prog environment operation).

The following sections will describe essential elements of this invention's operation in the same order in which they are presented in the algorithm (see Appendix A). FIGS. 16 and 17 present abbreviated flowcharts of this program's execution.

Environment Set-Up (procedure Initiate)

Sections and Environments (procedures Select_Environment, Select_Window and Select_Section)
Basic Video Operations (procedure Process_Video)
Formula Editing (procedure Process_Formula_Edit)
Database Records Flags (procedure Process_Mark_Record)
Simple Recalculation (procedure Calc)
Full Recalculation (procedure Full_Recalc)
Active and Assigned Case_Db Files (procedure Change_Case)
Field Input (procedure Field_Input)
Execution of Parent and Scratch Environments (procedures Execute_Parent_Environment and Execute_Scratch_Environment)

Referring to FIGS. 16 and 17, all elements necessary to the operation of the invention are defined (initiate). If the Quit_key is pressed, the program terminates, else, it waits for a keypress. According to the key pressed, the program selects a section or does a different action. If section < > Gen_Prog, Scratch_Environment is executed. If the Environment_Key is pressed, an environment is selected. If the Window_Key is pressed, the col_prog environment and the col_prog window are activated or deactivated. If the col_prog window is deactivated, the Parent_Environment is executed.

Finally, if the col_prog window is activated, according to the key pressed, the invention may execute any of the following processes: process_video, process_formula_edit, process_mark_record, process calc, full_recalc, change_case, field_input, or execute_parent_environment. See Appendix A, part 2, and FIG. 18.

The environment will be set up with the specifications that are necessary to show the operation of essential elements. It is important to notice that the environment could be set up otherwise, for different purposes.

Figure 18:
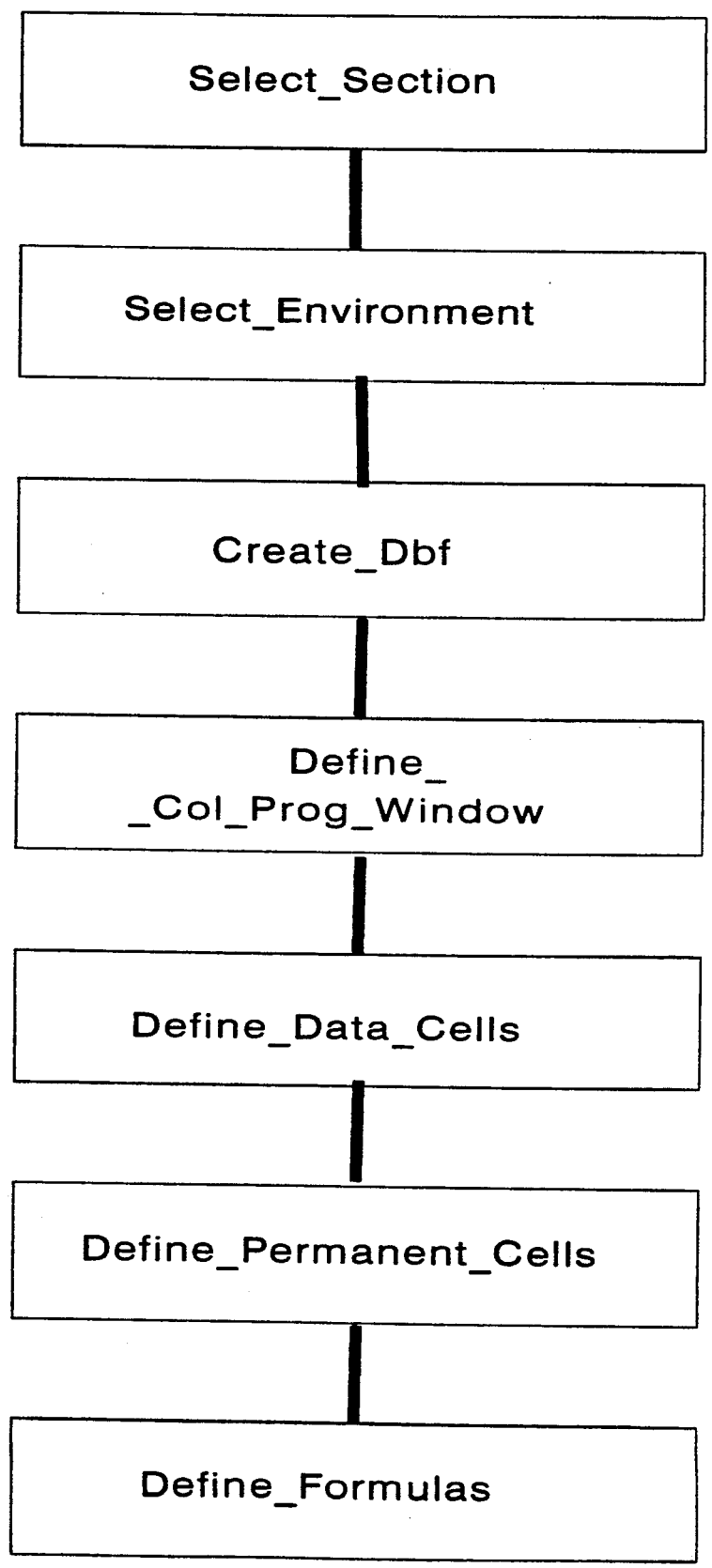
FIG. 18 shows a flowchart of procedure initiate, or the setup of initial conditions. This represents the necessary sequence of operations and commands issued by the user to demonstrate the concepts of the invention relevant to the patent application. The following steps are executed: A section and environment are selected (by default, the gen‒prog section in the layout environment). Case‒db files are created. The col‒prog window is defined. Data cells and permanent cells are defined. Spreadsheet formulas are defined.

Referring to FIG. 18, this procedure may be abbreviated as follows: A section and environment are selected (by default, the gen_prog section in the layout environment). Case_db files are created. The col_prog window is defined. Data cells and permanent cells are defined. Spreadsheet formulas are defined.

Figure 19:
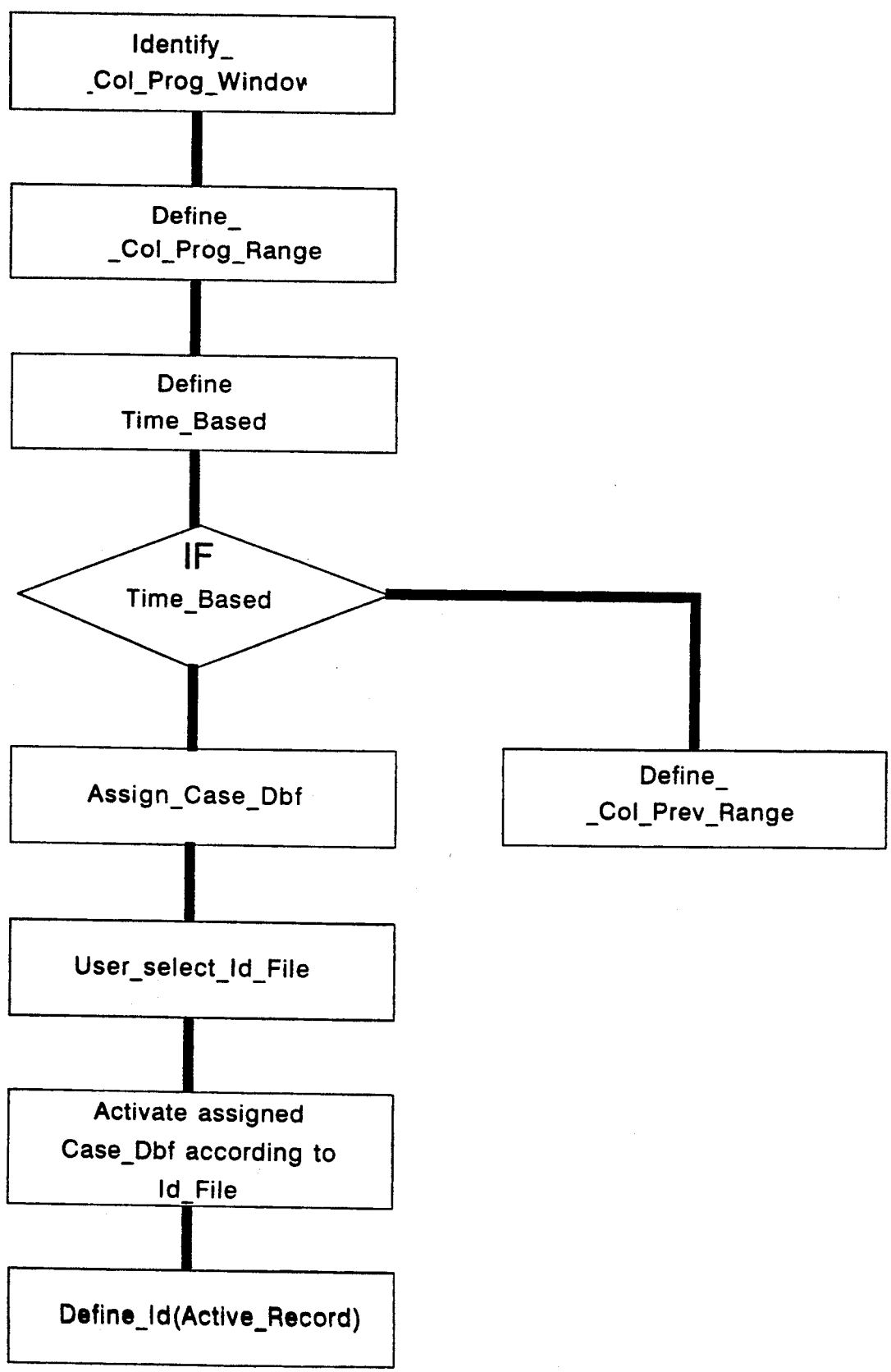
FIG. 19 shows a flowchart of procedure Define‒Col‒Prog‒Window. This procedure represents the operation where a user defines a col‒prog window. The following steps are executed: The col‒prog window is named and thus, identified. The following definitions are enacted: col‒prog range, time‒based (TRUE or FALSE), col‒prev range (if time‒based=TRUE), assigned case‒db files, the identifiers for each assigned case‒db file and the identifier for the active case‒db file (which, in turn, is activated), the active record's identifier.
Figure 20:
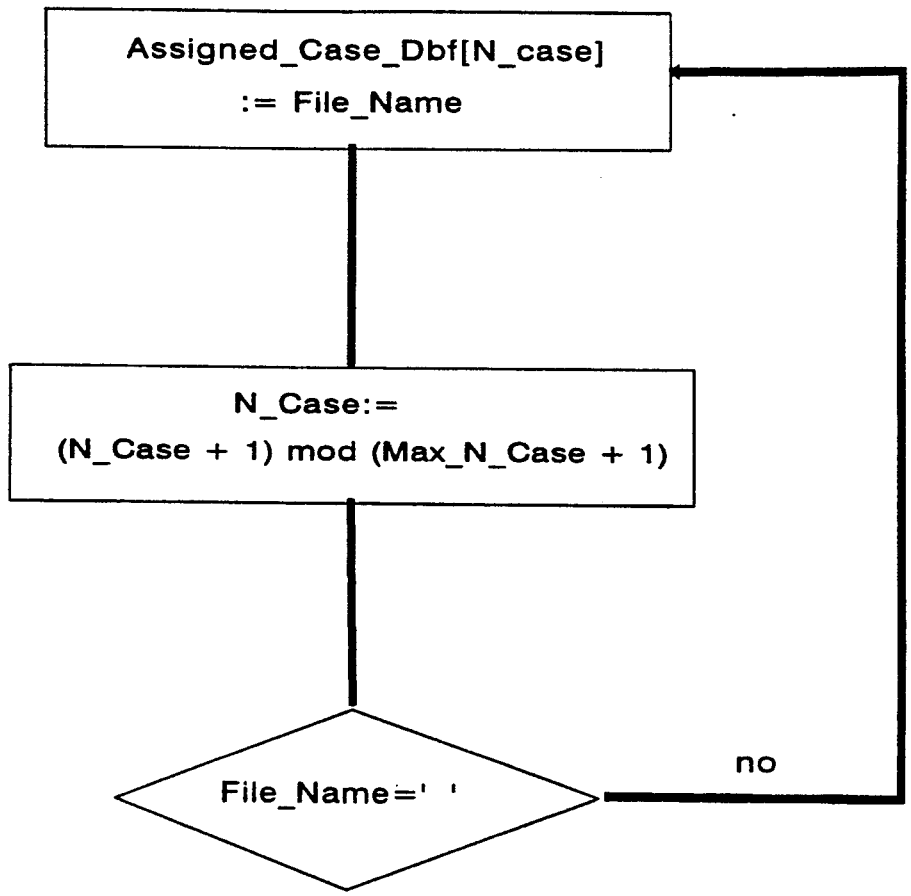
FIG. 20 shows a flowchart of procedure Assign‒Case‒Dbf. In this procedure, the user assigns Case‒Db files to the col‒prog window. Each time this procedure is executed, the next case‒db file in sequence (according to their identifiers) is selected. The use of 'mod' in the second statement guarantees that after the first case‒db file will again be selected after the last case‒db file in sequence.

Procedure Setup also comprises the definition of the Col_Prog Window, shown in FIG. 19. A summarized description of this procedure follows: The col_prog window is named and thus, identified. The following definitions are enacted: col_prog range, time_based (TRUE or FALSE), col_prev range (if time_based=TRUE), assigned case_db files, the identifiers for each assigned case_db file and the identifier for the active case_db file (which, in turn, is activated), the active record's identifier.

A more detailed description of Procedure Setup is presented in the following paragraphs.

The operation of the invention may be described similarly in the layout or in the application environment. Therefore, for the sake of simplicity, this description will primarily consider the case of the layout environment. The differences in the application environment are not essential to understanding the invention's operation.

After the program begins to execute, the user selects the layout environment in the gen_prog section to define one or more col_prog windows. (This is represented by the statements "Init_section(GEN_PROG)" and "Init_environment(LAYOUT)" in procedure Initiate).

The user may create the necessary case_db files (statement "Create_Dbf"). Yet this is optional, because the user may create these files independently of this invention.

The user must define a col_prog window in the layout environment (statement "define col_prog window"). Although the invention contemplates the definition of several col_prog windows, this description requires only one col_prog window definition.

The definition of a col_prog window begins by naming it (statement "identify col_prog window"). The following items compose the named col_prog window:
a) The location of the col_prog range (statement "define col_prog range");
b) Whether the database records are chained-dependent (statement "time_based:=TRUE");
c) If the database records are chained-dependent, the location of the col_prev range (statement "if (time_based) then define col_prev range");
d) The names and directories for the assigned case_db files (statement "assign case_dbf");
e) The identifier of the assigned case_db file that will be the active case_db file (statement "active case_dbf:=assigned case_dbf[id_file]");
f) The identifier of the initial active record for the operation of the active case_db file (statement "define_id(active record)").

Each case_db file assigned to a col_prog window has an associated identifier. This identifier allows the program to select a case_db file for activation, without requiring the file's directory and name. Each identifier also allows the program to activate case_db files more efficiently than if they had not been previously assigned to the col_prog window.

The active case_db file is selected from the assigned case_db files by using the case_db file identifier. This is exactly how the SELECT command operates in prior-art database programs. These programs allow only one file to be selected at a time. This matches the invention's restriction of allowing only one active case_db file at any time.

Each record in the active case_db file also has an associated identifier. This identifier allows the invention to select a case_db record to read from or write to it. Thus, record identifiers operate similarly to the assigned case_db file identifiers.

Three related entities, called dynamic links, are essential to the operation of the invention. Each dynamic link contains the actual value of the identifier corresponding, respectively, to the current record, the active record and the previous record. These dynamic links also have to be defined at this stage of program execution. Finally, to finish the environment set-up, the user defines data cells and formulas in the gen_prog section, and permanent cells in the col_prog range (statements "define data cells", "define permanent cells" and "define formulas"). As mentioned previously, all cells in the gen_prog section are outcome cells, unless they are defined as data cells. Also, by default, data cells in the col_prog range are temporary cells, unless they are defined as permanent cells. Outcome cells in the col_prog range are already permanent cells, and the user may not modify their status.

The dimension of the col_prog range and the dimension of each record in the active case_db file may not be the same. The invention may handle this problem in several ways. The following paragraphs describe the solution envisioned for the preferred embodiment implementation:

1) If the number of cells in the col_prog range is greater than the number of fields in the case_db file, the program loads the entire case_db record into the col_prog range. In this case it does not modify the remaining cells of the col_prog range.

2) If the number of cells in the col_prog range is smaller than the number of fields in the case_db file, the program loads only the record fields that fit into the col_prog range.

3) In both cases, the unload operation writes back the same number of fields that was loaded into the col_prog range.

SECTIONS AND ENVIRONMENTS

Procedures Select_Section, Select_Environment and Select_Window

Figure 21:
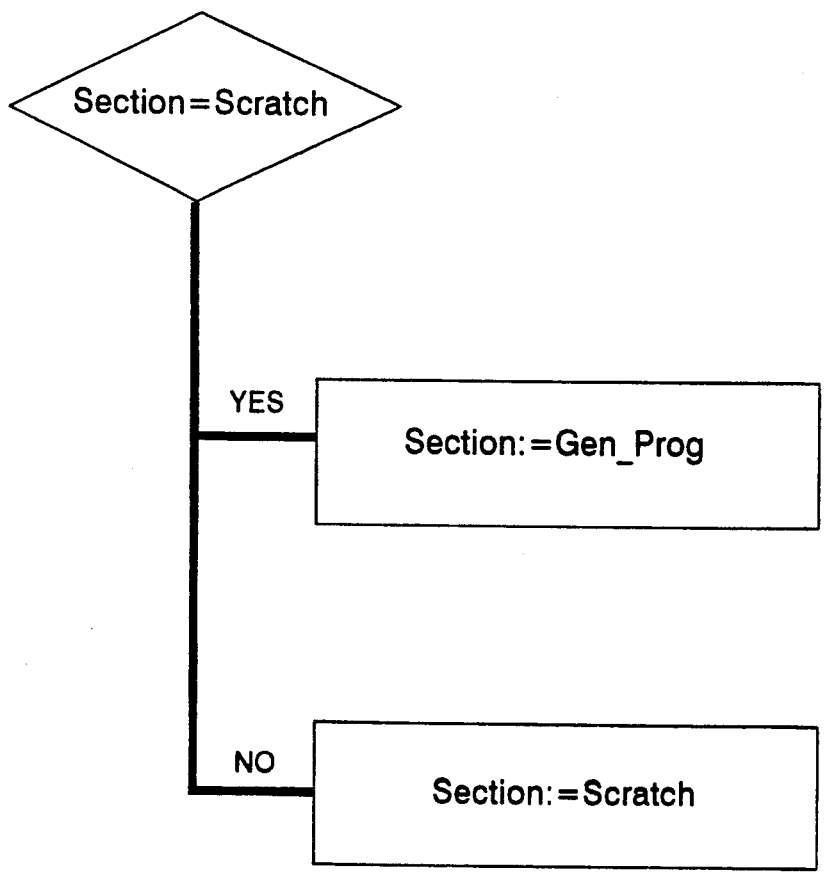
FIG. 21 shows a flowchart of procedure Select‒Section. This procedure controls the switching operation between the SCRATCH section and the GEN‒PROG section.
Figure 22:
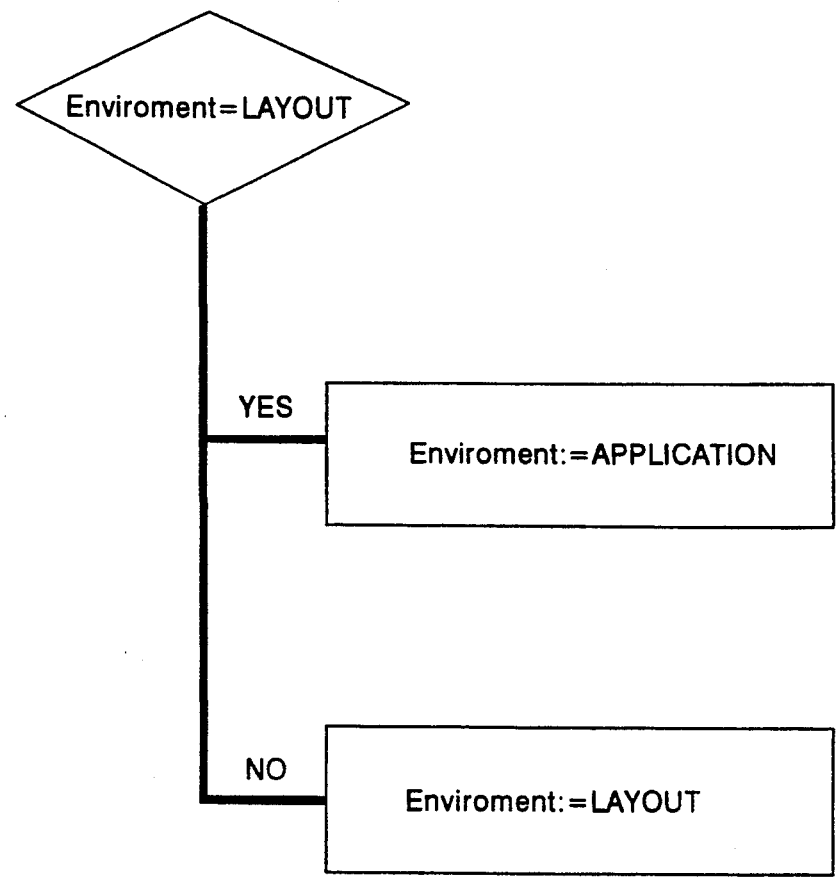
FIG. 22 shows a flowchart of procedure Select‒Environment. This procedure controls the selection of the active environment in the Gen‒Prog section; that is, the switching operation between the LAYOUT environment and the APPLICATION environment.
Figure 23:
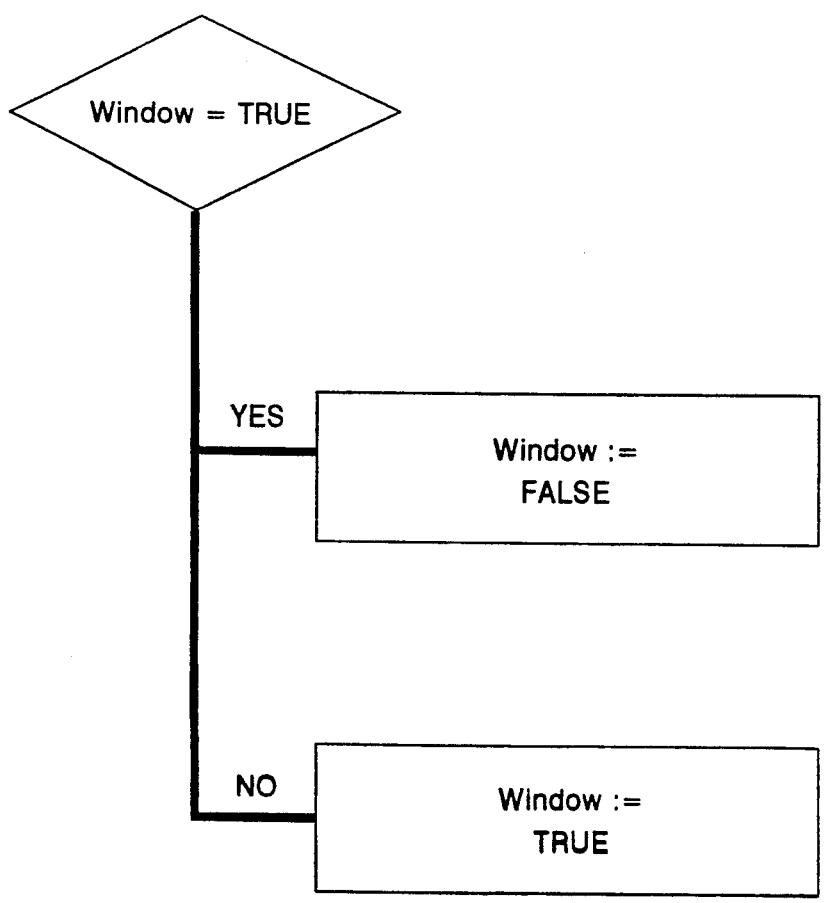
FIG. 23 shows a flowchart of procedure Select‒Window. By this procedure, it is possible to activate (window:=TRUE) or deactivate (window:=FALSE) a Col‒Prog window.

See Appendix A, parts 5, 6, and 7.
Also see FIGS. 21, 22 and 23.

The user can select whether to operate in the gen_prog section or the scratch section. In the scratch section, the scratch environment takes control of the user interface. While operating in the gen_prog section, the user may choose between the layout environment and the application environment. Also, in any of these environments, the user can activate or deactivate the col_prog environment.

In the preferred embodiment implementation demonstrated in Appendix A, parts 5, 6 and 7, the key-activated commands allow the user to make a choice.

Also, in the preferred embodiment implementation, a special key called the window_key activates or deactivates a col_prog window. When there is only one col_prog window, the window_key acts as a switch to put the user in the col_prog window or take the user out of it. When there is more than one col_prog window, the window_key displays a list of options. This list contains all defined col_prog windows defined, with their respective environments, and the layout environment. The user points to the desired environment and the program provides immediate access to the selected environment.

BASIC VIDEO OPERATIONS

Procedure Process_Video

Figure 24:
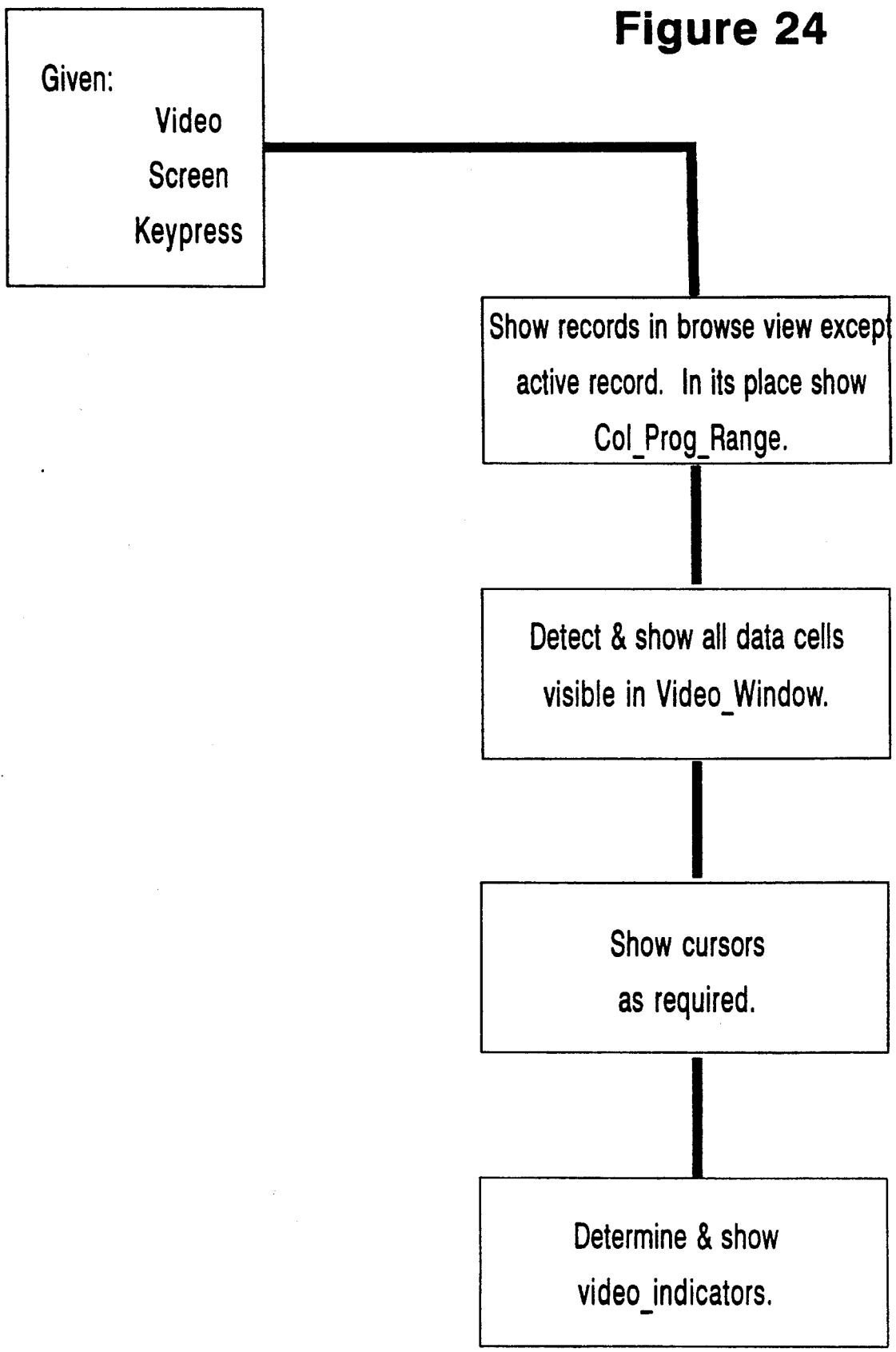
FIG. 24 shows a flowchart of procedure Process‒Video. This procedure operates and modifies the video display after any cursor key is pressed. Two previous conditions are taken into consideration: the key pressed (any cursor key activates this procedure), and the previous state of the video screen display. All case‒db records are shown in a browse view, except for the active record, in whose place the col‒prog range is shown. Data indicators, cursors and video indicators are shown as required.

See Appendix A, part 8, and see FIG. 24.

As already described, when the user is in a col_prog environment, the video_sa generates an interactive database browse view of the active case_db file. Cursor keys and data input operations are similar to those of ordinary database browse operations.

Referring to FIG. 24, this procedure may be abbreviated as follows: Two previous conditions are taken into consideration: the key pressed (any cursor key activates this procedure), and the previous state of the video screen display. All case_db records are shown in a browse view, except for the active record, in whose place the col_prog range is shown. Data indicators, cursors and video indicators are shown as required.

A more detailed description of Procedure Process_Video is presented in the following paragraphs.

With the exception of the active record, all the records' information that fits in the view window is shown immediately in a browse view. For the active record, its own view is substituted by a view of the col_prog range. This view actually displayed the contents of the cells in the col_prog range. Formula-containing cells are shown by displaying the results of formula operations on the contents of the active record.

Also, the col_prog environment implements operations that require a dynamic connection between the active case_db file and the col_prog range.

Examples of these operations are the simple_calc and full_recalc operations.

Cursor keys

The browse view in the col_prog environment shows the case_db records in columnar view. By pressing the right or left cursor keys within the col_prog window, the user can look at different records of the active case_db file. Similarly, by pressing the up and down cursor keys, the user can look at different fields of a case_db record. This operation is similar to a browse operation in a database program.

The span of the information limits the movement of the cursor keys. For example, the right cursor key operates until it points to the last record in the assigned database file. The size of the col_prog range limits up and down movements. The col_prog range size depends on the spreadsheet range defined for a particular screen in the application environment.

In the preferred embodiment implementation for the invention, pressing the Ctrl key and a right or left cursor key executes control cursor key operations. These operations place the cursor immediately at the designated edge of the screen.

Data and outcome fields

The type of operation on an individual record field depends on whether it corresponds to a data or to an outcome cell in the col_prog range. Thus, a data field is a record field that would be placed in a data cell, if the record that contains it was loaded into the col_prog range. An outcome field is a record field that would be placed in an outcome cell, under similar circumstances. Data fields are the only fields that may be modified while the program is operating in the application environment.

The screen cursor

The screen cursor signals the position where the next data input operation will be executed. Thus, it is visible only if the screen displays at least one col_prog data cell or data field. When it is visible, the screen column where it is positioned shows the contents of the current record.

If the screen does not display any data cells or data fields, the column cursor is active instead of the screen cursor. The column cursor's position always indicates the current record.

Logical chain of procedural statements

The program executes, in the following order, the essential ideas described for the video operation of the col_prog window (see Appendix A, part 8 -procedure Process_Video):

1. Initialize all state variables (flags).
2. Determine the video screen's boundaries. Position the screen and column cursors, according to their previous conditions and the cursor key pressed by the user (keypress).
3. Display all records as in a browse view, except the active record which is substituted by the col_prog range.

4. Use special indicators to display all col_prog range data cells and data fields in the col_prog window (in most prior-art references, data cells and data fields are represented in a different color).
5. Show the screen cursor only if any col_prog range data cells or data fields are visible in the screen. Show the column cursor if the screen cursor is not visible.
6. Display modified video indicators. Most important among these are: mark_record flags, need_rec_calc flags, active column indicator, need_spreadsheet_calc flag, available spreadsheet memory, other spreadsheet and database indicators.

FORMULA EDITING

Procedure Process_Formula_Edit

Figure 25:
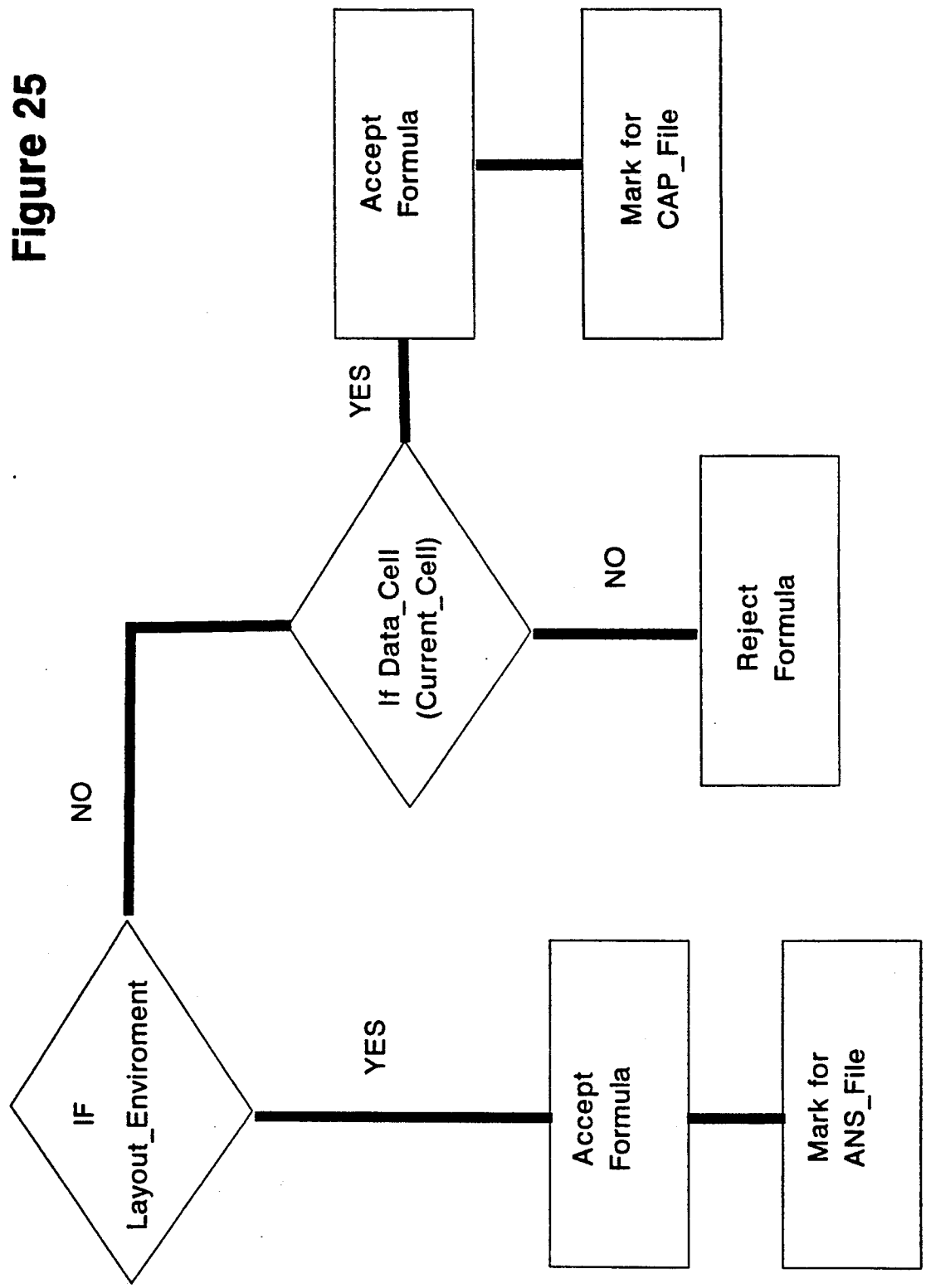
FIG. 25 shows a flowchart of procedure Process‒Formula‒Edit. This procedure accepts a formula edit operation in the col‒prog range. The following steps are executed: If environment is LAYOUT, then formula‒edit is accepted and results are marked for storage in the ANS file. Else, formula‒edit is accepted and results are marked for storage in the CAP file, only if current cell is data cell. Else, formula‒edit is rejected.

See Appendix A, part 9, and also see FIG. 25.

The user presses the formula_edit_key to modify a col_prog range formula in the cell where the cursor is.

Referring to FIG. 25, this procedure may be abbreviated as follows: If environment is LAYOUT, then formula_edit is accepted and results are marked for storage in the ANS file. Else, formula_edit is accepted and results are marked for storage in the CAP file, only if current cell is data cell. Else, formula_edit is rejected.

A more detailed description of Procedure Process_Formula_Edit is presented in the following paragraphs.

The application environment does not allow formula edition in outcome cells. This is possible only in the layout environment.

In the layout environment, if the cursor is on an outcome cell, the cell accepts the action of the formula_edit key. This executes the formula edit operation. The formula will be saved in the ans_file, the main spreadsheet file. This file also stores all texts, numbers or formulas defined in permanent outcome cells.

If the cursor is on a data cell, regardless of the environment, the formula_edit_key executes the formula edit operation. This operation is similar to formula edit operations in ordinary spreadsheet programs. If the data cell is a permanent cell, the formula will be saved in the cap_file. In the preferred embodiment implementation, the value resulting from the evaluation of that formula is also stored in the ans_file.

These protection modes allow the programmer and the user to get maximum benefit from the program's features. In the layout environment of the gen_prog section, the programmer can build an application by defining or editing formulas in the outcome cells. Then the programmer deliberately transforms the layout environment into the application environment, to let the user evaluate the formulas on the data. For example, in a financial model, the user may want to examine the consequences of changes in the firm's financial conditions. To do this, the user modifies all data cells in the application environment, even if they contain formulas.

DATABASE RECORDS FLAGS

Procedure Process_Mark_Record

Figure 26:
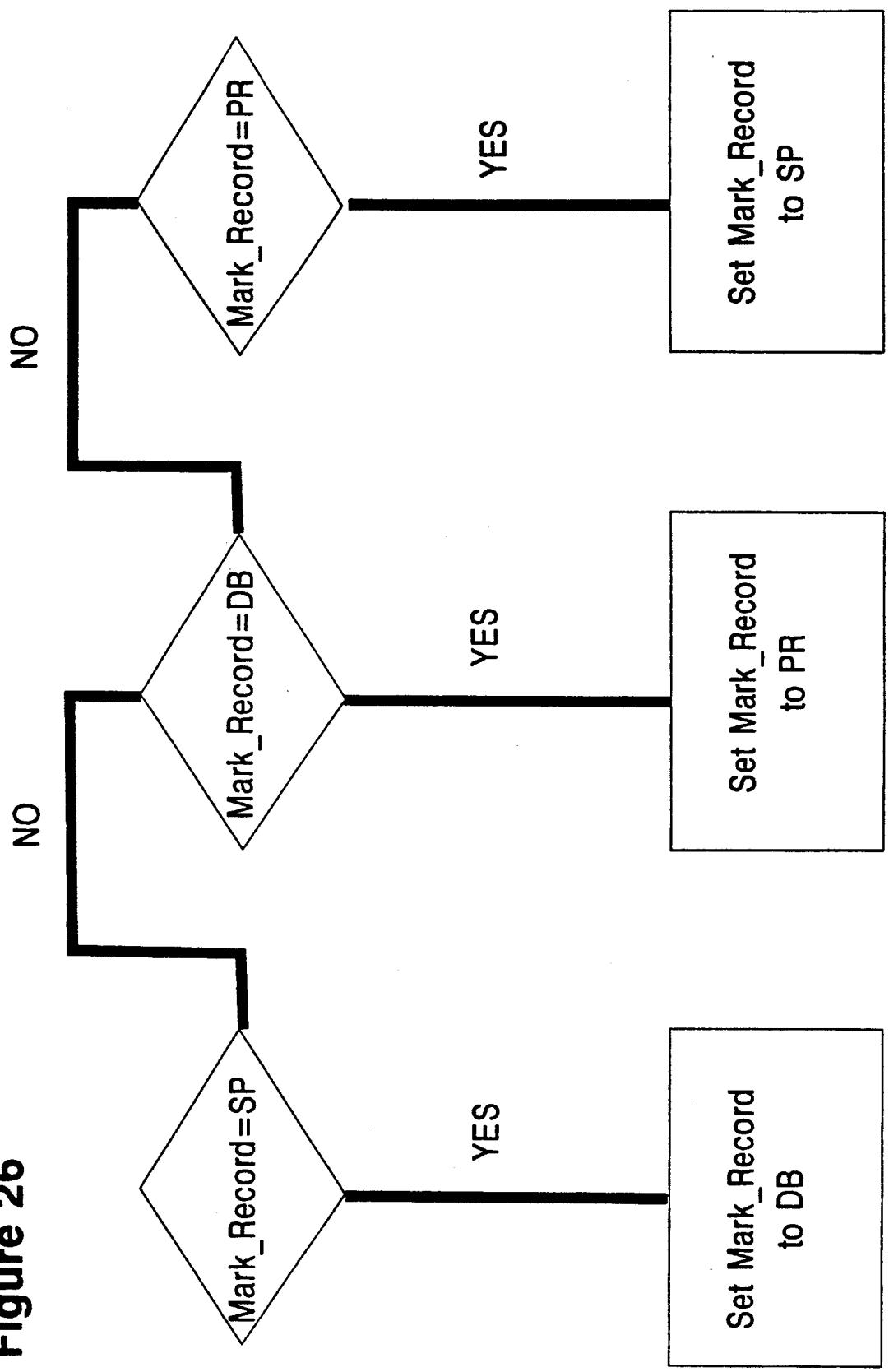
FIG. 26 shows a flowchart of procedure Process‒Mark‒Record. This procedure marks a record as PR (protected), SP (spreadsheet) or DB (database). It acts as a switch between those three values.

See Appendix A, part 10, and also see FIG. 26.

The mark_record key controls a state variable (flag) associated to each record in a case_db file. This state variable is the mark_record flag. The mark_record flag variable controls whether a database record can be loaded into the col_prog range when required.

The mark_record key can switch the status of a record to any of three possible conditions:

SP (SPreadsheet),
DB (DataBase),
PR (PRotected).

SP allows a record to be loaded into the col_prog range, and to be modified.

DB does not allow a record to be loaded into the col_prog range, although it may be modified.

PR is the most restrictive status, because it does not allow the record to be modified or loaded into the col_prog range. When a record is in PR status, the scrolling of the screen is active but all record fields may not be modified. The screen cursor has access to these fields only if the mark_record key switches the record to a different status.

The user presses the mark_record key until the mark_record flat is set to DB to signal the contents of a record that are not going to be modified in the application environment. In a financial application, for example, a user prepares an extensive set of records that contain the financial history of the firm. The user does not want to modify these records while running the model. So, the user sets the mark_record flag OFF for every period (record) of historical data.

The operation of mark_record flags in simple and full recalculation (sections 5 and 6) and field input (section 7) will clarify the functions of this key.

SIMPLE RECALCULATION

Procedure Calc

See Appendix A, part 11, and also see FIG. 27.

Two kinds of recalculation are possible: simple recalculation (CALC or recalc, for short) and full recalculation. The calc_key activates simple recalculation (procedure calc).

FIG. 27 shows a simplified case, where Mark_Record and Need_Rec_Calc flags are not considered. In this figure, the sequence of steps followed are: If the current record is also the active record, then a spreadsheet calc is executed and the process ends. Else, a spreadsheet calc is executed if needed, then the col_prog range's contents are written to the active record, the current record's contents are read into the col_prog range. The current record is then identified as the active record and, if application is time_based, the previous_record is also loaded into the col_prev range. Finally, a spreadsheet calc is executed.

A more detailed description of Procedure Calc is presented in the following paragraphs.

When the user presses the calc_key, the program begins procedure calc. Procedure calc executes two basic operations:

a) a read operation of the current record to the col_prog range, if allowed by the current record's mark_record flag, and b) a spreadsheet recalc.

For the first operation, the program identifies the current record as the record where the screen (column) cursor is. Then the current record is compared to the active record, which is the last record loaded into the col_prog range. (More properly said, its identifiers are compared. Record identifiers are numbers used to point and select specific records in the case_db file. If two records' identifiers are the same number, then these records are the same.)

If the current record and the active record are the same (i.e., their identifiers are the same), the program only performs a spreadsheet recalc. A spreadsheet recalc executes all formulas defined in the spreadsheet cells. This operation is performed as in the most popular spreadsheet programs currently in the market, such as the LOTUS 1-2-3 ™ release 2.2 spreadsheet program.

If the current record is not the same record as the active record, then the program checks if the current record may be loaded into the col_prog range. The mark_record flag forbids such operation if its status is "DB" or "PR." The current record may be loaded into the col_prog range only if the status of the mark_record flag for the current record is SP. If the current record may not be loaded, procedure calc only executes a spreadsheet recalc.

Before the current record is loaded into the col_prog range, the col_prog range has to "unload" by writing its contents back to the active record (the last record loaded) in the case_db file.

Also, before unloading the contents of the col_prog range to the active record, the need_spreadsheet_calc flag has to be checked. If the need_spreadsheet_calc flag is TRUE, then the spreadsheet needs to be recalculated, since one or more spreadsheet data have been changed with no subsequent spreadsheet recalc. In this case, a spreadsheet recalc is executed before the col_prog range is unloaded. Otherwise, the col_prog range's results would not be correct when written back to the active record.

The total sequence of operation in procedure calc is as follows. First, a spreadsheet calc is executed (if needed). Then, if the current record is going to be read into the col_prog range, the col_prog range "unloads" by writing its entire cells' contents to the active record (this is needed in order to save the col_prog range's contents). After this operation, if mark_record's status for current record is SP, the current record is loaded into the col_prog range. Thus, the current record becomes the new active record. Finally, a spreadsheet recalc is always executed.

A special consideration has to be made when the current record is loaded (read) from the database file into the col_prog range. The col_prog range may contain permanent data, texts and formulas, and this read operation may not modify permanent cells in the col_prog range.

Finally, in a time-based application, when the program loads a record into the col_prog range, it must also read the previous record into the col_prev range. The col_prev range cells may only contain data, not formulas. The previous record must be read entirely into the col_prev range.

Notice that the mark_record flag does not control whether the previous record can be loaded into the col_prev range. This range cannot be modified and is not subject to recalculation, since it contains only data. Also, the col_prev range does not write information back to the database record from which it read.

FULL RECALCULATION

Procedure Full_Recalc

See Appendix A, part 12, and also see FIG. 28.

The full recalculation procedure, or procedure full_recalc, is a composite calculation procedure that applies only to time-based applications. Full recalculation requires the application to be previously defined as time-based.

Referring to FIG. 28, this procedure may be abbreviated as follows: If application is not time_based, then this process doesn't execute any operations. Else, cursor is positioned at first record (that is, the first record is made the current record). The next record with Mark_Record=SP and Need_Rec_Calc=TRUE is found (if not found, Process Full_Recalc terminates here). Procedure Calc is executed. Cursor is advanced one record and procedure Calc is executed again until Mark_Record for Current_Record <> SP. If current_record is not last_record, the next record with Mark_Record=SP and Need_Rec_Calc=TRUE is found and the process starts again from that record.

A more detailed description of Procedure Process_Formula_Edit is presented in the following paragraphs.

Full recalculation executes procedure calc repeatedly. It stops until it has calculated and written back all database records that had to be evaluated, due to changes in a data set. In a financial model, for example, a sales level change for a given period alters the financial statements for all subsequent periods. Therefore, a full recalculation is necessary, to update all periods after the change.

For procedure full_recalc to operate adequately, it is necessary to define an additional state variable for each case_db record: the need_rec_calc flag. A need_rec_calc flag has two possible states: TRUE and FALSE. The need_rec_calc flag is set to TRUE when the user modifies at least one field in the database record. It is set to FALSE when the database record contents are loaded into the col_prog range, calculated, and written back to the same database record.

Procedure full_recalc is activated by pressing the full_recalc key. The operational sequence may be described as follows:

1. The procedure checks the status of the mark_record flag and the need_rec_calc flag in each record of the active case_db file.
2. The first record with the following two characteristics is identified:
   a) the mark_record flag set to SP, *and*
   b) the need_rec_calc flag set to TRUE.
   The screen cursor is placed over this record.
3. The procedure executes a simple calc operation on the current record. It repeats the process on all contiguous and subsequent records that have the mark_record flag set to SP. Notice that the program does not examine the status of subsequent records' need_rec_calc flags after the current record.
4. This repetitive procedure stops immediately before reaching the first record with a mark_record flag that is not set to SP.
5. Procedure full_recalc then searches for the next record with mark_record flag set to SP and need_rec_calc flag set to TRUE. If it finds such a record, the entire procedure is repeated. Otherwise, the procedure stops.

ACTIVE AND ASSIGNED CASE DB FILES

Procedures Define_Col_Prog_Window and Change_Case

Figure 29:
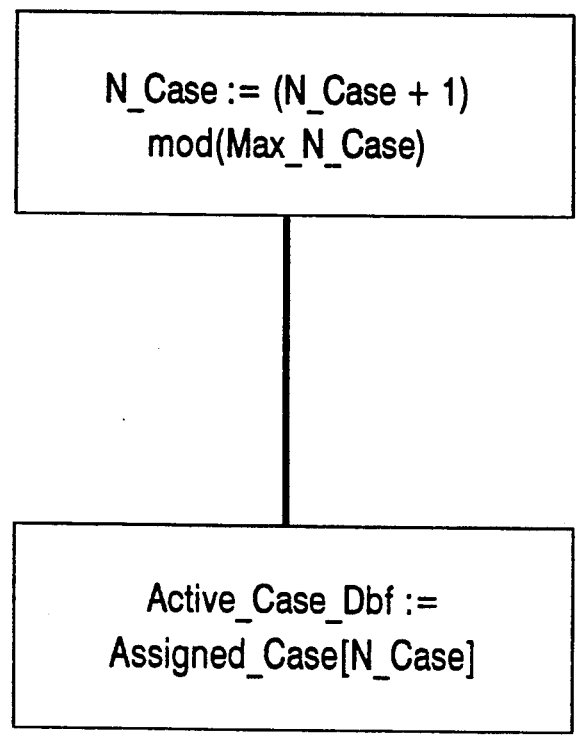
FIG. 29 shows a flowchart of procedure Change‒Case. This procedure changes the active case‒db file to the next one in sequence.

See Appendix A, parts 3 and 13, and also see FIG. 29.

One or more case_db files can be assigned to a col_prog window. The user may define these assignments.

This is represented by the following statement in the algorithmic procedure "Define_Col_Prog_Window": "assign case_dbf". (See Appendix A, part 3.)

Only one assigned case_db file can be active at any particular time. In the best mode implementation, the user can change the active case_db file by pressing the change_case key. This operation activates the assigned case_db file whose identifier immediately succeeds the identifier of the previous active case_db file. (See Appendix A, part 13.)

FIELD INPUT

Procedures Main and Field_Input

Figure 30:
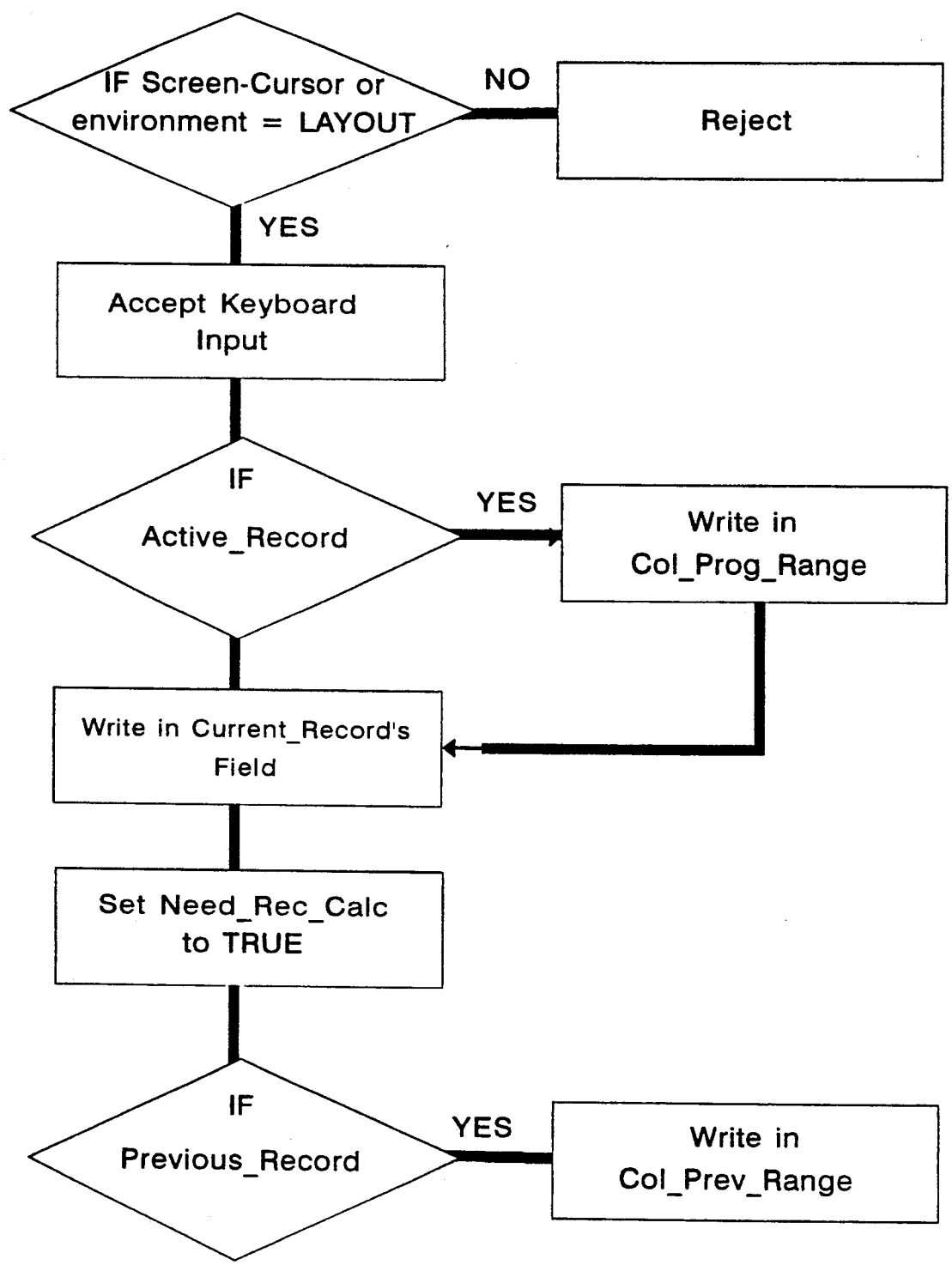
FIG. 30 shows a flowchart of procedure Field‒Input. This procedure accepts user-activated data input into selected spreadsheet cells and selected fields in the active case‒db file. The following steps are executed: If operating in the APPLICATION environment (that is, environment <> LAYOUT) and there is no screen cursor, then field‒input is rejected. Else, keyboard input is accepted and written in the col‒prog range if the current‒record is also the active record. Then, keyboard input is written in the current‒record's field. Set Need‒Rec‒Calc is set to TRUE for current‒record. Finally, if the current‒record is also the previous‒record, keyboard input is also written in the previous record.

See Appendix A, parts 1 and 14, and also see FIG. 30.

Referring to FIG. 30, this procedure may be abbreviated as follows: If operating in the APPLICATION environment (that is, environment < > LAYOUT) and there is no screen cursor, then field_input is rejected. Else, keyboard input is accepted and written in the col_prog range if the current_record is also the active record. Then, keyboard input is written in the current_record's field. Set Need_Rec_Calc is set to TRUE for current_record. Finally, if the current_record is also the previous_record, keyboard input is also written in the previous record.

The screen cursor is visible only when it is on any col_prog data cell or database data field on the screen. When the user presses a cursor key, the video cursor moves to the next data cell or data field located in the direction indicated by the key. If the screen does not display any data cells or data fields, the video cursor is not visible.

A more detailed description of Procedure Process_Formula_Edit is presented in the following paragraphs.

To modify the information of any case_db record field, the user places the cursor on the required field and writes the value or text desired.

While operating in the col-prog environment, a field input operation begins when the user presses any key of a set of keys defined previously. See Appendix A, part 1, procedure Main, statement "if (Keypress in ANY_INPUT_KEY) then Field_Input". ANY_INPUT_KEY represents a set of keys that are validated to begin field input. In the preferred embodiment implementation, if the first character is a number or any of the signs "( )+ −," the field will be stored in a floating point number format. Otherwise, the field will be stored as a text field.

The layout environment allows the modification of all fields in every record and all cells in the col_prog range. In the application environment, there are several limitations:
1) only data fields can be modified, and
2) the records that contain them cannot have mark_record flags set to PR (protected).

In a financial model, for example, all historical financial information should not be modifiable. The associated records have mark_record flags set to PR, to prevent the program from loading them into the col_prog range. Also, the screen does not display any data fields belonging to these records.

Finally, in all situations, any input operation in a case_db record field will set the need_rec_calc to TRUE.

Logical chain of procedural statements

The program executes, in the following order, the essential ideas just described for field input (see Appendix A, part 14-procedure Field_Input):
1. Determine if the screen cursor is visible in the current record. If not, then end procedure field_input. Otherwise, continue.
2. Clear the input buffer. Accept keyboard input at the input buffer.
3. If the current record is the same as the active record, then write keyboard input only in the corresponding col_prog cell.
4. If the current record is not the active record nor the previous record, then write keyboard input in the current record's corresponding field. Then set need_rec_calc to TRUE for current record.
5. If the current record is the previous record, then write in the col_prev range.

EXECUTION OF PARENT AND SCRATCH ENVIRONMENTS

Procedures Main, Execute_Parent_Environment and Execute_Scratch_Environment

Figure 31:
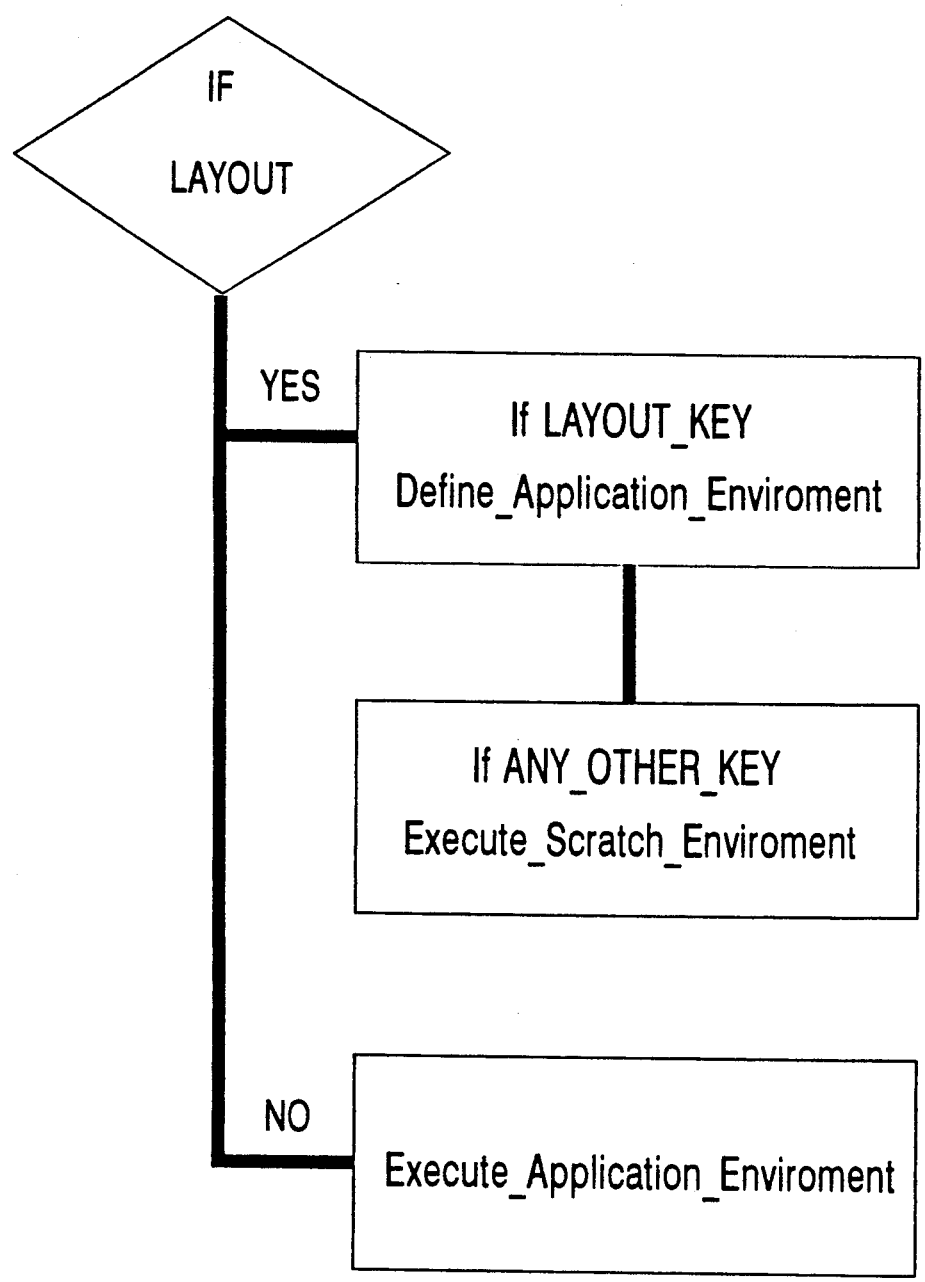
FIG. 31 shows a flowchart of procedure Execute‒Parent‒Environment. This procedure executes user-activated commands in the parent environment.

See Appendix A, parts 1, 15 and 16, and FIG. 31.

At any given time, the active environment in the gen_prog section is the environment that controls the operation of the gen_prog section. The user selects the active environment through the use of a special key, called the environment key. As explained before, only the layout and the application environments can be the active environment in the gen_prog section.

When the user operates in the scratch environment, or in the layout or application environment in the gen_prog section, the active environment controls the operation of the invention. Yet, when the user operates in the col_prog environment, there are several special considerations.

The col_prog environment inherits from the active environment in the gen_prog section the commands that do not conflict with its proprietary commands. As mentioned previously, this is why the layout and the application environments may be called parent environments.

In the col_prog environment, if the user presses a key that is not defined in its proprietary commands, the program checks the command set of the parent environment. See Appendix A, part 1, procedure Main, statement "if (Keypress in ANY_OTHER_KEY) then Execute_Parent_Environment". Statements in procedure Main show all proprietary commands of the col_prog environment.

The scratch environment is a spreadsheet environment, while the layout environment is an enhanced spreadsheet environment. Consequently, the layout environment matches the scratch environment in the commands that do not conflict with its proprietary commands. See Appendix A, parts 15 and 16, procedures Execute_Parent_Environment and Execute_Scratch_Environment.

NON-ESSENTIAL OPERATIONS

There are several operations that are not necessary for the operation of this invention. Some of them are described in the following paragraphs. These operations are not shown in the pseudocode algorithm of Appendix A.

Simultaneous video operation of assigned case_db files

In the preferred embodiment implementation, records from all assigned case_db files may be displayed simultaneously on the col_prog window video screen. To execute this operation, the sim_video operation, the user issues an explicit command by pressing the sim_video key (Alt-F6).

The sim_video operation displays records from assigned case_db files in the order indicated by a selected field, the index field. The computer screen only displays as many records as fit according to its dimensions.

The index fields of several records may have the same value. If this happens, the sim_video operation displays these records in the order in which their case_db files were assigned to the col_prog window.

While executing an application for the special case of a financial model, the sim_video operation would follow these steps:
Each case_db file contains one set of financial forecasts for the firm.
Several case_db files are created, to represent several possible scenarios for the future of the firm.
Each case_db record represents the financial information for a particular point in time.
Consecutive records correspond to consecutive periods.
The date field is the index field in a case_db record needed for the sim_video operation.
Therefore, the sim_video operation displays all records with the same date simultaneously and side-to-side. The record that appears left-most belongs to the scenario that was assigned first to the col_prog window.

Operational Codes

Database files being used by the invention may contain special operational codes. These codes can control the operation of specific database fields or spreadsheet cells. In financial applications developed using the invention, each case_db record may represent financial results for a particular period. Each field in a case_db record may represent a financial concept such as sales or cash flow level. Here, operational codes can be used to allow the results of a financial application to be calculated and expressed in different currencies, as required by the user. These operations do not change formulas in the spreadsheet environment. A particular operational code may identify the currency used as the field's unit of measure, while another may identify the exchange rate. Specific instructions associated with op_codes execute all exchange currency conversions.

Uses and applications of operational codes are not limited to the example presented above. Operational codes expand the power and flexibility of the invention's programmability for all kinds of applications.

Multi-record Database Operations

In the preferred embodiment implementation, some formulas in the col_prog range may access data from different records in the same database file. These formulas are expressed in terms of special database read and write functions. Some examples are:
@DB_SUM, a read function that calculates the sum of a several record fields' contents
@DB_GROW, a write function that calculates an increase over a sequence of record fields' contents, according to a constant growth rate (used in time-based applications)
@DB_SPREAD, a write function that distributes an original amount over a sequence of record fields (where each record corresponds to a single time period).

Relational Databases

The invention can be extended to operate with relational databases. This concept adds powerful advantages to the invention. This is proven by the growth of the relational database application market.

The description in this document considers the definition of only one col_prog window. Yet, the preferred embodiment implementation can define and activate several col_prog windows simultaneously in a single spreadsheet application. The col_prog range in each col_prog window accesses its corresponding active case_db file.

Through these operations, and through the coordination of a central program, the col_prog windows and the case_db files can compose a relational database system. (See FIG. 14.) The user develops this program in the layout environment of the gen_prog section. Thus, in this invention, the user can access relational database components, view them on a single screen and operate on their contents with spreadsheet flexibility.

Development of the Application Environment

As already described, the layout environment is an enhanced spreadsheet environment. The programmer may use a special command set, called the layout command, to define the tools available to the user for the operation of the application environment. Thus, the application environment comprises the tools that have been defined in the layout environment. In the preferred embodiment implementation, these are the only tools and operations available to the user in the application environment.

In the preferred embodiment implementation, the layout command can define the following tools of the application environment:
Application screens: The programmer defines all screens by associating them to a spreadsheet range. To identify a screen that must operate in the col_prog environment, a range that is a strict subset of a col_prog range must be selected.
Menus: The programmer defines menus by filling the blanks in a special list of options in the layout environment. All menu options call other menus or application screens (identified by their corresponding cell ranges).
Programming: Routines from a procedural programming language can be linked to application screens.
Context-sensitive Help Screens: The programmer uses a text editor in the layout environment to develop help text.
Data input validation: Data input validation conditions are associated with defined data cells in the gen_prog section. These conditions include range and type checking of data input.

Turing Machine Emulation (Automata Theory)

The invention can operate as the software equivalent of a hardware parallel processor for several Turing machines. Additionally, some tools of the invention can make it operate more efficiently than parallel Turing machines. Since any computation or recognition problem for which there is a known informal algorithm can be handled by a Turing machine, therefore, the invention can handle and solve all sorts of programming problems.

In the invention, each field in a case_db record may contain data, text, or formulas. If a particular field contains formulas in spreadsheet format, each read operation will load these formulas in the col_prog range. The spreadsheet calc operation will produce the expected results, given the formulas' syntax.

For the invention to emulate a set of Turing machines, a minimum of two col_prog windows may operate simultaneously, and at least one of them must read and write formulas in its active case_db file. This is the software equivalent of a hardware parallel processor for a number of Turing machines. Each col_prog range's cell corresponds to a single processor in the parallel system's hardware. All data and results may be processed in a case_db file and col_prog window different from that which is used to process formulas.

There is considerable evidence that the partial functions computed by languages, which are recognized by Turing machines, are exactly those recognized by informal effective procedures or algorithms. Thus, as mentioned previously, any computation or recognition problem for which there is a known informal algorithm can be handled by a Turing machine.

The problem of efficiency associated to Turing machines can also be solved with this invention. (This problem refers to the conclusion that some Turing machine computations may require an inordinately large measure of tape.)

The order in which the case_db records are read may be controlled by a procedural language. Also, it is possible to organize case_db records by filtering, indexing, and sorting them according to their associated indexes. In any of these ways, it is possible to control a three-level algorithm, described as follows:
1) first level, procedural language;
2) second level, formulas in the case_db records; and
3) third level, formulas in the spreadsheet storage area.

This produces an efficient instrument for the development and operation of any computation or recognition problem.

Ramifications and Scope of Invention

While the previous description contains many specificities, these should not be construed as limitations on the scope of the invention, but rather as an exemplification of one preferred implementation thereof. The following paragraphs explain many other alternative schemes for special structures that relate to the operation of the col_prog window and col_prog environment with the active case_db files. Alternative implementation schemes are described for each of the structures, identified 'A' to 'D'.

A. The col—prog range cells may be organized in two different ways:
  a) Each col—prog range may consist of a single column of spreadsheet cells. This interpretation corresponds to the best mode implementation.
  b) Each col—prog range may be an ordered set of disjoint spreadsheet cells.

B. The relationship between the spreadsheet's col—prog range and the database files may operate as follows:
  a) Each read and write operation, to and from the col—prog range, is performed on one database record at a time.

This is the best mode implementation, which is adequate for applications with a large number of records, each with few fields. An example is an inventory analysis program, where each record represents a single product. The fields contain past sales volume information, price, inventories, etc. This implementation is appropriate for any scenario that requires efficient reading and writing to one database record.
  b) The spreadsheet interacts with all records of a database file at a time, by accessing the same field in each record. Each read and write operation to and from the col—prog range is performed on only one field in every record.

This is suitable for applications with very few records, each with many fields. An example is a financial model of a firm, with many accounts (fields in a record), and few periods (records) to be simulated and/or stored as history.
C. Information may be transferred back and forth through the link between spreadsheet and the database as follows:
  a) One database record at a time; this is the best mode implementation as described.
  b) A subset of database file records is substituted into a spreadsheet range. Spreadsheet operations are executed one column on one record at a time. This is the idea behind some spreadsheet database tools, which execute all query operations in the spreadsheet storage area.
  c) Information is transferred back and forth between the database files and the col—prog range, through an intermediate storage area. An example is the use of main memory as buffer memory for communication. This implementation may accelerate the performance of slow computer disk drives.
D. Particular implementations may have the following requirements:
  a) Independent database records.
  b) Each database record contains the information corresponding to a single time period.

This is the case of most financial models: the results corresponding to each period depend on the values of the previous period. These applications involve an additional set of spreadsheet cells, called col—prev range. A col—prev range is associated with each col—prog range. A col—prev range contains data from the period previous to the col—prog range period.
E. A separate storage area and a separate environment area may be created to store and operate elements similar to those defined in the col—prog window. Also, they may be used to implement operations similar to those described for the col—prog environment.

Said separate environment contains commands and operations for the access and operation of information in the case—db files and said separate information storage area. Said separate environment can integrate the operation of data stored in the gen—prog section with data stored in said separate storage area by the use of formulas, in a similar manner to formulas used in a spreadsheet environment.

However, said separate environment does not inherit all the characteristics and basic commands from the parent environment (layout or application environment), since there is not a parent environment to inherit from, nor is the data structure compatible with that operated by the layout or application environments.

Accordingly, the scope of the invention should be determined by the appended claims and their legal equivalents.

APPENDICES

~~Appendix A - Glossary of Terms used in the Document~~

~~Appendix B - Glossary of Descriptors used in the Algorithm~~

Appendix ~~C~~ A - Pseudocode Summarizing Source Code of Appendix D

Appendix ~~D~~ B - Source Code in C++ Language For Best Mode of Practicing the Invention

~~APPENDIX A~~
GLOSSARY OF TERMS USED IN THE PATENT APPLICATION

<u>Active col_prog window</u> - An active col_prog window allows the simultaneous access and operation of information of the active case_db file and the col_prog and col_prev ranges contained in its definition. To do this it activates the col_prog environment.

<u>Active record</u> - One record of the active database file, whose information is being held in the col_prog range.

<u>Active case_db files</u> - Case_db file whose information is being accessed by the active col_prog window.

<u>Active environment</u> - The environment that controls the operation of the gen_prog section. This term is used only when executing in the gen_prog section.

<u>Ans file</u> - The main spreadsheet file, identified by the suffix ANS, for "analysis-spreadsheet-file". All texts, numbers or formulas defined in outcome cells that are also permanent cells are stored in this file.

Application environment - An environment for the operation of the gen_prog section, whose set of tools and commands are defined in the layout environment. Also see: gen_prog section, layout environment.

Assigned case_db files - Case_db files that have been assigned while defining a col_prog window. Only an assign case_db file can be activated. Special identifiers select any assigned case_db file to be activated.

Calc - Another name for *simple recalculation*; see.

Calc key - A user-activated key that immediately issues the execution of a simple recalculation.

Cap file - A separate spreadsheet file, identified by the suffix CAP, for "hat file". All texts, numbers or formulas defined in data cells that are also permanent cells are stored in this file.

Case_assign key - User-activated key that immediately issues the execution of the case_assign command. Also see case_assign command.

Case_assign command - Command that enables the user to assign case_db files to a particular col_prog window. Also see *case_assign key*.

Case_db files - Regular database files in the db_sa that contain the data for each record to be operated in the invention. Also see db_sa.

Case_db records - Individual records of case_db files. Also see case_db files.

Chained-dependent records - Database records mostly used for time-based applications, that compose a chained structure with dependency relationships. Also see time-based application.

Change case key - User-activated key that changes the active case_db file. It does this by activating the assigned case_db file whose identifier immediately succeeds the identifier of the previous active case_db file.

_Col prev range_ - A range of cells created only for time-based applications. The col_prev range contains the information of the record located immediately before the active record in the active case_db file. Also see previous record.

_Col prog range_ - A range of cells that holds the information of one record of the active database, called the active record.

_Col prog window_ - A set of definitions related to the operation of the data in the gen_prog section and the case_db files.

_Col prog environment_ - A special environment within the layout or application environments in the gen_prog section. The col_prog environment controls and coordinates the spreadsheet video operations with the operations that display the data from an associated database file.

_Column cursor_ - A visual element on the screen display that signals the current case_db record. The column cursor is active only if no data cells or fields are displayed in the screen.

_Data cells_ - Cells dedicated to accept data input from the user in the application environment. Data input can be texts, numbers or formulas. Data cells may be permanent or temporary cells. The contents of data cells that are also permanent cells are stored in a separate spreadsheet file (cap file). Also see *cap file, permanent cells, temporary cells, data fields.*

_Data field_ - A record field that would be placed in a data cell, if the record that contains it were loaded into the col_prog range.

_Database file storage area_ - Computer storage area that contains information in regular database files. It is also called *db_sa*.

_DB_ - One of three possible status for the mark_record flag. This status, called 'database', allows a record to be modified but not loaded into the col_prog range.

_Db_sa_ - See database file storage area.

_Desc db files_ - Description files that contain textual descriptions of the case_db records contents. These files also contain other information to control the mode of operation of the case_db files when they are loaded into the col_prog window.

_Desc db records_ - The individual records of the desc_db file.

_Desc db file_ - A database file each of whose records holds the names, descriptions and operational codes of each field in a case_db record.

_Descriptions database file_ - Another name for *desc_db file*; see.

_Dynamic links_ - Storage elements that contain the actual value of the identifiers of the active case_db records that are being accessed by the spread_sa. They coordinate the operation of the case_db files and the col_prog window.

_Environment key_ - User activated key for the selection of the active environment in the gen_prog section. This key switches control of program's execution between the layout and application environments.

_Full recalculation_ - A compounded calculation procedure that applies only to time-based applications.

_Full recalc key_ - A user-activated key that immediately issues the execution of a full recalculation. Also see *full recalculation*.

_Gen prog section_ - A principal section of the spreadsheet storage area (spread_sa). The general programmable section is a set of spreadsheet cells that can be operated through any of two environments, the Layout environment and the Application Environment. Also see *spread_sa, layout environment, application environment*.

_General programmable section_ - Another name for gen_prog section; see.

_Index field_ - The field that is used to sort all records for the sim_video operation. Also see *sim_video operation*.

_Layout command_ - Command set in the layout environment, through which are defined the tools available to the user for the operation of the application environment. Also see *application environment, layout environment*.

Layout environment - An enhanced spreadsheet environment that may be used for the development of an application by using a special set of commands. It accesses information stored in the gen_prog section. The layout environment may also be used for the definition of a col_prog window. Also see *gen_prog section, application environment*.

Mark record key - A user-activated key that controls a state variable (flag) associated to each record in a case_db file. It allows a user to control whether or not particular database records can be loaded into the col_prog range. Also see *mark_record flag*.

Mark record flag - A state variable that controls whether or not a database record can be loaded into the col_prog range.

Mark row key - A user-activated key that controls a state variable (flag) associated to each col_prog range cell. By means of the mark_row key, a user may control the operation of the mark_row options. Also see *mark_row options*, mark_row flag.

Mark row flag - A state variable that controls the operation of the mark_row options, which are used for the definition of graphics and printing reports. This state variable is set by the user by means of the *mark_row key*. Also see mark_row options, *mark_row key*.

Mark row options - Options that allow the user to define data involved in graphics and printout reports, by setting ON the mark_row flags of those data elements. Also see mark_row flag, *mark_row key*.

Need rec calc flag - State variable defined for each case_db record. A need_rec_calc flag is set to TRUE when at least one field in the corresponding record is modified by the user. A need_rec_calc flag is set to FALSE when the contents of that record are loaded into the col_prog range, calculated, and written back to the same database record.

Null op_codes - Valid op_codes that do not execute an operation. Also see *op_codes, operational codes.*

Op codes - Another name for *operational codes*; see.

Operational codes - Particular operational information stored in one or more desc_db record fields, which indicate how the information contained in each case_db record field should be processed. Operational codes allow the development of special data handling routines.

Outcome field - A record field that would be placed in an outcome cell if the record that contains it were loaded into the col_prog range.

Outcome cells - Cells dedicated to the design of the application in the gen_prog section. Formulas in these cells must be defined by the programmer in the layout environment. These cells' contents cannot be modified by the user when working in the layout environment, and are stored in the main spreadsheet file (ans file). All outcome cells must be permanent cells. Also see *ans file, outcome fields, layout environment, permanent cells.*

Permanent cells - Cells in the gen_prog section that are never modified when a database record is loaded into the col_prog range, because the record fields that would be placed in the col_prog range permanent cells are not loaded.

PR - One of three possible status for the mark_record flag. This status, called 'protected', does not allow the record to be modified or loaded into the col_prog range. When a record is in the PR status, only the scrolling of the screen is active and all record fields are not modifiable.

Previous record - The record located immediately before the active record in the active case_db file. In the case of time-based applications, this record's information is loaded into the col_prev range.

Procedure calc - Another name for *simple recalculation*; see.

Procedure full_recalc - Another name for *full recalculation*; see.

Programmer - A user that operates in the layout environment, with the specific purpose of developing formulas for an application.

Recalculation - Another name for *simple recalculation*; see.

Record-chained application - See *time-based application*.

Scratch section - A principal section of the entire program storage area. The scratchpad -non-programmable- section is a standard spreadsheet where the user may do scratchpad operations.

Scratch environment - While operating in the scratch section, this is the environment that holds control of program execution.

Screen cursor - A visual element on the screen display that signals the position where the next data input operation will be executed. The screen cursor is only visible if there is at least one col_prog data cell or database data field visually represented in the screen.

Section key - While working in the spread_sa, this key changes the section where the user is operating to the alternative section.

Sim_video key - User-activated key that immediately issues the execution of the sim_video operation. Also see sim_video operation.

Sim_video operation - Operation that displays records from all assigned case_db files simultaneously on the col_prog window video screen.

Simple calc - See simple recalculation.

Simple recalculation - User-activated procedure that performs two functions, (a) a write operation to the database of the updated active record, if permitted by the current record's mark_record flag, and (b) a spreadsheet recalc.

SP - One of three possible status for the mark_record flag. This status, called 'spreadsheet', allows a record to be loaded and into the col_prog range and to be modified.

Spread_sa - See spreadsheet storage area.

*Spreadsheet environment* - Set of commands and associated video operation of prior-art spreadsheet programs.

*Spreadsheet recalc* - Procedure that evaluates all formulas defined in the spreadsheet cells, as in the most popular spreadsheet programs currently in the market, such as the LOTUS 1-2-3™ release 2.01 spreadsheet program.

*Spreadsheet storage area* - Contains information with the same data structures as an ordinary spreadsheet program. It is also called *spread_sa*.

*Status line* - A particular screen row that is used to show the current state of several indicators of the working environment's condition.

*Temporary cells* - Cells in the col_prog range that are modified when a database record is loaded into said col_prog range, because only they accept the information contained in the corresponding record fields.

*Time-based application* - An application whose data is contained in ordered records, each of which depends on the previous one.

*User* - Any person who uses the invention in the layout or application environments.

*Video system storage area* - Computer storage area that contains the information that is displayed in the computer's video screen. It is also called *video_sa*. (The invention's entire program storage area is divided into three storage areas: *video_sa*, *db_sa* and *spread_sa*.)

*Video_sa* - See video system storage area.

*Window key* - Special key that activates or deactivates the col_prog window (i.e., the col_prog environment). If more than one col_prog window has been defined, this key lets the user select between any col_prog window or the parent environment.

GLOSSARY OF DESCRIPTORS USED IN THE ALGORITHM

The following list contains only non-obvious descriptors used in the algorithm. These descriptors include procedures, functions and variable names. For any missing terms, see the previous glossary section.

Active Case Dbf - Case_db file that has been *selected* among all assigned cases to operate with the col_prog window.

Active Record - Variable holding the contents of active record; see definition in Glossary of Terms (section 'C').

Any Other Key - User-activated key that executes a field input operation. See procedure field_input.

Assigned Case Dbf[i] - Array of names identifying case_db files that have been assigned to the col_prog window. *Assigning* case_db files to the col_prog window is equivalent to *opening* database files in a relational database instrument.

Calc - Procedure to execute a simple recalculation operation, see the algorithm.

Calc Key - User-activated key to execute a simple recalc (F9). See procedure calc.

Cell[Id_Cell] - Contents of col_prog_range cell identified by id_cell.

Change Case - Procedure to change the active case_db file, see algorithm for this process.

Change Case Key - User-activated key to change the active case_db file (F6). See procedure change_case.

Col Prev Range - Variable holding the contents of col_prev range; see definition in Glossary of Terms (section 'C').

Col Prog Range - Variable holding the contents of col_prog range; see definition in Glossary of Terms (section 'C').

Column Cursor - Variable containing the position and state of the screen cursor in the visible screen display.

Current Cell - The col_prog_range cell where the screen cursor is positioned, or the col_prog_range cell corresponding to the field where the screen cursor is positioned. See procedure process_formula_edit.

Current Record - Variable holding the contents of current record; see definition in Glossary of Terms (section 'C').

Data Cell Exist - Logical variable state flag; data_cell_exist is true only if a data cell is shown in the video screen. See algorithm for procedure process_video.

Data Cell[Id Cell] - Variable logical array; the col_prog_range cell identified by id_cell is a data cell only if data_cell[id_cell] is TRUE.

Data Field Exist - Logical variable state flag; data_cell_exist is true only if a data field is shown in the video screen. See algorithm for procedure process_video.

Data Field[Id Field] - Variable logical array; the case_dbf field identified by id_field is a data field only if data_cell[id_cell] is TRUE.

F Column Cursor - Function to determine the position and state of the column cursor depending on its previous state and the last key pressed by the user. See procedure process_video.

F Screen Cursor - Function to determine the position and state of the screen cursor depending on its previous state and the last key pressed by the user. See procedure process_video.

F Video Window - Function to determine the contents of the video screen display depending on its previous state and the last key pressed by the user. See procedure process_video.

Field[Id Field,Id Rec] - Contents of field identified by id_field in the case_db record identified by id_rec.

First Cell(Video Window) - The first col_prog_range cell visible in the video display. See procedure process_video.

First Field(Video Window) - The first field in all records of
active case_db file visible in the video display. See procedure
process_video.

First Rec(Video Window) - The first record in the video display,
when all records are sorted according to the 'index' field. The
'index' field is used to determine the order in which records should
be displayed. See procedure process_video.

First Record - First record in active case_db file. See procedure
full_recalc.

Formula Edit Key - User-activated key to execute a formula edit
operation (F2). See procedure Process_formula_edit Full Recalc - Procedure to execute a full recalc operation. See the
algorithm for this process.

Full Recalc Key - User-activated key to execute a full recalc (Alt-
F9). See procedure full_recalc.

Id(element) - Function to determine the identifier of 'element',
where 'element' may be a case_db record, a field in a case_db
record, or a col_prog_range cell. Identifiers are the only means to
find a specific record, field or cell without interpreting its
contents. For example, identifiers are the only means to determine
which records are the active, current and previous records.

Id Cell, Id Field, Id Rec, Id0 Active, Id0 Current - Temporary
integer variables.

Keypress - Last key pressed by the user. See the algorithm for
function keypress.

Last Cell(Video Window) - The last col_prog_range cell visible in
the video display. See procedure process_video.

Last Field(Video Window) -The last field in each of all the
records of the active case_db file visible in the video display. See
procedure process_video.

Last Rec(Video Window) -The last record in the video display,
when all records are sorted according to the 'index' field. The 'index' field is used to determine the order in which records should be displayed. See procedure process_video.

20 Last Record - Last record in active case_db file. See procedure full_recalc.

Mark Formula[Id Cell] -Variable array; if mark_formula[id_cell] is equal to ANS, then the formula at col_prog_range cell id_cell will be saved in the ans_file; if mark_formula[id_cell] is equal to CAP,
25 then the formula at col_prog_range cell id_cell will be saved in the cap_file. See procedure process_formula_edit.

Mark Record Key - User-activated key to mark a record as protected, spreadsheet or database (F5). See procedure process_mark_record.

Mark Record[Id Rec] - Variable array containing the
5 mark_record_flag for each case_db record identified by id_rec.

Option Original - Logical variable; if TRUE then, after a full recalc, the screen cursor and active record immediately go back to their original states before execution of full recalc; if FALSE then screen cursor and active record.

10 Previous Record - Variable holding the contents of previous record; see definition in Glossary of Terms (section 'C').

Process Formula Edit - Procedure to accept a formula edit operation in the col_prog range. See algorithm for this process.

Process Mark Record - Procedure to mark a record as protected,
15 spreadsheet or database. See algorithm for this process.

Process Video - Procedure to operate and modify the video after any cursor key is pressed. See algorithm for this process.

Record[Id Rec] - Contents of case_db record identified by id_rec.

Screen Cursor - Variable containing the position and state of the
20 screen cursor in the visible screen display.

Screen Cursor Exist - Logical variable state flag; data_cell_exist is true only if a data cell is shown in the video screen. See algorithm for procedure process_video.

Show Browse View(Id Rec) -Function to display the browse view element corresponding to the record identified by id_rec. See procedure process_video.

Show Col Prog Range - Procedure to display the col_prog range coordinated with a browse view of active case_db records. See procedure process_video.

Show Data Cell(Id Cell) - Function to show the visual display identifier for data cell identified by id_cell. (In the best mode implementation, the visual display identifier is a different color for data cells.)

Show Data Field(Id Field,Id Rec) - Function to show the visual display identifier for a data field identified by id_field in the case_db record identified by id_rec. (In the best mode implementation, the visual display identifier is a different color for data fields.)

Spreadsheet Calc - Ordinary spreadsheet recalc operation.

Video Control Key - Any cursor key that affects the state of the video screen, including PgUp, PgDn. See procedure process_video.

Video Window - Variable array storing the full contents of the current visible screen display. See algorithm for procedure process_video.

APPENDIX A - Pseudocode

"Copyright (c) 1990 Carlos Armando Amado All Rights Reserved".

procedure Main: begin        { PART 1. Algorithm demonstrating the operation of the invention, in the scratch, layout and applications environments and col_prog environment. }

```
function Id(Element):  begin
                           {Definition for this function. }
       Identify_Id         { determine the identifier of
                           'element', where 'element' may be a
                           Case_Db record, a field in a
                           Case_Db record, or a
                           Col_Prog_Range cell }
   end                     { function Id };

Initiate;               { See part 2 of this figure. } while not Keypress := QUIT_KEY begin

Keypress := readkey;   { Key pressed by user } if ( Keypress = SECTION_KEY ) then Select_Section
                           { Action for F8 key. Section may be
                           SCRATCH or GEN_PROG. See part 5
                           of this figure. }
       else if ( section = GEN_PROG ) then
           begin
               if ( Keypress = ENVIRONMENT_KEY ) then
               Select_Environment
                           { Action for F7 key. If section <>
                           GEN_PROG then section = SCRATCH;
                           in this case, do nothing. In
                           GEN_PROG, environment may be
                           LAYOUT or APPLICATION. See part 6
                           of this figure. }
```

```
else if ( Keypress = WINDOW_KEY ) then
    Select_Window
                    { Action for Alt-F7 key.  Window
                    may be TRUE or FALSE.  Window =
                    TRUE means Col_Prog Window.  See
                    part 7 of this figure. }
else if Window then
                    { Window = TRUE means we are in
                    Col_Prog Environment. } case ( Keypress )
                    { This case statement represents
                    the col_prog environment's
                    operation }
        VIDEO_CONTROL_KEY: Process_Video;
                    { Action for any cursor key that
                    affects the appearance of the video
                    screen, called here
                    "Video_Control_Key".  See part 8 of
                    this figure. }
        FORMULA_EDIT_KEY Process_Formula_Edit;
                    { Action for F2 key.  See part 9 of this
                    figure. }
        MARK_RECORD_KEY: Process_Mark_Record;
                    { Action for F5 key.  See part 10 of
                    this figure. }
        CALC_KEY: Calc;
                    { Action for F9 key.  See part 11 of
                    this figure. }
        FULL_RECALC_KEY: Full_Recalc;
                    { Action for Alt_F9 key.  See part
                    12 of this figure. }
```

```
                    CHANGE_CASE_KEY: Change_Case;
10                          { Action for F6 key.  See part 13 of
                            this figure. }
                    ANY_INPUT_KEY: Field_Input;
                            { See part 14 of this figure.
                            ANY_INPUT_KEY is a set containing
15                          all keys validated to initiate
                            Field_Input. }
                else Execute_Parent_Environment
                            { See part 15 of this figure.  This
                            statement shows how the Col_Prog
20                          Environment inherits all tools (that
                            don't conflict with proprietary
                            commands) from the parent
                            environment.  Previous statements
                            showed all proprietary commands of
25                          the Col_Prog Environment. }
                end             { case for col_prog environment
                                } else Execute_Parent_Environment
                        { When not working in the Col_Prog
                        Environment.  See part 15 of this
                        figure. }
5       end
        else Execute_Scratch_Environment
                        { Section = SCRATCH.  See part 16
                        of this figure. }

10  end                 { while }
    Close_And_Quit      { Procedure Close_And_Quit
                        saves and closes files and then
                        quits program. }
```

15  end                            { procedure Main }.

procedure Initiate: begin       { PART 2 - The following
20                                        statements represent the necessary
                                          sequence of operations and
                                          commands issued by the user to
                                          demonstrate the concepts of the
                                          invention relevant to the patent
25                                        application }

Init_Section(GEN_PROG);     { Function: options are
                                          GEN_PROG or SCRATCH. This
                                          statement represents a
                                          particular case of user
                                          interaction, where the user
                                          selects the gen_prog section. }

5          Init_Environment(LAYOUT);   { Function: options are LAYOUT
                                          or APPLICATION. The user
                                          selects the layout environment.
                                          }

Create_Dbf;                 { Optional user interaction: create
10                                        Case_Db and Desc_Db files. This
                                          operation is optional, since these
                                          files may be created outside of the
                                          invention. }

15          Define_Col_Prog_Window;     { The user creates a definition
                                          for a col_prog window. See part
                                          3 of this figure. }

20          Define_Data_Cells;           { The user defines data cells in the
                                           gen_prog section. }

Define_Permanent_Cells;      { The user defines permanent
                                           cells in the col_prog range. }

Define_Formulas;             { The user defines formulas the
                                           gen_prog section -including the
25                                         col_prog range-. } end                               { procedure Initiate }.

<u>procedure Define_Col_Prog_Window</u>: begin
                                         { <u>PART 3</u>. User definition of a
5                                          col_prog window. }

Identify_Col_Prog_Window;    { The user gives a name to
                                           this col_prog window. }

10          Define_Col_Prog_Range;       { The user defines a col_prog
                                           range. }

Time_Based := TRUE;          { Time_Based may be TRUE or
                                           FALSE. Here, the user configures
                                           the program as time_based. }

15     If (Time_Based) then Define_Col_Prev_Range;
                                         { The user defines the col_prev
                                           range. }

Assign_Case_Dbf;             { The user assigns Case_Db files
                                           to Col_Prog window. See part 4
20                                         of this figure. }

User_select_Id_File;
       Active_Case_Dbf := Assigned_Case_Dbf[Id_File];
                                         { Activate assigned Case_Db file
                                           according to Id_File selected by the

```
                        Define_Id(Active_Record)    { The user defines the identifier
                                                     of the initial active record for
                                                     the operation of the active
                                                     case_db file. } end                                       { procedure
                                                     Define_Col_Prog_Window }.

procedure Assign Case Dbf: begin
                                                    { PART 4. The user assigns Case_Db
                                                     files to the Col_Prog window. }

N_Case := 0;
15           repeat
                 begin
                     Assigned_Case_Dbf[N_case] := File_Name;
                     N_Case := (N_Case + 1) mod (Max_N_Case + 1)
                 end
20           until File_Name = "
                                                    { File_Name, provided by the user,
                                                     becomes assigned case number "i";
                                                     several Case_Db files may be
                                                     assigned to Col_Prog window }
25       end                                        { procedure Assign_Case_Dbf }.
```

{ user. The user may change later the active Case_Db file by means of the Change_Case_Key. See part 13 of this figure. } procedure Select_Section: begin   { PART 5.  Switch between
                                   scratch and gen_prog sections. }

5              if section = SCRATCH     then section := GEN_PROG
                                        else section := SCRATCH
                                        { Section can only be GEN_PROG or
                                          SCRATCH } end                      { procedure Select_Section }.

procedure Select_Environment: begin
                                        { PART 6.  Select the active
15                                        environment in the Gen_Prog
                                          section. } if environment = LAYOUT  then environment := APPLICATION
                                        else environment := LAYOUT
20                                      { In the Gen_Prog section,
                                          environment can only be LAYOUT or
                                          APPLICATION. } end                      { procedure Select_Environment
25 }.

procedure Select_Window: begin  { PART 7.  Procedure to activate
                                            or deactivate a Col_Prog
                                            window. }

5      if window = TRUE         then window := FALSE
                                else window := TRUE
                                { In this example, with only one col_prog_window, window can only be TRUE or FALSE. } end             { procedure Select_Window }.

15 procedure Process_Video: begin    { PART 8. Procedure to operate and modify the video after any cursor key is pressed. }

Data_Cell_Exist := FALSE;
20 Data_Field_Exist := FALSE;
   Screen_Cursor_Exist := FALSE;
                     { initialize by clearing flags }

Video_Window := F_Video_Window(Video_Window,Keypress);
25 Screen_Cursor := F_Screen_Cursor(Screen_Cursor,Keypress);
   Column_Cursor := F_Column_Cursor(Column_Cursor,Keypress);
                     { determine positions of video window, screen and column cursors, as of their previous conditions and the key pressed } for Id_Rec = Id(First_Rec(Video_Window)) to
5  Id(Last_Rec(Video_Window))
       do if (Id_Rec <> Id(Active_Record)) then
       Show_Browse_View(Id_Rec);
   for (Id_Rec = Id(Active_Record)) do Show_Col_Prog_Range;
                     { all records are shown in browse
10                   view, except for active record, in
                     whose place the col_prog_range is
                     shown }

```
              for Id_Cell = Id(First_Cell(Video_Window)) to
              Id(Last_Cell(Video_Window))
                  do    if Data_Cell[Id_Cell] then
                              begin
                                  Show_Data_Cell(Id_Cell);
                                  Data_Cell_Exist := TRUE
                              end;
              for Id_Rec = First_Rec(Video_Window) to
              Last_Rec(Video_Window)
                  do if Mark_Record[Id_Rec] <> PR
                      for Id_Field = Id(First_Field(Video_Window)) to
                                                      Id(Last_Field(Video_
                                                                Window))
                          do if Data_Field[Id_Field] then
                              begin
                                  Show_Data_Field(Field,Id_Rec);
                                  Data_Field_Exist := TRUE
                              end;
                                              { detect and show all data cells and
                                                data fields visible in Video_Window
                                              } if (Data_Cell_Exist or Data_Field_Exist) then
                  begin
                      Show(Screen_Cursor);
                      Screen_Cursor_Exist := TRUE
                  end
              else Show(Column_Cursor);
                                              { show cursors as required }

Determine_And_Show_Video_Indicators
                                              { Most important among these are:
                                                Mark_Record flags, Need_Rec_Calc
``` flags, Active_Column indicator, Need_Spreadsheet_Calc flag, available spreadsheet memory, other spreadsheet and database indicators }

5  end    { procedure Process_Video }.

procedure Process Formula Edit: begin
    { PART 9. Procedure to accept a formula edit operation in the col_prog range. }
5    if not Data_Cell[Id(Current_Cell)] then
        { equivalent to: if current cell is an outcome cell }
    if (environment = LAYOUT) then
      begin
10        Current_Cell := Edit_Formula(Current_Cell);
        Mark_Formula[Id(Current_Cell)] := ANS
        { accept edit formula at current cell, and mark cell for ANS file }
      end
15    else    { else: environment = APPLICATION }
      reject    { do not accept edit formula }
    else    { else: current cell is a data cell }
      begin
20        Current_Cell := Edit_Formula(Current_Cell);
      if (environment = LAYOUT) then
        Mark_Formula[Id(Current_Cell)] := ANS
        { accept edit formula at current cell, and mark cell for ANS file; formulas for cells marked for ANS file will be saved in the ANS file } else

Mark_Formula[Id(Current_Cell)] := CAP

{ accept edit formula at current cell, and mark cell for CAP file } end end　　　　　　　　　　　　　　{ procedure Process_Formula_Edit }.

procedure Process_Mark_Record: begin　　　{ PART 10. Procedure to mark a record as protected, spreadsheet or database. } if ( Mark_Record[Id(Current_Record)] = SP ) then
　　　　　Mark_Record[Id(Current_Record)] := DB else if ( Mark_Record[Id(Current_Record)] = DB ) then
　　　　　Mark_Record[Id(Current_Record)] := PR else if ( Mark_Record[Id(Current_Record)] = PR ) then
　　　　　Mark_Record[Id(Current_Record)] := SP { where SP means SPreadsheet, PR means PRotected, DB means DataBase } end　　　　　　　　　　　　　　{ procedure Mark_Record }.

procedure Calc: begin    { PART 11. Procedure to execute a
                           simple recalc operation. } if ( Id(Current_Record) <> Id(Active_Record) and
          Mark_Record[Current_Record] = SP ) then
    begin 10      if Need_Spreadsheet_Calc then
            begin
                Spreadsheet_Calc;
                Need_Spreadsheet_Calc := FALSE
            end;
15                          { if spreadsheet needs a Calc
                              operation, perform it immediately
                              before writing }

Active_Record := Col_Prog_Range;
20                          { Before reading Col_Prog range,
                              write previous to Active_Record.
                              Sends all range cells. }

Need_Rec_Calc[Active_Record] := FALSE;
25                          { Need_Rec_Calc becomes FALSE
                              when the results from the previous
                              calculation is written to
                              Active_Record }

Col_Prog_Range := Current_Record;
        Id(Active_Record) := Id(Current_Record);
                            { Read current record; this does not
5                             destroy those cells which hold
                              formulas in the col_prog range.

```
                                Current record becomes active
                                record, by modifying its identifier
                                or 'Id'. } if Time_Based then
            Col_Prev_Range := Previous_Record
                                { Previous_Record is the record
                                placed immediately before
15                              Active_Record. }
        end;

Spreadsheet_Recalc      { always do a spreadsheet recalc }

20  end                         { procedure Calc }.

procedure Full_Recalc: begin  { PART 12. Procedure to execute a
                                  full recalculation. }
        if Time_Based then        { execute Full_Recalc only if
                                  application is time based }
5       begin Id0_Active := Id(Active_Record);
            Id0_Current := Id(Current_Record);
                                  { remember original active record
10                                and cursor position }

Id(Current_Record) := Id(First_Record);
                                  { begin by positioning cursor at
                                  first record } repeat                { actual Full_Recalc operation }
```

```
            repeat Id(Current_Record) := Id(Current_Record) + 1
            until  ( Mark_Record[Current_Record] = SP  and
                        Need_Rec_Calc[Current_Record] ) or
                        Id(Current_Record) = Id(Last_Record);
            while Mark_Record[Current_Record] = SP  and
                    Id(Current_Record) <> Id(Last_Record)   do
                begin
                    Calc;
                    Id(Current_Record) := Id(Current_Record) + 1
                end
            until Id(Current_Record) = Id(Last_Record);
            Current_Record := Record[Id0_Active];
            Calc;
            Current_Record := Record[Id0_Current]
                            { return cursor and active record to
                                original condition } end
    end                         { procedure Full_Recalc }.

procedure Change_Case: begin { PART 13. Procedure to change the
                                active case_db file. }
    N_Case := N_Case + 1;
    Active_Case_Dbf := Assigned_Case_Dbf[i]
                            { See part 4 of this figure,
                                procedure Assign_Case_Dbf. }
    end                         { procedure Change_Case }.

procedure Field Input: begin   { PART 14.  Procedure to accept
                                user-activated data input into
```

{ selected spreadsheet cells and
selected fields in the active
case_db file. } if ( Screen_Cursor_Exist and Mark_Record[Current_Record] <>
PR )

{ Screen_Cursor only positions
itself over data cells or data fields
of unprotected records } begin

Input_Buffer := '';   { clear Input_Buffer } repeat
        Input_Buffer := Input_Buffer + Keypress
                { concatenation }
    until Keypress = ENTER;
                { accept keyboard input at
                Input_Buffer until ENTER is pressed
                } if ( Id(Current_Record) = Id(Active_Record) ) then
        begin
            Col_Prog_Range[Cursor_Position] := Input_Buffer;
                { this statement is equivalent to
                the statement "Current_Cell :=
                Input_Buffer" }
            Need_Spreadsheet_Calc := TRUE
        end
                { if this is the active record then
                only write in Col_Prog range }

```
        else
            begin
                Field[Cursor_Position,Current_Record] :=
                Input_Buffer;
                Need_Rec_Calc[Current_Record] := TRUE
                            { If this is not the active record
                              then write in current record's
                              corresponding field, and set
                              Need_Rec_Calc to TRUE for
                              Current_Record } if ( Id(Current_Record) = Id(Previous_Record) )
                then
                    Col_Prev_Range[Cursor_Position] :=
                    Input_Buffer
                            { if this is the previous record then
                              also write in Col_Prev range } end
        end
    end                             { procedure Input_Field }.

procedure Execute_Parent_Environment: begin
                            { PART 15. Procedure that executes
                              user-activated commands in the
                              parent environment. Remember
                              that, in the gen_prog section,
                              environment can only be LAYOUT or
                              APPLICATION. } if environment = LAYOUT then
```

```
10      begin                           { Execute_Layout_Environment }
            if ( Keypress = LAYOUT_KEY ) then
            Define_Application_Environment;
            if ( Keypress in ANY_OTHER_KEY ) then
            Execute_Scratch_Environment
15                                      { See part 16 of this figure.  This
                                          statement shows how the LAYOUT
                                          environment inherits all tools (that
                                          don't conflict with proprietary
                                          commands) from the SCRATCH
20                                        environment.  The previous
                                          statement represents all
                                          proprietary commands of the
                                          LAYOUT Environment. }
            end
25      else
            Execute_Application_Environment
                                        { As defined in LAYOUT Environment
                                          }
end                                     { procedure
Execute_Parent_Environment }.

procedure Execute_Scratch_Environment: begin
                                        { PART 16.  Procedure that executes
                                          user-activated commands in the
10                                        scratch environment. }

Spreadsheet_Environment     { Executes an ordinary
                                          spreadsheet environment. }

15  end                                 { procedure
        Execute_Scratch_Environment }.
```

APPENDIX D - Source Code in Turbo C++ by Borland International

```c
/* ============ */
/* FILE: NUEVO.CPP */
/* ============ */

/* --------------------------------------------------
PROGRAMMABLE SPREADSHEET ENVIRONMENTS AND SYNERGISTIC INTEGRATION OF
SPREADSHEET AND DATABASE DATA STRUCTURES

Beginning of source code execution.

-------------------------------------------------- */ extern "C"
{
# include <bwindow.h>  /* Library bwindow.h, from 'Turbo C Tools' by Blaise,
                         is included to complement video operations in
                         procedure Process_Video */

}
              /* The following are Turbo C++'s standard libraries,
                 these take care of basic strings, memory and math
                 operations */
# include <string.h>
include <io.h>
# include <stdlib.h>
# include <stdio.h>
# include <conio.h>
# include <alloc.h>

/* Variable definitions in routine "defines.cpp"
                 help for a clear intepretation of code */
# include "defines.cpp"

/* The following include statements refer to basic
                 spreadsheet operations in the invention */
# include "TCUTIL.H"
# include "TCHASH.H"
# include "TCMENU.H"
# include "TCCELL.H"
# include "TCWINDOW.H"
# include "TCSHEET.H"
# include "TCRUN.H"
# include "TCINPUT.H"
# include "patente.h"

define ErrorData "Error in input type or value limits"

Word    Keypress;   /* Variable Keypress stores the value of the last
                       key pressed by the user */

Col_Prog_Window  *Window1; /* Define Col_Prog_Window named WINDOW1 */

Environment_Type Environment;  /* May be LAYOUT or APPLICATION environment */
Section_Type     Section;      /* May be SCRATCH or GEN_PROG section */
boolean          Window;       /* TRUE means program execution in the GEN_PROG
                                  section is controlled by col_prog environment */
boolean          Time_Based;   /* TRUE means application is time based */
boolean          Need_Spreadsheet_Calc; /* Flag for Procedure Calc (Simple Recalc) */

Hilera13 Tempo[100];
```

```
/* The following variables in 'extern' statements
   are declared in other program modules. They will
   also be used in this module, using the values
   defined in other modules. */
extern ProgramObject Vars;
extern CentralMenu ApplicationMenu;
extern HorizontalMenu MainMenu;
extern void Execute_Scratch_Environment();
extern void Execute_Parent_Environment();
extern void Help();

# include "apoyo.cpp"  /* Routines in that file perform video operations,
                          and read and write operations between the
                          col_prog range and the case_db records.
                          These operations are used in for the following
                          procedures: Process_Video, Change_Case,
                          Select_Environment, and Select_Window. */

/* -----------------------------------------------------------
   Procedure Main
   -------------

Operation of the invention, in the scratch, layout and applications
   environments and col_prog environment.

Here begins the body of routine Main. Its structure can be summarized as
   follows.

1) Initiate: environment set-up, col_prog window definition;
      2) Video preparation -not shown in the pseudocode algorithm of figure 16
      3) Keypress recognition and execution of associated actions.

This sequence is repeated until the user presses the Quit_Key.
   ----------------------------------------------------------- */ void main()
{

Initiate();      /* The necessary sequence of operations and
                      commands issued by the user to demonstrate the
                      concepts of the invention relevant to the patent
                      application */ while (((Keypress = GetKey()) != QUIT_KEY) || (Window1->Sure_Want_Quit()))
              /* Main Loop begins: "While not QUIT" */
  {
    if (Keypress == SECTION_KEY)
      Select_Section();
               /* Action for F8 key. Section may be SCRATCH or
                  GEN_PROG. */
    else if (Keypress == F1) Help();
    else
     if (Section == GEN_PROG)

{
       if (Keypress == ENVIRONMENT_KEY)
         Select_Environment();
                /* Action for F7 key. If section <> GEN_PROG
                   then section = SCRATCH; in this case, do
                   nothing. In GEN_PROG, environment may be LAYOUT
                   or APPLICATION. */
       else
        if (Keypress == WINDOW_KEY)
          Select_Window();
                /* Action for Alt-F7 key. This switches window to TRUE or
                   FALSE. Window = TRUE means Col_Prog Window is active. */
        else
         if (Window)
                /* Window = TRUE means we are in Col_Prog
                   Environment. */
```

```
switch (Keypress) {
    /* This case statement represents the col_prog
       environment's operation */ case VIDEO_CONTROL_KEY: Window1->Process_Video();
            break;
        /* Action for any cursor key that affects the
           appearance of the video screen, called here
           "Video_Control_Key". */ case FORMULA_EDIT_KEY: Window1->Process_Formula_Edit();
            break;
        /* Action for F2 key. */ case MARK_RECORD_KEY: Window1->Process_Mark_Record();
            break;
        /* Action for F5 key. */ case     CALC_KEY: Window1->Process_Calc();
            break;
        /* Action for F9 key. */ case FULL_CALC_KEY: Window1->Process_Full_Calc();
            break;
        /* Action for Alt-F9 key. */ case CHANGE_CASE_KEY: Window1->Process_Change_Case();
            break;
        /* Action for F6 key. */ default: if (ANY_INPUT_KEY)
                    Window1->Process_Field_Input((char)Keypress);
                else
                    if (!Window)
                        Execute_Parent_Environment();
                break;
        /* ANY_INPUT_KEY is a set containing all keys
           validated to initiate Field_Input. */
} else
{
 if (!Window)
  · Execute_Parent_Environment();
        /* This statement shows how the Col_Prog Environment
           inherits all tools (that don't conflict with
           proprietary commands) from the parent environment.
           Previous statements showed all proprietary commands
           of the Col_Prog Environment. */
}
   } else
     Execute_Scratch_Environment();
            /* Because Section = SCRATCH. */

}

Window1->Close_And_Quit();
            /* Procedure Close_And_Quit saves and closes
               files and then quits program. */

}

/* ----------------------------------------------------------
Procedure Process_Formula_Edit
-----------------------------
```

Procedure to accept a formula edit operation in the col_prog range.

```
---------------------------------------------------- */ void Col_Prog_Window::Process_Formula_Edit()
{
  char    formula[256];
  char    caracter=0;
  Hilera13 Valor;

formula[0]='\0';

if
(!Vars.CurrSS.DataCells.IsData(Col_Prog_Range->Start.Col,Col_Prog_Range->Start.Row+Caso_Actual->Campo_Ac
tual)) {
          /** equivalent to: if current cell is an outcome cell? */
        if (Environment == LAYOUT) {
          if (!ProcessInput(caracter, 1, Col_Prog_Range->Start.Col,
                  Col_Prog_Range->Start.Row + Caso_Actual->Campo_Actual,formula)) {
          strcpy(Valor,formula);
                Caso_Actual->Mark_Cell[Caso_Actual->Campo_Actual].Value=ANS;
            /*
              accept edit formula at current cell, and mark cell
              for ANS file
            */
          Display_New_Value(Valor,0);
        }
        }
      }
      else {      /* else: environment = APPLICATION */
          if (!ProcessInput(caracter, 1, Col_Prog_Range->Start.Col,
                  Col_Prog_Range->Start.Row + Caso_Actual->Campo_Actual,formula)) {
          strcpy(Valor,formula);

/* If the new formula is added to the col_prog range,
               and after calculating its resulting value, this
               value is written to a string called 'dato'.     */

Caso_Actual->Mark_Cell[Caso_Actual->Campo_Actual].Value=(Environment==LAYOUT)?CAP:ANS;
            /* Accept edit formula at current cell, and mark
               cell for ANS file; formulas for cells marked for
               ANS file will be saved in the ANS file. */
          Display_New_Value(Valor,0);
        }
      }
    Valor[0] = '\0';
}

/* ---------------------------------------------------
   Procedure Process_Field_Input
   -----------------------------
   Procedure to accept user-activated data input into selected
   spreadsheet cells and selected fields in the active case_db file.

---------------------------------------------------- */ void Col_Prog_Window::Process_Field_Input(char caracter)

/* Process_Field_Input concatenates new input with
             'character', previously input. */

{
  int     Celda_Actual, i,Lugar;
  char    dato[256] = " ";
  Field   Entrada(1, 80, 1, 0, 0);
  Hilera13 Valor;
  Boolean Quit, Valido = 0;
```

```
/* This source code executes field_input following a
   different sequence of operations. Here, one
   routine is used if input goes into both the
   col_prog range and the col_prev range, or if
   input goes into any one of them. Another routine
   is used if no data goes into any of these ranges
   (such as is the case for field_input to records
   other than the active and previous records) */ if (Caso_Actual->Periodo_Status[Caso_Actual->Periodo_Actual].Protect!=PR_PERIOD) {
  if (Caso_Actual->Periodo_Actual==Caso_Actual->Periodo_Activo) {
    Quit=ProcessInput(caracter, 0, Col_Prog_Range->Start.Col,
              Col_Prog_Range->Start.Row + Caso_Actual->Campo_Actual,dato);
    if (!Quit) {
      strcpy(Valor,dato);
      Need_Spreadsheet_Calc=TRUE;
    }
  }
  else {
    dato[0]=caracter;
    do
    {
      Entrada.Edit(dato);
      Quit = Entrada.GetQuit();
      if (!Quit)
      {
        strcpy(dato, Entrada.InputData);
        if (!Vars.CurrSS.DataCells.Cumple(Col_Prog_Range->Start.Col,
            Col_Prog_Range->Start.Row + Caso_Actual->Campo_Actual,
            dato, &Vars.CurrSS.CellHash))
          PrintError(ErrorData);
        else Valido = 1;
      }
      else Valido = 1;

}
    while (!Valido);
    if (Caso_Actual->Periodo_Actual==Caso_Actual->Periodo_Activo-1)
    {
      if (!Quit)
        Vars.CurrSS.AgregaCelda2(Col_Prev_Range->Start.Col,
          Col_Prev_Range->Start.Row + Caso_Actual->Campo_Actual, dato);
    }
    strcpy(Valor, RightJustStr(dato, 8));
    if (!Quit)
      Caso_Actual->Modify_Field(dato);
  }
  if (!Quit) {
    Caso_Actual->Periodo_Status[Caso_Actual->Periodo_Actual].Calc=TRUE;
    Display_Period_Status((Caso_Actual->Periodo_Actual - Caso_Actual->Primer_Periodo_Desplegado +
1),Caso_Actual->Periodo_Actual);
    Display_New_Value(Valor,1);
  }
}
Valor[0] = dato[0] = '\0';
}

/* --------------------------------------------------
   Procedure Calc
   ----------
   Procedure to execute a simple recalc operation.

-------------------------------------------------- */ void Col_Prog_Window::Process_Calc()
{
    Block BTemp(Col_Prog_Range->Start.Col, Col_Prog_Range->Start.Row + Caso_Actual->Fila_Inferior_Mostrada,
         Col_Prog_Range->Start.Col, Col_Prog_Range->Start.Row + Caso_Actual->Fila_Superior_Mostrada);
```

```
    Hilera13 *Activo,Tempo[100];
int Temporal;

Activo=(Hilera13 *)calloc(abs(Col_Prog_Range->Start.Row-Col_Prog_Range->Stop.Row)+1,sizeof(Hilera13));
        if (Caso_Actual->Periodo_Actual) {
                /** This condition verifies that active_record won't
                    position in the first case_db record. */
        Temporal = Caso_Actual->Periodo_Activo;
            if (Caso_Actual->Periodo_Actual!=Caso_Actual->Periodo_Activo &&
                Caso_Actual->Periodo_Status[Caso_Actual->Periodo_Actual].Protect==SP_PERIOD) {
                if (Need_Spreadsheet_Calc) {
                    Vars.CurrSS.Update(0);
                if ((Caso_Actual->Periodo_Activo >= Caso_Actual->Primer_Periodo_Desplegado) &&
                    (Caso_Actual->Periodo_Activo <= Caso_Actual->Primer_Periodo_Desplegado + 5))
                {
                    Vars.CurrSS.CopiaAArreglo(Activo,(Caso_Actual->Fila_Superior_Mostrada -
Caso_Actual->Fila_Inferior_Mostrada + 1),BTemp,8);

Escribe_Datos(Activo,(Caso_Actual->Periodo_Activo-Caso_Actual->Primer_Periodo_Desplegado+1),Caso_Actu-
al->Periodo_Activo);
                }
                Caso_Actual->Periodo_Status[Caso_Actual->Periodo_Activo].Calc=FALSE;
                Display_Period_Status((Temporal - Caso_Actual->Primer_Periodo_Desplegado + 1),Temporal);
                Need_Spreadsheet_Calc=FALSE;
                    /* if spreadsheet needs a Calc operation, perform
                        it immediately before writing */

}

Vars.CurrSS.CopiaAArreglo(Activo,(Caso_Actual->Caso.Header.Contenido.LongRegId-33)/32,*Col_Prog_Range,8);

Caso_Actual->Write_Active_Record(Activo,abs(Col_Prog_Range->Start.Row-Col_Prog_Range->Stop.Row)+1);
        Caso_Actual->Read_Current_Record(Tempo);

Vars.CurrSS.CopiaDeArreglo(Tempo,(Caso_Actual->Caso.Header.Contenido.LongRegId-33)/32,*Col_Prog_Range);
        Caso_Actual->Periodo_Activo=Caso_Actual->Periodo_Actual;
    //
            if (Time_Based) {
            Caso_Actual->Read_Previous_Record(Tempo);

Vars.CurrSS.CopiaDeArreglo(Tempo,(Caso_Actual->Caso.Header.Contenido.LongRegId-33)/32,*Col_Prev_Range);
            }
        }
        Caso_Actual->Periodo_Status[Caso_Actual->Periodo_Activo].Calc=FALSE;
            Vars.CurrSS.Update(0);
        Display_Period_Status((Temporal - Caso_Actual->Primer_Periodo_Desplegado + 1),Temporal);
        Vars.CurrSS.CopiaAArreglo(Activo,(Caso_Actual->Fila_Superior_Mostrada -
Caso_Actual->Fila_Inferior_Mostrada + 1),BTemp,8);

Escribe_Datos(Activo,(Caso_Actual->Periodo_Activo-Caso_Actual->Primer_Periodo_Desplegado+1),Caso_Actu-
al->Periodo_Activo);
        Show_New_Cursor_Position();
        Despliega_Rows();
        }
        free(Activo);
}

/* ------------------------------------------------
    Procedure Full_Recalc
    ------------------
    Procedure to execute a full recalculation.

------------------------------------------------ */ void Col_Prog_Window::Process_Full_Calc()
{
```

```
        Hilera13 *Activo;
        int  Id0_Active=0,
         Id0_Campo=0,
            Id0_Current=0,
         Id0_Primero=0,
            First_Record=0,
            Last_Record=0;

if (Time_Based) {
        Activo=(Hilera13 *)calloc(abs(Col_Prog_Range->Start.Row-Col_Prog_Range->Stop.Row)+1,sizeof(Hilera13));
        Id0_Active=Caso_Actual->Periodo_Activo;
            Id0_Current=Caso_Actual->Periodo_Actual;
        Id0_Campo=Caso_Actual->Campo_Actual;
        Id0_Primero=Caso_Actual->Primer_Periodo_Desplegado;
            Last_Record=Caso_Actual->Caso.Header.Contenido.NumReg-1;
            Caso_Actual->Periodo_Actual=First_Record;
        Caso_Actual->Primer_Periodo_Desplegado=First_Record;
        Cambia_Formatos_Pantalla(0);
            do {
            do {
            if (Caso_Actual->Periodo_Actual < Last_Record)
                Move_Cursor_Horizontal(-1);
            else
                Caso_Actual->Periodo_Actual++;
            } while(Caso_Actual->Periodo_Actual<=Last_Record &&
                (Caso_Actual->Periodo_Status[Caso_Actual->Periodo_Actual].Protect!=SP_PERIOD ||
                !Caso_Actual->Periodo_Status[Caso_Actual->Periodo_Actual].Calc));

Vars.CurrSS.CopiaAArreglo(Activo,(Caso_Actual->Caso.Header.Contenido.LongRegId-33)/32,*Col_Prog_Range,8);

Caso_Actual->Write_Active_Record(Activo,abs(Col_Prog_Range->Start.Row-Col_Prog_Range->Stop.Row)+1);
            while (Caso_Actual->Periodo_Actual<=Last_Record &&
                Caso_Actual->Periodo_Status[Caso_Actual->Periodo_Actual].Protect==SP_PERIOD) {

Process_Calc();
            if (Caso_Actual->Periodo_Actual < Last_Record)
                Move_Cursor_Horizontal(-1);
            else
                Caso_Actual->Periodo_Actual++;
            }
            } while (Caso_Actual->Periodo_Actual<Last_Record);
            Caso_Actual->Periodo_Actual=Id0_Active;
        Caso_Actual->Primer_Periodo_Desplegado=Id0_Primero;

Cambia_Formatos_Pantalla(0);
            Process_Calc();
        Erase_Previous_Cursor_Position(0);
            Caso_Actual->Periodo_Actual=Id0_Current;
        Caso_Actual->Campo_Actual = Id0_Campo;
        Show_New_Cursor_Position();
        Despliega_Rows();
        free(Activo);
        }
    }.

/* --------------------------------------------------
Procedure Process_Video
--------------------
Procedure to operate and modify the video after any cursor key is pressed.

-------------------------------------------------- */ void Col_Prog_Window::Process_Video()
{
```

```
switch (Keypress) { case  RIGHT_ARROW:if (Caso_Actual->Periodo_Actual < (Caso_Actual->Caso.Header.Contenido.NumReg - 1))
              Move_Cursor_Horizontal(-1);
            break;
               /* Where 'Caso_Actual' is active case_db file,
                  and 'Periodo Actual' is current case_db record */ case  LEFT_ARROW:if (Caso_Actual->Periodo_Actual > 0)
              Move_Cursor_Horizontal(1);
            break;

case  END_KEY:Video_End_Key();
            break;

case  HOME_KEY:Video_Home_Key();
            break;

case  TAB_KEY:Video_Tab_Key();
            break;

case SHIFT_TAB_KEY:Video_Shift_Tab_Key();
            break;

case  UP_ARROW:if (Caso_Actual->Periodo_Status[ Caso_Actual->Periodo_Actual].Protect != PR_PERIOD)
              Move_Cursor_Vertical(UP);
            break;

/* If Mark_Record(Current_Record) = PR then the
                  cursor can't move vertically in Current_Record */ case  DOWN_ARROW:if (Caso_Actual->Periodo_Status[ Caso_Actual->Periodo_Actual].Protect != PR_PERIOD)
              Move_Cursor_Vertical(DOWN);
            break;

case  PAGE_UP:Move_Cursor_Page_Up();
            break;
               /* When pressing PgDn and PgUp, a different range is
                  shown */ case  PAGE_DOWN:Move_Cursor_Page_Down();
            break;
  }

}

//
//
//
void Col_Prog_Window::Process_Mark_Record()
{ wnselect(Data_Window);
MARKING_RECORDS = 1;
Caso_Actual->Tipo_Cursor = COLUMN_CURSOR;    //
Muestra_Column_Cursor(0);           //
if (Environment == APPLICATION)
   Pone_Command_Line(0);            //
                    // while ((Keypress = GetKey()) != MARK_RECORD_KEY)
   //
   //
```

```
{
  switch (Keypress) { case    ENTER_KEY: Cambia_Status_Period();      //
            break;                          // case    LEFT_ARROW: if (Caso_Actual->Periodo_Actual > 0)  //
            Move_Cursor_Horizontal(1);      //
            break;                          // case    RIGHT_ARROW: if (Caso_Actual->Periodo_Actual < (Caso_Actual->Caso.Header.Contenido.NumReg - 1))
            Move_Cursor_Horizontal(-1);
            break;

}
}
MARKING_RECORDS = 0;
Muestra_Column_Cursor(1);           //
if (Environment == APPLICATION)
  Pone_Command_Line(1);             //
Caso_Actual->Tipo_Cursor = CELL_CURSOR;  //
Show_New_Cursor_Position();         //

}

/* -------------------- */
/* End of Main Algorithm */
/* -------------------- */

*==========================================================*

*=================*
* FILE: APOYO.CPP *
*=================*

//
    //
    //

/* */ int MARKING_RECORDS = 0;  //
            // void Col_Prog_Window::Crea_Ventanas_Presentacion()
{

Data_Window   = wncreate(21,70,REVERSE);
  Text_Window   = wncreate(21,DEFINE_TAMANO,REVERSE);
  if (Environment == APPLICATION)
  {
     Header_Window = wncreate( 3,80,REVERSE);   //
     Botton_Window = wncreate( 1,80,REVERSE);
  }

}

/* */ void Col_Prog_Window::Llena_Primera_Pantalla()
{

Crea_Ventanas_Presentacion();
  Lectura_Primeros_Datos();
  Find_Next_Input_Field(DOWN);  //
     //
```

Despliega_Ventanas_General(1);

}

/* */ void Col_Prog_Window::Escribe_Textos_Ventanas()
{ int i;

wnselect(Text_Window);       //
wnsetopt(Text_Window,WN_CUR_TRACK,0);
wnsetopt(Text_Window,WN_CUR_OFF,1);

for ( i = Caso_Actual->Fila_Inferior_Mostrada; i <= Caso_Actual->Fila_Superior_Mostrada; ++i)
        //
    {
    wnwrbuf(FILA_AMBIENTE,1,strlen(Caso_Actual->Nombres[FILA1].Largo),
        Caso_Actual->Nombres[FILA1].Largo,
        ((Environment == LAYOUT)?SC_WHITE:WHITE),SC_BLUE,CHARS_ONLY);

wnwrbuf(FILA_AMBIENTE,25,1,&Caso_Actual->Nombres[FILA1].Simbolo,
        ((Environment == LAYOUT)?SC_WHITE:WHITE),SC_BLUE,CHARS_ONLY);
    } if (Environment == APPLICATION)
    {
    if (COMPILAR == 16)
        wnwrbuf(0,1,13,"▒▒▒▒▒▒▒▒▒▒▒▒▒▒",WHITE,SC_BLUE,CHARS_ONLY);

wnwrbuf(20,1,29,"▒▒▒▒▒▒▒▒▒▒▒▒▒▒▒▒▒▒▒▒▒▒▒▒▒▒▒▒▒",WHITE,SC_BLUE,CHARS_ONLY);
    }·

}

/* */ void Lista_Bases::Inicializa_Filas_Mostradas(int& Inferior, int& Superior)

//
    //

{

Inferior = 0;
Superior = COMPILAR;      //

}

/* */ void Col_Prog_Window::Despliega_Ventanas(char Caso)

//
    //

{
char Nombre_Titulo[15];

```
Nombre_Titulo[0] = '\0';

location.corner.row = 0;      //
location.corner.col = 0;      // wnselect(Header_Window);
wnatrblk(Header_Window,0,0,0,79,SC_BLUE,SC_WHITE,WN_NO_UPDATE);
wnatrblk(Header_Window,1,0,2,79,SC_WHITE,SC_BLUE,WN_NO_UPDATE);
                              // strcpy(Nombre_Titulo,Caso_Actual->Caso.Nombre_BD);
strcat(Nombre,")");
Nombre_Titulo[strlen(Nombre_Titulo) - 4] = '\0';
wnwrbuf(0,1,23,"COL_PROG_ENVIRONMENT: (",SC_BLACK,SC_WHITE,CHARS_ONLY);
wnwrbuf(0,24,strlen(Nombre),Nombre,SC_BLACK,SC_WHITE,CHARS_ONLY);
Nombre[strlen(Nombre)-1] = '\0';
wnwrbuf(0,46,33,"(PARENT: APPLICATION ENVIRONMENT)",SC_BLACK,SC_WHITE,CHARS_ONLY);
wnwrbuf(1,(79 - strlen(Nombre_Titulo) - 15),13,"Name of Case:",WHITE,SC_BLUE,CHARS_ONLY);
wnwrbuf(1,(79 - strlen(Nombre_Titulo)),strlen(Nombre_Titulo),Nombre_Titulo,WHITE,SC_BLUE,CHARS_ONLY);
if (COMPILAR == 16)
    wnwrbuf(2,1,13,"SAMPLE SCREEN",WHITE,SC_BLUE,CHARS_ONLY);
wnsetopt(Header_Window,WN_CUR_OFF,1);
wndsplay(Header_Window,&location,&border);  //
wnupdate(Header_Window);                    // location.corner.row = 24;
location.corner.col = 0;
wnselect(Botton_Window);
wnattr(SC_WHITE,SC_BLUE);
wndsplay(Botton_Window,&location,&border);
Pone_Command_Line(1);       //
                            // wnupdate(Botton_Window);    //

}

/*  */
void Col_Prog_Window::Move_Cursor_Horizontal(char Caso)

//
    //
{
  Block BTemp(Col_Prog_Range->Start.Col, Col_Prog_Range->Start.Row + Caso_Actual->Fila_Inferior_Mostrada,
        Col_Prog_Range->Start.Col, Col_Prog_Range->Start.Row + Caso_Actual->Fila_Superior_Mostrada);

Hilera13 Datos[25];
      //
      // if (JUST_SCROLL)
    //
  {
    Erase_Previous_Cursor_Position(Caso);   //
    Caso_Actual->Periodo_Actual -= Caso;    //
    Show_New_Cursor_Position();             //
  }
  else
```

```
//
{
  if ((Caso_Actual->Primer_Periodo_Desplegado + INCREMENTO) == Caso_Actual->Periodo_Activo)
    //

Vars.CurrSS.CopiaAArreglo(Datos,(Caso_Actual->Fila_Superior_Mostrada -
Caso_Actual->Fila_Inferior_Mostrada + 1), BTemp,8);
  else
    //

Caso_Actual->Lectura_Parcial(Datos,(Caso_Actual->Primer_Periodo_Desplegado + INCREMENTO));
    Erase_Previous_Cursor_Position(Caso);           //
    Caso_Actual->Periodo_Actual -= Caso;            //
    Caso_Actual->Primer_Periodo_Desplegado -= Caso;
    Escribe_Datos(Datos,((Caso == -1)?6:0),(Caso_Actual->         Primer_Periodo_Desplegado +
                                                                  INCREMENTO + Caso));
    //
    wnhoriz(10,SC_WHITE,SC_BLUE,((Caso == 1)?SCR_RIGHT:SCR_LEFT));
    //
    Show_New_Cursor_Position();      //
}

}

/* */ void Col_Prog_Window::Escribe_Datos(Hilera13 *Datos, char Lugar, int Periodo)

//
//
//
//

{ int i,Celda_Actual;

wnselect(Data_Window);            //
  wnsetopt(Data_Window,WN_CUR_TRACK,0);
  for (i = Caso_Actual->Fila_Inferior_Mostrada; i <= Caso_Actual->Fila_Superior_Mostrada; ++i)
    //
    //

{
    Celda_Actual = Vars.CurrSS.DataCells.IsData(Col_Prog_Range->
              Start.Col,(Col_Prog_Range->Start.Row + i));
    //
    wnwrbuf(FILA_AMBIENTE,(Lugar * 10 + 1),8,Datos[FILA1],
              COLOR_LETRAS(Caso_Actual->Periodo_Actual),COLOR_FONDO(Caso_Actual->
              Periodo_Actual),CHARS_ONLY | NO_MOVE_CUR);
  } if (Environment == LAYOUT)
    wnatrblk(Data_Window,0,(Lugar * 10),0,((Lugar + 1)*10 - 1),
              SC_BLUE,SC_WHITE,WN_NO_UPDATE);

Display_Period_Status(Lugar,Periodo);     //
                          //
                          // wnselect(Data_Window);           //
```

```
}
/* */ void Col_Prog_Window::Display_Period_Status(char Lugar, int Periodo)
{
    wnselect(Data_Window);   // Activate the Data_Window if (Periodo == Caso_Actual->Periodo_Activo)

// if Periodo corresponds to the Active_Record then a special indicator
    // is shown {
        wnwrbuf(DEPENDE_ENVIRONMENT,(Lugar * 10),10," ?? ?? ?? ?? ?? ??
",BACK_COLOR,FORE_COLOR,CHARS_ONLY | NO_MOVE_CUR);
        if (Caso_Actual->Periodo_Status[Periodo].Calc == TRUE)
            wnwrbuf(DEPENDE_ENVIRONMENT,(Lugar * 10),10," ------ ",BACK_COLOR,FORE_COLOR,CHARS_ONLY |
NO_MOVE_CUR);
        if (Environment == LAYOUT)
            // if we're on Layout puts the indicator in the
            // Video top.
        {
            wnwrbuf(DEPENDE_ENVIRONMENT,(Lugar * 10),2," ?? ",BACK_COLOR,FORE_COLOR,CHARS_ONLY |
NO_MOVE_CUR);
            wnwrbuf(DEPENDE_ENVIRONMENT,(Lugar * 10 + 8),2," ?? ",BACK_COLOR,FORE_COLOR,CHARS_ONLY |
NO_MOVE_CUR);
        }
        else
        {
            wnwrbuf(DEPENDE_ENVIRONMENT,(Lugar * 10),2," ?? ?? ",BACK_COLOR,FORE_COLOR,CHARS_ONLY |
NO_MOVE_CUR);
            wnwrbuf(DEPENDE_ENVIRONMENT,(Lugar * 10 +
8),2," ?? ?? ",BACK_COLOR,FORE_COLOR,CHARS_ONLY | NO_MOVE_CUR);
        }

}
    else
    {
        // puts indicators for the rest of records (periods)

if (Environment == APPLICATION)
            wnwrbuf(DEPENDE_ENVIRONMENT,(Lugar * 10),10,
                " ?? ?? ?? ?? ?? ?? ?? ?? ?? ?? ",BACK_COLOR,FORE_COLOR,CHARS_ONLY |
NO_MOVE_CUR);
        else
            wnwrbuf(DEPENDE_ENVIRONMENT,(Lugar * 10),10,
                "          ",BACK_COLOR,FORE_COLOR,CHARS_ONLY | NO_MOVE_CUR);
        // Displays if the present record needs calc or not
        if (Caso_Actual->Periodo_Status[Periodo].Calc == TRUE)
            wnwrbuf(DEPENDE_ENVIRONMENT,(Lugar * 10),10,
                PENDIENTE_CALCULO(Periodo),BACK_COLOR,FORE_COLOR,CHARS_ONLY | NO_MOVE_CUR);
    }
    // Displays if the present record is PR,SP or DB
    if (Caso_Actual->Periodo_Status[Periodo].Protect == 0)
    {
        if (Caso_Actual->Periodo_Status[Periodo].Calc == TRUE)
            wnwrbuf(DEPENDE_ENVIRONMENT,(Lugar * 10 + 5),1,
                ".",BACK_COLOR,FORE_COLOR,CHARS_ONLY | NO_MOVE_CUR);
```

```
    else
    {
      if (Environment == LAYOUT)
         wnwrbuf(0,(Lugar * 10 + 5),1,
              ((Periodo == Caso_Actual->Periodo_Activo)?"▓":" "),
                                   BACK_COLOR,FORE_COLOR,CHARS_ONLY | NO_MOVE_CUR);
      else
         wnwrbuf(20,(Lugar * 10 + 5),1,
              ((Periodo == Caso_Actual->Periodo_Activo)?
                              "▓":"▓"),BACK_COLOR,FORE_COLOR,CHARS_ONLY |
                                       NO_MOVE_CUR);
    }
  }
  else
    wnwrbuf(DEPENDE_ENVIRONMENT,(Lugar * 10 + 5),1,
       STATUS_PERIODO(Periodo),BACK_COLOR,FORE_COLOR,CHARS_ONLY | NO_MOVE_CUR);

wnupdate(Data_Window);   // Update the Data_Window in the screen

}

/* This routine manipulates the movements of the screen cursor in
   vertical direction. 'Sentido' indicates if the Movement is Up or
   Down. If we're on Layout we can access all cells, on application
   we can position just on input fields.
*/ void Col_Prog_Window::Move_Cursor_Vertical(char Sentido)
{

Find_Next_Input_Field(Sentido);   // We've to find the next input field
                   // in the shown range.
  Erase_Previous_Cursor_Position(0);   // Erase previos cursor position and
  Despliega_Rows();
  Show_New_Cursor_Position();      // then show the new cursor position

}

// This routine changes the range of fields shown on video when the user
// presses the Page_Up key and the present range shown is [17..32]

void Col_Prog_Window::Move_Cursor_Page_Up()
{ if (Caso_Actual->Fila_Inferior_Mostrada > 0)    // if the program shows range [17..32], and
     {                        // the users press 'Page_Up' key, then changes
        if ((Caso_Actual->Fila_Inferior_Mostrada - (COMPILAR + 1)) >= 0)
        {
           Caso_Actual->Fila_Inferior_Mostrada -= (COMPILAR + 1);   // range shown to [0..16]
           Caso_Actual->Fila_Superior_Mostrada = (Caso_Actual->Fila_Inferior_Mostrada + COMPILAR);
        }
        else
        {
           Caso_Actual->Fila_Superior_Mostrada = Caso_Actual->Fila_Inferior_Mostrada - 1;
           Caso_Actual->Fila_Inferior_Mostrada = 0;
        }
        Muestra_Nuevos_Datos();
```

```
}

}

// This routine shows the new data on screen when the user has pressed
// the Page_Up Key or the Page_Down Key.

void Col_Prog_Window::Muestra_Nuevos_Datos()
{

Caso_Actual->Campo_Actual = Caso_Actual->Fila_Inferior_Mostrada - 1;  // we initialize the cursor position on screen
  Caso_Actual->Campo_Anterior = -1;
  Find_Next_Input_Field(DOWN);       // we position the videos cursor
  Cambia_Formatos_Pantalla(0);       // Call routine that reads the new data
  Show_New_Cursor_Position();        // then display the videos cursor.
}

//
  //
  // void Col_Prog_Window::Lectura_Primeros_Datos()
{

Block BTemp(Col_Prog_Range->Start.Col, Col_Prog_Range->Start.Row + Caso_Actual->Fila_Inferior_Mostrada,
        Col_Prog_Range->Start.Col, Col_Prog_Range->Start.Row + Caso_Actual->Fila_Superior_Mostrada);
  int i;
  int mode, columns, active_page;
  Hilera13 Datos[25];

Caso_Actual->Lee_Nombres();          //
  wnselect(Text_Window);               //
  wnattr(SC_WHITE,SC_BLUE);            //
  Escribe_Textos_Ventanas();           //
  free(Caso_Actual->Nombres);          //
  wnselect(Data_Window);               //
  wnattr(SC_WHITE,SC_BLUE);            //
  for (i = Caso_Actual->Primer_Periodo_Desplegado; i < (Caso_Actual->
      Primer_Periodo_Desplegado + 5); ++i)
  //
  //

{
    if (i == Caso_Actual->Periodo_Activo)
      //
      Vars.CurrSS.CopiaAArreglo(Datos,(Caso_Actual->Fila_Superior_Mostrada -
            Caso_Actual->Fila_Inferior_Mostrada + 1),BTemp,8);

else
      //
      Caso_Actual->Lectura_Parcial(Datos,i);
    Escribe_Datos(Datos,(i-Caso_Actual->Primer_Periodo_Desplegado+1),i);
    //
    Revisa_Celdas(i);
    //
  }

}

/* */
```

```
void Col_Prog_Window::Despliega_Ventanas_Datos()
{
  int mode, columns, active_page;

Caso_Actual->Primera_Vez = 0;
  if (Environment == LAYOUT)
   {
      wnatrblk(Text_Window,0,0,0,25,SC_BLUE,SC_WHITE,WN_UPDATE);
      wnatrblk(Data_Window,0,0,0,69,SC_BLUE,SC_WHITE,WN_UPDATE);
      wnatrstr(Data_Window,0,COLUMN1(Caso_Actual->Periodo_Actual),8,SC_WHITE,SC_RED,WN_UPDATE);

}
   Show_New_Cursor_Position();
   location.dev = scmode(&mode,&columns,&active_page);
   location.page = active_page;
   border.type = BBRD_NO_BORDER;
   location.corner.row = DEFINE_FILA;
   location.corner.col = 30;
   wnvdisp(Data_Window,&location,21,50,0,10,&border);
   wnupdate(Data_Window);
   location.corner.row = DEFINE_FILA;
   location.corner.col = DEFINE_COLUMNA;
   wndsplay(Text_Window,&location,&border);
   wnupdate(Text_Window);

}

//
  //
  // void Col_Prog_Window::Move_Cursor_Page_Down()
{ if (Caso_Actual->Fila_Superior_Mostrada < (Col_Prog_Range->Stop.Row - Col_Prog_Range->Start.Row))
    {
       if ((Caso_Actual->Fila_Superior_Mostrada + COMPILAR + 1) <= (Col_Prog_Range->Stop.Row -
  Col_Prog_Range->Start.Row))
         {
            Caso_Actual->Fila_Superior_Mostrada += (COMPILAR + 1);
            Caso_Actual->Fila_Inferior_Mostrada += (COMPILAR + 1);
         }
         else
          {
            Caso_Actual->Fila_Inferior_Mostrada = Caso_Actual->Fila_Superior_Mostrada + 1;
            Caso_Actual->Fila_Superior_Mostrada = Col_Prog_Range->Stop.Row - Col_Prog_Range->Start.Row;
          }
         Muestra_Nuevos_Datos();
    }

}

//
  // void Col_Prog_Window::Find_Next_Input_Field(char Direccion)
{ int i,Celda_Actual;
```

```
if (Environment == LAYOUT)
  //
  //
  {
    if (Direccion == DOWN)
      //
      //
      //
      {
        if (Caso_Actual->Campo_Actual < Caso_Actual->Fila_Superior_Mostrada)
        {
          Caso_Actual->Campo_Anterior = Caso_Actual->Campo_Actual;
          ++Caso_Actual->Campo_Actual;
        }
      }
    else
    {
      //
      //
      // if (Caso_Actual->Campo_Actual > Caso_Actual->Fila_Inferior_Mostrada)
      {
        Caso_Actual->Campo_Anterior = Caso_Actual->Campo_Actual;
        --Caso_Actual->Campo_Actual;
      }
    }

}
  else
  {
    //
    //
    if (Direccion == DOWN)
    {
      if (Caso_Actual->Campo_Actual >= Caso_Actual->Fila_Inferior_Mostrada)
        i = Caso_Actual->Campo_Actual + 1;
      else
        i = Caso_Actual->Fila_Inferior_Mostrada;
      while (i <= Caso_Actual->Fila_Superior_Mostrada)
      {
        Celda_Actual = Vars.CurrSS.DataCells.IsData(Col_Prog_Range->
                        Start.Col,(Col_Prog_Range->Start.Row + i));
        i++;
        if (Celda_Actual)
        {
          Caso_Actual->Campo_Anterior = Caso_Actual->Campo_Actual;
          Caso_Actual->Campo_Actual = i - 1;
          break;
        }
      }
    }
    else
    {
      if (Caso_Actual->Campo_Actual >= Caso_Actual->Fila_Inferior_Mostrada)
        i = Caso_Actual->Campo_Actual - 1;
      else
        i = Caso_Actual->Fila_Superior_Mostrada;
      while (i >= Caso_Actual->Fila_Inferior_Mostrada)
      {
```

```
           Celda_Actual = Vars.CurrSS.DataCells.IsData(Col_Prog_Range->
                         Start.Col,(Col_Prog_Range->Start.Row + i));
         -i;
         if (Celda_Actual)
         {
             Caso_Actual->Campo_Anterior = Caso_Actual->Campo_Actual;
             Caso_Actual->Campo_Actual   = i + 1;
             break;
         }
        }
      }
    }
}

//
  //
  // void Col_Prog_Window::Erase_Previous_Cursor_Position(char Caso)
{
  int Celda_Actual;

//
  // if (Caso_Actual->Tipo_Cursor == CELL_CURSOR)
  {
    //
    // if (Caso_Actual->Campo_Anterior >= Caso_Actual->Fila_Inferior_Mostrada)
    {
      Celda_Actual = Vars.CurrSS.DataCells.IsData(Col_Prog_Range->
                     Start.Col,(Col_Prog_Range->Start.Row + Caso_Actual->Campo_Anterior));
      wnatrstr(Data_Window,FILA_AMBIENTE_2,COLUMN3(Caso_Actual->
               Periodo_Actual),8,COLOR_LETRAS(Caso_Actual->Periodo_Actual),
               COLOR_FONDO(Caso_Actual->Periodo_Actual),WN_UPDATE);
      if ((Environment == LAYOUT) && (Caso != 0))
         wnatrstr(Data_Window,0,COLUMN3(Caso_Actual->Periodo_Actual),
                  8,SC_BLUE,SC_WHITE,WN_UPDATE);
    }
  }
  else //
   Revisa_Celdas(Caso_Actual->Periodo_Actual);
  wnupdate(Data_Window);

}

//
  // void Col_Prog_Window::Show_New_Cursor_Position()
{ if (Caso_Actual->Tipo_Cursor == CELL_CURSOR)
  {
    //
    //
```

```
    if (Caso_Actual->Campo_Actual >= Caso_Actual->Fila_Inferior_Mostrada)
    {
       wnatrstr(Data_Window,FILA_AMBIENTE_3,COLUMN1(Caso_Actual->
                 Periodo_Actual),8,SC_WHITE,SC_RED,WN_UPDATE);
       Caso_Actual->Campo_Anterior = Caso_Actual->Campo_Actual;
       if (Environment == LAYOUT)
          wnatrstr(Data_Window,0,COLUMN1(Caso_Actual->Periodo_Actual),
                   8,SC_WHITE,SC_RED,WN_UPDATE);

}
  }
 else
   //
   //
   Muestra_Column_Cursor(0);

}

//
 //
 // void Col_Prog_Window::Cambia_Status_Period()
{
 //
 //
 //

++(Caso_Actual->Periodo_Status[Caso_Actual->Periodo_Actual].Protect);
 (Caso_Actual->Periodo_Status[Caso_Actual->Periodo_Actual].Protect) %= 3;
 Display_Period_Status((Caso_Actual->Periodo_Actual - Caso_Actual->
     Primer_Periodo_Desplegado + 1),Caso_Actual->Periodo_Actual);

} .

//
 //
 //
 // void Col_Prog_Window::Muestra_Column_Cursor(char Caso)
{ switch( Caso ) {
 case 0: wnatrblk(Data_Window,0,(COLUMN1(Caso_Actual->Periodo_Actual)-1),
     20,COLUMN2(Caso_Actual->Periodo_Actual),SC_WHITE,SC_RED,WN_UPDATE);
     break;
 case 1: wnsetopt(Data_Window,WN_DELAYED,1);
       Revisa_Celdas(Caso_Actual->Periodo_Actual);
       wnupdate(Data_Window);
       wnsetopt(Data_Window,WN_DELAYED,0);
       break;
 }
}

//
 //
void Col_Prog_Window::Pone_Command_Line(char Caso)
{
```

```
char Linea1[85] = " F1-Help F2-Edit F5-Mrk_Rec F6-Case F7-Envim aF7-Wind F8-Sect F9-Calc Esc-Quit ";
char Linea2[85] = " Marking Columns (F5):     ENTER-Toggle Mark          F5-Finished ";

wnselect(Botton_Window);
wnsetopt(Botton_Window,WN_CUR_TRACK,0);
wnsetopt(Botton_Window,WN_CUR_OFF,1);

switch ( Caso ) {
 case 0: {
      wnwrbuf(0,0,80,Linea2,SC_CYAN,SC_BLUE,CHARS_ONLY);
      wnatrstr(Botton_Window,0,1,20,YELLOW,SC_BLUE,WN_UPDATE);   //
      wnatrstr(Botton_Window,0,32,5,YELLOW,SC_BLUE,WN_UPDATE);   //
      wnatrstr(Botton_Window,0,68,2,YELLOW,SC_BLUE,WN_UPDATE);   //
      break;
    }
  case 1: {
      wnwrbuf(0,0,80,Linea1,SC_CYAN,SC_BLUE,CHARS_ONLY);
      wnatrstr(Botton_Window,0,1,2,YELLOW,SC_BLUE,WN_UPDATE);
      wnatrstr(Botton_Window,0,9,2,YELLOW,SC_BLUE,WN_UPDATE);
      wnatrstr(Botton_Window,0,17,2,YELLOW,SC_BLUE,WN_UPDATE);
      wnatrstr(Botton_Window,0,28,2,YELLOW,SC_BLUE,WN_UPDATE);
      wnatrstr(Botton_Window,0,36,2,YELLOW,SC_BLUE,WN_UPDATE);
      wnatrstr(Botton_Window,0,46,3,YELLOW,SC_BLUE,WN_UPDATE);
      wnatrstr(Botton_Window,0,55,2,YELLOW,SC_BLUE,WN_UPDATE);
      wnatrstr(Botton_Window,0,63,2,YELLOW,SC_BLUE,WN_UPDATE);
      wnatrstr(Botton_Window,0,71,3,YELLOW,SC_BLUE,WN_UPDATE);
      break;
    }
}
wnselect(Data_Window);

}

//
//
// void Col_Prog_Window::Revisa_Celdas(char Periodo)
{ int Celda_Actual;
int i;
if (Environment == LAYOUT)
  {
   wnatrblk(Data_Window,0,COLUMN1(Periodo)-1,0,COLUMN2(Periodo),SC_BLUE,
        SC_WHITE,WN_NO_UPDATE);
   wnatrblk(Data_Window,1,COLUMN1(Periodo)-1,20,COLUMN2(Periodo),SC_WHITE,
        SC_BLUE,WN_NO_UPDATE);
  }
else
  wnatrblk(Data_Window,0,COLUMN1(Periodo)-1,20,COLUMN2(Periodo),WHITE,
        SC_BLUE,WN_NO_UPDATE);
if (Caso_Actual->Periodo_Status[Periodo].Protect != PR_PERIOD)
 for (i = Caso_Actual->Fila_Inferior_Mostrada;i <= Caso_Actual->Fila_Superior_Mostrada; ++i)

//

{
    Celda_Actual = Vars.CurrSS.DataCells.IsData(Col_Prog_Range->Start.Col,
            (Col_Prog_Range->Start.Row + i));
    if (Celda_Actual)
```

```
        //
        wnatrstr(Data_Window,FILA_AMBIENTE,COLUMN1(Periodo),8,
                COLOR_LETRAS(Periodo),COLOR_FONDO(Periodo),WN_NO_UPDATE);
    }
}

/* */ void Col_Prog_Window::Cambia_Formatos_Pantalla(char Cambio_Caso) //
{                                                                 //

Destruye_Ventanas(Cambio_Caso);   //
  Llena_Primera_Pantalla();         //

}

/* */ void Col_Prog_Window::Display_New_Value(Hilera13 Valor, char Caso)
{
  int Celda_Actual,i,Lugar = -1;

Celda_Actual = Vars.CurrSS.DataCells.IsData(Col_Prog_Range->Start.Col,
          (Col_Prog_Range->Start.Row + Caso_Actual->Campo_Actual));
  i = Caso_Actual->Campo_Actual;
  if (Caso)
     Lugar=Caso_Actual->Periodo_Actual-Caso_Actual->
              Primer_Periodo_Desplegado+1;
  else
     if ((Caso_Actual->Periodo_Activo >= Caso_Actual->
              Primer_Periodo_Desplegado) &&
         (Caso_Actual->Periodo_Activo <= Caso_Actual->
                  Primer_Periodo_Desplegado + 5))
         Lugar=Caso_Actual->Periodo_Activo-Caso_Actual->
                  Primer_Periodo_Desplegado+1;
  if (Lugar != -1)
    {
      wnselect(Data_Window);
      wnwrbuf(FILA_AMBIENTE,(Lugar * 10 +1),8,Valor,COLOR_LETRAS(Caso_Actual->
              Periodo_Actual),COLOR_FONDO(Caso_Actual->Periodo_Actual),CHARS_ONLY I NO_MOVE_CUR);
    }
  Show_New_Cursor_Position();
}

/* */ void Col_Prog_Window::Despliega_Ventanas_General(char Caso)
{ int i;
  Caso_Actual->Desplegados = 1;

if (Window)
  //
  {
    for (i = Caso_Actual->Primer_Periodo_Desplegado; i < (Caso_Actual->
          Primer_Periodo_Desplegado + 5); ++i)
      Revisa_Celdas(i);
    if (Environment == LAYOUT)
```

```
//
{
  Despliega_Rows();
  ClrEolXY(1,1,LIGHTGRAY<<4);
  WriteXY("COL_PROG ENVIRONMENT :(",2,1,LIGHTGRAY<<4);
  WriteXY(Nombre,25,1,LIGHTGRAY<<4);
  WriteXY(")",(25 + strlen(Nombre)),1,LIGHTGRAY<<4);
  WriteXY("(PARENT: LAYOUT ENVIRONMENT)",52,1,LIGHTGRAY<<4);
  ClrEolXY(1,2,BLACK);
  ClrEolXY(1,3,BLACK);
  ClrEolXY(1,24,BLACK);
  ClrEolXY(1,25,LIGHTGRAY<<4);
}
Despliega_Ventanas_Datos();    //
                               //
                               //
if (Environment == APPLICATION)
                               //
    Despliega_Ventanas(Caso);  //
                               //
                               //

}
else
{
   Remover_Ventanas(Caso);   //
                             //
                             //
   if (Environment == LAYOUT)
   {
      MainMenu.NumOps = 3;
      DisplayAll();
   }
   else
   {
      ApplicationMenu.DespliegaMenu();
   }

}
Caso_Actual->Primera_Vez = 0;

}

/* */ void Col_Prog_Window::Destruye_Ventanas(char Caso)
{ wndstroy(Data_Window);
   wndstroy(Text_Window);
   if (((Caso == 2) && (Environment == LAYOUT)) ||
       (((Caso == 0) || (Caso == 1)) && (Environment == APPLICATION)))
      {
         wndstroy(Header_Window);
         wndstroy(Botton_Window);
      }
   Caso_Actual->Desplegados = 0;

}

/* */
```

```
void Col_Prog_Window::Remover_Ventanas(char Caso)
{ if ((!Caso_Actual->Primera_Vez) && (Caso == 0) && (Caso_Actual->Desplegados == 1))
    {
    wnremove(Data_Window);
    wnremove(Text_Window);
    Caso_Actual->Desplegados = 2;
    if (Environment == APPLICATION)
      {
      wnremove(Botton_Window);
      wnremove(Header_Window);
      }
    }

}
  /* */ void Col_Prog_Window::Video_End_Key()
{ if (Caso_Actual->Primer_Periodo_Desplegado < (Caso_Actual->
      Caso.Header.Contenido.NumReg - 5))
    {
    Caso_Actual->Primer_Periodo_Desplegado = Caso_Actual->
              Caso.Header.Contenido.NumReg - 5;
    Caso_Actual->Periodo_Actual = Caso_Actual->Caso.Header.Contenido.NumReg
          - 1;
    Muestra_Nuevos_Datos();
    }
  else
    {
    Erase_Previous_Cursor_Position(0);
    Caso_Actual->Periodo_Actual = Caso_Actual->Caso.Header.Contenido.NumReg
          - 1;
    Show_New_Cursor_Position();
    }

}

/* */ void Col_Prog_Window::Video_Home_Key()
{ if (Caso_Actual->Primer_Periodo_Desplegado > 0)
    {
    Caso_Actual->Primer_Periodo_Desplegado = 0;
    Caso_Actual->Periodo_Actual = 0;
    Muestra_Nuevos_Datos();
    }
  else
    {
    Erase_Previous_Cursor_Position(0);
    Caso_Actual->Periodo_Actual = 0;
    Show_New_Cursor_Position();
    }

}
```

```
/* */
void Col_Prog_Window::Video_Tab_Key()
{
  if ((Caso_Actual->Primer_Periodo_Desplegado + 9) < Caso_Actual->Caso.Header.Contenido.NumReg)
  {
    Caso_Actual->Primer_Periodo_Desplegado +=5;
    Caso_Actual->Periodo_Actual = Caso_Actual->Primer_Periodo_Desplegado;
    Muestra_Nuevos_Datos();
  }
  else
  {
    if (Caso_Actual->Primer_Periodo_Desplegado < (Caso_Actual->
           Caso.Header.Contenido.NumReg - 5))
    {
      Caso_Actual->Primer_Periodo_Desplegado = Caso_Actual->
              Caso.Header.Contenido.NumReg - 5;
      Caso_Actual->Primer_Periodo_Desplegado = Caso_Actual->
              Primer_Periodo_Desplegado;
      Muestra_Nuevos_Datos();
    }
    else
    {
      Erase_Previous_Cursor_Position(0);
      Caso_Actual->Periodo_Actual = Caso_Actual->Caso.Header.Contenido.NumReg
              - 1;
      Show_New_Cursor_Position();
    }
  }
}

/* */
void Col_Prog_Window::Video_Shift_Tab_Key()
{
  if ((Caso_Actual->Primer_Periodo_Desplegado - 5) >= 0)
  {
    Caso_Actual->Primer_Periodo_Desplegado -= 5;
    Caso_Actual->Periodo_Actual = Caso_Actual->Primer_Periodo_Desplegado;
    Muestra_Nuevos_Datos();
  }
  else
  {
    if (Caso_Actual->Primer_Periodo_Desplegado > 0)
    {
      Caso_Actual->Primer_Periodo_Desplegado = 0;
      Caso_Actual->Periodo_Actual = 0;
      Muestra_Nuevos_Datos();
    }
    else
    {
      Erase_Previous_Cursor_Position(0);
      Caso_Actual->Periodo_Actual = 0;
      Show_New_Cursor_Position();
    }
  }
}

/* */
```

```
void Col_Prog_Window::Despliega_Rows()
{
 Word Start, Stop, Cursor;

if (Environment == LAYOUT)
 {
   Start = Vars.CurrSS.Sections[Section].ScreenBlock.Start.Row;
   Stop = Vars.CurrSS.Sections[Section].ScreenBlock.Stop.Row;
   Cursor = Vars.CurrSS.Sections[Section].CurrPos.Row;
   if ((Caso_Actual->Fila_Superior_Mostrada < 17) ||
     (Caso_Actual->Fila_Superior_Mostrada < 19))
    {
     Vars.CurrSS.Sections[Section].ScreenBlock.Start.Row = 1;
     Vars.CurrSS.Sections[Section].ScreenBlock.Stop.Row = 20;
    }
   else
    if ((Caso_Actual->Fila_Superior_Mostrada < 34) ||
       (Caso_Actual->Fila_Superior_Mostrada < 38))
     {
       Vars.CurrSS.Sections[Section].ScreenBlock.Start.Row = 21;
       Vars.CurrSS.Sections[Section].ScreenBlock.Stop.Row = 40;
     }
    else
     if ((Caso_Actual->Fila_Superior_Mostrada < 51) ||
        (Caso_Actual->Fila_Superior_Mostrada < 57))
      {
        Vars.CurrSS.Sections[Section].ScreenBlock.Start.Row = 41;
        Vars.CurrSS.Sections[Section].ScreenBlock.Stop.Row = 60;
      }
     else
      if ((Caso_Actual->Fila_Superior_Mostrada < 68) ||
         (Caso_Actual->Fila_Superior_Mostrada < 76))
       {
         Vars.CurrSS.Sections[Section].ScreenBlock.Start.Row = 61;
         Vars.CurrSS.Sections[Section].ScreenBlock.Stop.Row = 80;
       }
     Vars.CurrSS.Sections[Section].CurrPos.Row = Caso_Actual->Campo_Actual -
     Caso_Actual->Fila_Inferior_Mostrada + ((COMPILAR == 16)?2:1) +
     Vars.CurrSS.Sections[Section].ScreenBlock.Start.Row;
    Vars.CurrSS.DisplayRows();
    Vars.CurrSS.Sections[Section].ScreenBlock.Start.Row = Start;
    Vars.CurrSS.Sections[Section].ScreenBlock.Stop.Row = Stop;
    Vars.CurrSS.Sections[Section].CurrPos.Row = Cursor;
 }

}

/* */ int Col_Prog_Window::Sure_Want_Quit()
{
 BWINDOW *Signal;
 Word Answer;
 int mode, columns, active_page;

if (Keypress != ESC)
  return 1;
 Signal = wncreate(1,32,REVERSE);
```

```c
location.dev = scmode(&mode,&columns,&active_page);
location.page = active_page;
border.type = BBRD_DDDD;
border.attr = WHITE;
location.corner.row = 12;
location.corner.col = 24;
wnselect(Signal);
wnattr(WHITE,RED);
wnwrbuf(0,0,32," Sure you want Quit (Y/N) ? (N) ",-1,-1,CHARS_ONLY);
wnwrbuf(0,29,1,"N",RED,-1,CHARS_ONLY);
wndsplay(Signal,&location,&border);
border.type = BBRD_NO_BORDER;
while (!kbhit());

Answer = GetKey();
if ((Answer == 'y') || (Answer == 'Y'))
   {
   wnwrbuf(0,29,1,"Y",RED,-1,CHARS_ONLY);
   for( Answer = 0; Answer < 200; ++ Answer);
   Answer = 0;
   }
else Answer = 1;
wnremove(Signal);
wndstroy(Signal);
return Answer;
}
```

```
*================================================*

*============*
* FILE: PATENTE.H *
*============*

/*------------------------------------------------
   PROGRAMMABLE SPREADSHEET ENVIRONMENTS AND SYNERGISTIC INTEGRATION OF
   SPREADSHEET AND DATABASE DATA STRUCTURES

Global constants definitions.

--------------------------------------------------*/ define CAP  1
define ANS  0       /* Marks for cells that will be saved in the
                        CAP file or in the ANS file */ define CELL_CURSOR    1
define COLUMN_CURSOR  2 /* Cursor types available in Col_Prog_Window */

/* The following statements contain global type
                 definitions for all program modules */
typedef enum {TRUE=1,FALSE=0} boolean;
typedef enum {GEN_PROG=1,SCRATCH=0} Section_Type;
typedef enum {APPLICATION=1,LAYOUT=0} Environment_Type;
typedef char Hilera13[9];

typedef Hilera13 *Arreglo_Hileras;

struct Mark {
    int Value: 1;    /* Structure Mark may contain values ANS=0 or
                        CAP=1, indicating in which file will the cell
                        be saved */
```

```
/* ----------------------------------------------------------------
   The following statements represent a structure used to read and write a
   new record from a Desc_db file. */ struct ABC{
         char Largo[41];
         char Simbolo;
         };

union Tipo_Nombres{
         ABC Info;
         char StrInfo[42];
         };

/* ----------------------------------------------------------------
   The following statements represent a structure for each field in a Case_db
   record. The Case_db files and records have been made compatible to the
   dBASE III format. However, this program may use records with more fields
   than are acceptable in dBASE III or dBASE IV files. */
struct Descrip_Campo {
         char      Nombre[11];    //
         unsigned char    Tipo;         //
         unsigned long    Reservado12_15; //
         unsigned char    LongCamp;     //
         unsigned char    LongDecimal;  //
         unsigned int Reservado18_19; //
         long double      Reservado20_29; //
         unsigned int     Reservado30_31; //
         };

/* ----------------------------------------------------------------
   The following Union statement represents a node from a the case_db file
   fields list. This node contains information about that field's attributes,
   such as type and size. This union is used to speed up read and write
   operations, by executing them byte by byte. */ union Lista_Campos {
         Descrip_Campo Info;
         char HileraInfo[32];
         };

/* ----------------------------------------------------------------
   A list bype BUFFER is associated to each active Case_db file. This list
   contains one node for each field in the Active_case db file. */ struct Buffer {
         float  Vfloat;
         char   *Valor;  /* Value for the ith-field in BUFFER */
         Buffer *Prox;   /* Pointer to next field in BUFFER */
         };

/* ----------------------------------------------------------------
```

Type BASE defines the most important attributes in a Case_Db file compatible
to dBASE files. Each variable of this type will identify a Case_db file,
to which a BUFFER of size 1 will be assigned when the associated Case_db
file becomes active. */

```c
struct Header_Type {
        unsigned char   Info;       /* Version number */
        unsigned char   Fecha0;     /* Month */
        unsigned char   Fecha1;     /* Day */
        unsigned char   Fecha2;     /* Time when file was last saved */
        unsigned long   NumReg;     /* Number of records in file */
        unsigned int    LongRegId;  /* File header's length */
        unsigned int    LongReg;    /* Record's length */
        unsigned int    Reservado12_13; /* Reserved bytes */
        unsigned char   TransAbort; /* Aborted transactions */
        unsigned char   ContCod;    /** Codified contents */ char    Nombres_Asociados[12];
            /* Reserved for LAN use, but temporarily used here
               to hold the associated Desc_db file's name */ unsigned long   Reservado28_31; /* Reserved bytes */
        };
```

/* ----------------------------------------------------------------
The following Union statement represents in one single type the most
important information in the Case_db file's Header. */

```c
union Compact_Header {
    char HileraContenido[32];
    Header_Type Contenido;
    };
```

/* ----------------------------------------------------------------
Structure operating all information contained in a Case_db file. This
contains the information in: Header, field's list, associated buffer,
name and pointer for the Case_db file, and name and pointer to the
associated Desc_db file. */

```c
struct Base {
    Compact_Header Header;      /* Header's information */
    Lista_Campos * Campos;      /* List containing each field's
                                   description */
    unsigned char Carac_Final;  /* Character 0x0D indicating
                                   the Header's end */

/* Additional Header's variables. These variables are
               not part of a dBASE compatible file */

Buffer    * BufferBase;     /* Buffer associated to the
                                   Case_db file */
    FILE      * Archivo_BD;     /** Pointer to the Case_db file */
    char        Nombre_BD[15];  /** Name of the Case_db file */
    FILE      * Arch_Nombres;   /* Pointer to the Desc_db file */

Base(char *);  /* Constructor initializing the Case_db file's
                          Buffer and fields list */

/* -------------------------------
```

The next statements represent routines
for the operation of the Case_db Files */

```
boolean Baja_Header();   /* Record the Header of a new Case_db
                            file */
boolean Open_DB();       /* Activate a Case_db file */
boolean Close_DB();      /* Deactivate and close
                            the Active Case_db file */
boolean Go_To( int );    /* Move to the corresponding Case_db
                            record */
boolean Read_DB();       /* Read the next Case_db record */
boolean Write_DB(int);   /* Write BUFFER to the corresponding
                            Case_db record */
void Actualiza_Campo( char *, int, int);
                         /* Write to the Case_db file, the i-th
                            field of the j-th record. The
                            field and record numbers are the second and third int parameters. */
//
//
        void Return( Arreglo_Hileras, int );
                //
        void Write_Active(int , Arreglo_Hileras , int);
//
//
//
        void Transfer( Arreglo_Hileras);
//
//
//
//
        void Read_Period(Arreglo_Hileras, int , int , int );
                //
//
//
        int Jump( int );
                //
                //
        void Read_Current_And_Prev( int , Hilera13 *);
//
//
//
        void Write_Field( char * , int , int );
                //
        boolean Abre_Nombres(char *);
                //
//
        boolean Actualiza_Nombres(char *, char , int );
                //
                //
                //
        void Lee_Porcion_Nombres(ABC **, int , int );
        };

//
//
//
boolean printbytes(FILE * , char *, int);

//
```

```
//
//
boolean readbytes(FILE * ,void * , int);

//
void Completa_Blancos(char *, int );

//
void Elimina_Blancos(char *);

//
//
void Insertar(char * , char * , int );

//
//
//
//
// struct Marca_Periodo {
        unsigned Calc   : 1; //
                    // unsigned Protect : 2; //
                    //
                    //
};
//
// struct Lista_Bases {
        Base    Caso;       //
        Mark    * Mark_Cell;   //
        ABC     * Nombres;     //
        Marca_Periodo * Periodo_Status; //
                                // int     Primer_Periodo_Desplegado; //
                    //
                    // int     Periodo_Activo;  //
                    // int     Periodo_Actual;  //
                    // int     Campo_Actual;   //
                                //
     int        Campo_Anterior;  //

. int Fila_Inferior_Mostrada; //
       int Fila_Superior_Mostrada; // int Tipo_Cursor;  //
                    //
    int Primera_Vez;  //
    int Desplegados;
```

```
        Lista_Bases     *Siguiente_Caso;

//
        //
        Lista_Bases(char *);

void Lee_Nombres()   //
        {  Caso.Lee_Porcion_Nombres(&Nombres,Fila_Inferior_Mostrada,Fila_Superior_Mostrada); }

//
        void Inicializa_Filas_Mostradas(int& , int&);

//
          //
        void Lectura_Parcial( Arreglo_Hileras Sub_Lista, int No_Periodo)
        {  Caso.Read_Period( Sub_Lista, Fila_Inferior_Mostrada, Fila_Superior_Mostrada, No_Periodo); }

//
          //
          //
          //
        void Write_Active_Record( Arreglo_Hileras Values, int Size)
        {  Caso.Write_Active( Periodo_Activo, Values, Size); }

//
            //
            //
            //
        void Read_Current_Record( Hilera13 *Tempo)
        {      Caso.Read_Current_And_Prev( (Periodo_Actual == 0)?1:Periodo_Actual , Tempo ); }

//
            //
            //
        void Read_Previous_Record(Hilera13 *Tempo)
        {  Caso.Read_Current_And_Prev( (Periodo_Actual == 0)?0:(Periodo_Actual-1) , Tempo ); }

//
            //
            //
        void Modify_Field( char * NewValue)
        {  Caso.Write_Field( NewValue, Campo_Actual, Periodo_Actual); }

//
        ~Lista_Bases();
        };

//
//
struct Col_Prog_Window {
        char        Nombre[15];    //
      . Lista_Bases  * Primer_Caso;  //
        Lista_Bases  * Caso_Actual;  //
        BWINDOW      * Text_Window,
                     * Data_Window,
                     * Header_Window,  //
                     * Botton_Window;
        WHERE       location;
        BORDER      border;
```

```
Block      * Col_Prog_Range;
Block      * Col_Prev_Range;
boolean    Time_Based;      //

//
        //
Lista_Bases * Busca_Caso(Lista_Bases **Anterior,long *Numero);
void Modify_Time_Based();
void Modify_Active_Case();
void Modify_Cases();
void Elimina_Caso(long Numero);
void Baja_Marcas();
void Sube_Marcas();
    void Define_Id();
    Lista_Bases * Assigned_Case_Dbf( int );
    void Assign_Case_Dbf();
        //
    void Agrega_Caso(char *);
        //
    Col_Prog_Window(char *);
-Col_Prog_Window();
        //
        //
//
    void Crea_Ventanas_Presentacion();
        //
void Despliega_Ventanas_General(char);
    void Despliega_Ventanas( char );
void Despliega_Ventanas_Datos();
    //
    //
void Destruye_Ventanas(char);
    //
    //
void Remover_Ventanas(char);
    //
    //
void Cambia_Formatos_Pantalla(char);
    //
    //
    //
void Display_Period_Status(char, int);
    //
    //
    //
void Display_New_Value(Hilera13 ,char);
        //
        //
    void Escribe_Textos_Ventanas();
        //
        //
        //
    void Process_Video();
        //
    void Process_Change_Case();
        //
        //
    void Llena_Primera_Pantalla();
        //
    void Lectura_Primeros_Datos();
        //
```

```
        //
    void Despliega_Rows();
    int Sure_Want_Quit();
        void Process_Formula_Edit();

void Process_Mark_Record();
        void Process_Calc();
        void Process_Full_Calc();
        void Process_Field_Input( char );
    void Video_End_Key();
    void Video_Home_Key();
    void Video_Tab_Key();
    void Video_Shift_Tab_Key();
        void Move_Cursor_Horizontal( char );
        void Move_Cursor_Vertical( char );
        void Move_Cursor_Page_Up();
        void Move_Cursor_Page_Down();
        void Escribe_Datos( Hilera13 *, char, int);
        void Erase_Previous_Cursor_Position( char );
        void Show_New_Cursor_Position( );
        void Find_Next_Input_Field( char );
        void Muestra_Nuevos_Datos();
        void Cambia_Status_Period();
        void Muestra_Column_Cursor( char );
        void Pone_Command_Line( char );
        void Revisa_Celdas(char);
    void Define_Data_Cells_And_Formulas();
    void Free_Cases();
    void Close_And_Quit();
    };

//
//
void Initiate();

//
void Define_Col_Prog_Window();

//
void User_Select_Id_File( int& );
void Define_Data_And_Permanent_Cells();
void Define_Formulas();

//
//
void Select_Section();
void Select_Environment();
void Select_Window();
```

* ================================================ *

* ================== *
* FILE: DEFINES.CPP *
* ================== *

```
#define SP_PERIOD    0
#define DB_PERIOD    1
#define PR_PERIOD    2
#define DOWN         1
#define UP           0
```

```
#define FORMULA_EDIT_KEY    F2
#define MARK_RECORD_KEY     F5
#define CHANGE_CASE_KEY     F6
#define ENVIRONMENT_KEY     F7
#define SECTION_KEY         F8
#define CALC_KEY            F9
#define WINDOW_KEY          AltF7
#define FULL_CALC_KEY       AltF9
#define VIDEO_CONTROL_KEY   LEFT_ARROW:\
            case RIGHT_ARROW:\
            case UP_ARROW:\
            case DOWN_ARROW:\
            case PAGE_UP:\
            case PAGE_DOWN:\
            case END_KEY:\
            case HOME_KEY:\
            case TAB_KEY:\
            case SHIFT_TAB_KEY define QUIT_KEY        ESC
define LEFT_ARROW      LeftKey
#define RIGHT_ARROW     RightKey
#define UP_ARROW        UpKey
#define DOWN_ARROW      DownKey
#define PAGE_UP         PgUpKey
#define PAGE_DOWN       PgDnKey
#define ENTER_KEY       CR
#define END_KEY         EndKey
#define HOME_KEY        HomeKey
#define TAB_KEY         TabKey
#define SHIFT_TAB_KEY   STabKey
#define ANY_INPUT_KEY   EstaEn(Keypress,30,255)

define COMPILAR        18 define COLUMN(a)       (a - Caso_Actual->Primer_Periodo_Desplegado + 1)

define COLUMN1(a)      (COLUMN(a) * 10 + 1)

#define COLUMN2(a)      ((COLUMN(a) + 1) * 10 - 1)

#define COLUMN3(a)      (COLUMN(a) * 10 + 1)

#define FILA_AMBIENTE   (Environment == LAYOUT)?(FILA1 + SEGUN_1):(FILA1 + SEGUN_2)

#define SEGUN_1         ((COMPILAR == 16)?3:2)

#define SEGUN_2         ((COMPILAR == 16)?2:0)

#define FILA1           (i - Caso_Actual->Fila_Inferior_Mostrada)

#define FILA_AMBIENTE_2 (Environment == LAYOUT)?(FILA2 + SEGUN_1):(FILA2 + SEGUN_2)

#define FILA2           (Caso_Actual->Campo_Anterior - Caso_Actual->Fila_Inferior_Mostrada)

#define FILA_AMBIENTE_3 (Environment == LAYOUT)?(FILA3 + SEGUN_1):(FILA3 + SEGUN_2)

#define FILA3           (Caso_Actual->Campo_Actual - Caso_Actual->Fila_Inferior_Mostrada)

#define INCREMENTO      ((Caso == -1)?5:-1)
```

```c
#define COLOR_LETRAS(a)    (((Caso_Actual->Periodo_Status[a].Protect == 2)?(Environment ==
LAYOUT?SC_WHITE:WHITE):COLOR_LETRAS_1)

#define COLOR_LETRAS_1    ((Environment ==
LAYOUT)?(Celda_Actual?SC_CYAN:SC_WHITE):(Celda_Actual?SC_BLACK:WHITE))

#define COLOR_FONDO(a)    (((Caso_Actual->Periodo_Status[a].Protect == 2)?SC_BLUE:COLOR_FONDO_1)

#define BACK_COLOR    ((MARKING_RECORDS == 0)?((Environment == LAYOUT)?SC_BLUE:WHITE):SC_WHITE)

#define FORE_COLOR    ((MARKING_RECORDS == 0)?((Environment ==
LAYOUT)?SC_WHITE:SC_BLUE):SC_RED)

#define COLOR_FONDO_1    ((Environment == LAYOUT)?SC_BLUE:(Celda_Actual?SC_WHITE:SC_BLUE))

define JUST_SCROLL    (Caso == -1)?RIGHT_SCROLL:LEFT_SCROLL define RIGHT_SCROLL    ((Caso_Actual->Periodo_Actual - Caso_Actual->Primer_Periodo_Desplegado) < 4)?1:0 define LEFT_SCROLL    ((Caso_Actual->Periodo_Actual - Caso_Actual->Primer_Periodo_Desplegado) > 0)?1:0 define FUNCTION_KEY    ((Last.Key == 60) || (Last.Key == 63) ||\
                        (Last.Key == 64) || (Last.Key == 67) ||\
                        (Last.Key == 67) || (Last.Key == 112))?1:0 define CURSOR_KEY    ((Last.Key == 72) || (Last.Key == 73) ||\
                      (Last.Key == 75) || (Last.Key == 77) ||\
                      (Last.Key == 80) || (Last.Key == 81))?1:0 define DEFINE_TAMANO    (Environment == LAYOUT)?26:30 define DEFINE_COLUMNA    (Environment == LAYOUT)?4:0 define DEFINE_FILA    (Environment == LAYOUT)?2:3 define QUE_PANTALLA    (Environment == LAYOUT)?Botton_Window:Header_Window define STATUS_PERIODO(a) (Caso_Actual->Periodo_Status[a].Protect ==
2)?"--":((Caso_Actual->Periodo_Status[a].Protect == 1)?"\x1e":((a == Caso_Actual->Periodo_Activo)?"[?¿]":" "))

#define PENDIENTE_CALCULO(a) (Caso_Actual->Periodo_Status[a].Calc == 1)?" ........
":"[?¿][?¿][?¿][?¿][?¿][?¿][?¿][?¿][?¿][?¿]"

#define DEPENDE_ENVIRONMENT (Environment == LAYOUT)?0:20
```

```
*=================================================*

*=================*
* FILE: PTCASO.CPP *
*=================*

/* */

//
//
extern "C"
{
# include <bwindow.h>
}

//
```

```
//
#include <stdio.h>
include <string.h>
#include <stdlib.h>
#include <io.h>
#include <conio.h>
#include <dos.h>
#include <alloc.h>

//
//
#include "TCUtil.h"
#include "TCHash.h"
#include "TCCell.h"
#include "TCWindow.h"
#include "TCSheet.h"

//
#include "PATENTE.H"

//
//
Base::Base(char *NombreCaso)
{
    int x;

Campos = NULL;
    strcpy(Nombre_BD,NombreCaso);
    x=0;
    while ((Nombre_BD[x] != '.') && (Nombre_BD[x] != '\0'))
        x++;
    if (Nombre_BD[x] != '.')
        strcat(Nombre_BD,".dba");
}

//
//
boolean Base::Open_DB()
{
    int Cont;
    Buffer *BAux;
    char Temporal[35];

if ((Archivo_BD = fopen(Nombre_BD,"rb+")) == NULL) //
        return(FALSE);
    else
    {   //
        if (readbytes(Archivo_BD,Header.HileraContenido, 32) == FALSE)
            return(FALSE);
        if (Abre_Nombres(Header.Contenido.Nombres_Asociados) == NULL)
            return(FALSE);
        if ((Campos = (Lista_Campos *)calloc((Header.Contenido.LongRegId-33)/32,sizeof(Lista_Campos))) == NULL)
            return(FALSE);
        BufferBase = BAux = NULL;
        Cont = 0;
    //
        while (Cont < (Header.Contenido.LongRegId-33)/32)
        {
            if (readbytes(Archivo_BD,Campos[Cont].HileraInfo,32) == FALSE)
            { //
                free(Campos);
```

```
                return(FALSE);
            }
        else
        { //
            if (BufferBase == NULL)
            {
                if ((BufferBase = BAux = (Buffer *)malloc(sizeof(Buffer))) == NULL)
                { //
                    free(Campos);
                    return(FALSE);
                }
                if ((BAux->Valor = (char *)calloc(Campos[Cont].Info.LongCamp+1,
                    sizeof(char))) == NULL)
                { //
                    free(Campos);
                    free(BufferBase);
                    return(FALSE);
                }
                BAux->Vfloat = 0;
                BAux->Prox = NULL;
            }
            else
            {
                if ((BAux->Prox = (Buffer *)malloc(sizeof(Buffer))) == NULL)
                { //
                  free(Campos);
                  while (BufferBase != NULL)
                  {
                      BAux = BufferBase;
                      BufferBase = BufferBase->Prox;
                      free(BAux);
                  }
                  return(FALSE);
                }
                BAux = BAux->Prox;
                if ((BAux->Valor = (char *)calloc(Campos[Cont].Info.LongCamp+1,
                sizeof(char))) == NULL)
                { //
                  free(Campos);
                  while (BufferBase != NULL)
                  {
                      BAux = BufferBase;
                      BufferBase = BufferBase->Prox;
                      free(BAux);
                  }
                  return(FALSE);
                }
                BAux->Vfloat = 0;
                BAux->Prox = NULL;
            }
        }
        Cont++;
    }
  } .
  Cont = fgetc(Archivo_BD); //
  return(TRUE);
}

//
boolean Base::Close_DB()
{
```

```
        Buffer *BAux;
    unsigned long memo;

memo = coreleft();
     fseek(Archivo_BD,0l,2);
memo = coreleft();
     fclose(Archivo_BD);    //
memo = coreleft();
     fclose(Arch_Nombres);  //
memo = coreleft();
     free(Campos);
memo = coreleft();
     while (BufferBase != NULL) //
        {              //
memo = coreleft();
        BAux = BufferBase;
        BufferBase = BufferBase->Prox;
        free(BAux->Valor);
memo = coreleft();
        free(BAux);
memo = coreleft();
        }
memo = coreleft();
     Archivo_BD = NULL;
     Arch_Nombres = NULL;
     return(TRUE);
}

//
boolean Base::Go_To( int Objetivo )
{
  long Pos;

Pos = Objetivo;
  if ((Header.Contenido.LongRegId+(Header.Contenido.LongReg*(Pos))) < filelength(fileno(Archivo_BD)))
     {         //
          Pos = (Header.Contenido.LongRegId+(Header.Contenido.LongReg*(Pos)));
          if (fseek(Archivo_BD,Pos,0) != 0) //
               return(FALSE);
          else
               return(TRUE);
     }
  else
          return(FALSE);
}

//
boolean Base::Read_DB()
{
  Buffer *BAux;
  int Cont=0;
  char flag;

BAux = BufferBase;
  if ((flag=fgetc(Archivo_BD)) == ' ') //
        while (BAux != NULL)      //
        {  //
            if (readbytes(Archivo_BD,BAux->Valor,Campos[Cont].Info.LongCamp) ==
               FALSE)
                    return(FALSE);
            else
```

```
            {
                    BAux->Valor[Campos[Cont].Info.LongCamp] = '\0';
                    BAux->Vfloat = atof(BAux->Valor);
            }
            BAux = BAux -> Prox;
            Cont++;
        }
    else
        return(FALSE);
    return(TRUE);
}

//
//
boolean Base::Write_DB(int Limit)
{
    Buffer *BAux;
    int Cont;

BAux = BufferBase;
    Cont = 0;
    if (fputc(' ',Archivo_BD) == FALSE)   //
        return(FALSE);              //
    while ((BAux != NULL) && (Cont <= Limit))
    {  //
       if (printbytes(Archivo_BD,BAux->Valor,Campos[Cont].Info.LongCamp) == FALSE)
            return(FALSE);
       BAux = BAux -> Prox;
       Cont++;
    }
    fflush(Archivo_BD);   //
            //
    return(TRUE);
}

//
//
void Base::Write_Field( char *NewValue, int NumField, int NumRegister)
{
    Buffer *BAux;
    int Cont = 0,Salto;
    char *StrAux;

BAux = BufferBase;
    while ((BAux != NULL) && (Cont != NumField))
    {
        BAux = BAux->Prox;
        Cont++;
    }
    if (BAux != NULL)
    {
        Go_To(NumRegister);
        Salto = Jump(NumField);
        fseek(Archivo_BD,Salto,SEEK_CUR);
        StrAux = (char *)calloc(Campos[Cont].Info.LongCamp+1,sizeof(char));
        NewValue[Campos[Cont].Info.LongCamp] = '\0';
        strcpy(StrAux,NewValue);
        while (strlen(StrAux) < Campos[Cont].Info.LongCamp)
            Insertar(StrAux," ",0);
        printbytes(Archivo_BD,StrAux,Campos[Cont].Info.LongCamp);
```

```
        free(StrAux);
     }
}

//
//
//
void Base::Return(Arreglo_Hileras Periodo, int Limit)
{
    Buffer *BAux;
    int i=0,Aux;
    char Str[20];

BAux = BufferBase;
    while ((BAux != NULL) && (i <= Limit))
    {
        strcpy(BAux->Valor,Periodo[i++]);
/*      gcvt(Periodo[i] ,12,Str);
        strcpy(BAux->Valor,Str);
        Aux=0;
        while ((BAux->Valor[Aux] != '.') && (BAux->Valor[Aux] != '\0'))
               Aux++;
        Aux += 3;
        BAux->Valor[6] = '\0';
        while (Aux < Campos[i].Info.LongCamp)
        {
            Insertar(BAux->Valor," ",0);
            Aux++;
        }
        i++; */
        BAux = BAux->Prox;   //
    }
}

//
//
//
void Base::Write_Active(int No_Periodo, Arreglo_Hileras Values, int Size)
{
    Return(Values,Size);
    Go_To(No_Periodo);
    Write_DB(Size);
}

//
//
//
void Base::Transfer(Arreglo_Hileras Periodo)
{
    Buffer *BAux;
    int i=0;

BAux = BufferBase;
    while (BAux != NULL)
    {
        strcpy(Periodo[i++],BAux->Valor);
        BAux = BAux->Prox;
    }
}

//
```

```
//
//
void Base::Read_Period(Arreglo_Hileras Sub_Lista, int Fila_Inicio, int Fila_Final, int No_Periodo)
{
    Buffer *BAux;
    int Cont,Toca=0,Salto;
    long Pos;
    char *StrAux;

Salto = Jump(Fila_Inicio);
    //
    Pos = (long)No_Periodo;
    Pos = (Header.Contenido.LongRegId+(Header.Contenido.LongReg*Pos))+Salto;
    fseek(Archivo_BD,Pos,0);
    BAux = BufferBase;
    Cont = 0;
    while (BAux != NULL)
    {
      if ((Cont >= Fila_Inicio) && (Cont <= Fila_Final))
      {
            StrAux = (char *)calloc(Campos[Cont].Info.LongCamp+1,sizeof(char));
            if (readbytes(Archivo_BD,StrAux,Campos[Cont].Info.LongCamp) == FALSE)
                ;
            else
            {
                    StrAux[Campos[Cont].Info.LongCamp] = '\0';
                    strcpy(Sub_Lista[Toca++],StrAux);
            }
            free(StrAux);
      }
      else
           if (Cont > Fila_Final)
                   break;
      Cont++;
      BAux = BAux->Prox;
    }
}

//
//
int Base::Jump(int Campo)
{
    Buffer *BAux;
    int Cont,Salto;

BAux = BufferBase;
    Cont = 0;
    Salto = 0;
    while (BAux != NULL)
    {
        if (Cont != Campo)
            Salto += Campos[Cont].Info.LongCamp;
        else
            break;
        BAux = BAux -> Prox;
        Cont++;
    }
    Salto++;
    return(Salto);
}
```

```
//
//
//
//
void Base::Read_Current_And_Prev(int No_Periodo, Hilera13 *Values)
{
//     Arreglo_Hileras Values = (Arreglo_Hileras )calloc((Header.Contenido.LongRegId-33)/32,sizeof(Hilera13));
    unsigned long memo;

memo = coreleft();
      Go_To(No_Periodo);
memo = coreleft();
      Read_DB();
memo = coreleft();
      Transfer(Values);
memo = coreleft();
//    return(Values);
}
```

```
*=====================================================*

*=================*
* FILE: PTNOMBRE.CPP *
*=================*

//
//
// extern "C"
{
# include <bwindow.h>
} include <stdio.h>
include <string.h>
#include <stdlib.h>
#include "TCUtil.h"
#include "TCHash.h"
#include "TCCell.h"
#include "TCWindow.h"
#include "TCSheet.h"
#include "PATENTE.H"

//
boolean Base::Abre_Nombres(char *Nombre)
{
    if ((Arch_Nombres=fopen(Nombre,"r+")) == NULL)
         return(FALSE);
    return(TRUE);
}

//
boolean Base::Actualiza_Nombres(char *Largo, char Simbolo, int No_Reg)
{
    Tipo_Nombres Modificado;

//
    strcpy(Modificado.Info.Largo,Largo);
    Completa_Blancos(Modificado.Info.Largo,40-strlen(Modificado.Info.Largo));
    Modificado.Info.Simbolo = Simbolo;
```

```cpp
        //
        fseek(Arch_Nombres,(No_Reg*42),0);
        //
        return(printbytes(Arch_Nombres,Modificado.StrInfo,42));
}

//
//
//
void Base::Lee_Porcion_Nombres(ABC **Sub_Lista, int F_Inicio, int F_Final)
{
    int i,j,k;
    char Lectura[55];

*Sub_Lista = (ABC *)calloc((F_Final-F_Inicio)+1,sizeof(ABC));
        //
    fseek(Arch_Nombres,(F_Inicio*42),0);
        //
    for (i=0;i<=(F_Final-F_Inicio);i++)
    {
        readbytes(Arch_Nombres,Lectura,42);
        for (j=0;j<41;j++)
            (*Sub_Lista)[i].Largo[j] = Lectura[j];
        Elimina_Blancos((*Sub_Lista)[i].Largo);
        (*Sub_Lista)[i].Simbolo = Lectura[j];
    }
}

*===============================================*

*=================*
* FILE: PTUTIL2.CPP *
*=================*

// extern "C"
{
# include <bwindow.h>
} include <stdio.h>
include <math.h>
#include <stdlib.h>
#include <string.h>
include <io.h>
#include "TCUtil.h"
#include "TCHash.h"
#include "TCCell.h"
#include "TCWindow.h"
#include "TCSheet.h"
#include "PATENTE.H"

//
//
boolean printbytes(FILE *BaseAct,char *Hilera,int Limite)
{
    if (fwrite(Hilera,sizeof(char),Limite,BaseAct) == -1)
        return(FALSE);
    return(TRUE);
```

```
boolean readbytes(FILE *BaseAct,void *Hilera, int Limite)
{
    if (fread(Hilera, Limite, 1, BaseAct) == -1)
            return(FALSE);
    return(TRUE);
} void Completa_Blancos(char *Hilera,int Numero)
{
    int i;

for (i=0;i<Numero;i++)
        strcat(Hilera," ");
}

//
void Elimina_Blancos(char *Hilera)
{
    while (Hilera[strlen(Hilera)-1] == ' ')
        Hilera[strlen(Hilera)-1] = '\0';
}

//
//
void Insertar(char *Str, char *SubStr, int Pos)
{
    memmove(Str+Pos+strlen(SubStr),Str+Pos,strlen(Str)-Pos+1);
    memcpy(Str+Pos,SubStr,strlen(SubStr));
}
```

*=====================================*

*==============*
* FILE: PTWINDOW.CPP *
*==============*

```
//
//
//

//
//
extern "C"
{
# include <bwindow.h>
}

//
//
#include <dos.h>
#include <stdio.h>   //
                     //
#include <string.h>  //
#include <stdlib.h>  //
                     //
                     //
```

```c
#include <alloc.h>

//
//
//
#include "TCUTIL.H"   //
#include "TCHASH.H"   //
                     //
                     //
#include "TCMENU.H"   //
#include "TCCELL.H"   //
                     //
#include "TCWINDOW.H"//
                     //
#include "TCSHEET.H"  //
                     //
#include "TCRUN.H"    //
                     //
#include "TCINPUT.H"
#include "PATENTE.H"  //
                     //

//
//
extern ProgramObject   Vars;      //
                                  //
extern CentralMenu ApplicationMenu; //
                                  //
extern HorizontalMenu MainMenu;   //
extern Environment_Type Environment;//
                                  //
extern Section_Type    Section;   //
extern boolean         Window;    //
                                  //
extern Col_Prog_Window *Window1;  //
                                  //
extern Hilera13 Tempo[100];

extern Boolean LeeRango(String , Block& , Boolean , BlockPtr );

//
//
void Initiate()
{ union REGS Reg;

Reg.x.ax = 0X1003;
    Reg.x.bx = 0X0;
    int86(0X10, &Reg, &Reg);
    Section = GEN_PROG;          //
    Environment = LAYOUT;        //
    Window = FALSE;              //

Define_Col_Prog_Window();    //
    Define_Data_And_Permanent_Cells();
                                 //
                                 //
    Define_Formulas();           //
                                 //
    Vars.CurrSS.Update(0);       //
    Window1->Llena_Primera_Pantalla();
                                 //
```

```
                //
}
//
void Define_Col_Prog_Window()
{
    int Id_File;

Window1 = new Col_Prog_Window("WINDOW1"); //
                                              //
    Window1->Col_Prog_Range = new Block(184, 1, 184, 55);
                                              //
    Window1->Time_Based = TRUE;       //
    if (Window1->Time_Based)          //
        Window1->Col_Prev_Range = new Block(183, 1, 183, 55);
    Window1->Assign_Case_Dbf();       //
    User_Select_Id_File(Id_File);     //
                                      //
    Window1->Caso_Actual = Window1->Assigned_Case_Dbf(Id_File);
                                      //
                                  //
    Window1->Define_Id();         //
}

//
void Col_Prog_Window::Agrega_Caso(char *Nombre)
{                       //
    Lista_Bases *Nuevo_Nodo,**Temporal;  //

Nuevo_Nodo = new Lista_Bases(Nombre); //
                                          //
                                          //
                                          //
    Temporal = &Primer_Caso;        //
    while (*Temporal != NULL)       //
        Temporal = &((*Temporal)->Siguiente_Caso);
    *Temporal = Nuevo_Nodo;
}

//
//
void Col_Prog_Window::Assign_Case_Dbf()
{       //
        //

Agrega_Caso("APLICA");
    /*
    Agrega_Caso("CASO2");
    Agrega_Caso("CASO3");
    Agrega_Caso("CASO4");
    */

}

//
//
//
//
void User_Select_Id_File(int& Id_File)
{
    Id_File = 0;
}
```

```
//
//
//
//
Lista_Bases * Col_Prog_Window::Assigned_Case_Dbf(int Id_File)
{
    Lista_Bases * Temporal;   //
    int Cont=0;

Temporal = Primer_Caso;   //
    while ((Temporal != NULL) && (Cont < Id_File))
    {
        Temporal = Temporal->Siguiente_Caso;
        Cont++;
    }
    Temporal->Caso.Open_DB();   //
 Temporal->Read_Previous_Record(Tempo);
    Vars.CurrSS.CopiaDeArreglo(Tempo,(Temporal->Caso.Header.Contenido.LongRegId-33)/32,*Col_Prev_Range)
;
 Temporal->Read_Current_Record(Tempo);
    Vars.CurrSS.CopiaDeArreglo(Tempo,(Temporal->Caso.Header.Contenido.LongRegId-33)/32,*Col_Prog_Range)
;
                             //
                             //
                             //
                 //
    return(Temporal);        //
                 //
}

//
//
//
void Col_Prog_Window::Define_Id()
{
    Caso_Actual->Periodo_Activo = 1;
}

//
//
//
//
//
/*
void Define_Data_And_Permanent_Cells()
{
  int i;  // for (i = Window1->Col_Prog_Range->Start.Row + 1;
       i <= Window1->Col_Prog_Range->Stop.Row; i += 2)
    Vars.CurrSS.DataCells.SetValues(Window1->Col_Prog_Range->Start.Col, i, 1);
}

//
//
//
void Define_Formulas()
{
 Vars.CurrSS.AgregaCelda2(184, 1, "GA1-GB2");
 Vars.CurrSS.AgregaCelda2(184, 3, "GA3+GB4");
 Vars.CurrSS.AgregaCelda2(184, 5, "GA5-GB6");
```

```
    Vars.CurrSS.AgregaCelda2(184, 7, "GA7+GB8");
    Vars.CurrSS.AgregaCelda2(184, 9, "GA9-GB10");
    Vars.CurrSS.AgregaCelda2(184, 11, "GA11+GB12");
    Vars.CurrSS.AgregaCelda2(184, 13, "GA13-GB14");
    Vars.CurrSS.AgregaCelda2(184, 15, "GA15+GB16");
    Vars.CurrSS.AgregaCelda2(184, 17, "GA17-GB18");
    Vars.CurrSS.AgregaCelda2(184, 19, "GA19+GB20");
    Vars.CurrSS.AgregaCelda2(184, 21, "GA21-GB22");
    Vars.CurrSS.AgregaCelda2(184, 23, "GA23+GB24");
    Vars.CurrSS.AgregaCelda2(184, 25, "GA25-GB26");
    Vars.CurrSS.AgregaCelda2(184, 27, "GA27+GB28");
    Vars.CurrSS.AgregaCelda2(184, 29, "GA29-GB30");
    Vars.CurrSS.AgregaCelda2(184, 31, "GA31+GB32");
    Vars.CurrSS.AgregaCelda2(184, 33, "GA33-GB34");
    Vars.CurrSS.AgregaCelda2(184, 35, "GA35+GB36");
    Vars.CurrSS.AgregaCelda2(184, 37, "GA37-GB38");
    Vars.CurrSS.AgregaCelda2(184, 39, "GA39+GB40");
    Vars.CurrSS.AgregaCelda2(184, 41, "GA41-GB42");
    Vars.CurrSS.AgregaCelda2(184, 43, "GA43+GB44");
    Vars.CurrSS.AgregaCelda2(184, 45, "GA45-GB46");
    Vars.CurrSS.AgregaCelda2(184, 47, "GA47+GB48");
    Vars.CurrSS.AgregaCelda2(184, 49, "GA49-GB50");
}
*/ void Define_Data_And_Permanent_Cells()
{
    Vars.CurrSS.DataCells.SetValues(Window1->Col_Prog_Range->Start.Col, 3, 1);
    Vars.CurrSS.DataCells.SetValues(Window1->Col_Prog_Range->Start.Col, 44, 1);
    Vars.CurrSS.DataCells.SetValues(Window1->Col_Prog_Range->Start.Col, 45, 1);
    Vars.CurrSS.DataCells.SetValues(Window1->Col_Prog_Range->Start.Col, 46, 1);
    Vars.CurrSS.DataCells.SetValues(Window1->Col_Prog_Range->Start.Col, 47, 1);
    Vars.CurrSS.DataCells.SetValues(Window1->Col_Prog_Range->Start.Col, 51, 1);
}

//
//
//
void Define_Formulas()
{
 Vars.CurrSS.AgregaCelda2(184, 5, "GB3*GX6");
 Vars.CurrSS.AgregaCelda2(184, 7, "GB3-GB5");
 Vars.CurrSS.AgregaCelda2(184, 9, "GX8*GA26/12");
 Vars.CurrSS.AgregaCelda2(184, 11, "GX13*GA31/12+GX17*GA32/12");
 Vars.CurrSS.AgregaCelda2(184, 13, "GB7-GB9-GB11");
 Vars.CurrSS.AgregaCelda2(184, 15, "GB13*GX10");
 Vars.CurrSS.AgregaCelda2(184, 17, "GB13-GB15");
 Vars.CurrSS.AgregaCelda2(184, 24, "GB27-GB26");
 Vars.CurrSS.AgregaCelda2(184, 25, "GA25-GB46");
 Vars.CurrSS.AgregaCelda2(184, 26, "GA26+GB51");
 Vars.CurrSS.AgregaCelda2(184, 27, "GB37");
 Vars.CurrSS.AgregaCelda2(184, 31, "GA31-GA31/GX14");
 Vars.CurrSS.AgregaCelda2(184, 32, "GA32-GA32/GX18");
 Vars.CurrSS.AgregaCelda2(184, 33, "GB31+GB32");
 Vars.CurrSS.AgregaCelda2(184, 35, "GA35+GB17");
 Vars.CurrSS.AgregaCelda2(184, 37, "GB33+GB35");
 Vars.CurrSS.AgregaCelda2(184, 43, "GB17");
 Vars.CurrSS.AgregaCelda2(184, 49, "GB43+GB44+GB45+GB46+GB47");
 Vars.CurrSS.AgregaCelda2(184, 53, "-(GA31/GX14+GA32/GX18)");
 Vars.CurrSS.AgregaCelda2(184, 55, "GB49+GB51+GB53");
```

```
} void Col_Prog_Window::Process_Change_Case()
{
    Hilera13 *Activo=(Hilera13
*)calloc(abs(Col_Prog_Range->Start.Row-Col_Prog_Range->Stop.Row)+1,sizeof(Hilera13));

Vars.CurrSS.CopiaAArreglo(Activo,(Caso_Actual->Caso.Header.Contenido.LongRegId-33)/32,*Col_Prog_Range,8);
    Caso_Actual->Write_Active_Record(Activo,abs(Col_Prog_Range->Start.Row-Col_Prog_Range->Stop.Row)+1);
    free(Activo);
    Caso_Actual->Caso.Close_DB(); //
                //
    if (Caso_Actual->Siguiente_Caso != NULL) //
        Caso_Actual = Caso_Actual->Siguiente_Caso;
    else
        Caso_Actual = Primer_Caso;
    Caso_Actual->Caso.Open_DB(); //
                //
    Caso_Actual->Read_Previous_Record(Tempo);
    Vars.CurrSS.CopiaDeArreglo(Tempo,(Caso_Actual->Caso.Header.Contenido.LongRegId-33)/32,*Col_Prev_Range);
    Caso_Actual->Read_Current_Record(Tempo);
    Vars.CurrSS.CopiaDeArreglo(Tempo,(Caso_Actual->Caso.Header.Contenido.LongRegId-33)/32,*Col_Prog_Range);
            //
    Cambia_Formatos_Pantalla(1);
}

//
//
void Col_Prog_Window::Free_Cases()
{
    Lista_Bases *Temporal; // while (Primer_Caso != NULL) //
    {
        Temporal = Primer_Caso->Siguiente_Caso;
        delete Primer_Caso;
        Primer_Caso = Temporal;
    }
}
//
//
void Col_Prog_Window::Close_And_Quit()
{
    Hilera13 *Activo=(Hilera13
*)calloc(abs(Col_Prog_Range->Start.Row-Col_Prog_Range->Stop.Row)+1,sizeof(Hilera13));

Vars.CurrSS.CopiaAArreglo(Activo,(Caso_Actual->Caso.Header.Contenido.LongRegId-33)/32,*Col_Prog_Range,8);
    Caso_Actual->Write_Active_Record(Activo,abs(Col_Prog_Range->Start.Row-Col_Prog_Range->Stop.Row)+1);
    free(Activo);
    Caso_Actual->Caso.Close_DB(); //
    delete Window1;        //
                //
}

//
void Select_Section()
```

```
{
 if (Section == GEN_PROG)
   {
     Section = SCRATCH;
     Window1->Remover_Ventanas(0);
     MainMenu.NumOps = 2;
     DisplayAll();
     //
     // Window1->Remover_Ventanas(0);
   }
 else
   {
       Section = GEN_PROG;
     Window1->Despliega_Ventanas_General(0);
     /*
     MainMenu.NumOps = 3;
     DisplayAll();
     //
     if (Window)
      {
         Window1->Despliega_Ventanas_General(1);
      }
     */

}
}

//
// void Select_Environment()
{ if (Environment == LAYOUT)
   {
       Environment = APPLICATION;
     /*
       if (!Window)
          ApplicationMenu.DespliegaMenu(); //
     */
   }
 else
   {
     Environment = LAYOUT;
     /*
       if (!Window) DisplayAll(); //
     */
   }
 Window1->Cambia_Formatos_Pantalla(2); //
                      //
                      //
                      //
}

// void Select_Window()
{
```

```
if (Window)
    Window = FALSE;
else
    Window = TRUE;
Window1->Despliega_Ventanas_General(0);

/*
if (Window)
{
    Window1->Despliega_Ventanas_General(1);
    Window1->Show_New_Cursor_Position();
}
else
{ if (Environment == APPLICATION)
        ApplicationMenu.DespliegaMenu(); //
    else
        DisplayAll();

//
}
*/
}

//
//
Col_Prog_Window::Col_Prog_Window(char *Nombre_Win)
{
    strcpy(Nombre,Nombre_Win);
    Primer_Caso = NULL;
    Caso_Actual = NULL;
    Text_Window = NULL;
    Data_Window = NULL;
    Header_Window = NULL;
    Botton_Window = NULL;
    Col_Prog_Range = NULL;
    Col_Prev_Range = NULL;
}

//
//
Col_Prog_Window::~Col_Prog_Window()
{
    Free_Cases();           //
                //
    Destruye_Ventanas(0);
    delete Col_Prog_Range;  //
    delete Col_Prev_Range;  //
}

//
//
Lista_Bases::Lista_Bases(char *BD_Nombre) : Caso(BD_Nombre)
{
    int i;  //

Caso.Open_DB();
    Mark_Cell = (Mark *)calloc((Caso.Header.Contenido.LongRegId-33)/32+1,sizeof(Mark));
    for(i=0;i<(Caso.Header.Contenido.LongRegId-33)/32;i++)
            Mark_Cell[i].Value = ANS;
```

```c
            Periodo_Status = (Marca_Periodo *)calloc(Caso.Header.Contenido.NumReg,sizeof(Marca_Periodo));
            for (i=0;i<Caso.Header.Contenido.NumReg;i++)
            {
                    Periodo_Status[i].Calc = 0;
                    Periodo_Status[i].Protect = 00;
            }
        Periodo_Status[0].Protect = 2;
            Primer_Periodo_Desplegado = 0;
            Periodo_Actual = 0;
            Periodo_Activo = 1;
            Campo_Actual = -1;
            Campo_Anterior = -1;
            Tipo_Cursor = CELL_CURSOR;
        Desplegados = 2;
            Primera_Vez = 1;
            Inicializa_Filas_Mostradas(Fila_Inferior_Mostrada,Fila_Superior_Mostrada);
            Siguiente_Caso = NULL;
            Caso.Close_DB();
}

//
Lista_Bases::~Lista_Bases()
{
    free(Mark_Cell);
    free(Periodo_Status);
}

//
//
//
//
Option ColProgOptions[5] = {{'C',"Col_Prog_Range"},
                {'P',"Col_Prev_Range"},
                {'L',"Cases List"},
                {'A',"Active_based"},
                {'B',"Time_based"}
                };

char *ColProgMessages[5] = {"Modify Col_Prog_Range" ,
                "Modify Col_Prev_Range",
                "Modify,delete and add some case to the case list",
                "Modify active case",
                "Modify Time_based attribute"};
//
//
//
Option CaseOptions[3]  = {{'M',"Modify Case"},
                {'A',"Add Case"},
                {'D',"Delete Case"}
                };

char *CaseMessages[3] = { "Modify the name of some case",
                "Add a new case to the case list",
                "Delete a case from the case list",
                };

//
HorizontalMenu ColProgMenu(ColProgOptions, 5, ColProgMessages);
HorizontalMenu CaseMenu(CaseOptions, 3, CaseMessages);
```

```
//
//
void Execute_Col_Prog_Menu()
{
   switch(ColProgMenu.LeeMenu(1))
   {   //
      case 1: LeeRango("Select Col_Prog_Range ",*(Window1->Col_Prog_Range),1,Window1->Col_Prog_Range);
         Window1->Caso_Actual->Read_Current_Record(Tempo);

Vars.CurrSS.CopiaDeArreglo(Tempo,(Window1->Caso_Actual->Caso.Header.Contenido.LongRegId-33)/32,*(Window
1->Col_Prog_Range));
         Vars.CurrSS.DisplayAllCells();
         Define_Data_And_Permanent_Cells();
         break;
         //
      case 2: LeeRango("Select Col_Prev_Range ",*(Window1->Col_Prev_Range),1,Window1->Col_Prev_Range);
         Window1->Caso_Actual->Read_Previous_Record(Tempo);

Vars.CurrSS.CopiaDeArreglo(Tempo,(Window1->Caso_Actual->Caso.Header.Contenido.LongRegId-33)/32,*(Window
1->Col_Prev_Range));
         Vars.CurrSS.DisplayAllCells();
         break;
         //
      case 3: Window1->Modify_Cases();
         break;
         //
      case 4: Window1->Modify_Active_Case();
         break;
         //
      case 5: Window1->Modify_Time_Based();
         break;
   }
}

//
//
Lista_Bases * Col_Prog_Window::Busca_Caso(Lista_Bases **Anterior,long *Numero)
{
   Lista_Bases *Pcase=NULL;
   int Cont=1;

Pcase = Primer_Caso;   //
   while ((Pcase!=NULL) && (Cont!=(*Numero)))
   {
      (*Anterior) = Pcase;
      Pcase = Pcase -> Siguiente_Caso;
      Cont++;
   }
   (*Numero) = Cont;
   return(Pcase);
}

//
//
void Col_Prog_Window::Modify_Time_Based()
{
   if (Time_Based)
      Time_Based = FALSE;
   else
      Time_Based = TRUE;
} void Col_Prog_Window::Modify_Active_Case()
{
   Byte Opcion;
   long Numero;
```

```
    long No_Caso;
    Boolean Centinela;
    Lista_Bases *Anterior;

No_Caso = -1;
    Busca_Caso(&Anterior,&No_Caso);
        //
    Opcion = GetNumber("Case number ","",1,No_Caso,Centinela);
    if (Centinela != 0)
    {
        Caso_Actual->Caso.Close_DB();
        Numero = (long)Opcion;
        Caso_Actual = Busca_Caso(&Anterior,&Numero);  //
        Caso_Actual->Caso.Open_DB();  //
        Caso_Actual->Read_Previous_Record(Tempo);

Vars.CurrSS.CopiaDeArreglo(Tempo,(Caso_Actual->Caso.Header.Contenido.LongRegId-33)/32,*Col_Prev_Range);
        Caso_Actual->Read_Current_Record(Tempo);

Vars.CurrSS.CopiaDeArreglo(Tempo,(Caso_Actual->Caso.Header.Contenido.LongRegId-33)/32,*Col_Prog_Range);
        Cambia_Formatos_Pantalla(1);
    }
}

//
void Col_Prog_Window::Elimina_Caso(long Numero)
{
    Lista_Bases *Pcase,*Anterior;

Pcase = Busca_Caso(&Anterior,&Numero);
    if (Caso_Actual == Pcase)
    {
        Caso_Actual->Caso.Close_DB();
        Caso_Actual = (Pcase->Siguiente_Caso != NULL) ? Pcase->Siguiente_Caso:Primer_Caso;
        Caso_Actual->Caso.Open_DB();  //
        Caso_Actual->Read_Previous_Record(Tempo);

Vars.CurrSS.CopiaDeArreglo(Tempo,(Caso_Actual->Caso.Header.Contenido.LongRegId-33)/32,*Col_Prev_Range);
        Caso_Actual->Read_Current_Record(Tempo);

Vars.CurrSS.CopiaDeArreglo(Tempo,(Caso_Actual->Caso.Header.Contenido.LongRegId-33)/32,*Col_Prog_Range);
        Cambia_Formatos_Pantalla(1);
    }
    if (Pcase == Primer_Caso)
        Primer_Caso = Pcase->Siguiente_Caso;
    else
        Anterior->Siguiente_Caso = Pcase->Siguiente_Caso;
    delete Pcase;
}
//
//
void Col_Prog_Window::Modify_Cases()
{
    Lista_Bases *Pcase,*Anterior;
    long No_Caso;
    Boolean Centinela,Borrar;
    char Nombre[50];

switch (CaseMenu.LeeMenu(1))
    {
        case 1: No_Caso = -1;
            Busca_Caso(&Anterior,&No_Caso);
            No_Caso = GetNumber("Case number ","",1,No_Caso-1,Centinela);
            if (Centinela != 0)
```

```
        {
            Pcase = Busca_Caso(&Anterior,&No_Caso);
            strcpy(Nombre,ReadString("New name ",Pcase-> Caso.Nombre_BD,15,Centinela));
            if (Centinela == 0)
                strcpy(Pcase->Caso.Nombre_BD,Nombre);
        }
        break;
     case 2: No_Caso = -1;
           Busca_Caso(&Anterior,&No_Caso);
           sprintf(Nombre,"Name of case Number %ld",No_Caso);
           strcpy(Nombre,ReadString(Nombre,"",15,Centinela));
           if (Centinela == 0)
              Agrega_Caso(Nombre);
           break;
     case 3: No_Caso = -1;
           Busca_Caso(&Anterior,&No_Caso);
           No_Caso = GetNumber("Case number ","",1,No_Caso-1,Centinela);
           if (Centinela != 0)
           {
               Pcase = Busca_Caso(&Anterior,&No_Caso);
               sprintf(Nombre,"Name of case %ld is %s, Are you sure, ", No_Caso,Pcase->Caso.Nombre_BD);
               Borrar = GetYesNo(Nombre,Centinela);
               if (Centinela == 0)
                  if (Borrar == 1)
                     Elimina_Caso(No_Caso);
           }
           break;
     }
}

//
//
//
//
//
//
void Col_Prog_Window::Baja_Marcas()
{
    int i;
    char Marca[5];

for(i=0;i<Caso_Actual->Caso.Header.Contenido.NumReg;i++)
    {
       if (Caso_Actual->Periodo_Status[i].Calc == 0)
          Marca[0] = '0';
       else
          Marca[0] = '1';
       if (Caso_Actual->Periodo_Status[i].Protect == 00)
          Marca[1] = '0';
       else
          if (Caso_Actual->Periodo_Status[i].Protect == 01)
              Marca[1] = '1';
          else
             if (Caso_Actual->Periodo_Status[1].Protect == 10)
                 Marca[1] = '2';
       Marca[2] = '\0';
       Caso_Actual->Caso.Write_Field(Marca,(Caso_Actual->Caso.Header.Contenido.LongRegId-33)/32,i);
    }
}

//
//
void Col_Prog_Window::Sube_Marcas()
{
    int i;
    char Marca[5];
    Buffer *BAux;
```

```
for(i=0;i<Caso_Actual->Caso.Header.Contenido.NumReg;i++)
{
   Caso_Actual->Caso.Read_DB();
   BAux = Caso_Actual->Caso.BufferBase;
   while (BAux->Prox != NULL)
      BAux = BAux->Prox;
   if (BAux->Valor[0] == '0')
      Caso_Actual->Periodo_Status[i].Calc = 0;
   else
      Caso_Actual->Periodo_Status[i].Calc = 1;
   switch (BAux->Valor[1])
   {
      case '0':Caso_Actual->Periodo_Status[i].Protect = 00;
         break;
      case '1':Caso_Actual->Periodo_Status[i].Protect = 01;
         break;
      case '2':Caso_Actual->Periodo_Status[i].Protect = 10;
         break;
   }
 }
}
```

```
*===============================================*
*===================*
* FILE: TCHACH.CPP *
*===================* include "string.h"
include "TCUtil.h"
#include "TCHash.h"

/* */

HashTable::HashTable(Byte InitBuckets)
{
   Buckets = InitBuckets;
```

```
HashData = new HashItemPtr[Buckets];
memset(HashData, 0, sizeof(HashItemPtr) * Buckets);
Items = 0;
}

/* */

HashTable::~HashTable()
{ HashItemPtr P, D;
  Word Counter;

for (Counter = 0; Counter < Buckets; Counter ++)
  {
    P = HashData[Counter];
    while (P)
    {
      D = P;
      P = P->Next;
      delete D->Data;
      delete D;
    }
  }
  delete HashData;
}

/* */

Boolean HashTable::Add()
{ HashItemPtr A;
  Byte V;

A = new HashItem;
  if (!A) return 0;
  A->Data = new Byte[ItemSize()];
  CreateItem(A);
  V = HashValue() % Buckets;
  A->Next = HashData[V];
  HashData[V] = A;
  Items ++;
  return 1;
}

/* */ void HashTable::Delete(void *Deleted)
{ HashItemPtr D;
  HashItemPtr *H;

H = &HashData[HashValue() % Buckets];
  while (*H && !Found(*H))
    H = &(*H)->Next;
  if (!*H)
  {
    if (Deleted)
      memset(Deleted, 0, ItemSize());
    return;
  }
  else
  {
    D = *H;
    *H = D->Next;
```

```
    if (Deleted)
      memcpy(Deleted, D->Data, ItemSize());
    delete D->Data;
    delete D;
  }
  Items --;
}

/* */

HashItemPtr HashTable::FirstItem()
{ Word Counter;

for (Counter = 0; Counter < Buckets; Counter ++)
  {
    CurrItem = HashData[Counter];
    if (CurrItem) {
      CurrBucket = Counter;
      return CurrItem;
    }
  }
  return NULL;
}

/* */

HashItemPtr HashTable::NextItem()
{
  if (CurrItem)
    CurrItem = CurrItem->Next;
  if (CurrItem)
    return CurrItem;
  while (++ CurrBucket < Buckets)
  {
    CurrItem = HashData[CurrBucket];
    if (CurrItem)
      return CurrItem;
  }
  return NULL;
}

/* */

Boolean HashTable::Change()
{ HashItemPtr H;

H = HashData[HashValue() % Buckets];
  while (H && !Found(H))
    H = H->Next;
  if (H)
  {
    CreateItem(H);
    return 1;
  }
  else return Add();
}

/* */

HashItemPtr HashTable::Search()
{ HashItemPtr H;
```

```
H = HashData[HashValue() % Buckets];
while (H && !Found(H))
  H = H->Next;
return H;
}

/* */

Word HashTable::HashValue()
{
  return 0;
}

/* */

Boolean HashTable::Found(HashItemPtr Item)
{
  return 1;
}

/* */ void HashTable::CreateItem(HashItemPtr Item)
{
}

/* */

Byte HashTable::ItemSize()
{
  return 1;
}
```

```
*==================================================*

*=============*
* FILE: TCHASH.H *
*=============*

/* */
    /* */ define MaxBuckets      100
define MaxHashItemSize 256

/* */ typedef Byte *HashItemData;

struct HashItem {
/* */
  struct HashItem *Next;
  HashItemData Data;
};

typedef HashItem *HashItemPtr;

struct HashTable {
  long Items;
```

```
  HashItemPtr CurrItem;
  Byte CurrBucket;
  HashItemPtr *HashData;
  Byte Buckets;
  HashTable(Byte InitBuckets);
  ~HashTable();
  Boolean Add();
  void Delete(void *Deleted);
  HashItemPtr FirstItem();
  HashItemPtr NextItem();
  Boolean Change();
  HashItemPtr Search();
  virtual Word HashValue();
  virtual Boolean Found(HashItemPtr Item);
  virtual void CreateItem(HashItemPtr Item);
  virtual Byte ItemSize();
};
```

```
*=================================*

*=================*
* FILE: TCINPUT.CPP *
*=================* include "stdlib.h"
include "ctype.h"
#include "conio.h"
include "string.h"
include "TCUtil.h"
#include "TCWindow.h"
#include "TCInput.h"

#define YesNo "Y/N"
#define ErrNumberError1 "Input a value between"
#define ErrNumberError2 " and "

char SInput[256];
char BufferInp[160];

/* */

Field::Field(Byte C1, Byte C2, Byte R, Byte InitMaxLen, Boolean InitUCase)
{
  Reinicia(C1, C2, R, InitMaxLen, InitUCase);
}

/* */ void Field::Reinicia(Byte C1, Byte C2, Byte R, Byte InitMaxLen,
            Boolean InitUCase)
{
  StartCol = C1;
  StopCol = C2;
  InputRow = R;
  MaxInputLen = (InitMaxLen ? InitMaxLen : 255);
  memset(InputData, 0, MaxInputLen + 1);
  UCase = InitUCase;
  Quit = 0;
}
```

```
/* */

Boolean Field::GetQuit()
{
  return Quit;
}

/* */ void Field::Edit(char *Data)
{ Word Start, CursorPos, C;
  Byte LeftPos, Amt = StopCol - StartCol + 1;
  Boolean Overwrite = 0;
  char StrDisplay[81];
  Window Area;

gettext(StartCol, InputRow, StopCol, InputRow, BufferInp);
  Area.SetValues(StartCol, InputRow, StopCol, InputRow, BlackOnLightGray);
  strcpy(InputData, Data);
  _setcursortype(_NORMALCURSOR);
  if (strlen(InputData) <= Amt) LeftPos = 0;
  else LeftPos = strlen(InputData) - Amt + 1;
  CursorPos = strlen(InputData);
  do
  {
    Area.Clear();
    CopyN(StrDisplay, InputData + LeftPos, Amt);
    Area.WindowWriteXY(StrDisplay, 1, 1, LoColor);
    gotoxy(StartCol + CursorPos - LeftPos, InputRow);
    C = (UCase ? GetKeyUpCase() : GetKey());
    switch (C)
    {
      case BS:
        if (CursorPos)
        {
          CursorPos --;
          memmove(InputData + CursorPos, InputData + CursorPos + 1,
              strlen(InputData) - CursorPos);
          if (CursorPos < LeftPos)
            LeftPos --;
        }
        break;
      case DelKey:
        if (strlen(InputData))
          memmove(InputData + CursorPos, InputData + CursorPos + 1,
              strlen(InputData) - CursorPos);
        break;
      case InsKey:
        Overwrite = !Overwrite;
        if (Overwrite) _setcursortype(_SOLIDCURSOR);
        else _setcursortype(_NORMALCURSOR);
        break;
      case HomeKey:
        LeftPos = CursorPos = 0;
        break;
      case EndKey:
        if (strlen(InputData) <= Amt) LeftPos = 0;
        else LeftPos = strlen(InputData) - Amt + 1;
        CursorPos = strlen(InputData);
        break;
      case LeftKey:
```

```
      if (CursorPos)
      {
        CursorPos --;
        if (CursorPos < LeftPos)
          LeftPos --;
      }
      break;
    case RightKey:
      if (CursorPos < strlen(InputData))
      {
        CursorPos ++;
        if (CursorPos >= (Word) LeftPos + Amt)
          LeftPos ++;
      }
      break;
    default:
      if (EstaEn(C, 30, 255) && CursorPos <= MaxInputLen)
      {
        if (Overwrite)
        {
          InputData[CursorPos ++] = C;
          if (CursorPos >= (Word) LeftPos + Amt)
            LeftPos ++;
        }
        else if (strlen(InputData) < MaxInputLen)
        {
          if (CursorPos < strlen(InputData))
            memmove(InputData + CursorPos + 1, InputData + CursorPos,
                strlen(InputData) - CursorPos);
          InputData[CursorPos ++] = C;
          if (CursorPos >= (Word) LeftPos + Amt)
            LeftPos ++;
        }
      }
    }
  }
  while (C != CR && C != ESC);
  Quit = (C == ESC);
  _setcursortype(_NOCURSOR);
  Area.Clear();
  puttext(StartCol, InputRow, StopCol, InputRow, BufferInp);
}

/* */ void Field::ClearInput()
{
  *InputData = '\0';
}

/* */

String ReadString(String Prompt, String InitS, Word Len, Boolean& ESCPressed)
{ Field I(1, 80, 1, Len, NotUpper);
  char Temp[81];

if (strlen(Prompt))
  {
    strcat(strcpy(Temp, Prompt), ": ");
    WriteXY(Temp, 1, 2, InfoColor);
    clreol();
```

```c
}
  I.Edit(InitS);
  ESCPressed = I.GetQuit();
  ClrEolXY(1, 2, InfoColor);
  return strcpy(SInput, I.InputData);
}

/*    */

Boolean LegalYesNo(char C)
{
  C = toupper(C);
  return (C == 'Y' || C == 'N');
}

/*    */

Boolean GetYesNo(String Prompt, Boolean& ESCPressed)
{ char Ch, Temp[81];

strcat(strcat(strcat(strcpy(Temp, Prompt), "("), YesNo), ")?");
  PrintMessage(Temp);
  Ch = GetKeyChar(LegalYesNo);
  ESCPressed = (Ch == ESC);
  ClearMessage();
  return (Ch == 'Y');
}

/*    */ long GetNumber(String Prompt, String InitS, long Low,
               long High, Boolean& Result)
{ Field I(strlen(Prompt) + 1, 80, 1, strlen(NumToString(High)) + 1, NotUpper);
  char S[81], STemp[81];
  long L;

if (strlen(Prompt))
  {
    strcpy(S, Prompt);
    WriteXY(S, 1, 1, LoColor);
    clreol();
  }
  do {
    I.Edit(InitS);
    strcpy(S, I.InputData);
    if (!I.GetQuit() && strlen(S))
    {
      L = atoi(S);
      Result = (L >= Low && L <= High);
      if (!Result)
        PrintError(strcat(strcat(strcpy(S, ErrNumberError1), NumToString(Low)),
                   strcat(strcpy(STemp, ErrNumberError2), NumToString(High))));
    }
    else
    {
      Result = 0;
      L = 0;
    }
  } while (!Result && strlen(S));
  if (strlen(Prompt))
    ClrEolXY(1, 1, LoColor);
```

```
  return L;
}
```

```
/*========================*
 *========================*
 * FILE: TCINPUT.H        *
 *========================*
*/
*/
*/ define AllUpper 1
define NotUpper 0

/*    */ struct Field {
  Byte StartCol, StopCol, InputRow, MaxInputLen;
  Boolean Quit, UCase;
  char InputData[256];
  Field(Byte C1, Byte C2, Byte R, Byte InitMaxLen, Boolean InitUCase);
  void Reinicia(Byte C1, Byte C2, Byte R, Byte InitMaxLen, Boolean InitUCase);
  Boolean GetQuit();
  void Edit(char *Data);
  void ClearInput();
};

Boolean GetYesNo(String M, Boolean& EscPressed);
char *ReadString(String Prompt, String InitS, Word Len, Boolean& EscPressed);
long GetNumber(String Prompt, String InitS, long Low,
         long High, Boolean& Result);
```

```
/*========================================================*

*========================*
 * FILE: TCMENU.CPP       *
 *========================*
*/
/*  */
/*  */
/*  */ include "ctype.h"
include "string.h"
#include "conio.h"
#include "TCUtil.h"
#include "TCWindow.h"
#include "TCMenu.h"

#define MenuHiColor 0X3F
define MenuLoColor 0X30 typedef enum {TRUE=1, FALSE=0} boolean;

extern boolean Window;

Menu::Menu(Option *InitOptions, Byte InitNumOps)
{
  Options = InitOptions;
```

```
  NumOps = InitNumOps;
  OpcionActual = 0;
} void Menu::DespliegaOpcion(Byte NumOpDisplay, Boolean IsCurr)
{
} void Menu::DespliegaMenu()
{ Byte Cont;

for (Cont = 0; Cont < NumOps; Cont ++)
    DespliegaOpcion(Cont, 0);
    DespliegaOpcion(OpcionActual, 1);
} void Menu::Execute(Word& Key)
{ Byte OpAux;

if (!Window)
    DespliegaOpcion(OpcionActual, 0);
  switch (Key)
  {
    case UpKey :
    case LeftKey : OpcionActual = (OpcionActual + NumOps-1) % NumOps; break;
    case DownKey :
    case RightKey : OpcionActual = (OpcionActual + 1) % NumOps; break;
    case HomeKey : OpcionActual = 0; break;
    case EndKey : OpcionActual = NumOps - 1; break;
    default :
      OpAux = 0;
      while (OpAux < NumOps && Options[OpAux].Elige != toupper(Key))
        OpAux ++;
      if (OpAux < NumOps)
      {
        OpcionActual = OpAux;
        Key = CR;
      }
  }
  if (!Window)
    DespliegaOpcion(OpcionActual, 1);
}

Byte Menu::LeeMenu(Boolean Reinicia)
{ Word C;

if (Reinicia)
    OpcionActual = 0;
  DespliegaMenu();
  do
  {
    C = GetKeyUpCase();
    Execute(C);
  }
  while (C != ESC && C != CR);
  ClrEolXY(1, 1, LoColor);
  ClrEolXY(1, 2, InfoColor);
  if (C == ESC) return 0;
  else return OpcionActual + 1;
}
```

```cpp
HorizontalMenu::HorizontalMenu(Option *InitOptions, Byte InitNumOps,
                char **InitMensajes) : Menu(InitOptions, InitNumOps)
{ Byte Pos = 0, Cont = 0;

for (Cont = 0, Pos = 0; Cont < NumOps; Cont ++)
  {
    TextStart[Cont] = Pos;
    Pos = Pos + strlen(Options[Cont].Texto) + 1;
  }
  Mensajes = InitMensajes;
} void HorizontalMenu::DespliegaOpcion(Byte NumOpDisplay, Boolean IsCurr)
{ Byte Cont;
  Boolean YaPaso;

gotoxy(1 + TextStart[NumOpDisplay], 1);
  textattr(IsCurr ? HighLightColor : LoColor);
  for (Cont = YaPaso = 0; Cont < strlen(Options[NumOpDisplay].Texto); Cont ++)
  {
    if (!YaPaso && toupper(Options[NumOpDisplay].Texto[Cont]) ==
        Options[NumOpDisplay].Elige)
    {
      textattr(IsCurr ? HighLightColor : HiColor);
      putch(Options[NumOpDisplay].Elige);
      textattr(IsCurr ? HighLightColor : LoColor);
      YaPaso = 1;
    }
    else putch(Options[NumOpDisplay].Texto[Cont]);
  }
  if (IsCurr)
  {
    textattr(InfoColor);
    gotoxy(1, 2);
    cputs(Mensajes[NumOpDisplay]);
    clreol();
  }
} void HorizontalMenu::DespliegaMenu()
{
  gotoxy(1, 1);
  textattr(LoColor);
  clreol();
  Menu::DespliegaMenu();
} void CentralMenu::DespliegaOpcion(Byte NumOpDisplay, Boolean IsCurr)
{
  gotoxy(30, NumOpDisplay + NumOpDisplay / 3 + 10);
  textattr(IsCurr ? MenuHiColor : MenuLoColor);
  cprintf("%c - %s", Options[NumOpDisplay].Elige, Options[NumOpDisplay].Texto);
} void CentralMenu::DespliegaMenu()
{ Byte Pos;

textattr(CellColor);
  clrscr();
  ClearScreen(22, 5, 60, 16, MenuHiColor);
  WriteXY(CenterStr(Titulo, 37), 22, 6, MenuHiColor);
```

```
WriteXY(PadChar("", '?', 35), 24, 7, MenuHiColor);
WriteXY(PadChar("", '?', 22), 30, 13, MenuLoColor);
WriteXY(PadChar("", ' ', 39), 24, 17, 0);
for (Pos = 6; Pos < 17; Pos ++)
  WriteXY(" ", 61, Pos, 0);
WriteXY(PadChar("", '?', 78), 2, 22, 0X1F);
WriteXY("CONFIDENTIAL AND PROPRIETARY", 2, 23, 0X13);
WriteXY("Copyright (c) 1990 Carlos Armando Amado", 41, 23, 0X13);
WriteXY("-Help  -Edit  -Mrk_Rec  -Case  -Envim  -Wind  -Sect  -Calc  -Quit", 4, 25, 0X13);
WriteXY("F1", 2, 25, 0X1E);
WriteXY("F2", 10, 25, 0X1E);
WriteXY("F5", 18, 25, 0X1E);
WriteXY("F6", 29, 25, 0X1E);
WriteXY("F7", 37, 25, 0X1E);
WriteXY("aF7", 47, 25, 0X1E);
WriteXY("F8", 56, 25, 0X1E);
WriteXY("F9", 64, 25, 0X1E);
WriteXY("Esc", 72, 25, 0X1E);
Menu::DespliegaMenu();
}
```

```
* FILE: TCMENU.H * struct Option {
  char Elige, *Texto;
};

struct Menu {
  Option *Options;
  Byte NumOps, OpcionActual;
  Menu(Option *InitOptions, Byte InitNumOps);
  void Execute(Word& Key);
  virtual void DespliegaOpcion(Byte NumOpDisplay, Boolean IsCurr);
  virtual void DespliegaMenu();
  Byte LeeMenu(Boolean Reinicia);
};

struct HorizontalMenu : Menu {
  Byte TextStart[9];
  char **Mensajes;
  HorizontalMenu(Option *InitOptions, Byte InitNumOps, char **InitMensajes);
  virtual void DespliegaOpcion(Byte NumOpDisplay, Boolean IsCurr);
  virtual void DespliegaMenu();
};

struct CentralMenu : Menu {
  char *Titulo;
  CentralMenu(Option *InitOptions, Byte InitNumOps, char *InitTitulo) :
      Menu(InitOptions, InitNumOps) { Titulo = InitTitulo; };
  virtual void DespliegaOpcion(Byte NumOpDisplay, Boolean IsCurr);
  virtual void DespliegaMenu();
};
```

```
* FILE: TCPARSER.CPP *
```

```c
#include "stdlib.h"
include "ctype.h"
include "string.h"
include "TCUtil.h"
#include "TCHash.h"
#include "TCCell.h"
#include "TCParser.h"

typedef enum {GEN_PROG=1,SCRATCH=0} Section_Type;

ParserObj Parser;
extern Section_Type Section;

/* */

Boolean Referencia(char* Inp, Byte Len, Word Start, CellPos& P, Word& FormLen)
{ char CS[10], RS[10], *Temp;

Temp = CS;
  while (Start < Len && isalpha(Inp[Start]) && Temp - CS < 2)
  {
    *Temp ++ = Inp[Start];
    Start ++;
  }
  *Temp = '\0';
  P.Col = StringToCol(CS);
  if (!P.Col) return 0;
  Temp = RS;
  while (Start < Len && isdigit(Inp[Start]) && Temp - RS < 5)
  {
    *Temp ++ = Inp[Start];
    Start ++;
  }
  *Temp = '\0';
  P.Row = StringToRow(RS);
  if (!P.Row) return 0;
  FormLen = strlen(CS) + strlen(RS);
  return 1;
}

/* */ void ParserObj::SetValues(CellHashTablePtr InitHash, char *InitInp)
{
  ParserHash = InitHash;
  Inp = InitInp;
  Len = strlen(Inp);
  Position = 0;
  MathError = 0;
  IsFormula = 0;
}

/* */ void ParserObj::NextToken()
{ char NumString[256];
  Word TLen;
  CellPos CP;
```

```c
while (Position < Len && Inp[Position] == ' ')
  Position ++; /* */
/* */
if (Position >= Len) CurrToken.Tipo = FDL;
else if (isdigit(Inp[Position]) || Inp[Position] == '.')
{
  CurrToken.Tipo = Desconocido;
  TLen = Position;
  while (isdigit(Inp[TLen]))
    TLen ++;
  if (Inp[TLen] == '.')
  {
    if (!isdigit(Inp[++ TLen]))
      return;
    while (isdigit(Inp[++ TLen]));
  }
  if (toupper(Inp[TLen]) == 'E')
  {
    if (Inp[++ TLen] == '+' || Inp[TLen] == '-')
      TLen ++;
    if (!isdigit(Inp[TLen]))
      return;
    while (isdigit(Inp[++ TLen]));
  }
  CopyN(NumString, Inp + Position, TLen - Position);
  Position = TLen;
  CurrToken.Tipo = VALOR;
  CurrToken.Info.Valor = atof(NumString);
}
else if (isalpha(Inp[Position]) || Inp[Position] == '!')
{
  /* */
  if (Referencia(Inp, Len, Position, CP, TLen))
  {
    Position += TLen;
    IsFormula = 1;
    CurrToken.Tipo = Celda;
    CurrToken.Info.CP.SetValues(CP.Col, CP.Row);
  }
  else CurrToken.Tipo = Desconocido;
}
else
{ /* */
  switch (Inp[Position])
  {
    case '(': CurrToken.Tipo = ParIzq; break;
    case '+': CurrToken.Tipo = Mas; break;
    case '-': CurrToken.Tipo = Menos; break;
    case '*': CurrToken.Tipo = Por; break;
    case '/': CurrToken.Tipo = Divide; break;
    case ')': CurrToken.Tipo = ParDer; break;
    default : CurrToken.Tipo = Desconocido;
  }
  Position ++;
}
}

/* */ double CellValue(CellHashTable *CellHash, CellPos P, Boolean& Error)
{ CellPtr CPtr;
```

```
CPtr = CellHash->Search(P);
if (CPtr->HasError())
{
  Error = 1;
  return 0;
}
else return CPtr->CurrValue();
}

/* */

Boolean ParserObj::ExpresionUnaria()
{ Byte Tipo = CurrToken.Tipo;

if (Tipo == VALOR || Tipo == Celda)
  {
    ParseValue = (Tipo == VALOR ? CurrToken.Info.Valor : CellValue(ParserHash,
                  CurrToken.Info.CP, MathError));
    NextToken();
    return 1;
  }
  else if (Tipo == Mas || Tipo == Menos)
  {
    NextToken();
    if (!Expresion()) return 0;
    if (Tipo == Menos)
      ParseValue = - ParseValue;
    return 1;
  }
  else if (Tipo == ParIzq)
  {
    NextToken();
    if (!Expresion()) return 0;
    if (CurrToken.Tipo != ParDer) return 0;
    NextToken();
    return 1;
  }
  return 0;
}

/* */

Boolean ParserObj::ExpresionMultiplicativa()
{ double ResultAnt;
  Byte Tipo;

if (ExpresionUnaria())
  {
    while ((Tipo = CurrToken.Tipo) == Por || Tipo == Divide)
    {
      NextToken();
      ResultAnt = ParseValue;
      if (!ExpresionUnaria()) return 0;
      if (Tipo == Por) ParseValue = ResultAnt * ParseValue;
      else if (ParseValue != 0) ParseValue = ResultAnt / ParseValue;
      else MathError = 1;
    }
    return 1;
  }
  return 0;
```

}

/* */

```
Boolean ParserObj::ExpresionSuma()
{ double ResultAnt;
  Byte Tipo;

if (ExpresionMultiplicativa())
  {
    while ((Tipo = CurrToken.Tipo) == Mas || Tipo == Menos)
    {
      NextToken();
      ResultAnt = ParseValue;
      if (!ExpresionMultiplicativa()) return 0;
      ParseValue = ResultAnt + (Tipo == Mas ? ParseValue : - ParseValue);
    }
    return 1;
  }
  return 0;
}
```

/* */

```
Boolean ParserObj::Expresion()
{
  return ExpresionSuma();
}
```

/* */

```
void ParserObj::Parse()
{
  NextToken();
  if (Expresion() && CurrToken.Tipo == FDL)
    CType = (IsFormula ? CIFormula : CIValue);
  else CType = CIText;
}
```

*==================================================*

*==============*
* FILE: TCPARSER.H *
*==============*

/* */
/* */

```
#define VALOR        0
#define Celda        1
#define ParIzq       2
#define Mas          3
#define Menos        4
#define Por          5
#define Divide       6
#define ParDer       7
#define FDL          8
#define Desconocido  9
```

/* */

```
struct TokenRec {
  Byte Tipo;
  union {
    double Valor;
    CellPos CP;
  } Info;
};
```

/* */

```
struct ParserObj {
    char *Inp;
    CellHashTablePtr ParserHash;
    Word Position;
    Byte Len;
    TokenRec CurrToken;
    CellTypes CType;
    double ParseValue;
    Boolean MathError, IsFormula;
    void SetValues(CellHashTablePtr InitHash, char *InitInp);
    void NextToken();
    Boolean ExpresionUnaria();
    Boolean ExpresionMultiplicativa();
    Boolean ExpresionSuma();
    Boolean Expresion();
    void Parse();
};
```

/* */

```
double CellValue(CellHashTable *CellHash, CellPos CP, Boolean& Error);
```

*=================================================================*

*========================*
* FILE: TCRANGOS.CPP *
*========================*

/* */

```
extern "C"
{
# include <bwindow.h>
} include "conio.h"
include "string.h"
#include "stdio.h"
#include "TCUtil.h"
#include "TCWindow.h"
#include "TCMenu.h"
#include "TCHash.h"
#include "TCInput.h"
#include "TCCell.h"
#include "TCParser.h"
#include "TCSheet.h"
#include "Patente.h"
#include "Editor.h"
#include "TCRun.h"
```

/* */

```
#define RedrawYes 1
define RedrawNo  0 define LAYOUT_KEY F5
define PromptRango "Select range: "
#define PromptDestino "Select destination cell or range: "
#define PromptTecla "Enter new selection character"
#define PromptTexto "Enter new option's description"
#define PromptEsquina "Select the top leftmost corner for this screen"
#define MessageDataOutcome "(D)ata or (O)utcome cells"
#define MessageCellType "(A)lphanumeric or (N)umeric cells"
#define MarkDataRange "Select range to define data validations: "
#define ErrorConstante "Error, constant was expectet"
#define PromptInf "Set lower value for input"
#define PromptSup "Set higher value for input"

/* */ extern Word Keypress;
extern ParserObj Parser;
extern boolean Window;
extern ProgramObject Vars;
extern Environment_Type Environment;
extern Section_Type Section;
extern char Buffer[4000];
extern Boolean Execute_Col_Prog_Menu();

/* */

Option InitOptions[4] = {{'F', "First Option       "},
            {'S', "Second Option     "},
            {'T', "Third Option      "},
            {'C', "Col_Prog_Window   "}};
Option MainOptions[3] = {{'C', "Copy"}, {'E', "Erase"}, {'L', "Layout"}};
Option LayoutOptions[6] = {{'F', "First Option"}, {'S', "Second Option"},
            {'T', "Third Option"}, {'C', "Col_Prog_Window"},
            {'D', "Data"}, 'H', "Help"};
Option OptionsOptions[3] = {{'S', "Selection"}, {'D', "Description"},
            {'P', "Position"}};
char *MainMessages[3] = {"Copy a spreadsheet range",
            "Eliminate a spreadsheet range",
            "Define the application environment's commands"};
char *LayoutMessages[6] = {
  "Modify the first option in the application environment's menu",
  "Modify the second option in the application environment's menu",
  "Modify the third option in the application environment's menu",
  "Modify the Col_Prog_Window definition",
  "Define data-outcome cells and data types (alphanumeric or numeric)",
  "Define help text"};
char *OptionsMessages[3] = {"Change the selection character",
            "Change this option's description",
            "Change the initial position of this screen"};

CellPos Selecciones[3] = {{201, 1}, {201, 21}, {201, 41}};

CentralMenu ApplicationMenu(InitOptions, 4, "APPLICATION - MAIN MENU");
HorizontalMenu MainMenu(MainOptions, 3, MainMessages);
HorizontalMenu LayoutMenu(LayoutOptions, 6, LayoutMessages);
HorizontalMenu OptionsMenu(OptionsOptions, 3, OptionsMessages);
```

```
/* */ void CopyBlock();
void DeleteBlock();
Boolean LeeRango(String Mensaje, Block& Bloque, Boolean On, BlockPtr PtrBlock);

/* */ void MueveCursor(CellPos Anterior)
{
  Vars.CurrSS.DisplayCell(Anterior, 1);
  Vars.CurrSS.DisplayCell(Vars.CurrSS.Sections[Section].CurrPos, 1);
}

/* */ void ExtendCurrBlock(Boolean Redraw)
{ Block OldBlock;

if (Vars.CurrSS.BlockOn)
  {
    memcpy(&OldBlock, &Vars.CurrSS.CurrBlock, sizeof(Block));
    if (Vars.CurrSS.CurrBlock.ExtendTo(Vars.CurrSS.Sections[Section].CurrPos))
    {
      if (Redraw)
        Vars.CurrSS.DisplayBlockDiff(OldBlock, Vars.CurrSS.CurrBlock);
    }
    else ClearCurrBlock();
  }
}

/* */ void ExtiendeBloque(CellPos Anterior)
{
  ExtendCurrBlock(RedrawYes);
  MueveCursor(Anterior);
}

/* */ void MoveHome()
{
  Vars.CurrSS.Sections[Section].CurrPos =
                Vars.CurrSS.Sections[Section].SectionBlock.Start;
  ExtendCurrBlock(RedrawNo);
  Vars.CurrSS.SetScreenColStart(Vars.CurrSS.Sections[Section].CurrPos.Col);
  Vars.CurrSS.SetScreenRowStart(Vars.CurrSS.Sections[Section].CurrPos.Row);
  Vars.CurrSS.Display();
}

/* */ void MoveEnd()
{ CellPos OldPos;

OldPos = Vars.CurrSS.Sections[Section].CurrPos;
  Vars.CurrSS.Sections[Section].CurrPos = Vars.CurrSS.Sections[Section].LastPos;
  if (!Vars.CurrSS.Sections[Section].ScreenBlock.CellInBlock(
     Vars.CurrSS.Sections[Section].CurrPos))
  {
```

```
  ExtendCurrBlock(RedrawNo);
  Vars.CurrSS.SetScreenColStop(Vars.CurrSS.Sections[Section].CurrPos.Col);
  Vars.CurrSS.SetScreenRowStop(Vars.CurrSS.Sections[Section].CurrPos.Row);
  Vars.CurrSS.Display();
 }
 else ExtiendeBloque(OldPos);
}
    /* */ void MoveUp()
{ CellPos OldPos;

if (Vars.CurrSS.Sections[Section].CurrPos.Row > 1)
 {
  OldPos = Vars.CurrSS.Sections[Section].CurrPos;
  Vars.CurrSS.Sections[Section].CurrPos.Row --;
  ExtendCurrBlock(RedrawYes);
  if (Vars.CurrSS.Sections[Section].CurrPos.Row <
      Vars.CurrSS.Sections[Section].ScreenBlock.Start.Row)
  {
   Vars.CurrSS.DisplayCell(OldPos, 1);
   Vars.CurrSS.SetScreenRowStart(Vars.CurrSS.Sections[Section].CurrPos.Row);
   Vars.CurrSS.DisplayRows();
   Vars.CurrSS.DisplayArea.Scroll(Down, 0, 0, 1);
   Vars.CurrSS.DisplayRow(Vars.CurrSS.Sections[Section].CurrPos.Row);
  }
  else MueveCursor(OldPos);
 }
}

/* */ void MoveDown()
{ CellPos OldPos;

if (Vars.CurrSS.Sections[Section].CurrPos.Row < MaxRow)
 {
  OldPos = Vars.CurrSS.Sections[Section].CurrPos;
  Vars.CurrSS.Sections[Section].CurrPos.Row ++;
  ExtendCurrBlock(RedrawYes);
  if (Vars.CurrSS.Sections[Section].CurrPos.Row >
      Vars.CurrSS.Sections[Section].ScreenBlock.Stop.Row)
  {
   Vars.CurrSS.DisplayCell(OldPos, 1);
   Vars.CurrSS.SetScreenRowStop(Vars.CurrSS.Sections[Section].CurrPos.Row);
   Vars.CurrSS.DisplayRows();
   Vars.CurrSS.DisplayArea.Scroll(Up, 0, 0, 1);
   Vars.CurrSS.DisplayRow(Vars.CurrSS.Sections[Section].CurrPos.Row);
  }
  else MueveCursor(OldPos);
 }
}

/* */ void MovePgUp()
{ CellPos OldPos;

if (Vars.CurrSS.Sections[Section].CurrPos.Row > 1)
 {
  OldPos = Vars.CurrSS.Sections[Section].CurrPos;
```

```
      Vars.CurrSS.Sections[Section].CurrPos.Row = Max(1, (long)
              Vars.CurrSS.Sections[Section].CurrPos.Row - TotalRows);
      if (Vars.CurrSS.Sections[Section].CurrPos.Row <
         Vars.CurrSS.Sections[Section].ScreenBlock.Start.Row)
    {
      ExtendCurrBlock(RedrawNo);
       Vars.CurrSS.SetScreenRowStart(Vars.CurrSS.Sections[Section].CurrPos.Row);
      Vars.CurrSS.DisplayRows();
      Vars.CurrSS.DisplayAllCells();
    }
      else ExtiendeBloque(OldPos);
  }
}

/* */ void MovePgDn()
{ CellPos OldPos;

if (Vars.CurrSS.Sections[Section].CurrPos.Row < MaxRow)
  {
    OldPos = Vars.CurrSS.Sections[Section].CurrPos;
    Vars.CurrSS.Sections[Section].CurrPos.Row = Min(MaxRow,
              Vars.CurrSS.Sections[Section].CurrPos.Row + TotalRows);
    if (Vars.CurrSS.Sections[Section].CurrPos.Row >
         Vars.CurrSS.Sections[Section].ScreenBlock.Stop.Row)
    {
      ExtendCurrBlock(RedrawNo);
       Vars.CurrSS.SetScreenRowStart(Vars.CurrSS.Sections[Section].CurrPos.Row);
      Vars.CurrSS.DisplayRows();
      Vars.CurrSS.DisplayAllCells();
    }
      else ExtiendeBloque(OldPos);
  }
}

/* */ void MoveLeft()
{ CellPos OldPos;
  Word C;

if (Vars.CurrSS.Sections[Section].CurrPos.Col >
       Vars.CurrSS.Sections[Section].SectionBlock.Start.Col)
  {
    OldPos = Vars.CurrSS.Sections[Section].CurrPos;
    Vars.CurrSS.Sections[Section].CurrPos.Col --;
    ExtendCurrBlock(RedrawYes);
    if (Vars.CurrSS.Sections[Section].CurrPos.Col <
         Vars.CurrSS.Sections[Section].ScreenBlock.Start.Col)
    {
      Vars.CurrSS.DisplayCell(OldPos, 1);
      Vars.CurrSS.SetScreenColStart(Vars.CurrSS.Sections[Section].CurrPos.Col);
      Vars.CurrSS.DisplayCols();
       if (Vars.CurrSS.Sections[Section].ScreenBlock.Start.Col <=
          Vars.CurrSS.Sections[Section].ScreenBlock.Stop.Col)
       Vars.CurrSS.DisplayArea.Scroll(Right, 0, 0, ColWidth);
       for (C = Vars.CurrSS.Sections[Section].ScreenBlock.Start.Col;
          C <= Vars.CurrSS.Sections[Section].CurrPos.Col; C ++)
       Vars.CurrSS.DisplayCol(C);
       Vars.CurrSS.BlankArea.Clear();
```

```
  }
  else MueveCursor(OldPos);
 }
}

/* */ void MoveRight()
{ Word C;
 CellPos OldPos;

if (Vars.CurrSS.Sections[Section].CurrPos.Col <
     Vars.CurrSS.Sections[Section].SectionBlock.Stop.Col)
 {
  OldPos = Vars.CurrSS.Sections[Section].CurrPos;
  Vars.CurrSS.Sections[Section].CurrPos.Col ++;
  ExtendCurrBlock(RedrawYes);
  if (Vars.CurrSS.Sections[Section].CurrPos.Col >
     Vars.CurrSS.Sections[Section].ScreenBlock.Stop.Col)
  {
   Vars.CurrSS.DisplayCell(OldPos, 1);
   Vars.CurrSS.SetScreenColStop(Vars.CurrSS.Sections[Section].CurrPos.Col);
   Vars.CurrSS.DisplayCols();
   if (Vars.CurrSS.Sections[Section].ScreenBlock.Start.Col + 1 <=
      Vars.CurrSS.Sections[Section].ScreenBlock.Stop.Col)
    Vars.CurrSS.DisplayArea.Scroll(Left, 0, 0, ColWidth);
   for (C = Vars.CurrSS.Sections[Section].CurrPos.Col;
      C <= Vars.CurrSS.Sections[Section].ScreenBlock.Stop.Col; C ++)
    Vars.CurrSS.DisplayCol(C);
  }
  else MueveCursor(OldPos);
 }
}

/* */ void MovePgLeft()
{ CellPos OldPos;

if (Vars.CurrSS.Sections[Section].CurrPos.Col >
    Vars.CurrSS.Sections[Section].SectionBlock.Start.Col)
 {
  OldPos = Vars.CurrSS.Sections[Section].CurrPos;
  Vars.CurrSS.Sections[Section].CurrPos.Col = Max(Vars.CurrSS.Sections[Section].
    SectionBlock.Start.Col, Vars.CurrSS.Sections[Section].ScreenBlock.Start.Col - 1);
  if (Vars.CurrSS.Sections[Section].CurrPos.Col <
     Vars.CurrSS.Sections[Section].ScreenBlock.Start.Col)
  {
   ExtendCurrBlock(RedrawNo);
   Vars.CurrSS.SetScreenColStop(Vars.CurrSS.Sections[Section].CurrPos.Col);
   Vars.CurrSS.DisplayCols();
   Vars.CurrSS.DisplayAllCells();
  }
  else ExtiendeBloque(OldPos);
 }
}

/* */ void MovePgRight()
{ CellPos OldPos;
```

```c
if (Vars.CurrSS.Sections[Section].CurrPos.Col <
    Vars.CurrSS.Sections[Section].SectionBlock.Stop.Col)
{
  OldPos = Vars.CurrSS.Sections[Section].CurrPos;
  Vars.CurrSS.Sections[Section].CurrPos.Col = Min(Vars.CurrSS.Sections[Section].
    SectionBlock.Stop.Col - 1, Vars.CurrSS.Sections[Section].ScreenBlock.Stop.Col);
  Vars.CurrSS.Sections[Section].CurrPos.Col ++;
  if (Vars.CurrSS.Sections[Section].CurrPos.Col >
      Vars.CurrSS.Sections[Section].ScreenBlock.Stop.Col)
  {
    ExtendCurrBlock(RedrawNo);
    Vars.CurrSS.SetScreenColStart(Vars.CurrSS.Sections[Section].CurrPos.Col);
    Vars.CurrSS.DisplayCols();
    Vars.CurrSS.DisplayAllCells();
  }
  else ExtiendeBloque(OldPos);
 }
}

/*  */

Boolean DefineOpcion(Byte NumOp)
{ Byte Opcion;
  char Temp[28];
  Boolean ESCPressed;

do
  {
    Opcion = OptionsMenu.LeeMenu(1);
    switch (Opcion)
    {
      case 1 :
        Temp[0] = ApplicationMenu.Options[NumOp].Elige;
        Temp[1] = 0;
        strcpy(Temp, ReadString(PromptTecla, Temp, 1, ESCPressed));
        if (!ESCPressed)
          ApplicationMenu.Options[NumOp].Elige = Temp[0];
        break;
      case 2 :
        strcpy(Temp, ApplicationMenu.Options[NumOp].Texto);
        strcpy(Temp, ReadString(PromptTexto, Temp, 28, ESCPressed));
        if (!ESCPressed)
          strcpy(ApplicationMenu.Options[NumOp].Texto, Temp);
        break;
      case 3 :
        Block BTemp(Selecciones[NumOp]);
        if (LeeRango(PromptEsquina, BTemp, 0, &BTemp))
          Selecciones[NumOp] = BTemp.Start;
    }
  }
  while (Opcion);
  return 0;
}

Boolean LegalDataOutcome(char C)
{
  C = toupper(C);
  return C == 'D' || C == 'O';
}
```

```
Boolean LegalCellType(char C)
{
  C = toupper(C);
  return C == 'A' || C == 'N';
} double LeeNumero(String Prompt, Boolean& Valido)
{ Field Entrada(1, 80, 1, 0, 0);

WriteXYClr(Prompt, 1, 2, 0X07);
  do
  {
    Entrada.Edit("");
    if (strlen(Entrada.InputData) && !Entrada.Quit)
    {
      Parser.SetValues(&Vars.CurrSS.CellHash, Entrada.InputData);
      Parser.Parse();
      if (Parser.CType != CIValue)
        PrintError(ErrorConstante);
    }
  } while (strlen(Entrada.InputData) && !Entrada.Quit && Parser.CType != CIValue);
  Valido = (strlen(Entrada.InputData) && !Entrada.Quit);
  ClrEolXY(1, 2, 0X07);
  return Parser.ParseValue;
} void DefineDataValidation()
{ Block Rango;
  Word Col, Row, C;
  Boolean ToData, ConSup = 0, ConInf = 0;
  Byte Type;
  double Sup, Inf;

if (!LeeRango(MarkDataRange, Rango, 0, NULL)) return;
  WriteXYClr(MessageDataOutcome, 1, 1, 0X70);
  C = GetKeyChar(LegalDataOutcome);
  if (C == ESC) return;
  ToData = (C == 'D');
  WriteXYClr(MessageCellType, 1, 1, 0X70);
  C = GetKeyChar(LegalCellType);
  if (C == ESC) return;
  Type = (C == 'N');
  if (Type)
  {
    Inf = LeeNumero(PromptInf, ConInf);
    Sup = LeeNumero(PromptSup, ConSup);
  }
  ClrEolXY(1, 1, 0X70);
  for (Col = Rango.Start.Col; Col <= Rango.Stop.Col; Col ++)
    for (Row = Rango.Start.Row; Row <= Rango.Stop.Row; Row ++)
      Vars.CurrSS.DataCells.SetValues(Col, Row, Type, ToData, ConSup,
                   ConInf, Sup, Inf);
  Vars.CurrSS.DisplayAllCells();
}

/* */

Boolean Define_Application_Environment()
{ Byte Opcion;
  Texto DefineHelp;
```

```c
do
{
  Opcion = LayoutMenu.LeeMenu(1);
  if (Opcion==4) Opcion = Execute_Col_Prog_Menu();
  else if (Opcion == 5) DefineDataValidation();
  else if (Opcion == 6)
  {
    DefineHelp.Escribe();
    _setcursortype(_NOCURSOR);
  }
  else if (Opcion) Opcion = DefineOpcion(Opcion - 1);
  else return 0;
}
while (!Opcion);
return 1;
}

/* */ void ExecuteMainMenu()
{ Byte Opcion;

do
  {
    Opcion = MainMenu.LeeMenu(1);
    if (Opcion == 1) CopyBlock();
    else if (Opcion == 2) DeleteBlock();
    else if (Opcion == 3) Opcion = Define_Application_Environment();
    else return;
  }
  while (!Opcion);
}

/* */ void ToggleCurrBlock(Boolean Band)
{
  if (Band) Vars.CurrSS.CurrBlock.Start = Vars.CurrSS.Sections[Section].CurrPos;
  else ClearCurrBlock();
  Vars.CurrSS.BlockOn = Band;
}

/* */ void GetCommands(Boolean Marcar)
{
  switch (Keypress) {
    case F2 :
      if (!Marcar)
        EditCell();
      break;
    case F9 : if (!Marcar) Recalc(); break;
    case '/' : if (!Marcar) ExecuteMainMenu(); break;
    case HomeKey : MoveHome(); break;
    case EndKey : MoveEnd(); break;
    case UpKey : MoveUp(); break;
    case DownKey : MoveDown(); break;
    case LeftKey : MoveLeft(); break;
    case RightKey : MoveRight(); break;
    case PgUpKey : MovePgUp(); break;
    case PgDnKey : MovePgDn(); break;
```

```
    case CtrlLeftKey : case STabKey : MovePgLeft(); break;
    case CtrlRightKey : case TabKey : MovePgRight(); break;
    default :
      if (EstaEn(Keypress, ' ', 255))
      {
        if (Keypress == '.' && Marcar && !Vars.CurrSS.BlockOn) ToggleCurrBlock(1);
        else if (!Marcar) EditInput(Keypress, EditNo);
      }
  }
  Vars.CurrSS.DisplayCellData();
}

/* */

Boolean LeeRango(String Mensaje, Block& Bloque, Boolean On, BlockPtr PtrBlock)
{ CellPos OldStart = Vars.CurrSS.Sections[Section].ScreenBlock.Start,
        OldCurrPos = Vars.CurrSS.Sections[Section].CurrPos;
  char STemp[81];

Vars.CurrSS.BlockOn = On;
  if (!PtrBlock)
    Vars.CurrSS.CurrBlock.Start = Vars.CurrSS.CurrBlock.Stop =
      Vars.CurrSS.Sections[Section].CurrPos;
  else
  {
    Vars.CurrSS.CurrBlock.Start = PtrBlock->Start;
    Vars.CurrSS.CurrBlock.Stop = PtrBlock->Stop;
    if (On) Vars.CurrSS.Sections[Section].CurrPos = PtrBlock->Stop;
    else Vars.CurrSS.Sections[Section].CurrPos = PtrBlock->Start;
    Vars.CurrSS.SetScreenRowStop(Vars.CurrSS.Sections[Section].CurrPos.Row);
    Vars.CurrSS.SetScreenColStop(Vars.CurrSS.Sections[Section].CurrPos.Col);
    Vars.CurrSS.Display();
  }
  WriteXY(Mensaje, 1, 1, LoColor);
  do
  {
    gotoxy(strlen(Mensaje) + 2, 1);
    if (Vars.CurrSS.BlockOn)
      WriteColor(strcat(strcat(ColToString(Vars.CurrSS.CurrBlock.Start.Col),
        strcpy(STemp, RowToString(Vars.CurrSS.CurrBlock.Start.Row))), ".."), LoColor);
    WriteColor(strcat(ColToString(Vars.CurrSS.Sections[Section].CurrPos.Col),
          strcpy(STemp, RowToString(Vars.CurrSS.Sections[Section].CurrPos.Row))), LoColor);
    clreol();
    Keypress = GetKey();
    GetCommands(1);
    if (Keypress == ESC && Vars.CurrSS.BlockOn)
    {
      ToggleCurrBlock(0);
      Keypress = ' ';
    }
  }
  while (Keypress != CR && Keypress != ESC);
  if (Keypress == CR)
  {
    if (Vars.CurrSS.BlockOn)
      Bloque.Asigna(Min(Vars.CurrSS.CurrBlock.Start.Col, Vars.CurrSS.CurrBlock.Stop.Col),
          Min(Vars.CurrSS.CurrBlock.Start.Row, Vars.CurrSS.CurrBlock.Stop.Row),
          Max(Vars.CurrSS.CurrBlock.Start.Col, Vars.CurrSS.CurrBlock.Stop.Col),
          Max(Vars.CurrSS.CurrBlock.Start.Row, Vars.CurrSS.CurrBlock.Stop.Row));
    else
    {
```

```
    Bloque.Start = Vars.CurrSS.Sections[Section].CurrPos;
    Bloque.Stop = Vars.CurrSS.Sections[Section].CurrPos;
  }
 }
 Vars.CurrSS.BlockOn = 0;
 Vars.CurrSS.Sections[Section].CurrPos = OldCurrPos;
 Vars.CurrSS.SetScreenColStart(OldStart.Col);
 Vars.CurrSS.SetScreenRowStart(OldStart.Row);
 Vars.CurrSS.Display();
 ClrEolXY(1, 1, LoColor);
 return Keypress == CR;
}

/* */
void DespliegaPantalla(CellPos Start)
{ CellPos OldStart = Vars.CurrSS.Sections[Section].ScreenBlock.Start,
       OldCurrPos = Vars.CurrSS.Sections[Section].CurrPos;

gettext(1, 1, 80, 25, Buffer);
  textattr(InfoColor);
  clrscr();
  Vars.CurrSS.Sections[Section].CurrPos.SetValues(0, 0);
  Vars.CurrSS.SetScreenRowStart(Start.Row);
  Vars.CurrSS.SetScreenColStart(Start.Col);
  Vars.CurrSS.DisplayAllCells();
  GetKey();
  Vars.CurrSS.Sections[Section].CurrPos = OldCurrPos;
  Vars.CurrSS.SetScreenColStart(OldStart.Col);
  Vars.CurrSS.SetScreenRowStart(OldStart.Row);
  puttext(1, 1, 80, 25, Buffer);
}

/* */ void AgregaCelda(char *LS, CellPos CP)
{
  strcat(LS, ColToString(CP.Col));
  strcat(LS, RowToString(CP.Row));
}

/* */ void CopiaFormula(CellPtr CPF, long DifX, long DifY, CellHashTablePtr CH)
{ char Nueva[256] = "", Temp[256];
  Word PosAnt;

Parser.SetValues(CH, ((FormulaCellPtr) CPF)->Formula);
  PosAnt = Parser.Position;
  Parser.NextToken();
  while (Parser.CurrToken.Tipo != FDL)
  {
    switch (Parser.CurrToken.Tipo)
    {
      case Celda:
        MInc(Parser.CurrToken.Info.CP.Col, DifX, MaxCol);
        MInc(Parser.CurrToken.Info.CP.Row, DifY, MaxRow);
        AgregaCelda(Nueva, Parser.CurrToken.Info.CP);
        break;
      default:
        strcat(Nueva, CopyN(Temp, Parser.inp+PosAnt, Parser.Position-PosAnt));
    }
```

```
  PosAnt = Parser.Position;
  Parser.NextToken();
}
 delete ((FormulaCellPtr) CPF)->Formula;
 ((FormulaCellPtr) CPF)->Formula = new char[strlen(Nueva) + 1];
 strcpy(((FormulaCellPtr) CPF)->Formula, Nueva);
}

/* */ void CopiaCelda(CellTypes Tipo, Boolean Error, double Valor, char *L,
         Word Row, Word Col, CellPos F)
{ CellPos P;
 CellPtr CPT;

P.Row = Row;
 P.Col = Col;
 Vars.CurrSS.DeleteCell(P);
 if (Tipo != ClEmpty)
 {
   Vars.CurrSS.AddCell(Tipo, P, Error, Valor, L);
   if (Tipo == ClFormula)
   {
     CPT = Vars.CurrSS.CellHash.CurrCell;
     CopiaFormula(CPT, (long) Col - F.Col, (long) Row -F.Row, &Vars.CurrSS.CellHash);
   }
 }
}

/* */ void CopiaValores(CellTypes& T, Boolean& E, double& V, CellPtr CP)
{
 T = CP->CellType();
 E = CP->HasError();
 V = CP->CurrValue();
}

/* */ void CopyBlock()
{ Block Fuente, Destino;
 CellPtr CP;
 Word C1;
 CellPos P;
 char L[256];
 CellTypes Tipo;
 double Valor;
 Boolean Error;

if (!LeeRango(PromptRango, Fuente, 1, NULL)) return;
 if (!LeeRango(PromptDestino, Destino, 0, NULL)) return;
 WriteXYClr(MensajeEspere, 1, 2, 0X07);
 if (Fuente.Start.Row == Fuente.Stop.Row && Fuente.Start.Col == Fuente.Stop.Col)
 {
     /* */
   CP = Vars.CurrSS.CellHash.Search(Fuente.Start);
   CP->CopyString(L);
   CopiaValores(Tipo, Error, Valor, CP);
   for (P.Row = Destino.Start.Row; P.Row <= Destino.Stop.Row; P.Row ++)
    for (P.Col = Destino.Start.Col; P.Col <= Destino.Stop.Col; P.Col ++)
```

```c
      CopiaCelda(Tipo, Error, Valor, L, P.Row, P.Col, Fuente.Start);
}
else if (Fuente.Start.Row == Fuente.Stop.Row)
    /* */
  for (P.Col = Fuente.Start.Col; P.Col <= Fuente.Stop.Col; P.Col ++)
  {
    P.Row = Fuente.Start.Row;
    CP = Vars.CurrSS.CellHash.Search(P);
    CP->CopyString(L);
    CopiaValores(Tipo, Error, Valor, CP);
    for (C1 = Fuente.Start.Row; C1 <= Fuente.Start.Row + Destino.Stop.Row -
        Destino.Start.Row; C1 ++)
      CopiaCelda(Tipo,Error,Valor,L, Destino.Start.Row +C1 -Fuente.Start.Row,
          Destino.Start.Col + P.Col - Fuente.Start.Col, P);
  }
else if (Fuente.Start.Col == Fuente.Stop.Col)
    /* */
  for (P.Row = Fuente.Start.Row; P.Row <= Fuente.Stop.Row; P.Row ++)
  {
    P.Col = Fuente.Start.Col;
    CP = Vars.CurrSS.CellHash.Search(P);
    CP->CopyString(L);
    CopiaValores(Tipo, Error, Valor, CP);
    for (C1 = Fuente.Start.Col; C1 <= Fuente.Start.Col + Destino.Stop.Col -
        Destino.Start.Col; C1 ++)
      CopiaCelda(Tipo,Error,Valor,L,Destino.Start.Row+P.Row-Fuente.Start.Row,
          Destino.Start.Col + C1 - Fuente.Start.Col, P);
  }
else
      /* */
  for (P.Row = Fuente.Start.Row; P.Row <= Fuente.Stop.Row; P.Row ++)
    for (P.Col = Fuente.Start.Col; P.Col <= Fuente.Stop.Col; P.Col ++)
    {
      CP = Vars.CurrSS.CellHash.Search(P);
      CP->CopyString(L);
      CopiaValores(Tipo, Error, Valor, CP);
      CopiaCelda(Tipo,Error,Valor,L,Destino.Start.Row+P.Row-Fuente.Start.Row,
          Destino.Start.Col + P.Col - Fuente.Start.Col, P);
    }
  Vars.CurrSS.SetLastPos(Vars.CurrSS.Sections[Section].LastPos);
  Vars.CurrSS.Update(DisplayYes);
  ClrEolXY(1, 2, 0X07);
}

/* */ void DeleteBlock()
{ Block Fuente;

if (!LeeRango(PromptRango, Fuente, 1, NULL)) return;
  Vars.CurrSS.DeleteBlock(Fuente);
  Vars.CurrSS.SetLastPos(Vars.CurrSS.Sections[Section].LastPos);
  Vars.CurrSS.Update(DisplayYes);
  DisplayMemory();
}

/* */ void Spreadsheet_Environment()
{
  GetCommands(0);
```

```
}

/* */ void Execute_Application_Environment()
{
  ApplicationMenu.Execute(Keypress);
  if (Keypress == CR)
  {
    if (ApplicationMenu.OpcionActual == 3) Select_Window();
    else DespliegaPantalla(Selecciones[ApplicationMenu.OpcionActual]);
  }
}

/* */ void Execute_Scratch_Environment()
{
  Spreadsheet_Environment();
}

/* */ void Execute_Parent_Environment()
{
  if (Environment == LAYOUT)
  {
    if (Keypress == LAYOUT_KEY) Define_Application_Environment();
    else Execute_Scratch_Environment();
  }
  else Execute_Application_Environment();
}
```

```
*=================================================*

*=========================*
* FILE: TCSHEET.CPP *
*=========================*

/* */ include "alloc.h"
include "string.h"
#include "conio.h"
#include "TCUtil.h"
#include "TCWindow.h"
#include "TCHash.h"
#include "TCCell.h"
#include "TCParser.h"
#include "TCSheet.h"

/* */ define ColWidth          10
define ScreenCols         7
#define CellHashBuckets   100
define OverwriteHashBuckets  10 typedef enum {GEN_PROG=1,SCRATCH=0} Section_Type;
typedef enum {APPLICATION=1, LAYOUT=0} Environment_Type;
typedef enum {TRUE=1,FALSE=0} boolean;
```

/* */ extern Section_Type Section;
extern boolean Window;
extern CellPtr Empty;
extern ParserObj Parser;
extern Environment_Type Environment;

/* */

```c
void DisplayMemory()
{
  WriteXY(RightJustStr(NumToString(farcoreleft()), 6), 35 +
      strlen(MemoryString), 25, MemoryColor);
}
```

/* */

```cpp
NodoLista::NodoLista(Word Col, Word Row)
{
  Pos.SetValues(Col, Row);
  Next = 0;
  Status = 0X02; /* */
}

NodoLista::NodoLista(Word Col, Word Row, Byte Tipo, Boolean Data,
         Boolean ConS, Boolean ConI, double LSup, double LInf)
{
  Pos.SetValues(Col, Row);
  Next = 0;
  SetValues(Tipo, Data, ConS, ConI, LSup, LInf);
}

Boolean NodoLista::IsData()
{
  return Status & 2;
}

Boolean NodoLista::Cumple(String Info, CellHashTablePtr CH)
{
  if (Status & 1)
  {
    Parser.SetValues(CH, Info);
    Parser.Parse();
    if (Parser.CType != CIValue)
      return 0;
    if ((Status & 4) && Parser.ParseValue > Superior)
      return 0;
    if ((Status & 8) && Parser.ParseValue < Inferior)
      return 0;
  }
  return 1;
} void NodoLista::SetValues(Boolean Data)
{
  Status = (Status & 253) | (Data << 1);
}
void NodoLista::SetValues(Byte Tipo, Boolean Data, Boolean ConS,
         Boolean ConI, double LSuperior, double LInferior)
```

```
{
 Status = 1 | Data << 1 | ConS << 2 | ConI << 3; /* */
 Superior = LSuperior;
 Inferior = LInferior;
}

/* */

Lista::~Lista()
{ NodoPtr Temp;

while (Header)
 {
  Temp = Header;
  Header = Header->Next;
  delete Temp;
 }
}

/* */ void Lista::SetValues(Word Col, Word Row, Boolean IsData)
{ NodoPtr *Tail;
 CellPos Pos;

Pos.SetValues(Col, Row);
 for (Tail = &Header; *Tail && !SameCellPos(Pos, (*Tail)->Pos);
    Tail = &(*Tail)->Next);
 if (!*Tail)
   *Tail = new NodoLista(Col, Row);
 else (*Tail)->SetValues(IsData);
} void Lista::SetValues(Word Col, Word Row, Byte Tipo, Boolean IsData,
           Boolean ConS, Boolean ConI, double LSup, double LInf)
{ NodoPtr *Tail;
 CellPos Pos;

Pos.SetValues(Col, Row);
 for (Tail = &Header; *Tail && !SameCellPos(Pos, (*Tail)->Pos);
    Tail = &(*Tail)->Next);
 if (!*Tail)
   *Tail = new NodoLista(Col, Row, Tipo, IsData, ConS, ConI, LSup, LInf);
 else (*Tail)->SetValues(Tipo, IsData, ConS, ConI, LSup, LInf);
}

/* */

Boolean Lista::IsData(Word Col, Word Row)
{ CellPos Pos;
 NodoPtr CurrPtr = Header;

Pos.SetValues(Col, Row);
 while (CurrPtr && !SameCellPos(CurrPtr->Pos, Pos))
   CurrPtr = CurrPtr->Next;
 if (!CurrPtr) return 0;
 return CurrPtr->IsData();
}

Boolean Lista::Cumple(Word Col, Word Row, String Info, CellHashTablePtr CH)
{ CellPos Pos;
```

```
NodoPtr CurrPtr = Header;

Pos.SetValues(Col, Row);
while (CurrPtr && !SameCellPos(CurrPtr->Pos, Pos))
  CurrPtr = CurrPtr->Next;
if (!CurrPtr) return 1;
return CurrPtr->Cumple(Info, CH);
} void Section::SetValues(Word Col1, Word Row1, Word Col2, Word Row2)
{
 CurrPos.SetValues(Col1, Row1);
 LastPos = CurrPos;
 SectionBlock.Asigna(Col1, Row1, Col2, Row2);
 ScreenBlock.Asigna(Col1, Row1, Col1 + 6, Row1 + 19);
}

/* */

Spreadsheet::Spreadsheet() : CellHash(CellHashBuckets),
                OverwriteHash(OverwriteHashBuckets)
{
 Sections[0].SetValues(1, 1, 156, MaxRow);
 Sections[1].SetValues(157, 1, MaxCol, MaxRow);
 FormulasLst = NULL;
 BandCirc = 0;
 BlockOn = 0;
}

/* */

Spreadsheet::~Spreadsheet()
{
}

/* */ void Spreadsheet::AgregaCelda(CellPos CP, char *S)
{
  Parser.SetValues(&CellHash, S);
  Parser.Parse();
  DeleteCell(CP);
  AddCell(Parser.CType, CP, Parser.MathError, Parser.ParseValue, S);
}

/* */ void Spreadsheet::AgregaCelda2(Word Col, Word Row, char *S)
{ CellPos P;

P.SetValues(Col, Row);
  AgregaCelda(P, S);
}
/* */ void Spreadsheet::SetAreas(Byte X1, Byte Y1, Byte X2, Byte Y2)
{
  ColArea.SetValues(X1 + RowNumberSpace, Y1, X2, Y1, BorderColor);
  RowArea.SetValues(X1, Y1 + 1, X1 + RowNumberSpace - 1, Y2 - 2, BorderColor);
  InfoArea.SetValues(X1, Y1, X1 + RowNumberSpace - 1, Y1, InfoColor);
  DisplayArea.SetValues(X1 + RowNumberSpace, Y1 + 1, X2, Y2 - 2, CellColor);
```

```
  BlankArea.SetValues(X2 - 5, Y1 + 1, X2, Y2 - 2, CellColor);
  SetScreenColStart(Sections[Section].ScreenBlock.Start.Col);
  SetScreenRowStart(Sections[Section].ScreenBlock.Start.Row);
}

/* */ void Spreadsheet::DisplayCols()
{ Word C;
  Byte Color;

ColArea.Clear();
  for (C = Sections[Section].ScreenBlock.Start.Col;
     C <= Sections[Section].ScreenBlock.Stop.Col; C ++)
  {
    if (C == Sections[Section].CurrPos.Col) Color = HighLightColor;
    else Color = BorderColor;
    WriteXY(CenterStr(ColToString(C), ColWidth), ColToX(C),
       ColArea.UpperLeft.Row, Color);
  }
}

/* */ void Spreadsheet::DisplayRows()
{ Word R;
  Byte Color;

RowArea.Clear();
  for (R = Sections[Section].ScreenBlock.Start.Row;
     R <= Sections[Section].ScreenBlock.Stop.Row; R ++)
  {
    if (R == Sections[Section].CurrPos.Row) Color = HighLightColor;
    else Color = BorderColor;
    WriteXY(LeftJustStr(RowToString(R), RowNumberSpace),
       RowArea.UpperLeft.Col, RowToY(R), Color);
  }
}

/* */ void Spreadsheet::DisplayInfo()
{
  InfoArea.Clear();
  ImpBandCirc();
  WriteXY(Section == SCRATCH ? "SCRATCH" : "LAYOUT", 73, 25, 0X74);
}

/* */ void Spreadsheet::DisplayAllCells()
{
  DisplayArea.Clear();
  DisplayBlock(Sections[Section].ScreenBlock);
}

/* */ void Spreadsheet::DisplayCell(CellPos Posicion, Boolean Band)
{ Byte Color;
  char S[81];
```

```
strcpy(S, CellToFString(Posicion, Color, ColWidth, 1));
WriteXY(S, ColToX(Posicion.Col), RowToY(Posicion.Row), Color);
if (Band)
{
  if (Posicion.Col == Sections[Section].CurrPos.Col) Color = HighLightColor;
  else Color = BorderColor;
  WriteXY(CenterStr(ColToString(Posicion.Col), ColWidth),
      ColToX(Posicion.Col), ColArea.UpperLeft.Row, Color);
  if (Posicion.Row == Sections[Section].CurrPos.Row) Color = HighLightColor;
  else Color = BorderColor;
  WriteXY(LeftJustStr(RowToString(Posicion.Row), RowNumberSpace),
      RowArea.UpperLeft.Col, Posicion.Row - Sections[Section].ScreenBlock.Start.Row
      + RowArea.UpperLeft.Row, Color);
}
}

/* */ void Spreadsheet::DisplayCellData()
{ CellPtr CP;
  char STemp[256];

CP = CellHash.Search(Sections[Section].CurrPos);
    strcpy(STemp, strcat(strcat(RowToString(Sections[Section].CurrPos.Row), ": "),
        strcpy(STemp, CP->DisplayString())));
    WriteXY(strcat(ColToString(Sections[Section].CurrPos.Col), STemp), 1, 2, InfoColor); clreol();
}

/* */ void Spreadsheet::DisplayCellBlock(Word C1, Word R1, Word C2, Word R2)
{ CellPos Posicion;

Switch(C1, C2);
  Switch(R1, R2);
  for (Posicion.Row = Max(R1, Sections[Section].ScreenBlock.Start.Row);
      Posicion.Row <= Min(R2, Sections[Section].ScreenBlock.Stop.Row); Posicion.Row ++)
  {
    for (Posicion.Col = Max(C1, Sections[Section].ScreenBlock.Start.Col);
        Posicion.Col <= Min(C2, Sections[Section].ScreenBlock.Stop.Col); Posicion.Col++)
      DisplayCell(Posicion, 0);
  }
}
        /* */ void Spreadsheet::DisplayBlock(Block B)
{
  DisplayCellBlock(B.Start.Col, B.Start.Row, B.Stop.Col, B.Stop.Row);
}

/* */ void Spreadsheet::DisplayBlockDiff(Block B1, Block B2)
{ Block B;

Switch(B1.Start.Row, B1.Stop.Row);
  Switch(B1.Start.Col, B1.Stop.Col);
  Switch(B2.Start.Row, B2.Stop.Row);
  Switch(B2.Start.Col, B2.Stop.Col);
  if (!memcmp(&B1, &B2, sizeof(Block))) return;
```

```
if (B1.Stop.Col != B2.Stop.Col)
{
  B.Asigna(Min(B1.Stop.Col +1, B2.Stop.Col + 1), Min(B1.Start.Row,B2.Start.Row),
      Max(B1.Stop.Col, B2.Stop.Col), Max(B1.Stop.Row, B2.Stop.Row));
  DisplayBlock(B);
}
if (B1.Stop.Row != B2.Stop.Row)
{
  B.Asigna(B1.Start.Col, Min(B1.Stop.Row + 1, B2.Stop.Row + 1),
      Max(B1.Stop.Col, B2.Stop.Col), Max(B1.Stop.Row, B2.Stop.Row));
  DisplayBlock(B);
}
if (B1.Start.Col != B2.Start.Col)
{
  B.Asigna(Min(B1.Start.Col, B2.Start.Col), Min(B1.Start.Row, B2.Start.Row),
      Max(B1.Start.Col, B2.Start.Col), Max(B1.Stop.Row, B2.Stop.Row));
  DisplayBlock(B);
}
if (B1.Start.Row != B2.Start.Row)
{
  B.Asigna(Min(B1.Start.Col, B2.Start.Col), Min(B1.Start.Row, B2.Start.Row),
      Max(B1.Stop.Col, B2.Stop.Col), Max(B1.Start.Row, B2.Start.Row));
  DisplayBlock(B);
}
}

/* */ void Spreadsheet::DisplayCol(Word Col)
{
  DisplayCellBlock(Col, Sections[Section].ScreenBlock.Start.Row, Col,
        Sections[Section].ScreenBlock.Stop.Row);
}

/* */ void Spreadsheet::DisplayRow(Word Row)
{
  DisplayCellBlock(Sections[Section].ScreenBlock.Start.Col, Row,
        Sections[Section].ScreenBlock.Stop.Col, Row);
}

/* */ void Spreadsheet::Display()
{
  DisplayCols();
  DisplayRows();
  DisplayInfo();
  DisplayCellData();
  DisplayAllCells();
}

/* */ void Spreadsheet::ImpBandCirc()
{
  if (!Window)
  {
    if (BandCirc) WriteXY("CIRC", 58, 25, LoColor);
    else WriteXY("    ", 58, 25, LoColor);
```

```
}
}

/*  */

Byte SigRef()
{
 Parser.NextToken();
 while (Parser.CurrToken.Tipo != Celda && Parser.CurrToken.Tipo < FDL)
   Parser.NextToken();
 return Parser.CurrToken.Tipo;
}

/*  */

ListaStackObj::ListaStackObj(Word InitMaxPos)
{
 MaxPos = InitMaxPos;
 Info = new FormulaCellPtr[MaxPos];
 QRear = 0;
 QFront = 0;
 TopS = MaxPos;
}

/*  */

ListaStackObj::~ListaStackObj()
{
 delete Info;
}

/*  */ void ListaStackObj::PushS(FormulaCellPtr CeldaFormula)
{
 TopS --;
 Info[TopS] = CeldaFormula;
 CeldaFormula->Marcada = (CeldaFormula->Marcada | EstaEnStack);
}

/*  */

FormulaCellPtr ListaStackObj::PopS()
{
 if (TopS >= MaxPos) return NULL;
 else {
   Info[TopS]->Marcada &= ~EstaEnStack;
   return Info[TopS ++];
 }
}

/*  */ void ListaStackObj::PushQ(FormulaCellPtr CeldaFormula)
{
 Info[QRear] = CeldaFormula;
 QRear ++;
 CeldaFormula->Marcada = Calculada;
}

/*  */
```

```
void Spreadsheet::Update(Boolean UDisplay)
{ FormulaCellPtr AValuar, *NuevaLista;
  CellPos CPTemp;
  CellPtr CPtr;
  Boolean Todos;
  Byte Tipo, Buffer[160];
  Word O, NumFormulas;

gettext(1, 2, 80, 2, Buffer);
  WriteXY(MensajeEspere, 1, 2, Environment == LAYOUT II Section == SCRATCH ? 0X07 : 0X17);
  clreol();
  BandCirc = 0;
  NuevaLista = &FormulasLst;
  NumFormulas = 0;
  while (*NuevaLista)
  {
      /* */
    (*NuevaLista)->Marcada = 0;
    NuevaLista = &(*NuevaLista)->Sig;
    NumFormulas ++;
  }
  ListaStackObj ListaStack(NumFormulas);
  while (FormulasLst) /* */
  {
    AValuar = FormulasLst;
    if (!AValuar->GetBand())
      do {
        Parser.SetValues(&CellHash, AValuar->Formula);
        Todos = 1;
        do {
          /* */
          /* */
          /* */
          Tipo = SigRef();
          if (Tipo == Celda)
          {
            CPtr = CellHash.Search(Parser.CurrToken.Info.CP);
            if (CPtr->EnStack()) BandCirc = 1;
            else Todos = CPtr->GetBand();
          }
        } while (Todos && Tipo != FDL);
        if (Todos)
        {
          if (!AValuar->GetBand())
            ListaStack.PushQ(AValuar);
          AValuar = ListaStack.PopS();
        }
        else {
          ListaStack.PushS(AValuar);
          AValuar = (FormulaCellPtr) CPtr;
        }
      } while (AValuar);
    FormulasLst = FormulasLst->Sig;
  }
  NuevaLista = &FormulasLst;
  for (NumFormulas = 0; NumFormulas < ListaStack.QRear; NumFormulas ++)
  {
    *NuevaLista = ListaStack.Info[NumFormulas];
    NuevaLista = &(*NuevaLista)->Sig;
  }
```

```
*NuevaLista = NULL;
NuevaLista = &FormulasLst;
while (*NuevaLista)
{
    /*  */
    Parser.SetValues(&CellHash, (*NuevaLista)->Formula);
    Parser.Parse();
    (*NuevaLista)->Value = Parser.ParseValue;
    (*NuevaLista)->Error = Parser.MathError;
    O = (*NuevaLista)->Overwritten(CellHash, Sections[Section].LastPos, MaxCol);
    if (!Parser.MathError) OverwriteHash.Change(*NuevaLista, O);
    NuevaLista = &(*NuevaLista)->Sig;
}
if (UDisplay)
    DisplayAllCells();
puttext(1, 2, 80, 2, Buffer);
ImpBandCirc();
}

/*  */ void Spreadsheet::SetScreenColStart(Word NewCol)
{
    Sections[Section].ScreenBlock.Stop.Col = Min(NewCol + ScreenCols - 1,
            Sections[Section].SectionBlock.Stop.Col);
    Sections[Section].ScreenBlock.Start.Col =
            (long) Sections[Section].ScreenBlock.Stop.Col - ScreenCols + 1;
}

/*  */ void Spreadsheet::SetScreenColStop(Word NewCol)
{
    Sections[Section].ScreenBlock.Start.Col = Max((long) NewCol - ScreenCols + 1,
            Sections[Section].SectionBlock.Start.Col);
    Sections[Section].ScreenBlock.Stop.Col =
            Sections[Section].ScreenBlock.Start.Col + ScreenCols - 1;
}

/*  */ void Spreadsheet::SetScreenRowStart(Word NewRow)
{
    Sections[Section].ScreenBlock.Stop.Row = Min(NewRow + TotalRows - 1,
            Sections[Section].SectionBlock.Stop.Row);
    Sections[Section].ScreenBlock.Start.Row =
            (long) Sections[Section].ScreenBlock.Stop.Row - TotalRows + 1;
}

/*  */ void Spreadsheet::SetScreenRowStop(Word NewRow)
{
    Sections[Section].ScreenBlock.Start.Row = Max((long) NewRow - TotalRows + 1,
            Sections[Section].SectionBlock.Start.Row);
    Sections[Section].ScreenBlock.Stop.Row =
            Sections[Section].ScreenBlock.Start.Row + TotalRows - 1;
}

/*  */
```

```
Boolean Spreadsheet::AddCell(CellTypes CellType, CellPos P, Boolean E,
                double V, char *I)
{ CellPtr CP, S;
  CellPos OldLastPos;

switch (CellType) {
    case ClValue :
      CP = new ValueCell(P, E, V);
      break;
    case ClFormula :
    {
      CP = new FormulaCell(P, E, V, I);
      FormulaCellPtr(CP)->Agrega(FormulasLst);
      break;
    }
    case ClText :
      CP = new TextCell(P, I);
  }
  if (!CP) return 0;
  if (!CellHash.Add(CP))
  {
    delete CP;
    return 0;
  }
  OldLastPos = Sections[Section].LastPos;
  if (P.Row <= MaxRow)
  {
    if (Sections[Section].SectionBlock.CellInBlock(P))
      Sections[Section].LastPos.SetValues(Max(P.Col, Sections[Section].
            LastPos.Col), Max(P.Row, Sections[Section].LastPos.Row));
    else
    {
      Sections[1 - Section].LastPos.SetValues(Max(P.Col, Sections[1 - Section].
            LastPos.Col), Max(P.Row, Sections[1 - Section].LastPos.Row));
    }
    if (!OverwriteHash.Add(CP, CP->Overwritten(CellHash,
                Sections[Section].LastPos, MaxCol)))
    {
      Sections[Section].LastPos = OldLastPos;
      CellHash.Delete(CP->Loc, S, FormulasLst);
      delete CP;
      return 0;
    }
    S = OverwriteHash.Search(CP->Loc);
    if (S->CellType() != ClEmpty)
      OverwriteHash.Change(S, S->Overwritten(CellHash, Sections[Section].LastPos, MaxCol));
  }
  return 1;
}

/* */ void Spreadsheet::DeleteCell(CellPos P)
{ CellPtr CP;

CellHash.Delete(P, CP, FormulasLst);
  if (CP)
  {
    delete CP;
    OverwriteHash.Delete(P);
    if (P.Col > 1)
```

```
{
  P.Col --;
  CP = OverwriteHash.Search(P);
  if (CP->CellType() == ClEmpty)
    CP = CellHash.Search(P);
  if (CP->CellType() != ClEmpty)
    OverwriteHash.Change(CP, CP->Overwritten(CellHash, Sections[Section].LastPos, MaxCol));
 }
 }
}

/* */ void Spreadsheet::DeleteBlock(Block B)
{ CellPos P;
  CellPtr CP;

WriteXYClr(MensajeEspere, 1, 2, 0X07);
  for (P.Row = B.Start.Row; P.Row <= B.Stop.Row; P.Row ++)
    for (P.Col = B.Start.Col; P.Col <= B.Stop.Col; P.Col ++)
      DeleteCell(P);
  ClrEolXY(1, 2, 0X07);
}

/* */

String Spreadsheet::CellToFString(CellPos Pos, Byte& Color, Byte Width,
                Boolean Over)
{ CellPtr CP;
  char S1[256];
  Boolean ColorFound;
  Byte Colr;

ColorFound = 1;
  if (SameCellPos(Pos, Sections[Section].CurrPos)) Color = HighLightColor;
  else if (BlockOn && CurrBlock.CellInBlock(Pos)) Color = HighLightColor;
  else if (DataCells.IsData(Pos.Col, Pos.Row)) Color = LoColor;
  else ColorFound = 0;
  CP = CellHash.Search(Pos);
  if (CP->HasError())
  {
    strcpy(S1, ErrorString);
    if (ColorFound) Color += BLINK;
    else Color = CellErrorColor;
  }
  else
  {
    if (!Over && CP->CellType() == ClEmpty) *S1 = '\0';
    else strcpy(S1, CP->FormattedString(OverwriteHash, Pos, 0, Colr, Width));
    if (!ColorFound)
      Color = Colr;
  }
  if (CP->CellType()==ClFormula || CP->CellType()==ClValue)
    return RightJustStr(S1, Width);
  else return LeftJustStr(S1, Width);
}

/* */ void Spreadsheet::SetLastPos(CellPos DPos)
{ CellPtr CP;
```

```
  Word Counter;
  Boolean ColFound, RowFound;

ColFound = (DPos.Col < Sections[Section].LastPos.Col);
  RowFound = (DPos.Row < Sections[Section].LastPos.Row);
  if (!ColFound)
    Sections[Section].LastPos.Col = 1;
  if (!RowFound)
    Sections[Section].LastPos.Row = 1;
  CP = CellHash.FirstItem();
  while (CP)
  {
    if (Sections[Section].SectionBlock.CellInBlock(CP->Loc))
    {
      if (!ColFound)
      {
        if (CP->Loc.Col > Sections[Section].LastPos.Col)
        {
          Sections[Section].LastPos.Col = CP->Loc.Col;
          ColFound = Sections[Section].LastPos.Col == DPos.Col;
          if (ColFound && RowFound) return;
        }
      }
      if (!RowFound)
      {
        if (CP->Loc.Row > Sections[Section].LastPos.Row)
        {
          Sections[Section].LastPos.Row = CP->Loc.Row;
          RowFound = Sections[Section].LastPos.Row == DPos.Row;
          if (ColFound && RowFound) return;
        }
      }
    }
    CP = CellHash.NextItem();
  }
}

/* */

Byte Spreadsheet::ColToX(Word Col)
{
  return ((Col - Sections[Section].ScreenBlock.Start.Col) * ColWidth + RowNumberSpace + 1);
}

/* */

Byte Spreadsheet::RowToY(Word Row)
{
  return Row + DisplayArea.UpperLeft.Row - Sections[Section].ScreenBlock.Start.Row;
}

/* */

Boolean SameCellPos(CellPos P1, CellPos P2)
{
  return !memcmp(&P1, &P2, sizeof(CellPos));
}

/* */ void Spreadsheet::IniciaFormulas()
```

```
{ CellPtr CPtr;

FormulasLst = NULL;
  CPtr = CellHash.FirstItem();
  while (CPtr)
  {
    if (CPtr->CellType() == ClFormula)
      ((FormulaCellPtr) CPtr)->Agrega(FormulasLst);
    CPtr = CellHash.NextItem();
  }
}

/* */ void Spreadsheet::CopiaAArreglo(Hilera *Arreglo, Word MaxItems,
                  Block Rango, Byte Width)
{ Word Cont = 0;
  CellPos Pos;
  Byte Color;

for (Pos.Col = Rango.Start.Col;
       Pos.Col <= Rango.Stop.Col && Cont < MaxItems; Pos.Col ++)
    for (Pos.Row = Rango.Start.Row;
         Pos.Row <= Rango.Stop.Row && Cont < MaxItems; Pos.Row ++)
      strcpy(Arreglo[Cont ++], CellToFString(Pos, Color, Width, 0));
}

/* */ void Spreadsheet::CopiaDeArreglo(Hilera *Arreglo, Word MaxItems, Block Rango)
{ Word Cont = 0;
  CellPos Pos;
  CellPtr CP;

for (Pos.Col = Rango.Start.Col;
       Pos.Col <= Rango.Stop.Col && Cont < MaxItems; Pos.Col ++)
    for (Pos.Row = Rango.Start.Row;
         Pos.Row <= Rango.Stop.Row && Cont < MaxItems; Pos.Row ++)
    {
      CP = CellHash.Search(Pos);
      if (CP->CellType() != ClFormula)
        AgregaCelda(Pos, Arreglo[Cont]);
      Cont ++;
    }
}
```

* FILE: TCSHEET.H *

/* */

```
#define EmptyRowsAtTop      2
#define EmptyRowsAtBottom   1
#define MaxScreenCols       25
#define TotalRows           20
#define ChangedChar         ""
#define LargoNodoStack      16384
#define EditYes             1
```

```
#define EditNo           0
#define DisplayYes       1
#define DisplayNo        0
#define WasChanged       1
#define NotChanged       0
#define MemoryString    "Avail Memory:"
#define ErrorString     "ERROR"
#define MensajeEspere   "Please wait"

typedef char Hilera[9];

struct NodoLista {
  CellPos Pos;
  Byte Status;
  double Superior, Inferior;
  NodoLista *Next;
  NodoLista(Word Col, Word Row, Byte Tipo, Boolean Data,
        Boolean ConS, Boolean ConI, double LSup, double LInf);
  NodoLista(Word Col, Word Row);
  void SetValues(Boolean Data);
  void SetValues(Byte Tipo, Boolean Data, Boolean ConS,
        Boolean ConI, double LSuperior, double LInferior);
  Boolean IsData();
  Boolean Cumple(String Info, CellHashTablePtr CH);
};

typedef NodoLista *NodoPtr;

struct Lista {
  NodoPtr Header;
  Lista::Lista() { Header = 0; };
  Lista::~Lista();
  void SetValues(Word Col, Word Row, Boolean IsData);
  void SetValues(Word Col, Word Row, Byte Tipo, Boolean Data, Boolean ConS,
        Boolean ConI, double LSuperior, double LInferior);
  Boolean IsData(Word Col, Word Row);
  Boolean Cumple(Word Col, Word Row, String Info, CellHashTablePtr CH);
};

struct Section {
  CellPos CurrPos;
  CellPos LastPos;
  Block SectionBlock;
  Block ScreenBlock;
  Section() {};
  void SetValues(Word Col1, Word Row1, Word Col2, Word Row2);
};
                    /* */ struct Spreadsheet {
   Section Sections[2];
   Boolean BandCirc;
   Lista DataCells;
   Boolean BlockOn;
   Block CurrBlock;
   FormulaCellPtr FormulasLst;
   CellHashTable CellHash;
   OverwriteHashTable OverwriteHash;
   Window DisplayArea;
   Window ColArea;
   Window RowArea;
```

```
Window InfoArea;
Window BlankArea;
Spreadsheet();
~Spreadsheet();
void AgregaCelda(CellPos CP, char *S);
void AgregaCelda2(Word Col, Word Row, char *S);
void SetAreas(Byte X1, Byte Y1, Byte X2, Byte Y2);
void DisplayCols();
void DisplayRows();
void DisplayInfo();
void DisplayAllWindows();
void DisplayAllCells();
void Display();
void DisplayCell(CellPos P, Boolean Band);
void DisplayCellData();
void DisplayCellBlock(Word C1, Word R1, Word C2, Word R2);
void DisplayBlock(Block B);
void DisplayBlockDiff(Block B1, Block B2);
void DisplayCol(Word Col);
void DisplayRow(Word Row);
void ImpBandCirc();
void Reordena();
void Update(Boolean UDisplay);
Boolean AddCell(CellTypes CellType, CellPos P, Boolean E,
        double V, char *I);
void DeleteCell(CellPos P);
void DeleteBlock(Block B);
String CellToFString(CellPos P, Byte& Color, Byte Width, Boolean Over);
void SetScreenColStart(Word Col);
void SetScreenColStop(Word Col);
void SetScreenRowStart(Word Row);
void SetScreenRowStop(Word Row);
void SetLastPos(CellPos DPos);
Byte ColToX(Word Col);
Byte RowToY(Word Row);
double ValorCelda(CellPos CP);
void IniciaFormulas();
void CopiaAArreglo(Hilera *Arreglo, Word MaxItems, Block Rango, Byte Width);
void CopiaDeArreglo(Hilera *Arreglo, Word MaxItems, Block Rango);
};

typedef Spreadsheet *SpreadsheetPtr;
typedef FormulaCellPtr *InfoPtr;

/* */ struct ListaStackObj {
    InfoPtr Info;
    Word MaxPos, TopS, QRear, QFront;
    ListaStackObj() {};
    ListaStackObj(Word InitMaxPos);
    ~ListaStackObj();
    void PushS(FormulaCellPtr CeldaFormula);
    FormulaCellPtr PopS();
    void PushQ(FormulaCellPtr CeldaFormula);
};

void DisplayMemory();
Boolean SameCellPos(CellPos P1, CellPos P2);
```

```
/*====================*/
/* FILE: TCUTIL.CPP   */
/*====================*/

/*  */ include "conio.h"
include "ctype.h"
#include "stdlib.h"
#include "string.h"
include "TCUtil.h"

char S[256]; //

/*  */ void Switch(Word& Val1, Word& Val2)
{ Word Temp;

if (Val1 > Val2)
  {
    Temp = Val2;
    Val2 = Val1;
    Val1 = Temp;
  }
}

/*  */

Word GetKey()
{ char Ch;

Ch = getch();
  if (Ch == NUL0) return (getch() << 8);
  else return Ch;
}

/*  */

Word GetKeyUpCase()
{ Word C;

return ((C = GetKey()) >= 'a' && C <= 'z') ? toupper(C) : C;
}

/*  */ char GetKeyChar(Boolean Legal(char))
{ Word Ch;

do
    Ch = GetKeyUpCase();
  while (Ch != ESC && !Legal(Ch));
  return Ch;
}

/*  */

String NumToString(long N)
{
```

```
Itoa(N, S, 10);
return S;
}

/* */

String FillString(Byte Len, char Ch)
{
  memset(S, Ch, Len);
  S[Len] = '\0';
  return S;
}

/* */

String TruncStr(String TString, Byte Len)
{
  TString[Len] = '\0';
  return TString;
}

/* */

String PadChar(String PString, char Ch, Byte Len)
{ Byte CurrLen;

strcpy(S, PString);
  CurrLen = Min(strlen(S), Len);
  if (Len > CurrLen)
    memset(&S[CurrLen], Ch, Len - CurrLen);
  S[Len] = '\0';
  return S;
}

/* */

String CenterStr(String SC, Byte Width)
{ char STemp[256];

return PadChar(strcpy(STemp, strcat(PadChar("", ' ', (Width -
           strlen(SC)) / 2), strcpy(STemp, SC))), ' ', Width);
}

/* */

String LeftJustStr(String SL, Byte Width)
{
  return PadChar(SL, ' ', Width);
}

/* */

String RightJustStr(String SR, Byte Width)
{ char STemp[256];

TruncStr(SR, Width);
  return strcat(LeftJustStr("", Width - strlen(SR)), strcpy(STemp, SR));
}

/* */
```

```c
char *CopyN(char *Dest, char *Source, Word Max)
{
  strncpy(Dest, Source, Max);
  Dest[Max] = '\0';
  return Dest;
}

/* */

String ColToString(Word Col)
{ Word W;
  char STemp[256];

STemp[0] = '\0';
  while (Col > 0)
  {
    strcpy(STemp, strcat(PadChar("", (Col - 1) % 26 + 'A', 1), STemp));
    Col = (Col - 1) / 26;
  }
  strcpy(S, STemp);
  return S;
}

/* */

String RowToString(Word Row)
{
  return NumToString(Row);
}

/* */

Word StringToCol(String SCol)
{ long C = 0;

strupr(SCol);
  for ( ; *SCol != '\0'; SCol ++)
    C = C * 26 + *SCol - 'A' + 1;
  if (C <= MaxCol) return C;
  else return 0;
}

/* */

Word StringToRow(String S)
{ long R;

if (S[0] == '\0') return 0;
  R = atol(S);
  if (R <= MaxRow) return R;
  else return 0;
}

/* */ void MInc(Word& Num, long Dif, Word Mayor)
{ long NT;

NT = Num + Dif;
  if (NT < 1) Num = Mayor + NT;
  else if (NT > Mayor) Num = NT - Mayor;
```

```c
else Num = NT;
}
```

```
*===============================================================*
*===============*
* FILE: TCUTIL.H *
*===============*

/* */ define ErrNoMemory    "Insuficient Memory"

define NULO        0
#define BS          8
#define TabKey      9
#define CR          13
#define ESC         27
#define STabKey     3840
#define F1          15104
#define F2          15360
#define F3          15616
#define F4          15872
#define F5          16128
#define F6          16384
#define F7          16640
#define F8          16896
#define F9          17152
#define F10         17408
#define AltF1       26624
#define AltF2       26880
#define AltF3       27136
#define AltF4       27392
#define AltF5       27648
#define AltF6       27904
#define AltF7       28160
#define AltF8       28416
#define AltF9       28672
#define AltF10      28928
#define HomeKey     18176
#define UpKey       18432
#define PgUpKey     18688
#define LeftKey     19200
#define RightKey    19712
#define EndKey      20224
#define DownKey     20480
#define PgDnKey     20736
#define InsKey      20992
#define DelKey      21248
#define CtrlLeftKey 29440
#define CtrlRightKey 29696
#define CtrlPgUp    33792
define CtrlPgDown  30208 define MaxRow          9999
define MaxCol          300
#define RowNumberSpace  4
define ColSpace        2 define BorderColor 0X71
define CellColor   0X17
```

```
#define HiColor        0X74
#define LoColor        0X70
#define HighLightColor 0X4F
#define CellErrorColor 0X94
#define MemoryColor    0X70
define InfoColor      0X07 define Min(a, b)  ((a) < (b) ? (a) : (b))
define Max(a, b)  ((a) > (b) ? (a) : (b))
#define EstaEn(a, b, c)  ((a) >= (b) && (a) <= (c))

/*  */ typedef void (*ProcPtr)();
typedef char *String;
typedef String *StringPtr;
typedef unsigned int Word;
typedef Word *WordPtr;
typedef unsigned char Boolean, Byte;

void Switch(Word& Val1, Word& Val2);
Word GetKey();
Word GetKeyUpCase();
char GetKeyChar(Boolean Legal(char));
String NumToString(long N);
String FillString(Byte Len, char Ch);
String TruncStr(String TString, Byte Len);
String PadChar(String PString, char Ch, Byte Len);
String CenterStr(String S, Byte Width);
String LeftJustStr(String S, Byte Width);
String RightJustStr(String S, Byte Width);
char *CopyN(char *Dest, char *Source, Word Max);
String ColToString(Word Col);
String RowToString(Word Row);
Word StringToCol(String S);
Word StringToRow(String S);
void MInc(Word& Num, long Dif, Word Mayor);

*========================================*

*============*
* FILE: TCRUN.CPP *
*============*

/*  */ include "conio.h"
include "string.h"
include "TCUtil.h"
#include "TCWindow.h"
#include "TCHash.h"
#include "TCCell.h"
#include "TCInput.h"
#include "TCParser.h"
#include "TCSheet.h"
#include "Editor.h"
#include "TCRun.h"

#define ErrorData "Error in data type or value limits"

typedef enum {GEN_PROG=1,SCRATCH=0} Section_Type;
```

```c
typedef enum {TRUE=1,FALSE=0} boolean;

/* */ extern Section_Type Section;
extern ParserObj Parser;
extern boolean Window;

char RBuffer[4000];
ProgramObject Vars;

/* */ void SetDisplayAreas()
{ Word StartRow, Amt;

StartRow = EmptyRowsAtTop + 1;
  Amt = 25 - EmptyRowsAtBottom - StartRow + 1;
  Vars.CurrSS.SetAreas(1, StartRow, 80, StartRow + Amt);
}

/* */ void DisplayFormat()
{
  textattr(InfoColor);
  clrscr();
  ClrEolXY(1, 25, LoColor);
  ClrEolXY(1, 1, LoColor);
  WriteXY(MemoryString, 33, 25, LoColor);
  DisplayMemory();
}

/* */ void DisplayAll()
{
  DisplayFormat();
  Vars.CurrSS.Display();
  _setcursortype(_NOCURSOR);
}

/* */

ProgramObject::ProgramObject() : CurrSS()
{
  _setcursortype(_NOCURSOR);
  SetDisplayAreas();
//

/*
  CurrSS.AgregaCelda2(202, 2, "First Screen");
  CurrSS.AgregaCelda2(202, 22, "Second Screen");
  CurrSS.AgregaCelda2(202, 42, "Third Screen");
*/
  //

CurrSS.AgregaCelda2(202, 3, "FINANCIAL CONDITIONS");
  CurrSS.AgregaCelda2(202, 4, "-------------------");
  CurrSS.AgregaCelda2(202, 6, "SALES COSTS");
  CurrSS.AgregaCelda2(202, 8, "OPERATING EXPENSES");
```

```
CurrSS.AgregaCelda2(202, 10, "INCOME TAX RATE");
CurrSS.AgregaCelda2(202, 12, "CURRENT LIABILITIES");
CurrSS.AgregaCelda2(202, 13, " Interest Rate");
CurrSS.AgregaCelda2(202, 14, " Number of Capital Payments");
CurrSS.AgregaCelda2(202, 16, "LONG-TERM LIABILITIES");
CurrSS.AgregaCelda2(202, 17, " Interest Rate");
CurrSS.AgregaCelda2(202, 18, " Number of Capital Payments");
CurrSS.AgregaCelda2(202, 23, "FINANTIAL SUMMARY");
CurrSS.AgregaCelda2(205, 23, " Periodo:");
CurrSS.AgregaCelda2(206, 23, "GB1");
CurrSS.AgregaCelda2(202, 24, "---------------");
CurrSS.AgregaCelda2(202, 27, "REVENUES            $.");
CurrSS.AgregaCelda2(202, 28, "SALES REVENUE          $.");
CurrSS.AgregaCelda2(202, 29, "EARNINGS BEF. INCOME TAX  $.");
CurrSS.AgregaCelda2(202, 30, "NET INCOME            $.");
CurrSS.AgregaCelda2(202, 33, "TOTAL ASSETS           $.");
CurrSS.AgregaCelda2(202, 34, "TOTAL LIABILITIES       $.");
CurrSS.AgregaCelda2(202, 35, "TOTAL EQUITY          $.");
CurrSS.AgregaCelda2(202, 36, "TOTAL LIABIL. & EQUITY    $.");
CurrSS.AgregaCelda2(202, 43, "FINANCIAL RATIOS");
CurrSS.AgregaCelda2(205, 43, " Periodo:");
CurrSS.AgregaCelda2(206, 43, "GB1");
CurrSS.AgregaCelda2(202, 44, "---------------");
CurrSS.AgregaCelda2(202, 46, "LEVERAGE");
CurrSS.AgregaCelda2(202, 47, " Debt Ratio");
CurrSS.AgregaCelda2(202, 48, " Earnings / Interests");
CurrSS.AgregaCelda2(202, 50, "LIQUIDITY");
CurrSS.AgregaCelda2(202, 51, " Current Ratio");
CurrSS.AgregaCelda2(202, 52, " Acid Test");
CurrSS.AgregaCelda2(202, 54, "EFFICIENCY MEASURES");
CurrSS.AgregaCelda2(202, 55, " Sales / Total Assets");
CurrSS.AgregaCelda2(202, 56, " Inventory Rotation");
CurrSS.AgregaCelda2(202, 57, " Net Earnings / Sales");
CurrSS.AgregaCelda2(202, 58, " Net Earnings / Assets");
CurrSS.AgregaCelda2(205, 27, "GB3");
CurrSS.AgregaCelda2(206, 27, "1");
CurrSS.AgregaCelda2(205, 28, "GB7");
CurrSS.AgregaCelda2(206, 28, "GW28/GW27");
CurrSS.AgregaCelda2(205, 29, "GB13");
CurrSS.AgregaCelda2(206, 29, "GW29/GW27");
CurrSS.AgregaCelda2(205, 30, "GB17");
CurrSS.AgregaCelda2(206, 30, "GW30/GW27");
CurrSS.AgregaCelda2(205, 33, "GB27");
CurrSS.AgregaCelda2(206, 33, "1");
CurrSS.AgregaCelda2(205, 34, "GB33");
CurrSS.AgregaCelda2(206, 34, "GW34/GW33");
CurrSS.AgregaCelda2(205, 35, "GB35");
CurrSS.AgregaCelda2(206, 35, "GW35/GW36");
CurrSS.AgregaCelda2(205, 36, "GB37");
CurrSS.AgregaCelda2(206, 36, "1");
CurrSS.AgregaCelda2(206, 47, "GX34");
CurrSS.AgregaCelda2(206, 48, "GB13/GB11");
CurrSS.AgregaCelda2(206, 51, "GB24/GB31");
CurrSS.AgregaCelda2(206, 52, "(GB24-GB25)/GB31");
CurrSS.AgregaCelda2(206, 55, "GB3/GB27");
CurrSS.AgregaCelda2(206, 56, "GB3/GB25");
CurrSS.AgregaCelda2(206, 57, "GB17/GB3");
CurrSS.AgregaCelda2(206, 58, "GB17/GB27");
CurrSS.AgregaCelda2(206, 6, ".65");
CurrSS.AgregaCelda2(206, 8, ".38");
CurrSS.AgregaCelda2(206, 10, ".33");
```

```
CurrSS.AgregaCelda2(206, 13, ".28");
CurrSS.AgregaCelda2(206, 14, "9");
CurrSS.AgregaCelda2(206, 17, ".22");
CurrSS.AgregaCelda2(206, 18, "20");
CurrSS.DataCells.SetValues(206, 6, 1);
CurrSS.DataCells.SetValues(206, 8, 1);
CurrSS.DataCells.SetValues(206, 10, 1);
CurrSS.DataCells.SetValues(206, 13, 1);
CurrSS.DataCells.SetValues(206, 14, 1);
CurrSS.DataCells.SetValues(206, 17, 1);
CurrSS.DataCells.SetValues(206, 18, 1);
}

/*    */

ProgramObject::~ProgramObject()
{
  textattr(LIGHTGRAY);
  clrscr();
  _setcursortype(_NORMALCURSOR);
}

/*    */ void IngresaCelda(char *LS)
{ CellPos Pos;

Vars.CurrSS.AgregaCelda(Vars.CurrSS.Sections[Section].CurrPos, LS);
  Pos.Row = Vars.CurrSS.Sections[Section].CurrPos.Row;
  if (!Window)
    for (Pos.Col = Vars.CurrSS.Sections[Section].CurrPos.Col;
         Pos.Col <= Vars.CurrSS.Sections[Section].ScreenBlock.Stop.Col; Pos.Col ++)
      Vars.CurrSS.DisplayCell(Pos, 0);
}

/*    */

Boolean EditInput(Word Ch, Boolean Editing)
{ Boolean PuedeSalir = 0;
  char STemp[256] = " ";
  Field CellInput(1, 80, 1, 0, NotUpper);
  CellPos Pos = Vars.CurrSS.Sections[Section].CurrPos;

if (Editing)
    Vars.CurrSS.CellHash.Search(Pos)->EditString(STemp);
  else STemp[0] = Ch;
  do
  {
    CellInput.Edit(STemp);
    strcpy(STemp, CellInput.InputData);
    if (!CellInput.Quit && strlen(STemp))
    {
      if (!Vars.CurrSS.DataCells.Cumple(Pos.Col, Pos.Row, STemp, &Vars.CurrSS.CellHash))
        PrintError(ErrorData);
      else PuedeSalir = 1;
    }
    else PuedeSalir = 1;
  } while (!PuedeSalir);
  if (!CellInput.Quit && strlen(CellInput.InputData))
    IngresaCelda(CellInput.InputData);
```

```
if (!Window)
  DisplayMemory();
return CellInput.GetQuit();
}

/*    */

Boolean ProcessInput(Word Ch, Boolean Editing, Word Col, Word Row, char *S)
{ CellPos OldPos = Vars.CurrSS.Sections[Section].CurrPos;
  CellPtr CP;
  Byte Colr;
  Boolean Quit;

Vars.CurrSS.Sections[Section].CurrPos.SetValues(Col, Row);
  Quit=EditInput(Ch, Editing);
  CP = Vars.CurrSS.CellHash.Search(Vars.CurrSS.Sections[Section].CurrPos);
  strcpy(S, CP->FormattedString(Vars.CurrSS.OverwriteHash,
              Vars.CurrSS.Sections[Section].CurrPos, 0, Colr, 8));
  if (CP->CellType() == CIText)
    strcpy(S, LeftJustStr(S, 8));
  else strcpy(S, RightJustStr(S, 8));
  Vars.CurrSS.Sections[Section].CurrPos = OldPos;
  return Quit;
}

/*  */ void ClearCurrBlock()
{
  if (Vars.CurrSS.BlockOn)
  {
    Vars.CurrSS.BlockOn = 0;
    Vars.CurrSS.DisplayBlock(Vars.CurrSS.CurrBlock);
  }
} void Help()
{ Texto HelpText;

HelpText.DespliegaMatriz();
  _setcursortype(_NOCURSOR);
}

/*  */ void Recalc()
{
  Vars.CurrSS.Update(DisplayYes);
}

/*  */ void EditCell()
{
  EditInput(0, EditYes);
}
```

* ================================================== *

* ============ *
* FILE: TCRUN.H *

```
/* */
/* */ struct ProgramObject {
  Spreadsheet CurrSS; /* */
  ProgramObject();
  ~ProgramObject();
};

void DisplayFormat();
void DisplayAll();
Boolean EditInput(Word Ch, Boolean Editing);
Boolean ProcessInput(Word Ch, Boolean Editing, Word Col, Word Row, char *S);
void EditCell();
void Help();
void Recalc();
void IngresaCelda(char *S);
void SetDisplayAreas();
void ClearCurrBlock();
```

```
* FILE: TCCELL.CPP *

/* */ include "stdio.h"
include "string.h"
#include "alloc.h"
#include "TCUtil.h"
#include "TCHash.h"
#include "TCCell.h"

char SCell[256];
CellPtr Empty = new EmptyCell;

/* */

Block::Block(Word StartCol, Word StartRow, Word StopCol, Word StopRow)
{
  Start.Col = StartCol;
  Start.Row = StartRow;
  Stop.Col = StopCol;
  Stop.Row = StopRow;
}

Block::Block(CellPos InitStart)
{
  Start = InitStart;
  Stop = Start;
}

/* */

Boolean Block::ExtendTo(CellPos NewLoc)
{
  Stop.Row = NewLoc.Row;
```

```
   Stop.Col = NewLoc.Col;
   return 1;
}

/* */

Boolean Block::CellInBlock(CellPos CheckCell)
{
  return (CheckCell.Col >= Min(Start.Col, Stop.Col) &&
       CheckCell.Col <= Max(Stop.Col, Start.Col) &&
       CheckCell.Row >= Min(Start.Row, Stop.Row) &&
       CheckCell.Row <= Max(Stop.Row, Start.Row));
}

/* */ void Block::Asigna(Word StartC, Word StartR, Word StopC, Word StopR)
{
  Start.Col = StartC;
  Start.Row = StartR;
  Stop.Col = StopC;
  Stop.Row = StopR;
}

/* */

CellHashTable::CellHashTable(Byte InitBuckets) : HashTable(InitBuckets)
{
}

/* */

CellHashTable::~CellHashTable()
{ CellPtr CP, Temp;
  CP = FirstItem();
  while (CP)
  {
    Temp = CP;
    CP = NextItem();
    delete Temp;
  }
}

/* */

Boolean CellHashTable::Add(CellPtr ACell)
{
  CurrCell = ACell;
  CurrLoc = CurrCell->Loc;
  return HashTable::Add();
}

/* */ void CellHashTable::Delete(CellPos DelLoc, CellPtr& DeletedCell,
             FormulaCellPtr& FL)
{ FormulaCellPtr *CP;

CurrLoc = DelLoc;
  HashTable::Delete(&DeletedCell);
  if (DeletedCell && DeletedCell->CellType() == CfFormula)
```

```
{
  CP = &FL;
  while (*CP && *CP != (FormulaCellPtr) DeletedCell)
    CP = &(*CP)->Sig;
  if (*CP)
    *CP = (*CP)->Sig;
 }
}

/* */

CellPtr CellHashTable::Search(CellPos SPos)
{ HashItemPtr I;
  CellPtr C;

CurrLoc = SPos;
  I = HashTable::Search();
  if (!I) return Empty;
  else
  {
    memcpy(&C, I->Data, sizeof(C));
    return C;
  }
}

/* */

Word CellHashTable::HashValue()
{
  return CurrLoc.Col + CurrLoc.Row;
}
        /* */

Boolean CellHashTable::Found(HashItemPtr Item)
{ CellPtr C;

memcpy(&C, Item->Data, sizeof(C));
  return (C->Loc.Col == CurrLoc.Col && C->Loc.Row == CurrLoc.Row);
}

/* */ void CellHashTable::CreateItem(HashItemPtr Item)
{
  memcpy(Item->Data, &CurrCell, sizeof(CellPtr));
}

/* */

Byte CellHashTable::ItemSize()
{
  return sizeof(CellPtr);
}

/* */

CellPtr HashItemPtrToCellPtr(HashItemPtr H)
{ CellPtr CP;

if (!H) return NULL;
  memcpy(&CP, H->Data, sizeof(CP));
```

```
return CP;
}

/* */

CellPtr CellHashTable::FirstItem()
{
  return HashItemPtrToCellPtr(HashTable::FirstItem());
}

/* */

CellPtr CellHashTable::NextItem()
{
  return HashItemPtrToCellPtr(HashTable::NextItem());
}

/* */

OverwriteHashTable::OverwriteHashTable(Byte InitBuckets) :
        HashTable(InitBuckets)
{
}

/* */

OverwriteHashTable::~OverwriteHashTable()
{
}

/* */

Boolean OverwriteHashTable::Add(CellPtr SCell, Word Overwritten)
{ CellPtr CP;

if (!Overwritten)
    return 1;
  CP = Search(SCell->Loc);
  if (CP->CellType() != ClEmpty)
  {
    if (!Change(CP, SCell->Loc.Col - 1))
      return 0;
  }
  CurrCell = SCell;
  CurrPos = SCell->Loc;
  EndCol = CurrPos.Col + Overwritten;
  return HashTable::Add();
}

/* */ void OverwriteHashTable::Delete(CellPos SPos)
{
  CurrPos = SPos;
  HashTable::Delete(NULL);
}

/* */

Boolean OverwriteHashTable::Change(CellPtr SCell, Word Overwritten)
{
```

```
if (!Overwritten)
{
  Delete(SCell->Loc);
  return 1;
}
else
{
  CurrCell = SCell;
  CurrPos = CurrCell->Loc;
  EndCol = SCell->Loc.Col + Overwritten;
  return HashTable::Change();
}
}

/* */

CellPtr OverwriteHashTable::Search(CellPos SPos)
{ HashItemPtr I;
  CellPtr C;

CurrPos = SPos;
  I = HashTable::Search();
  if (!I) return Empty;
  else
  {
    memcpy(&C, I->Data, sizeof(C));
    return C;
  }
}

/* */

Word OverwriteHashTable::HashValue()
{
  return CurrPos.Row;
}

/* */

Boolean OverwriteHashTable::Found(HashItemPtr Item)
{ CellPtr C;
  Word E;

memcpy(&C, Item->Data, sizeof(C));
  memcpy(&E, &Item->Data[sizeof(C)], sizeof(E));
  return (CurrPos.Row == C->Loc.Row && CurrPos.Col >= C->Loc.Col &&
      CurrPos.Col <= E);
}

/* */ void OverwriteHashTable::CreateItem(HashItemPtr Item)
{
  memcpy(Item->Data, &CurrCell, sizeof(CurrCell));
  memcpy(&Item->Data[sizeof(CurrCell)], &EndCol, sizeof(EndCol));
}

/* */

Byte OverwriteHashTable::ItemSize()
{
```

```
  return sizeof(CurrCell) + sizeof(EndCol);
}

/* */

Cell::Cell(CellPos InitLoc)
{
  Loc = InitLoc;
}

Cell::Cell(Word InitC, Word InitR)
{
  Loc.Col = InitC;
  Loc.Row = InitR;
}

/* */

Cell::~Cell()
{
}

/* */

Boolean Cell::GetBand()
{
  return 1;
}

/* */

Boolean Cell::EnStack()
{
  return 0;
}

/* */

CellTypes Cell::CellType()
{
  return ClEmpty;
}

/* */

Word Cell::Width()
{
  return 0;
}

/* */

Word Cell::Overwritten(CellHashTable& CHash, CellPos& LastPos, Word MaxCols)
{ long CellWidth;
  Word Total;
  CellPos P;

P = Loc;
  CellWidth = Width();
  Total = 0;
  do {
```

```
    Total ++;
    CellWidth -= ColWidth;
    P.Col ++;
        } while (CellWidth > 0 && P.Col != MaxCols && CHash.Search(P)->CellType() == ClEmpty);
    Total --;
    return Total;
}

/* */ double Cell::CurrValue()
{
  return 0;
}

/* */

Boolean Cell::HasError()
{
  return 0;
}

/* */

Word Cell::OverwriteStart(Word EndCol)
{ Word C, Place;

Place = 0;
  C = Loc.Col;
  do {
    Place += ColWidth;
    C ++;
  } while (C != EndCol);
  return Place;
}

/* */ void Cell::EditString(char *L)
{
}

/* */

String Cell::DisplayString()
{
  return 0;
}

/* */

String Cell::FormattedString(OverwriteHashTable& OHash, CellPos CPos,
                Word Start, Byte& Color, Byte Width)
{
  return 0;
}

/* */ char *Cell::CopyString(char *L)
{
```

```
  return 0;
}

/* */

EmptyCell::EmptyCell() : Cell(0, 0)
{
} void EmptyCell::EditString(char *L)
{
  *L = '\0';
}

String EmptyCell::DisplayString()
{
  *SCell = '\0';
  return SCell;
}

String EmptyCell::FormattedString(OverwriteHashTable& OHash, CellPos CPos,
                Word Start, Byte& Color, Byte Width)
{ CellPtr CP;

CP = OHash.Search(CPos);
  if (CP->CellType() != ClEmpty)
    return CP->FormattedString(OHash, Loc, CP->OverwriteStart(CPos.Col),
                Color, Width);
  else
  {
    Color = CellColor;
    *SCell = '\0';
    return SCell;
  }
} char *EmptyCell::CopyString(char *L)
{
  return L;
}

ValueCell::ValueCell(CellPos InitLoc, Boolean InitError, double InitValue) :
        Cell(InitLoc)
{
  Error = InitError;
  Value = InitValue;
}

ValueCell::~ValueCell()
{
}

CellTypes ValueCell::CellType()
{
  return ClValue;
}

Word ValueCell::Width()
{
  sprintf(SCell, "%g", Value);
  return strlen(SCell);
```

```
}

Boolean ValueCell::HasError()
{
  return Error;
} double ValueCell::CurrValue()
{
  return Value;
} void ValueCell::EditString(char *L)
{
  sprintf(L, "%g", Value);
}

String ValueCell::DisplayString()
{
  sprintf(SCell, "%g", Value);
  return SCell;
}

String ValueCell::FormattedString(OverwriteHashTable& OHash, CellPos CPos,
                Word Start, Byte& Color, Byte Width)
{ Word Counter;
  char *Temp, S2[256];

sprintf(S2, "%g", Value);
  Color = CellColor;
  if (Start < strlen(S2))
    CopyN(SCell, S2 + Start, ColWidth);
  else *SCell = '\0';
  return SCell;
} char *ValueCell::CopyString(char *L)
{
  return L;
}

TextCell::TextCell(CellPos InitLoc, char *InitTxt) : Cell(InitLoc)
{
  Txt = (char *) malloc(strlen(InitTxt) + 1);
  if (!Txt)
    return;
  strcpy(Txt, InitTxt);
}

TextCell::~TextCell()
{
  free(Txt);
}

CellTypes TextCell::CellType()
{
  return CTText;
}

Word TextCell::Width()
{
```

```
  return strlen(Txt);
} void TextCell::EditString(char *L)
{
  strcpy(L, Txt);
}

String TextCell::DisplayString()
{
  strcpy(SCell + 1, Txt);
  SCell[71] = '\0';
  SCell[0] = '\'';
  return SCell;
}

String TextCell::FormattedString(OverwriteHashTable& OHash, CellPos CPos,
            Word Start, Byte& Color, Byte Width)
{
  Color = CellColor;
  if (Start < strlen(Txt))
    CopyN(SCell, Txt + Start, ColWidth);
  else *SCell = '\0';
  return SCell;
} char *TextCell::CopyString(char *L)
{
  strcpy(L, Txt);
  return L;
}

FormulaCell::FormulaCell(CellPos InitLoc, Boolean InitError, double InitValue,
            char *InitFormula) : Cell(InitLoc)
{
  Formula = (char *) malloc(strlen(InitFormula) + 1);
  if (!Formula)
    return;
  strcpy(Formula, InitFormula);
  Error = InitError;
  Value = InitValue;
}

/* */ void FormulaCell::Agrega(FormulaCellPtr& FL)
{ FormulaCellPtr *Temp;

Sig = FL;
  FL = this;
}

FormulaCell::~FormulaCell()
{
  free(Formula);
}

CellTypes FormulaCell::CellType()
{
  return ClFormula;
}
```

```cpp
Boolean FormulaCell::GetBand()
{
  return (Marcada == Calculada);
}

Boolean FormulaCell::EnStack()
{
  return (Marcada == EstaEnStack);
}

Word FormulaCell::Width()
{ char S[81], *Temp;
  Word P, W;

sprintf(S, "%g", Value);
  W = strlen(S);
  return W;
}

Boolean FormulaCell::HasError()
{
  return Error;
} double FormulaCell::CurrValue()
{
  return Value;
} void FormulaCell::EditString(char *L)
{
  strcpy(L, Formula);
}

String FormulaCell::DisplayString()
{
  return Formula;
}

String FormulaCell::FormattedString(OverwriteHashTable& OHash, CellPos CPos,
                    Word Start, Byte& Color, Byte Width)
{ char Temp[256];
  Word Counter;

sprintf(Temp, "%g", Value);
  Color = CellColor;
  if (Start < strlen(Temp))
    CopyN(SCell, Temp + Start, ColWidth);
  else *SCell = '\0';
  return SCell;
} char *FormulaCell::CopyString(char *L)
{
  return strcpy(L, Formula);
}
```

* FILE: TCCELL.H *
* ============ *

/* */ define EstaEnStack 2
define Calculada 1
define ColWidth 10

/* */ enum CT {ClEmpty, ClValue, ClText, ClFormula, ClRepeat};
typedef enum CT CellTypes;

struct CellPos {
 Word Col;
 Word Row;
 void SetValues(Word InitCol = 1, Word InitRow = 1)
    { Col = InitCol; Row = InitRow; }
};

/* */
struct Block {
   CellPos Start, Stop;
   Block(CellPos InitStart);
   Block(Word StartCol, Word StartRow, Word StopCol, Word StopRow);
   Block() {};
   Boolean ExtendTo(CellPos NewLoc);
   Boolean CellInBlock(CellPos CheckCell);
   void Asigna(Word StartC, Word StartR, Word StopC, Word StopR);
};

typedef Block *BlockPtr;
struct Cell;
struct FormulaCell;

/* */
struct CellHashTable : HashTable {
   struct Cell *CurrCell;
   CellPos CurrLoc;
   CellHashTable(Byte InitBuckets);
   ~CellHashTable();
   Boolean Add(struct Cell *ACell);
   void Delete(CellPos DelLoc, struct Cell *& DeletedCell,
          struct FormulaCell *& FL);
   struct Cell *Search(CellPos SPos);
   virtual Word HashValue();
   virtual Boolean Found(HashItemPtr Item);
   virtual void CreateItem(HashItemPtr Item);
   virtual Byte ItemSize();
   struct Cell *FirstItem();
   struct Cell *NextItem();
};

typedef CellHashTable *CellHashTablePtr;

/* */
struct OverwriteHashTable : HashTable {
   struct Cell *CurrCell;
   CellPos CurrPos;
   Word EndCol;

```
    OverwriteHashTable(Byte InitBuckets);
    ~OverwriteHashTable();
    Boolean Add(struct Cell *SCell, Word Overwritten);
    void Delete(CellPos SPos);
    Boolean Change(struct Cell *SCell, Word Overwritten);
    struct Cell *Search(CellPos SPos);
    virtual Word HashValue();
    virtual Boolean Found(HashItemPtr Item);
    virtual void CreateItem(HashItemPtr Item);
    virtual Byte ItemSize();
};

/* */ struct Cell {
    CellPos Loc;
    Cell(CellPos InitLoc);
    Cell(Word InitC, Word InitR);
    virtual ~Cell();
    virtual CellTypes CellType();
    virtual void SetError(Boolean NewError) {};
    virtual void SetValue(double NewValue) {};
    virtual Boolean GetBand();
    virtual Boolean EnStack();
    virtual Word Width();
    virtual Word Overwritten(CellHashTable& CHash,
                CellPos& LastPos, Word MaxCols);
    virtual Boolean HasError();
    virtual double CurrValue();
    Word OverwriteStart(Word EndCol);
    virtual void EditString(char * L);
    virtual String DisplayString();
    virtual String FormattedString(OverwriteHashTable& OHash, CellPos CPos,
                Word Start, Byte& Color, Byte Width);
    virtual char *CopyString(char * L);
};

typedef Cell *CellPtr;

/* */
struct EmptyCell : Cell {
    EmptyCell();
    virtual void EditString(char *L);
    virtual String DisplayString();
    virtual String FormattedString(OverwriteHashTable& OHash, CellPos CPos,
                Word Start, Byte& Color, Byte Width);
    virtual char *CopyString(char *L);
};

/* */
struct ValueCell : Cell {
    Boolean Error;
    double Value;
    ValueCell(CellPos InitLoc, Boolean InitError, double InitValue);
    ~ValueCell();
    virtual CellTypes CellType();
    virtual void SetError(Boolean NewError) { Error = NewError; };
    virtual void SetValue(double NewValue) { Value = NewValue; };
    virtual Boolean GetBand() { return Cell::GetBand(); }
    virtual Boolean EnStack() { return Cell::EnStack(); }
    virtual Word Width();
```

```
      virtual Boolean HasError();
      virtual double CurrValue();
      virtual void EditString(char *L);
      virtual String DisplayString();
      virtual String FormattedString(OverwriteHashTable& OHash, CellPos CPos,
                  Word Start, Byte& Color, Byte Width);
      virtual char *CopyString(char *L);
};

/* */
struct TextCell : Cell {
   char *Txt;
   TextCell(CellPos InitLoc, char *InitTxt);
   ~TextCell();
   virtual CellTypes CellType();
   virtual Word Width();
   virtual void EditString(char *L);
   virtual String DisplayString();
   virtual String FormattedString(OverwriteHashTable& OHash, CellPos CPos,
                  Word Start, Byte& Color, Byte Width);
   virtual char *CopyString(char *L);
};

/* */
struct FormulaCell : Cell {
   Boolean Error;
   double Value;
   FormulaCell *Sig;
   Byte Marcada;
   char *Formula;
   FormulaCell(CellPos InitLoc, Boolean InitError,
           double InitValue, char *InitFormula);
   ~FormulaCell();
   void Agrega(FormulaCell *& FL);
   virtual CellTypes CellType();
   virtual void SetError(Boolean NewError) { Error = NewError; };
   virtual void SetValue(double NewValue) { Value = NewValue; };
   virtual Boolean GetBand();
   virtual Boolean EnStack();
   virtual Word Width();
   virtual Boolean HasError();
   virtual double CurrValue();
   virtual void EditString(char *L);
   virtual String DisplayString();
   virtual String FormattedString(OverwriteHashTable& OHash, CellPos CPos,
                  Word Start, Byte& Color, Byte Width);
   virtual char *CopyString(char *L);
};

typedef EmptyCell *EmptyCellPtr;
typedef ValueCell *ValueCellPtr;
typedef FormulaCell *FormulaCellPtr;
typedef TextCell *TextCellPtr;

CellPtr HashItemPtrToCellPtr(HashItemPtr H);
```

* ================================ *

* ================== *
* FILE: TCAPLICA.H *
* ================== *

```
struct Rango{
    char Nombre[16];
    int Limite_Superior;
    int Limite_Inferior;
    Rango *siguiente;
};

struct Dato{
    char Nombre[16];
    char Tipo_Operacion;
    float Limite_Superior;
    float Limite_Inferior;
};

//
//
    struct Aplica{
        float *P_Anterior;    //
        float *P_Actual;      //
        char *Nombre_Corto;   //
        char **Formulas;      //
        Dato **Lista_Datos;   //
        long *Indice_Ayuda;   //
        Rango *Base_Rango;    //
        Rango *Rango_Actual;  //
    };
//

//
boolean Asigna_Memoria(); //
void Libera_Memoria();  //
void Agrega_Aps();      //
void Baja_Formulas(char **); //
void Baja_Datos();   //
void Baja_Indice_Ayuda();  //
void Baja_Rangos(); //
boolean Baja_Aplicacion(char *); //
boolean Lee_Hilera(); //
boolean Lee_Formulas(); //
boolean Lee_Nombres(); //
boolean Lee_Datos(); //
boolean Lee_Indice_Ayudas(); //
boolean Lee_Rangos(); //
boolean Lee_Aplicacion(char *); //
```

I claim:

1. An apparatus for carrying out spreadsheet calculations using data imported from a database via a point and shoot user interface to select a database record for loading into a specified range of the spreadsheet, comprising:

a computer having a display and a memory having one or more storage locations;

a spreadsheet program, having a spreadsheet data format, in execution on said computer for displaying a plurality of cells which define a spreadsheet, each of said cells having a unique identification code indicative of the location of said cell on said display and each said cell being associated with one or more of said storage locations in said memory, and wherein any one or more of said cells can be selected by a user as part of a selected range using a cursor, and wherein said spreadsheet program includes program code to control said computer to receive data from said user and to store said data in the storage locations associated with user designated cells wherein said data can be text, numbers, or formulas including mathematical or logical operators relating contents of the storage locations associated with one or more of said cells to the contents of the storage locations of one or more other ones of said cells mathematically or logically, and wherein said computer is controlled by said spreadsheet program to display on said display the contents of said storage locations associated with each said cell, except where the contents of the storage locations associated with a particular one of said cells are a formula, in which case the computer is caused to display the results of the mathematical or logical operations defined by said formula at the corresponding location for said cell on said display, and wherein said spreadsheet program includes a recalculation routine for controlling said computer so as to perform a recalculation upon receipt of a recalculation command where all formulas associated with all cells of said spreadsheet are recalculated using whatever the current values are for each said cell stored in the associated storage locations in said memory at the time the recalculation command is received and any new results stemming from recalculation of said formulas where new contents since a previous recalculation exist in the storage locations associated with said cells mathematically or logically related by said formulas are displayed on said display at the location of the corresponding cells;

a database file stored in said memory and containing one or more records, each said record is comprised of one or more fields, each said field contains data;

first means in execution on said computer for controlling said computer so as to display on said display one or more of said records of said database file within a window while said spreadsheet program is in execution;

second means in execution on said computer and coupled to said recalculation routine and to said database file and to said first means, for controlling said computer to display a cursor in said window in which said records from said database file are displayed, said cursor being movable within said window under control of said user and controlling said computer to recognize a select command entered by said user such that any said data record pointed to by said cursor at the time said select command is given by said user is selected, and for controlling said computer so as to automatically load said selected database record into said selected range of said spreadsheet when said recalculation command is given, said loading including automatically reformatting data of said selected database record to said spreadsheet data format prior to the recalculation of said spreadsheet, such that when said recalculation is performed by said spreadsheet program, the contents of the storage locations associated with the cells in said selected range will be set equal to the contents of the selected database record before the recalculation starts thereby forcing the storage locations associated with the cells of said selected range to be loaded with the contents of said fields of said selected database record before the recalculation starts;

database record identifier means for controlling said computer to maintain data pointing to the last database record loaded from said database file into said selected range of said spreadsheet; and means for controlling said computer to load original contents of said storage locations associated with the cells of said selected range of said spreadsheet back into the database record pointed to by said database record identifier means before the contents of said selected database record are loaded into the cells of said selected range when said recalculation command is issued and before the recalculation is carried out.

2. The apparatus of claim 1 further comprising means coupled to said spreadsheet program and to said second means and database file, for carrying out loading of said cells of said selected range from fields of said selected record from said database file in accordance with a selectable mapping protocol defining which fields of said selected database record are loaded into specific cells of said selected range of said spreadsheet.

3. The apparatus of claim 2 wherein the process of loading said selected database record into the cells of said selected range of said database is accomplished using a one-to-one mapping between the cells of said selected range and said fields of said selected database record, such that when said recalculation is performed by said spreadsheet program, the contents of storage locations associated with the cells of the selected range of said spreadsheet before the recalculation starts will be set equal to the contents of selected fields of the selected database record according to said mapping protocol and wherein any formulas contained in the corresponding fields of said selected database record are stored in the storage locations associated with corresponding cells in said selected range of said spreadsheet, thereby forcing the recalculation process to use corresponding numbers, text and formulas from said database record in the storage locations associated with the cells of said selected range of said spreadsheet during said recalculation.

4. The apparatus of claim 2 further comprising:

intermediate processing means coupled to said database file and said first means for receiving one or more selected database record(s) and for performing a user selectable one or more of a plurality of predetermined processes on said database record and outputting a modified database record; and wherein said second means is coupled to said intermediate means and includes:

program code for controlling said computer to receive said modified database record from said intermediate processing means and displaying said modified record in said window, and for controlling said computer to display a cursor in said window in which said modified database record is displayed and to recognize a select command entered by a user and to select any said modified record pointed to by said cursor when said select command is received and for loading the contents of said selected modified database record into said storage locations associated with the cells within said selected range of said spreadsheet when said recalculation command is given but prior to the recalculation of said spreadsheet which results from issuance of said recalculation command by said user, such that when said recalculation is performed by said spreadsheet program, the contents of the storage locations associated with said selected range of cells of said spreadsheet will be set equal to the contents of selected fields of said selected modified database record according to said mapping protocol thereby forcing the recalculation process to use selected fields of said modified database record in the cells of said selected range during the recalculation.

5. The apparatus of claim 4 wherein said intermediate processing includes indexing means for either filtering or sorting said selected database records or for changing the mapping between the fields of the database records and the cells of said selected range.

6. The apparatus of claim 4 further comprising means for displaying said modified database records in said window after said intermediate processing and for loading any said modified database record designated by said user by moving said cursor in said window nto said selected range of said spreadsheet.

7. The apparatus of claim 1 further comprising record display means coupled to said second means and said first means for displaying records from said database file in said window, and for records from said database not currently visible in said window, for displaying said previously nonvisible records in said window upon receipt of a predetermined command from said user thereby allowing said user to designate any said record from said database for loading into said selected range of said spreadsheet by moving said cursor in said window regardless of the size of said window.

8. The apparatus of claim 7 wherein said record display means further comprises scrolling means for causing records from said database not currently visible in said window to scroll across said window sequentially upon receipt of a predetermined command from said user and for stopping the scrolling of records across said window upon receipt of a predetermined command from said user.

9. The apparatus of claim 7 wherein said record display means further comprises scrolling means for causing records from said database not currently visible in said window to scroll across said window sequentially and in stepwise fashion upon receipt of a scroll command from said user thereby allowing said user to bring in a predetermined number of new records into said window each time said scroll command is issued.

10. The apparatus of claim 9 wherein said scrolling means includes means for bringing records not currently displayed in said window into said window sequentially and in stepwise fashion whenever said pointer of said second means is moved to the edge of said window displayed by said first means.

11. The apparatus of claim 1 further comprising a plurality of database files, and wherein said first means displays a plurality of windows, each of which has displayed therein one or more records from a corresponding one of said database files, and wherein said second means displays a pointer on said display in a selectable one of said windows which can be moved to select any record displayed in any said window and which can be moved from window to window to select records from other database files for loading into said selected range.

12. The apparatus of claim 1 further comprising means for bringing other records from each database file not currently displayed in the corresponding window into said corresponding window.

13. The apparatus of claim 12 wherein said means for bringing other records into a particular window comprises scroling means for bringing other records from the corresponding database not currently displayed in any particular window into said corresponding window sequentially and in stepwise fashion whenever said pointer is moved to the edge of said corresponding window.

14. The apparatus of claim 1 further comprising ripple recalculation means coupled to said second means, to said recalculation means, to said first means and to said database file for sequentially loading a sequence of said database records, one at a time, into said selected reange of said spreadsheet starting from a predetermined database record, and for automatically setting said database record identifier pointer to point to the database record just loaded anytime between the time said new record is loaded into said selected range and before the next record in the sequence of records to be loaded into said selected range is loaded, and recalculating said spreadsheet, and, thereafter, for loading the resulting recalculated values displayed in said cells of said selected range back into the database record pointed to by said database records identifier pointer, and for loading the next database record in the sequence of database records to be loaded into said selected range of said spreadsheet into said selected range of said spreadsheet and repeating the process for all said database records in said sequence of database records to be loaded into said selected range of said spreadsheet.

15. The apparatus of claim 14 wherein said ripple recalculation means repeats the process of loading records from said database file and causing said spreadsheet program to recalculate until all records in the database file have been so processed.

16. The apparatus of claim 14 further comprising means for marking certain records in said database as restricted, and wherein said ripple recalculation means repeats the process of loading records from said database file and causing said spreadsheet program to recalculate until all records in the database file have been so processed except for those records marked as restricted.

17. The apparatus of claim 1 wherein each cell in said selected range can be designated by the user as either permanent or temporary and wherein there is a one-to-one mapping between each cell in said selected range of said spreadsheet and fields in said selected database record, and wherein fields of said selected database record which are mapped to said permanent cells are not loaded into said permanent cells, such that when said recalculation is performed by said computer under control of said spreadsheet program, the contents of the storage locations in memory associated with cells in said selected range of said spreadsheet before the recalculation starts will be set equal to the contents of selected fields of the database record pointed to by said second means except that said permanent cells will not have had their contents altered by the process of loading data from the database record thereby forcing the recalculation process to use selected fields of said database record in the cells of said selected range of cells during the recalculation.

18. The apparatus of claim 1 wherein said spreadsheet program controls said computer so as to be capable of recognizing and executing a plurality of commands, at least one of said commands for specifying a selectable range of said cells and providing a tool which, when invoked by a user allows the user to define a new command which is effective only for the specified selectable range of cells such that different regions of a single spreadsheet can have different command sets associated therewith.

19. An apparatus as defined in claim 18 wherein said spreadsheet program includes program code for controlling said computer to recognize and execute commands which, when executed, allow a user to define a plurality of new ranges of cells and new sets of commands for said new ranges of cells.

20. An apparatus as defined in claim 19 wherein said program code for controlling the computer to allow a user to define new ranges and environments includes computer code for controlling the computer to recognize and execute commands which when invoked by a user allow the user to specify any one or more of the following criteria for any specified new range of cells:
a new appearance in terms of colors,
new line types,
new fonts etc.
a new set of data validation values against which data entered in the cells of said specified range are checked for validity, new menus of commands, or
new help screens.

21. An apparatus for carrying out spreadsheet calculations using data imported from a database via a point and shoot user interface to select a database record for loading into a specified range of the spreadsheet, comprising:

a computer having a display and a memory having one or more storage locations;

a spreadsheet program, having a spreadsheet data format, in execution on said computer for displaying a plurality of cells which define a spreadsheet, each of said cells having a unique identification code indicative of the location of said cell on said display and each said cell being associated with one or more of said storage locations in said memory, and wherein any one or more of said cells can be selected by a user as part of a selected range using a cursor, and wherein said spreadsheet program includes program code to control said computer to receive data from said user and to store said data in the storage locations associated with user designated cells wherein said data can be text, numbers, or formulas including mathematical or logical operators relating contents of the storage locations associated with one or more of said cells to the contents of the storage locations of one or more other ones of said cells mathematically or logically, and wherein said computer is controlled by said spreadsheet program to display on said display the contents of said storage locations associated with each said cell, except where the contents of the storage locations associated with a particular one of said cells are a formula, in which case the computer is caused to display the results of the mathematical or logical operations defined by said formula at the corresponding location for said cell on said display, and wherein said spreadsheet program includes a recalculation routine for controlling said computer so as to perform a recalculation upon receipt of a recalculation command where all formulas associated with all cells of said spreadsheet are recalculated using whatever the current values are for each said cell stored in the associated storage locations in said memory at the time the recalculation command is received and any new results stemming from recalculation of said formulas where new contents since a previous recalculation exist in the storage locations associated with said cells mathematically or logically related by said formulas are displayed on said display at the location of the corresponding cells;

a database file stored in said memory and containing one or more records, each said record is comprised of one or more fields, each said field contains data;

first means in execution on said computer for controlling said computer so as to display on said display one or more of said records of said database file within a window while said spreadsheet program is in execution;

second means in execution on said computer and coupled to said recalculation routine and to said database file and to said first means, for controlling said computer to display a cursor in said window in which said records from said database file are displayed, said cursor being movable within said window under control of said user and controlling said computer to recognize a select command entered by said user such that any said data record pointed to by said cursor at the time said select command is given by said user is selected, and for controlling said computer so as to automatically load said selected database record into said selected range of said spreadsheet when said recalculation command is given, said loading including automatically reformatting data of said selected database record to said spreadsheet data format prior to the recalculation of said spreadsheet, such that when said recalculation is performed by said spreadsheet program, the contents of the storage locations associated with the cells in said selected range will be set equal to the contents of the selected database record before the recalculation starts thereby forcing the storage locations associated with the cells of said selected range to be loaded with the contents of said fields of said selected database record before the recalculation starts.

* * * * *

(12) EX PARTE REEXAMINATION CERTIFICATE (6068th)
United States Patent
Amada

(10) Number: US 5,293,615 C1
(45) Certificate Issued: Jan. 1, 2008

(54) POINT AND SHOOT INTERFACE FOR LINKING DATABASE RECORDS TO SPREADSHEETS WHEREBY DATA OF A RECORD IS AUTOMATICALLY REFORMATTED AND LOADED UPON ISSUANCE OF A RECALCULATION COMMAND

(76) Inventor: Carlos A. Amada, 4 Ave. 20-38 Zona 14, Guatemala (GT)

Reexamination Request:
No. 90/007,666, Aug. 11, 2005

Reexamination Certificate for:
Patent No.: 5,293,615
Issued: Mar. 8, 1994
Appl. No.: 07/614,907
Filed: Nov. 16, 1990

(51) Int. Cl.
*G06F 17/24* (2006.01)

(52) U.S. Cl. ............................ 707/4; 345/418; 715/503; 715/509; 715/804
(58) Field of Classification Search .................. 715/503
See application file for complete search history.

(56) References Cited

PUBLICATIONS

Computer Associates, "SuperCalc Version 5.0 User's Guide", Sep. 1988, Computer Associates International, Inc., U.S.
Computer Associates, "SuperCalc User's Guide", Mar. 1989, Computer Associates International, Inc., United States.
Computer Associates, "SuperCalc Reference Manual", Jan. 1989, Computer Associates International, Inc., United States.
Judy Duncan, "Q+E Allows Easy Queries to DBase Files in Windows", Info World: The Weekly for Personal Computer Professional, Sep. 18, 1989, pp. 94–95, vol. 11, N 38, InfoWorld Media Group, San Francisco, California.
Microsoft Corporation, Press Release, Jun. 19, 1989, Microsoft Corporation, Redmond, Washington.
Pioneer Software Inc., "Microsoft Excel for Windows/Q+E User's Guide, Version 2.1", 1989, The Kelton Group, Inc., Raleigh, N.C.
Microsoft Corporation, "Microsoft Excel Functions and Macros", 1988, Microsoft Corporation, Redmond, Washington.
Microsoft Corporation, Microsoft Excel Reference Guide, Version 2.0, 1987, Microsoft Corporation, Redmond, Washington.

*Primary Examiner*—Majid A. Banankhah

(57) ABSTRACT

A spreadsheet program providing the combination of spreadsheet and database tools, and enabling users to develop an application environment that can use all resources in the spreadsheet storage area. The spreadsheet program comprises three storage areas; a spreadsheet data structure; a set of database files in a storage area, and a video display system. The spreadsheet data structure is divided into two sets of cells that can be operated through three different environments. The first environment contains the tools of a spreadsheet environment, and the first set of cells can be operated through the first environment. This is most appropriate for scratchpad uses. The second environment contains the tools of a spreadsheet environment and contains a special command that can define commands for the third environment. This is appropriate to develop formulas for an application, and the application's environment of operation. The second environment also contains the tools necessary to define special environments for the integrated operation of spreadsheet and database tools. Said integrated operation coordinates dynamic screen video operations of the information in the spreadsheet and database storage areas. The second set of cells (for the development and use of an application) can be operated through the second or third environments. Several environments for the integrated operation of spreadsheet and database tools can exist in this invention. The software enables users to develop and use full database applications such as integrated accounting packages, within spreadsheet environments.

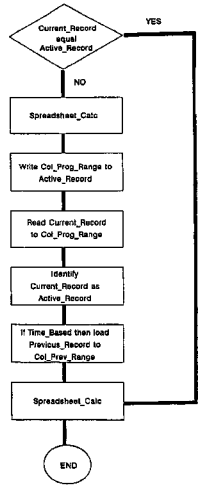

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–21 is confirmed.

* * * * *